US007930066B2

(12) United States Patent
Eliuk et al.

(10) Patent No.: US 7,930,066 B2
(45) **Date of Patent: *Apr. 19, 2011**

(54) AUTOMATED PHARMACY ADMIXTURE SYSTEM (APAS)

(75) Inventors: Walter W. Eliuk, Winnipeg (CA); Ronald H. Rob, Dugald (CA); Lance R. Mlodzinski, Winnipeg (CA); Alex H. Reinhardt, St. Andrews (CA); Thom Doherty, Winnipeg (CA)

(73) Assignee: Intelligent Hospital Systems Ltd., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/756,763

(22) Filed: Apr. 8, 2010

(65) Prior Publication Data

US 2010/0198392 A1 Aug. 5, 2010

Related U.S. Application Data

(63) Continuation of application No. 11/389,995, filed on Mar. 27, 2006, now Pat. No. 7,783,383.

(60) Provisional application No. 60/681,405, filed on May 16, 2005.

(51) Int. Cl.
*G06F 19/00* (2006.01)

(52) U.S. Cl. ........ 700/245; 700/240; 700/241; 700/242; 700/244; 221/2; 221/9; 221/191; 221/197; 221/198

(58) Field of Classification Search ........................ None
See application file for complete search history.

(56) References Cited

U.S. PATENT DOCUMENTS

| | | | | |
|---|---|---|---|---|
| 4,730,435 | A * | 3/1988 | Riddle et al. | 53/167 |
| 5,337,919 | A * | 8/1994 | Spaulding et al. | 221/2 |
| 5,341,854 | A * | 8/1994 | Zezulka et al. | 141/1 |
| 5,366,896 | A * | 11/1994 | Margrey et al. | 436/48 |
| 5,431,201 | A * | 7/1995 | Torchia et al. | 141/98 |
| 5,534,222 | A * | 7/1996 | Kelbrick et al. | 422/33 |
| 5,797,515 | A * | 8/1998 | Liff et al. | 221/2 |
| 6,048,086 | A * | 4/2000 | Valerino, Sr. | 706/10 |
| 6,066,294 | A * | 5/2000 | Lin et al. | 422/28 |
| 6,832,844 | B2 * | 12/2004 | Guzorek | 362/263 |
| 7,260,447 | B2 * | 8/2007 | Osborne | 700/216 |
| 2004/0034447 | A1 * | 2/2004 | Vollm | 700/235 |
| 2004/0154690 | A1 * | 8/2004 | Osborne et al. | 141/27 |
| 2005/0224137 | A1 * | 10/2005 | Tribble et al. | 141/329 |
| 2005/0236579 | A1 * | 10/2005 | Jenkins et al. | 250/455.11 |
| 2005/0252572 | A1 * | 11/2005 | Khan et al. | 141/94 |
| 2005/0252574 | A1 * | 11/2005 | Khan et al. | 141/198 |
| 2005/0273196 | A1 * | 12/2005 | Valerino | 700/230 |
| 2005/0279419 | A1 * | 12/2005 | Tribble et al. | 141/27 |

* cited by examiner

*Primary Examiner* — Khoi Tran
*Assistant Examiner* — Jonathan L Sample
(74) *Attorney, Agent, or Firm* — Irell & Manella LLP

(57) ABSTRACT

In a preferred embodiment, an automated Pharmacy Admixture System (APAS) may include a manipulator system to transport medical containers such as bags, vials, or syringes in a compounding chamber regulated to a pressure below atmospheric pressure. In a preferred implementation, the manipulator system is configured to grasp and convey syringes, IV bags, and vials of varying shapes and sizes from a storage system in an adjacent chamber regulated at a pressure above atmospheric pressure. Various embodiments may include a controller adapted to actuate the manipulator system to bring a fill port of an IV bag, vial, or syringe into register with a filling port at a fluid transfer station in the chamber. A preferred implementation includes a sanitization system that can substantially sanitize a bung on a fill port of a vial or IV bag in preparation for transport to the fluid transfer station.

20 Claims, 66 Drawing Sheets

AUTOMATED PHARMACY ADMIXTURE SYSTEM (APAS)

CROSS-REFERENCE TO RELATED APPLICATIONS

This application is a continuation of and claims priority to U.S. patent application Ser. No. 11/389,995 by Walter W. Eliuk et al., entitled "Automated Pharmacy Admixture System (APAS)", filed Mar. 27, 2006.

U.S. patent application Ser. No. 11/389,995 by Walter W. Eliuk et al., entitled "Automated Pharmacy Admixture System (APAS)", filed on Mar. 27, 2006 now U.S. Pat. No. 7,783,983, claims the benefit of U.S. patent application Ser. No. 11/316,795, entitled "Automated Pharmacy Admixture System," by Ronald H. Rob et al., filed on Dec. 22, 2005, now U.S. Pat. No. 7,610,115, issued on Oct. 27, 2009, and also claims priority under 35 USC §119(e) to U.S. Provisional Patent Application Ser. No. 60/681,405, entitled "Device and Method for Cleaning and Needle/Cap Removal in Automated Pharmacy Admixture System", filed on May 16, 2005. U.S. Pat. No. 7,610,115, entitled "Automated Pharmacy Admixture System," by Ronald H. Rob et al., filed on Dec. 22, 2005 claims priority under 35 USC §119(e) to U.S. Provisional Patent Application Ser. No. 60/638,776, filed on Dec. 22, 2004.

TECHNICAL FIELD

Various embodiments relate to handling medicinal containers such as syringes, vials, and IV bags.

BACKGROUND

Many medications are delivered to a from an intravenous (IV) bag into which a quantity of a medication is introduced. Sometimes, the medication may be an admixture with a diluent. In some cases, the IV bag contains only the medication and diluent. In other cases, the IV bag may also contain a carrier or other material to be infused into the patient simultaneously with the medication. Medication can also be delivered to a patient using a syringe.

Medication is often supplied, for example, in powder form in a medication container or in a vial. A diluent liquid may be supplied for making an admixture with the medication in a separate or diluent container or vial. A pharmacist may mix a certain amount of medication (e.g., which may be in dry form such as a powder) with a particular amount of a diluent according to a prescription. The admixture may then be delivered to a patient.

One function of the pharmacist is to prepare a dispensing container, such as an IV bag or a syringe, that contains a proper amount of diluent and medication according to the prescription for that patient. Some prescriptions (e.g., insulin) may be prepared to suit a large number of certain types of patients (e.g., diabetics). In such cases, a number of similar IV bags containing similar medication can be prepared in a batch, although volumes of each dose may vary, for example. Other prescriptions, such as those involving chemotherapy drugs, may require very accurate and careful control of diluent and medication to satisfy a prescription that is tailored to the needs of an individual patient.

The preparation of a prescription in a syringe or an IV bag may involve, for example, transferring fluids, such as medication or diluent, among vials, syringes, and/or IV bags. IV bags are typically flexible, and may readily change shape as the volume of fluid they contain changes. IV bags, vials, and syringes are commercially available in a range of sizes, shapes, and designs.

SUMMARY

In a preferred embodiment, an automated Pharmacy Admixture System (APAS) may include a manipulator system to transport medical containers such as bags, vials, or syringes in a compounding chamber regulated to a pressure below atmospheric pressure. In a preferred implementation, the manipulator system is configured to grasp and convey syringes, IV bags, and vials of varying shapes and sizes from a storage system in an adjacent chamber regulated at a pressure above atmospheric pressure. Various embodiments may include a controller adapted to actuate the manipulator system to bring a fill port of an IV bag, vial, or syringe into register with a filling port at a fluid transfer station in the chamber. A preferred implementation includes a sanitization system that can substantially sanitize a bung on a fill port of a vial or IV bag in preparation for transport to the fluid transfer station.

Various embodiments may provide one or more of the following advantages. First, the APAS may compound toxic and/or volatile substances, such as those used for chemotherapy, in a substantially aseptic chamber at pressure below ambient pressure to substantially avoid unintentional escape of the substances outside of the chamber. Second, the APAS may be programmed to select medical containers, such as IV bags, syringes, and/or vials, according to site-specific (e.g., hospital) protocols for containers for particular drug orders. Third, medical items, including IV bag and vial bung ports, may be positioned to receive a sanitizing dose of pulsed ultraviolet.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 61A-61B show illustrative configurations of syringe caps in the syringe cap tray of FIG. 57.

Like reference symbols in the various drawings indicate like elements.

DETAILED DESCRIPTION OF ILLUSTRATIVE EMBODIMENTS

Various illustrative embodiments relate to processing medical items contained in containers, such as bags, vial, and syringes. Some embodiments involve automation of processes to transfer fluids, compound pharmaceuticals and/or package and prepare medical items.

An Automated Pharmacy Admixture System (APAS) may include a manipulator that transports medical containers such as bags, vials, or syringes about a substantially aseptic admixing chamber. In a preferred implementation, a gripper assembly is configured to substantially universally grasp and retain syringes, IV bags, and vials of varying shapes and sizes. In an illustrative embodiment, a gripping device may include claws configured to grasp a plurality of different types of IV bags, each type having a different fill port configuration. Embodiments may include a controller adapted to actuate a transport assembly to place a fill port of the bag, vial or syringe into register with a filling port such as a cannula located at a filling station, or be equipped with carousel transport systems that are adapted to convey bags, vials, and syringes to the admixture system and deliver constituted medications in bags, vials or syringes to an egress area.

Figure 1:
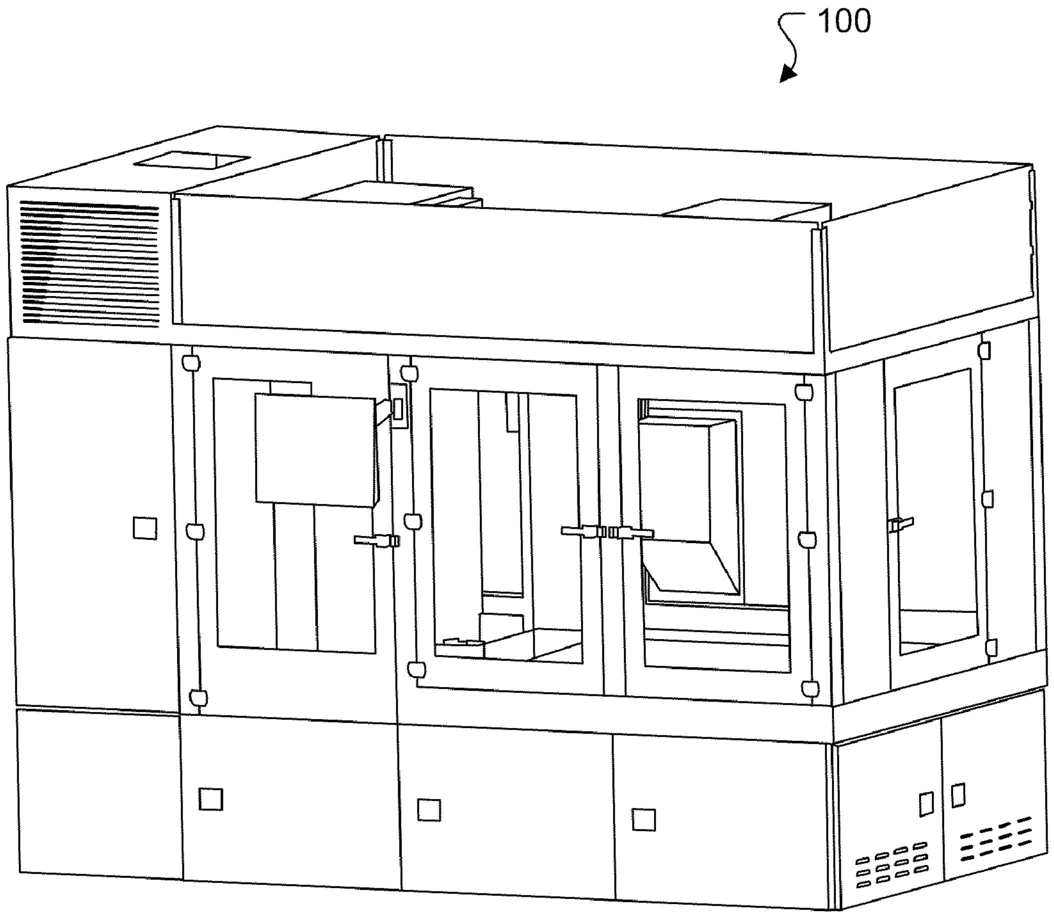
FIG. 1 shows an illustrative automated pharmacy admixture system (APAS) cell.

FIG. 1 shows an illustrative Automated Pharmacy Admixture System (APAS) cell 100 device for use within a hospital pharmacy environment. The APAS cell 100 may autonomously admix contents of syringes and IV bags using automation technologies. For example, embodiments of the APAS cell 100 may perform one or more operations that might otherwise be performed by pharmacy staff within a laminar airflow hood. The APAS cell 100 includes a robotic cell that automates the compounding and dispensing of drug doses into IV bags and/or syringes, such as those that may be prepared in hospital pharmacies. The robotic cell may use a syringe-based fluid transfer process, and may employ a robotic manipulator (e.g., a multiple degree of freedom arm) for moving drug vials, syringes, and IV bags through the cell as the medications are processed.

Figure 2:
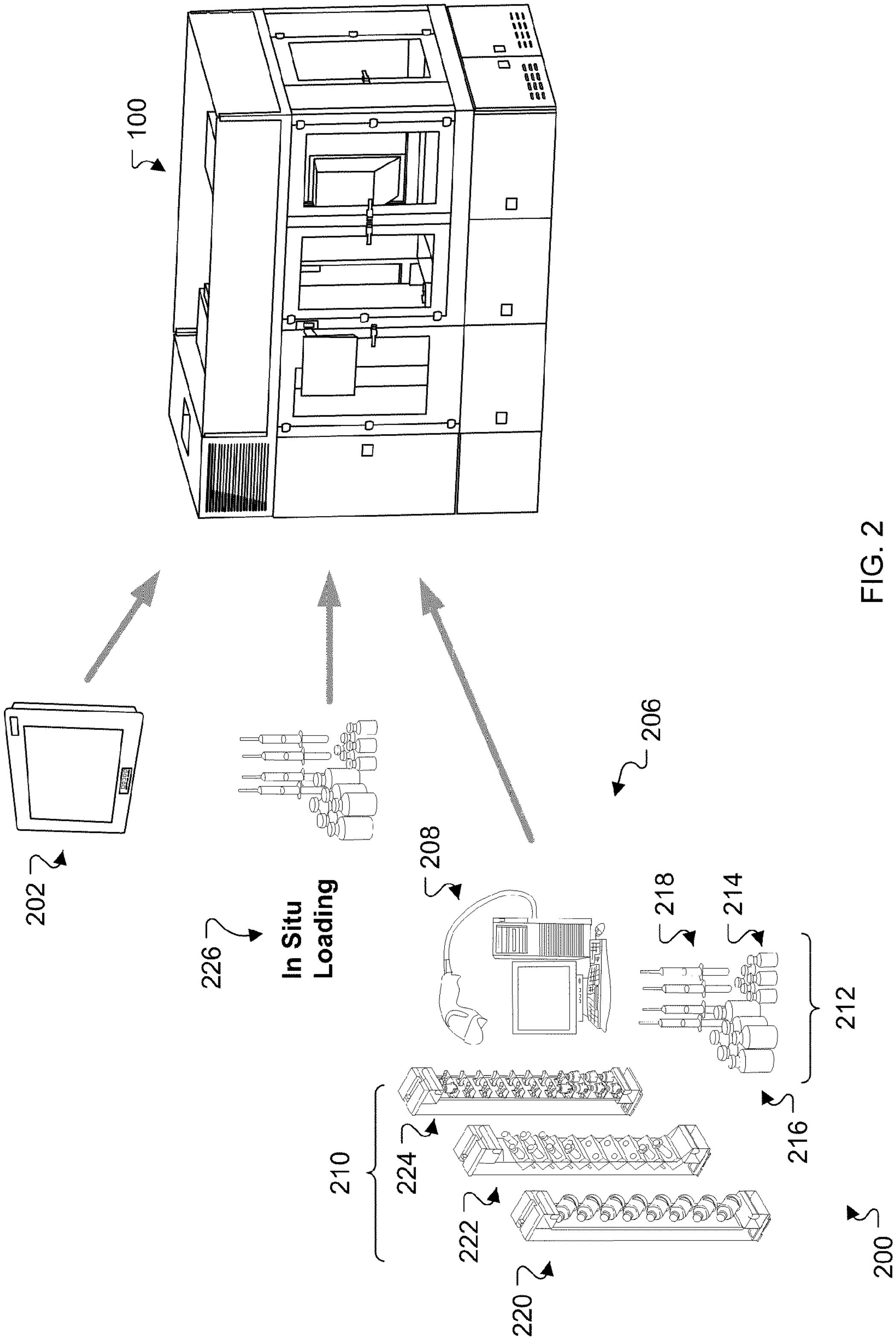
FIG. 2 shows an illustrative inventory system for an APAS cell.

FIG. 2 shows illustrative equipment 200 that allows an operator to load inventory, input control information, and/or retrieve syringes and/or IV bags from the APAS cell 100 of FIG. 1. The APAS cell 100 includes a flat panel monitor 202 which may be used by an operator, for example a pharmacy technician, as a user interface to the APAS cell 100. The APAS cell 100 may include one or more flat panel monitors 202, which may be used to input control information and/or output status information, for example. In this example, the flat panel monitor 202 may also act as a control device to allow the operator, for example by touching the indicators on a touch screen, to start, stop, and pause the APAS cell 100. As an output device, the flat panel monitor 202 can be used in the monitoring of the status and alarm conditions of the APAS by displaying, for example, a message to the operator when a predetermined condition has occurred. As another example, an operator may use the flat panel monitor 202 to control the process of loading the APAS cell 100 with the drugs needed to perform its compounding process. The operator may use the flat panel monitor 202 as an input device, for example, to control the cleaning of the APAS cell 100 in a step-by-step manner. The flat panel monitor 202 may be used as an input and output device, for example, by a pharmacy technician while training the system for new drugs that are to be prepared in the APAS cell 100.

In conjunction with the APAS cell 100, a remote user station (RUS) 206 may provide inventory control, planning, and/or management functions. The RUS 206 may include a workstation 208, inventory racks 210, and inventory (e.g., drug containers) 212. The workstation 208 may be interfaced to the APAS cell 100, either directly or through a computer network (e.g., LAN, WAN, MAN, wLAN), which may be part of a hospital interface network in some implementations. The operator, for example, may use the workstation 208 to review, add to, prioritize, or amend drug orders and planned production for the APAS cell 100. The operator may also use the workstation 208 to plan and manage the compounding and/or dispensing of drug dosages by the APAS cell 100, and/or to report operations with regard to such processes. In another example, the workstation 208 may be used in APAS cell management to control the release of drug order queues to cells for the compounding process, or to monitor the APAS cell status during the compounding process. The workstation 208, and/or the APAS cell 100, may include hardware and/or software for scanning identifying indicia, such a bar code, RFID tag, etc. . . . , to facilitate the identification of inventory, and/or the placement of the inventory on a rack.

In this example, an operator may use the RUS 206 to coordinate the loading of inventory racks 210. The inventory racks 210 may be loaded with inventory 212, which may include vials of various sizes 214, 216, syringes 218 and/or IV bags (not shown). In this embodiment, each of the racks 210 may store only one type or size of inventory items however, different racks may be arranged to hold inventory items of various sizes. In some embodiments, one or more of the racks 210 may be configured to store multiple sizes and/or types of inventory items. In this embodiment, the racks 210 are arranged to store large vials 220, syringes 222, or small vials 224. Further embodiments of racks 210 for storing inventory may include racks for IV bags, and examples of such racks are described with reference to FIGS. 5 and 14, for example. Each inventory item may be manually placed within an appropriate support, which may include, for example, a retention clip, hook, shelf, bin, slot, or pocket on the rack 210.

The inventory 212 may be used as inputs to the APAS cell 100, supplying it with vials, syringes, and/or IV bags that may contain drugs and/or diluents needed by the system for the compounding process. The APAS cell 100 may output syringes and/or IV bags that have been prepared for use, for example, in dispensing drug doses to patients in a hospital, health care facility, clinic, or for distribution on an outpatient basis (e.g., in-home nurse visits).

In some implementations, the inventory racks 210 may be pre-loaded (e.g., off-line in advance) with the inventory 212 needed for input to the APAS cell 100. For example, pre-loaded racks of commonly used inputs (e.g., saline IV bags) may be prepared to satisfy anticipated, expected, or planned compounding production orders. Preloading may occur, for example, in an off-site warehouse where the racks, drug inventory, and container inventory may be stored. Some or all operations relating to the remote workstation may be performed in work areas that have a controlled environment, which may be a substantially aseptic environment. The computer device 208 may communicate with the APAS cell 100, and each may be programmed to process and/or exchange information about historical, current, and anticipated inventory, supply schedules, and demand information. The information may be used to prioritize, schedule, and order inventory to respond to and satisfy production input requirements for one or more APAS cell 100 systems, for example. In some cases, the APAS cell 100 may coordinate with a hospital inventory control system to place orders automatically, for example, to maintain a minimum level of inventory of certain inputs or outputs of the APAS cell 100 based on historical and expected demand information.

In some examples, the APAS cell 100 may be operated in a batch mode to produce some number of substantially similar outputs, such as cefazolin at a particular dose and in a particular type of syringe. In other examples, the APAS cell 100 may be operated to be loaded with inventory in situ 226. In situ loading may occur at substantially any time to produce a typically limited number of outputs, which may include a single dose, for example. In situ loading may involve, for example, loading inventory onto a rack in the APAS cell 100 without interrupting an on-going compounding process, or when the APAS cell 100 is in an idle mode.

Some embodiments may include two independently operable carousels. In one mode of operation, one of the carousels can be operating to deliver inventory to the processing chamber while the other carousel is being unloaded or loaded. In a further embodiment, the APAS cell 100 may include three or more inventory delivery systems, which may perform the same functions as the carousels, examples of which are described elsewhere herein. In such embodiments, one or more of the carousels may be operated to deliver inventory while one or more other carousels are being serviced or loaded/unloaded with inventory.

For example, a pharmacy technician may use in situ loading of the APAS cell 100 in response to a written or electronically received order from a physician for a medication that is needed quickly (which may be referred to as a stat order or an on-demand order). The APAS cell 100 may notify the technician what inputs need to be loaded to fulfill the order. Knowing the items needed for the stat order, the technician may load any inventory (e.g., drug vial, syringe, and/or IV bag) to perform the compounding and/or dispensing process in the appropriate rack(s) 210 and places the rack(s) 210 onto a carousel (not shown here) in the APAS cell 100. In another embodiment, the technician may load the inventory into unused locations in one or more racks that are already on a carousel in the APAS cell 100. The technician may input order information or instructions to configure the APAS cell 100 to prepare to fulfill the stat order.

In some examples, the APAS cell 100 may have stored in a memory or a database a recipe for compounding. In such cases, the operator may identify the recipe to be recalled from memory. In other examples, a pharmacy technician or operator may teach the APAS cell how to process the inventory using a software-driven user interface, for example. The APAS cell 100 may learn new recipes through a training mode, which may involve the user entering command information via a graphical user interface being displayed on the monitor 202. The operator may, for example, indicate locations of inventory items on a graphical map of the inventory system.

In some embodiments, storage racks may be scanned with a scanner (e.g., bar-code, RFID, etc. . . . ) when re-stocking inventory. Reports that may be printed by the APAS or by printers associated with networked computers (e.g., hospital pharmacy data input terminals) may include bar-coded information that can be cross-referenced when, for example, distributing drugs (e.g., to patients, hospital carts, etc. . . . ). Data stored in a memory accessible by a computer system may include data associated with medical items, authorized system users and associated access rights, storage areas, and restock information. Authorized user information may be associated with user identification information, such as biometric data, passwords, challenge-response authentication, as well as other mechanisms known to those of ordinary skill in the art. In some implementations, at least in some modes, access to the storage chamber requires an authorized user to enable access to the doors, which may be unlocked in response to an authorized request for access.

Stored data may also include machine readable indicia (e.g., 1 or 2 dimensional bar codes, RFID tag codes, etc. . . . ), text which may be read using OCR (optical character recognition), and/or voice recognition information. Stored data about medical items may include brand name and/or generic name information. Medical containers, including IV bags, vials, and/or syringes, may be labeled with such data in connection with restocking inventory in a storage carousel or storage rack, or in connection with an output of a medical item individually or as a kit.

Figure 3:
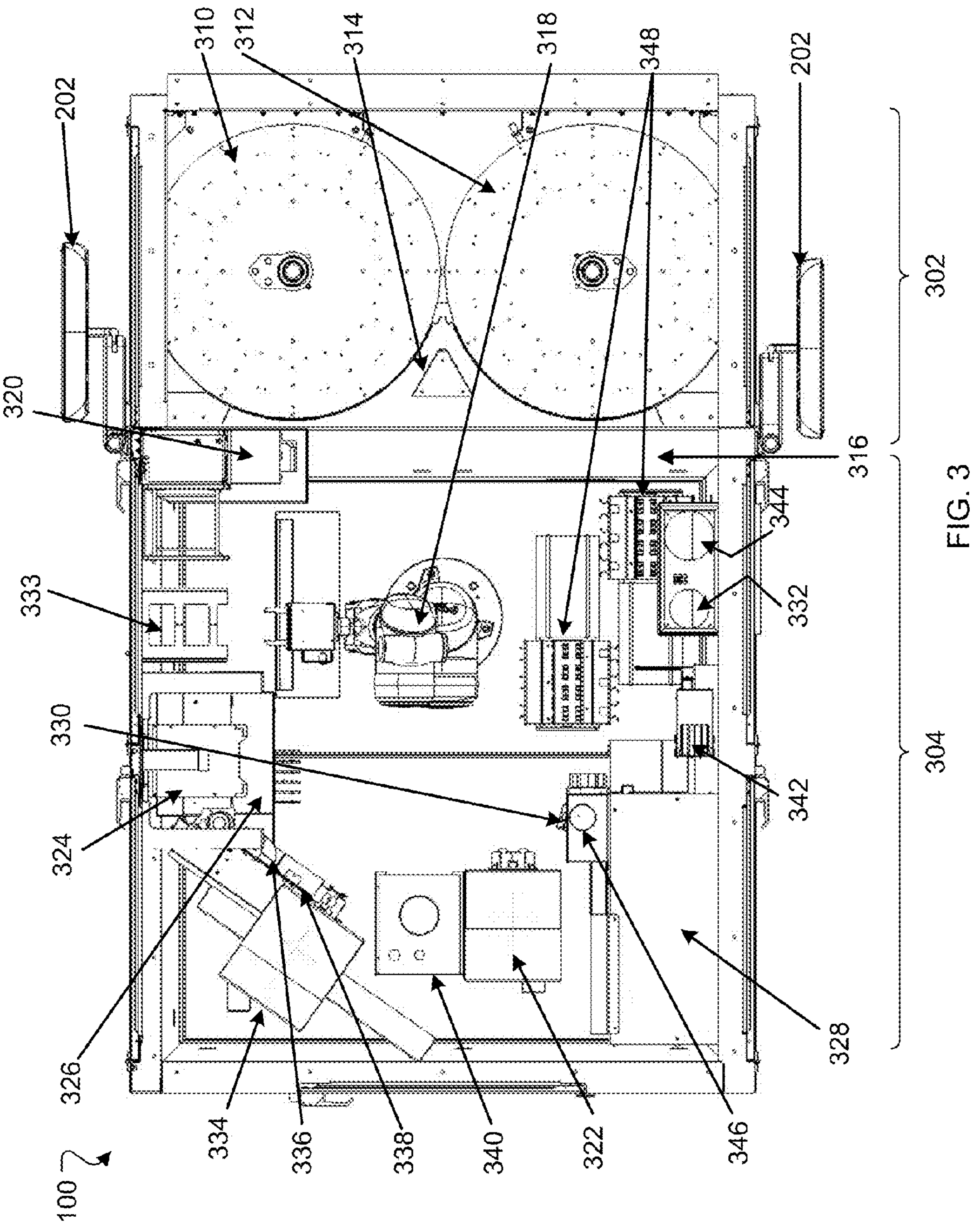
FIG. 3 shows a top cut-away view of the APAS cell of FIG. 1.

FIG. 3 shows an illustrative top cut-away view of the APAS cell of FIG. 1. The APAS cell 100 includes two chambers. An inventory chamber 302 is used as an inventory loading area, which can be accessed by an operator to load the APAS cell 100 through a loading door (not shown). A processing chamber 304 includes the compounding area in which the admixture and/or compounding processes may occur. In some embodiments, the processing chamber 304 provides a substantially aseptic environment, which may be an ISO Class 5 environment that complies with clean room standards. Mounted on the exterior of the APAS cell 100 are two of the monitors 202, which may serve as input/output devices as described with reference to FIG. 2.

The inventory chamber 302 includes two inventory rack carousels 310 and 312 and a temporary inventory rack 314. The temporary inventory rack 314 may be used to locate in-process drug vials that contain enough material to provide multiple doses. Each inventory rack carousel 310 may support multiple inventory racks 210. In some applications, an operator may remove one or more racks from the carousels 310, 312 and replace them with racks loaded with inventory. The racks may be loaded onto the carousels 310, 312 according to a load map, which may be generated by the operator for submission to the APAS cell 100, or generated by the APAS cell 100 and communicated to the operator. The chambers 302, 304 are separated by a dividing wall 316, an example of which is described with reference to FIG. 4.

The processing chamber 304 includes a multiple degree of freedom robotic arm 318, and the robotic arm 318 further includes a gripper that can be used, for example, to pick items from a pocket on a rack or to grasp items within the APAS cell 100 for manipulation. An illustrative gripper is described in further detail with reference to FIGS. 9-11. The robotic arm 318 may respond to command signals from a controller (not shown) to pick up, manipulate, or reposition inventory items within the processing chamber 304, and in or around the carousels 310, 312. The robotic arm 318 may manipulate inventory items, for example, by picking a vial, IV bag, or syringe from a rack of the carousels 310, 312 in the inventory chamber 302, and moving the item to a station in the processing chamber 304 for use in compound preparation. In some examples, the robotic arm 318 may manipulate inventory items on the carousels 310, 312 through access port 410 in the dividing wall 316. The dividing wall 316 may be substantially sealed so that a substantially aseptic environment may be maintained for compounding processes in the processing chamber 304.

According to an illustrative example, an incoming drug order from the RUS 206 involves a batch production order for syringes to be charged with individual doses of a drug that is reconstituted from a drug provided in one or more vials. The operator, for example, may preload the drug into the APAS cell 100 during a loading process by loading the carousel 310 with inventory racks of the drug vials, and by interfacing with the APAS cell 100 using the input/output device 202 to initiate, monitor, and/or control the loading process. As the APAS cell 100 is processing a previous order, the operator may load the carousel 312 with inventory racks of syringes, drug vials, and IV bags for the next batch production order while the APAS cell 100 is operating the carousel 310. Once the loading process is complete, the operator may submit the batch production process, which may begin immediately, or after other processing is completed.

To execute the batch production, in this example, the robotic arm 318 may pick a syringe from a pocket in a rack in carousel 310. The syringe in the carousel may have a needle and a needle cap. The needle cap is removed for processing in the APAS cell 100. The robotic arm 318 may convey the syringe to a decapper/deneedler station 320 where the needle cap is removed from the syringe/needle assembly to expose the needle. The robotic arm 318 may transfer the syringe to a needle-up syringe manipulator 322 where a dose of the drug is drawn from a vial, which was previously placed there by the robotic arm 318 after one or more verification operations (e.g. weighing, bar code scanning, and/or machine vision recognition techniques). The robotic arm 318 moves the syringe to the decapper/deneedler station 320 where the needle is removed from the syringe and disposed of into a sharps container (not shown here). The robotic arm 318 then moves the syringe to a syringe capper station 324, where the needleless syringe is capped. The robotic arm 318 moves the syringe to a scale station 326 where the syringe is weighed to confirm the predetermined dose programmed into the APAS cell. The robotic arm 318 then moves the syringe to a printer and labeling station 328 to receive a computer readable identification (ID) label that is printed and applied to the syringe. This label may have a bar code or other computer readable code printed on it which may contain, for example, patient information, the name of the drug in the syringe, the amount of the dose, as well as date and/or lot code information for the inputs. The robotic arm 318 then moves the syringe to an output scanner station 330 where the information on the ID label is read by the scanner to verify that the label is readable. The APAS cell 100 may report back to the RUS 206 using the hospital interface network, for use in operations planning. The syringe is then taken by the robotic arm 318 and dropped into the syringe discharge chute 332 where it is available to the pharmacy technician, for example, to be placed in inventory within the hospital pharmacy. As the process continues, there may be times during the drug order process where the robotic arm 318 removes an empty vial from the needle up syringe manipulator 322 and places it into a waste chute 333.

In another illustrative example, a syringe may be used for both as an input containing a fluid (e.g., diluent or known drug compound) to be admixed in a compounding process, and as an output containing a prepared dose suitable for delivery to a patient. Such a syringe may be needed to fulfill a special reconstitution order programmed into the APAS cell 100 via the input/output capabilities of the monitor 202, for example. In another example, the order may be a stat order, which may be received from a hospital interface. In this example, the operator performs in situ loading 226 by placing the syringes to be used for both reconstitution and dosing in pockets on a rack already located on the carousel 310. The operator enters the reconstitution order into the APAS cell 100. The robotic arm 318 picks the selected syringe from a pocket in the rack in the carousel 310 and moves it to the decapper/deneedler station 320, where the needle cap is removed from the syringe/needle combination, thereby exposing the needle. The syringe is then transferred by the robotic arm 318 to a needle down syringe manipulator 334. At the station 334, diluent is drawn into the syringe from a diluent supply IV bag 336 previously placed there by the robotic arm 318. The diluent supply 336 may be contained in an IV bag which is hung on the needle down syringe manipulator 334 by a clip, as shown in FIGS. 6-7. An air extraction process may be performed to prime the IV bag, if needed, the details of which are described with reference to FIGS. 15A-15C. The syringe then punctures the membrane of the diluent port 338 (another example of which is shown in FIG. 7) in a needle down orientation. The syringe is actuated to remove, for example, a predetermined amount of the diluent from the IV bag. The needle down syringe manipulator 334 then moves a reconstitution vial, placed there previously by the robotic arm 318, under the syringe. The diluent in the syringe is transferred to the vial for reconstitution with the vial contents. The robotic arm 318 then moves the vial to a mixer for shaking according to a mixing profile. The robotic arm 318 then moves the vial to the needle up syringe manipulator 322 where the appropriate amount of the reconstituted drug is drawn from the vial into an "output" syringe that was previously conveyed there by the robotic arm 318.

In another embodiment, the APAS cell 100 may receive a production order to prepare compounds that may involve IV bags as input inventory items or as outputs. In some examples, an IV bag may be selected as a diluent source for reconstitution in a drug order to be output into another medical container. In other examples, the selected IV bag may be used for output after preparation of the drug order is completed. Some IV bags may be placed on the carousel 310, 312 and used as an input that may be at least partially filled with a diluent that may be used to reconstitute drugs. The reconstituted drugs may be output in the form of charged syringes or IV bags. The operator loads racks of syringes and IV bags into the carousel 310 for use in the production order. During the production order, the robotic arm 318 picks an IV bag from a rack on the carousel 310 and moves it to the scale and bag ID station 326. At this station, the IV bag is identified by bar code or pattern matching and its weight is recorded. This may be done, for example, as an error check, and/or to positively identify the type and/or volume of diluent being used for reconstitution. If the IV bag is selected as a diluent source, then the bag may be weighed before use to confirm the presence of the diluent in the IV bag. If the IV bag is selected for output, it may be weighed multiple times, such as before, during, and/or after each fluid transfer step, for example. As a post-transfer verification step, the weight may be re-checked after fluid transfer operations have occurred to determine if the change in weight is within an expected range. Such checks may detect, for example, leaks, spills, overfills, or material input errors. In this example, the robotic arm 318 moves the IV bag to a port cleaner station 340 where a pulsed ultraviolet (UV) light or other sanitizing process may be used to substantially sterilize, disinfect, and/or sanitize at least a portion of the IV bag port. The robotic arm 318 moves the IV bag to the needle up syringe manipulator 322 where a pre-filled syringe has been loaded. As in examples described with reference to FIGS. 17A-17C, the IV bag may be inverted so that the fill port is oriented downwards for the fill process. The contents of the syringe may then be injected into the IV bag. The robotic arm 318 then conveys the IV bag to the scale station 326 where the IV bag is weighed to confirm the predetermined dose programmed into the APAS cell. The robotic arm 318 then moves the IV bag to a bag labeler tray station 342 where a label printed by the printer and labeling station 328 is applied to the IV bag. The robotic arm 318 may move the IV bag to the output scanner station 330, where the information on the ID label is read by the scanner to verify that the label is readable. One or more further verification checks may be performed, examples of which are described elsewhere herein. The IV bag is then taken by the robotic arm 318 and dropped into the IV bag discharge chute 344 where it is available to the pharmacy technician, for example, to be placed in inventory within the hospital pharmacy.

In another embodiment, a vial (or other medical item or container) may be prepared for reconstitution. During the performing of this process by the APAS cell 100, the vial may be identified at a vial ID station 346 where, for example, a bar coded label on the vial may be read by a scanner and/or image hardware in combination with image processing software. The captured information may be processed to identify the contents of the vial and correlate it to what is expected. In some implementations, as an alternative to or in combination with bar code scanning, the APAS cell 100 may employ pattern matching on the vial using optical scanning techniques. Also, in the reconstitution process, vial mixers 348 may be used to mix the vial contents with the diluent before using it for dosing.

In some embodiments, the robotic manipulator may include apparatus for reading machine readable indicia in the APAS, including the compounding chamber and/or the storage chamber. For example, the manipulator may include a fiber optic camera for taking images that can be processed to compare to stored image information (e.g., bitmaps). In other examples, the reading apparatus may include optical scanning (e.g., bar code) or RFID (radio frequency identification). Some embodiments may transmit image information wirelessly (e.g., using infrared or RF (radio frequency) transmissions) to a receiver coupled to the APAS. Such a receiver may be located inside or outside the chamber with the robotic manipulator. Such a reader may be used to read machine readable indicia at various locations in and around the compounding chamber, including through windows and on portions of the storage carousels that are exposed to the compounding chamber.

Figure 4:
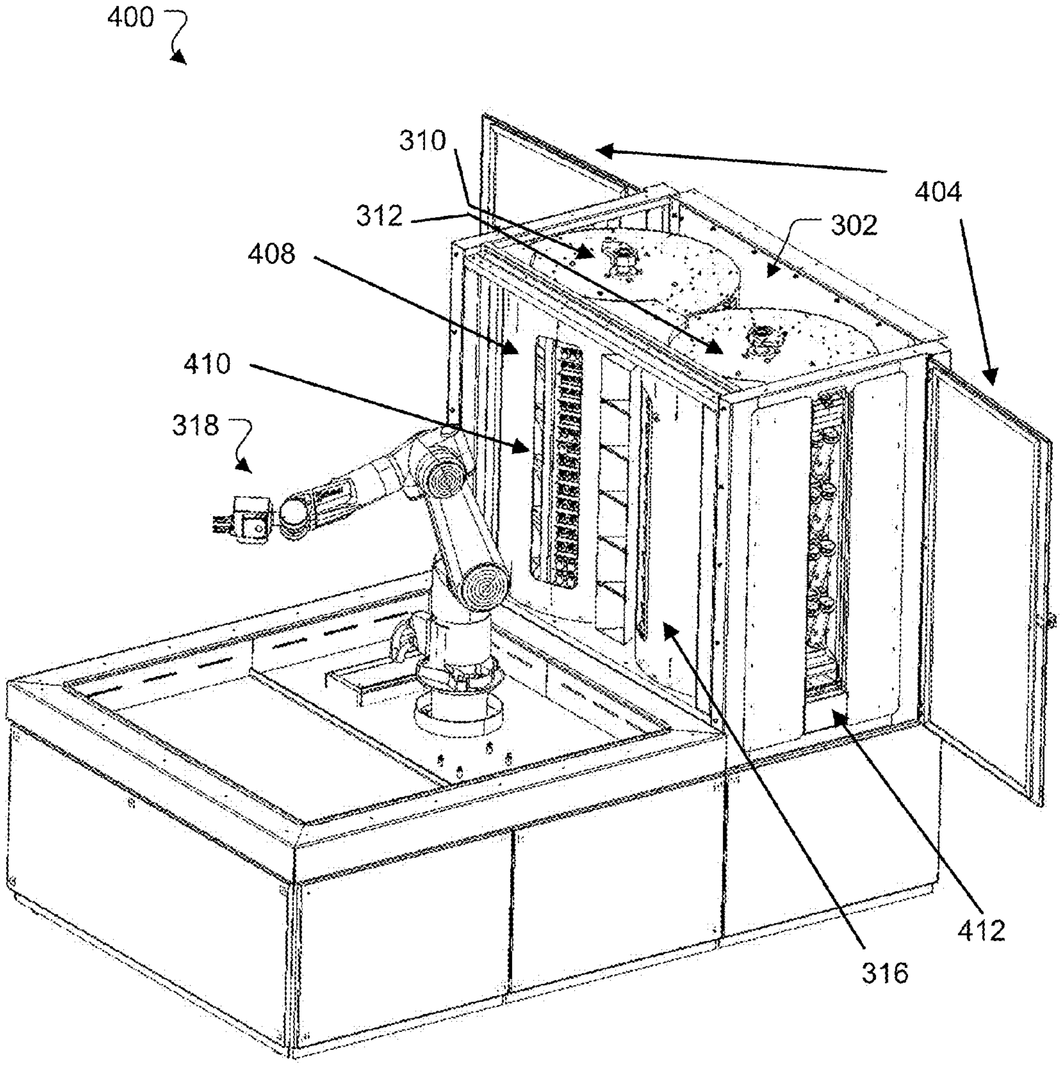
FIG. 4 is a perspective cut-away view showing illustrative details of the apparatus for handling syringes, IV bags, and drug vials in an APAS cell.

FIG. 4 shows a perspective cut-away view 400 of an illustrative APAS, an example of which is the APAS cell 100, shows details of the apparatus for handling syringes and IV bags in the APAS cell. The handling apparatus delivers inventory, including various sizes and types of syringes, vials, or IV bags, to be grasped by the robotic arm 318 in the processing chamber 304. An operator or technician may load/unload inventory racks that store the inventory until delivered to the robotic arm 318. In this example, the carousels 310, 312 may store syringes, vials, and/or IV bags, for example, for use in processes performed in the APAS cell 100. The partial view 400 of the APAS cell 100 is shown with the much of the processing chamber 304 removed to show the robotic arm 318 and how it can access the inventory chamber 302.

The inventory chamber 302 is shown in this embodiment with loading doors 404, which may be opened to load or remove a rack from either of the carousels 310, 312. The operator puts the APAS cell 100 into a loading mode to control a carousel by indexing it away from the robot access position where the curved wall 408 allows a portion of the carousel rack to be presented to a robot access port 410, which is in a portion of the dividing wall 316. The carousels 310, 312 may rotate to align the rack stations on the carousel with the loading doors 404 to allow rack-loading access 412. The carousel can be commanded by the operator to position any one of the rack positions in alignment with the loading access port 412. A rack that is aligned with the access port 412 can be removed and replaced with a rack containing a full load of inventory, or a rack may have its inventory replaced in situ, loading inventory into as little as a single pocket at a time. The racks can be reloaded in any combination of individual racks, including replacing all the racks at one time. At the conclusion of the rack loading, the operator may indicate via the touch screen that the APAS cell loading process is complete. This initiates a cycle where the carousel rotates through a 360-degree rotation to allow a barcode reader adjacent to the carousel to read a barcode (e.g., barcode 1408 of FIG. 14) on each of the racks. This allows the system to update the inventory data and correlate racks and inventory with carousel position information.

In this example, the dividing wall 316, which includes the curved wall 408, that separates the inventory chamber 302 from the processing chamber 304 may allow carousel 310, for example, to perform compounding processes within a substantially aseptic environment within the processing chamber 304, even while the operator is loading carousel 312. In an in situ process, for example as described with reference to FIG. 2, the loading of carousel 312 with the stat order may be carried out while the APAS cell 100 is operating out of carousel 310. The dividing wall 316 may be designed to substantially minimize airflow between the inventory chamber 302 to the processing chamber 304. Similarly, an airflow restriction may be set up at the loading door 404 in the inventory chamber 302 to restrict air exchange with ambient air when the rack is in the rack loading position (e.g., aligned with the access port 412) and the door 404 is open, for example.

In one embodiment, the loading door 404 may be coupled to an interlock that requires the loading door 404 to be closed during each advance of the carousel 312 for operator safety. Such an embodiment may also help reduce uncontrolled air exchanges in or out of the inventory chamber 302 while the carousel 312 is rotated.

Figure 5:
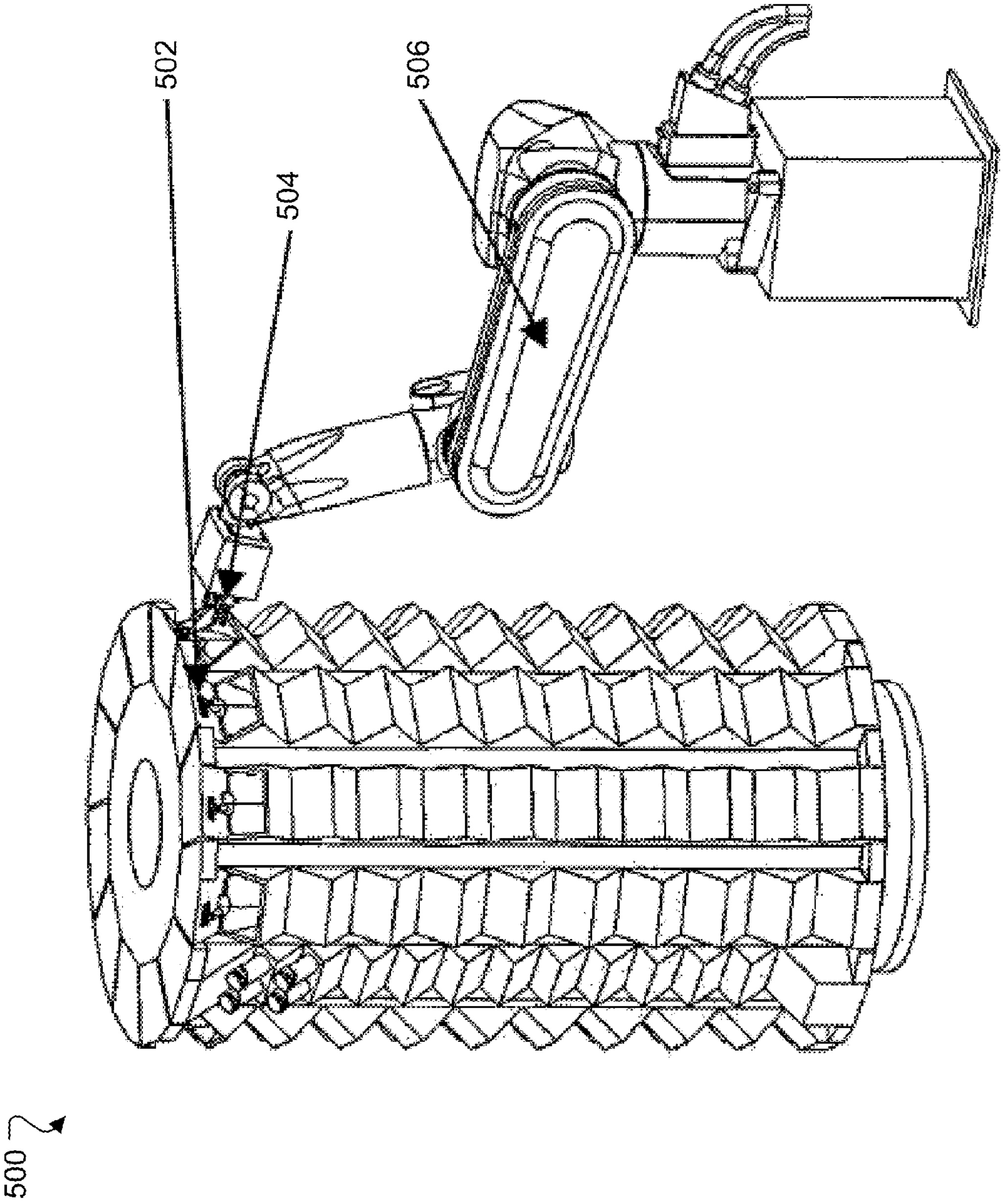
FIG. 5 illustrates an illustrative inventory system using a carousel structure with inventory racks accessible by a robotic arm in an APAS cell.

FIG. 5 shows an illustrative inventory system 500 that expands the inventory area that the robot can access for picking inventory (e.g., drug vials, syringes, and/or IV bags) that may be processed through the cell of an automated system, such as the APAS cell 100, for example. This inventory system 500 includes one or more carousels 502 for mounting the inventory. The carousels 502 may be positioned within the robot travel range such that the robot can access the full height of the racks on the carousel 502. The inventory is placed in a finite number of vertical racks 504 of the type shown in FIG. 2 that are placed around the periphery of the carousel. In this example, the carousel 502 includes twelve racks, but the design can accommodate any number of racks, including partial length (e.g., half-length) racks, for example. The rack size and configuration depends on the size of the inventory items or the user requirements for inventory quantity. All of the racks can be moved within the reach range of a robot arm 506 by rotating the carousel through 360 degrees with discrete stops for each rack. Positioning of the inventory locations may involve repeatably positioning the racks on the carousel and repeatably pre-programmed stopping of the carousel rotation at each rack location.

As for examples described with reference to FIGS. 12-13, the racks may be readily exchanged from the carousel for refilling. The racks are universally interchangeable in terms of position on the carousel, so that they can be removed and refilled and reinstalled in any order. FIG. 5 shows the racks as being all the same size and style, however the inventory may be separately stored on racks for each size of IV bag. Similarly, the racks can be configured for each size of syringe or combinations of syringe and size quantity.

Racks for the drug vials may also be configured to handle the full range of vial sizes. Some vial racks may be dedicated to large volume vial sizes, and some may be sectioned to handle two or more vial sizes in quantity. The diversity of the racks and the interchangeability of them allow the cell to be loaded with inventory for batch processing of a large number of doses of one type of drug or a diverse range of drugs that can be processed on demand and the mode of use can be switched from load to load of inventory. Alternatively, for example, batch processing may pull inventory from one carousel and on-demand orders may pull inventory from a second carousel.

Extra racks can expand the possible range of inventory in the cell, and in situ (e.g., online) replenishment of the inventory in the cell can be accomplished with multiple carousels (two or more). Downtime of the cell may be substantially minimized by reloading one of the carousels as the other one is emptied and the cell is feeding off the other.

In this example, the carousels are substantially circular and rotate around a vertical axis. In other embodiments, the carousels may be configured to rotate around a horizontal axis, and racks may be vertically or horizontally arranged. In some embodiments, the carousel may have a cross-section that is substantially elliptical, rectangular, square, triangular, or other polygon suitable for presenting racks of inventory to a robotic arm. In some embodiments, the central portion of the carousel may rotate around an axis. In other embodiments, racks may be affixed to a belt that is continuous or segmented (e.g., chain) and supported by two or more vertical or horizontal shafts that rotate as the racks are indexed into position, or they may be supported by one or more support members that are supported by and/or extend from a rotating hoop or shaft.

The control electronics may receive a unique electronic rack identification (e.g., hall sensor, encoder, bar code reader, pattern recognition, etc. . . . ) to identify the rack in each location on the carousel. This position information may be used to coordinate the rotation of the carousel to facilitate loading/unloading inventory, as well as supplying inventory to the robotic arm for processing.

In some embodiments, an APAS cell controller may relate the stopping position of the carousel during loading to the location of each rack. Accordingly, the controller may automatically determine and monitor the inventory content at each inventory location on the carousel. In some examples, the controller may monitor the inventory location information substantially without operator input.

In an illustrative embodiment, the APAS cell may include fill port holding and grasping features that allow IV bags of all sizes to be manifested, or registered, accurately in the inventory system so they can be picked up and moved by the robot and parked in other stations in the cell. These fill port holders may be provided to repeatably control the location of the ports so that the robot gripper can grasp the bag by the fill port and move the IV bag from station to station in the cell, and accurately plunge it onto a needle to inject the dose. With minor modifications these features can be adapted to suit IV bags from all of the major manufacturers, each of which may provide a unique geometry.

Figure 6A:
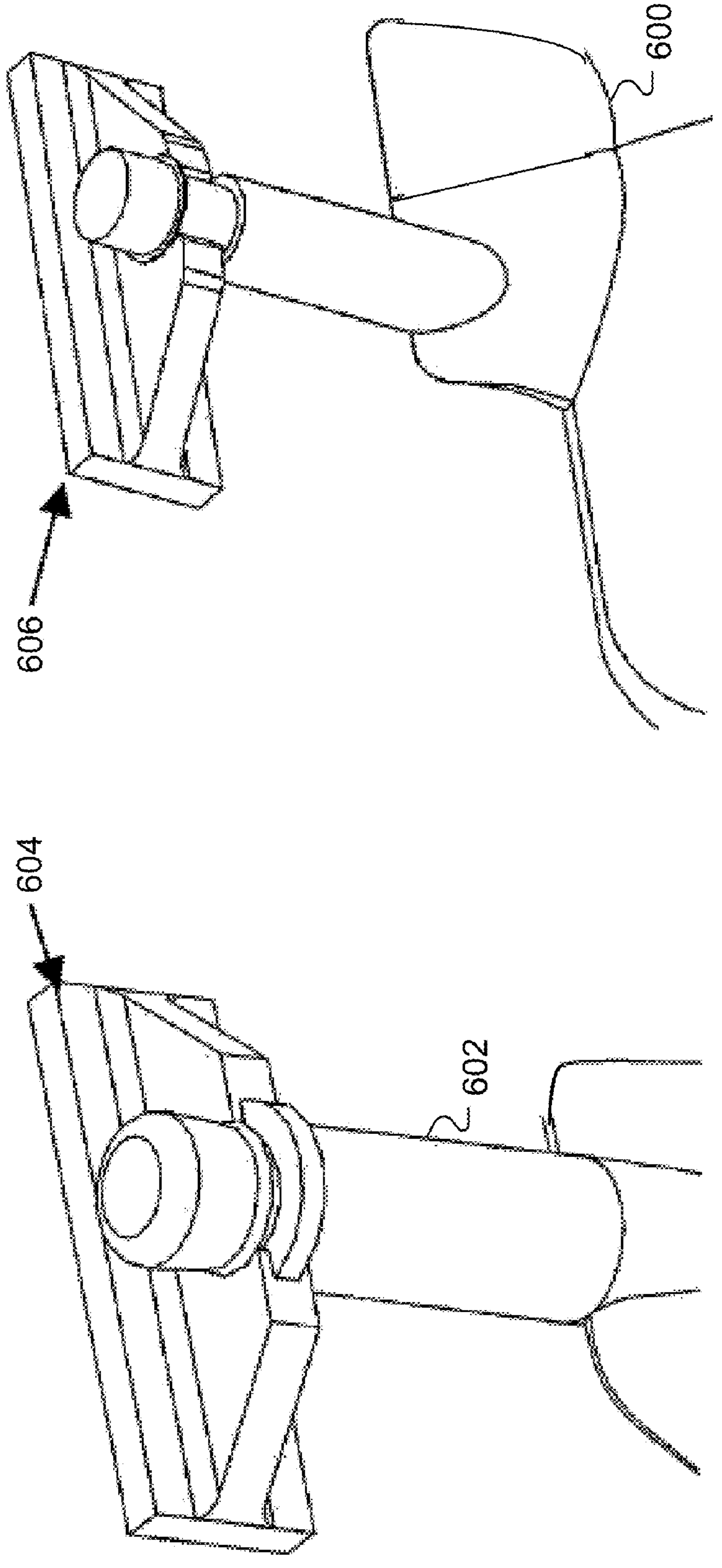
FIGS. 6A-6C show perspective views of illustrative rigid holder embodiments for registering a fill port of an IV bag.
Figure 6B:
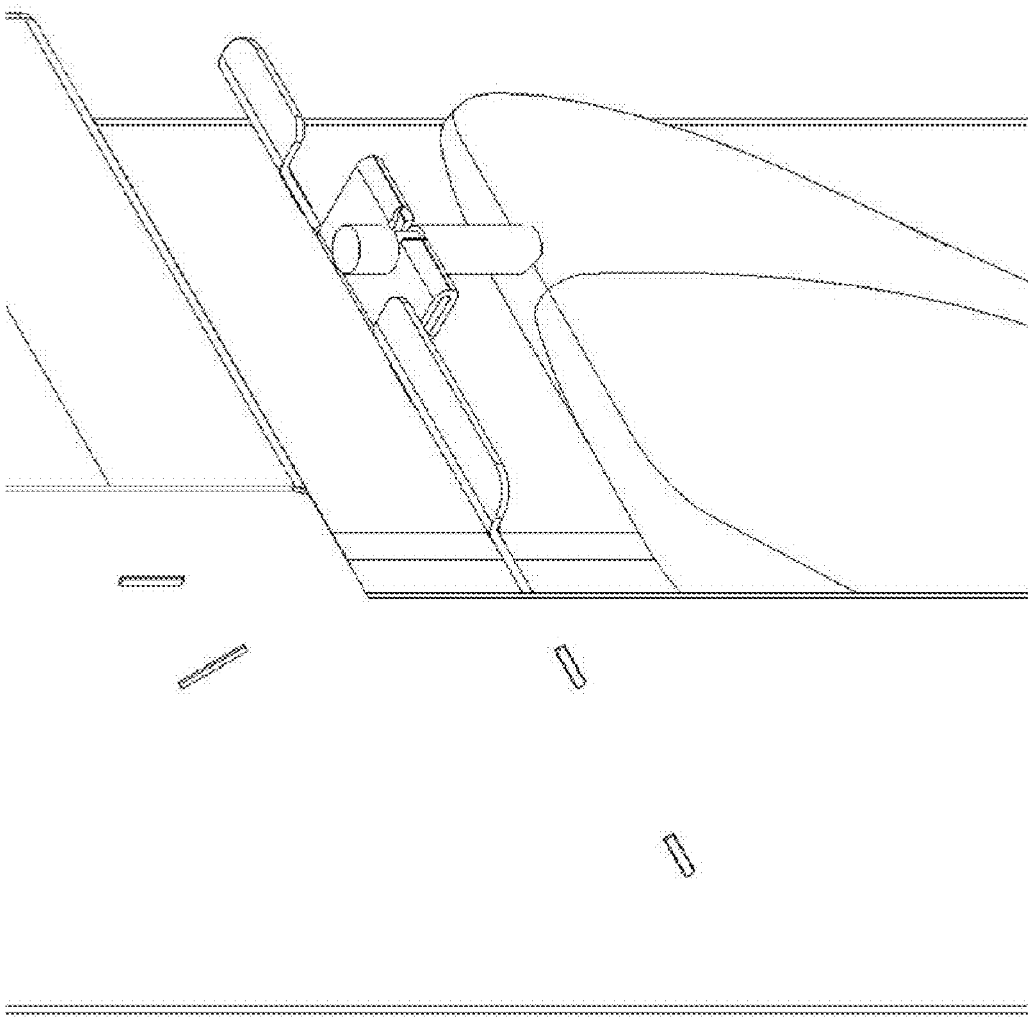
Figure 6C:
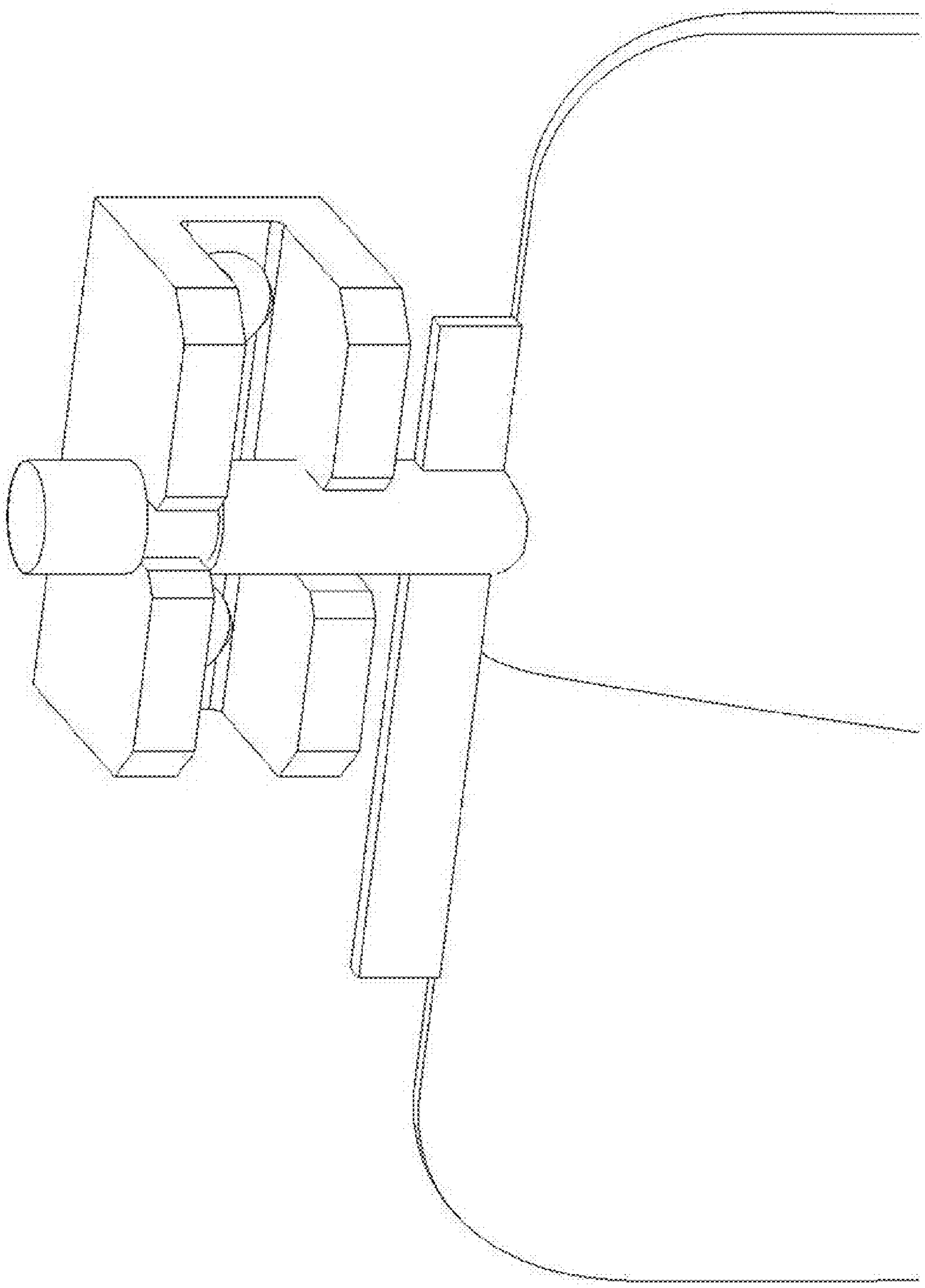
Figure 7:
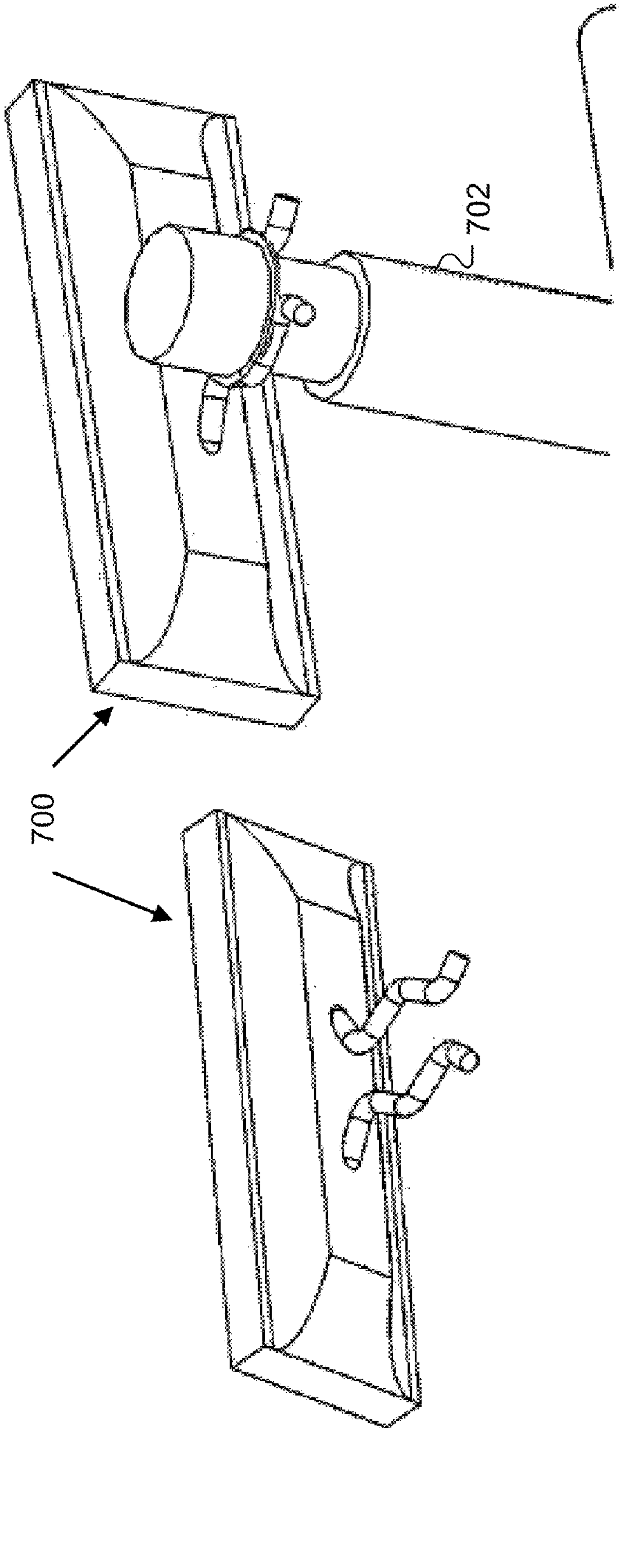
FIG. 7 shows perspective views of illustrative compliant holder embodiments for registering a fill port of an IV bag.

Illustrative devices for retaining the fill ports of IV bags that are commercially available from Baxter 600 and Abbot 602 are shown in FIGS. 6A-6C. The illustrative retaining devices, or retention clips, include substantially rigid holders 604 and 606, respectively. For these holders 604, 606, the compliance of the fill port allows the fill port to be slightly deformed while inserting it into the holder.

In various embodiments, the interference between the engaging surfaces of the holder and the fill port may result in a frictional force sufficient to retain the fill port in the holder after insertion. Embodiments of the holder may be designed to pick up the bag fill port to give a unique registration on a geometrical feature of the bags that is consistent from bag to bag and throughout the full range of bag sizes from each IV bag manufacturer.

Another illustrative embodiment of a compliant holder 700 is shown in FIG. 7. That design or a variant of it may be used on bags including a fill port 702 constructed of rigid material or for high volume usage stations in the cell. An example of such a station may include a weigh scale hook or tray near the station. The robot may locate the bags to be weighed on the scale one or more times during processing.

Figure 8:
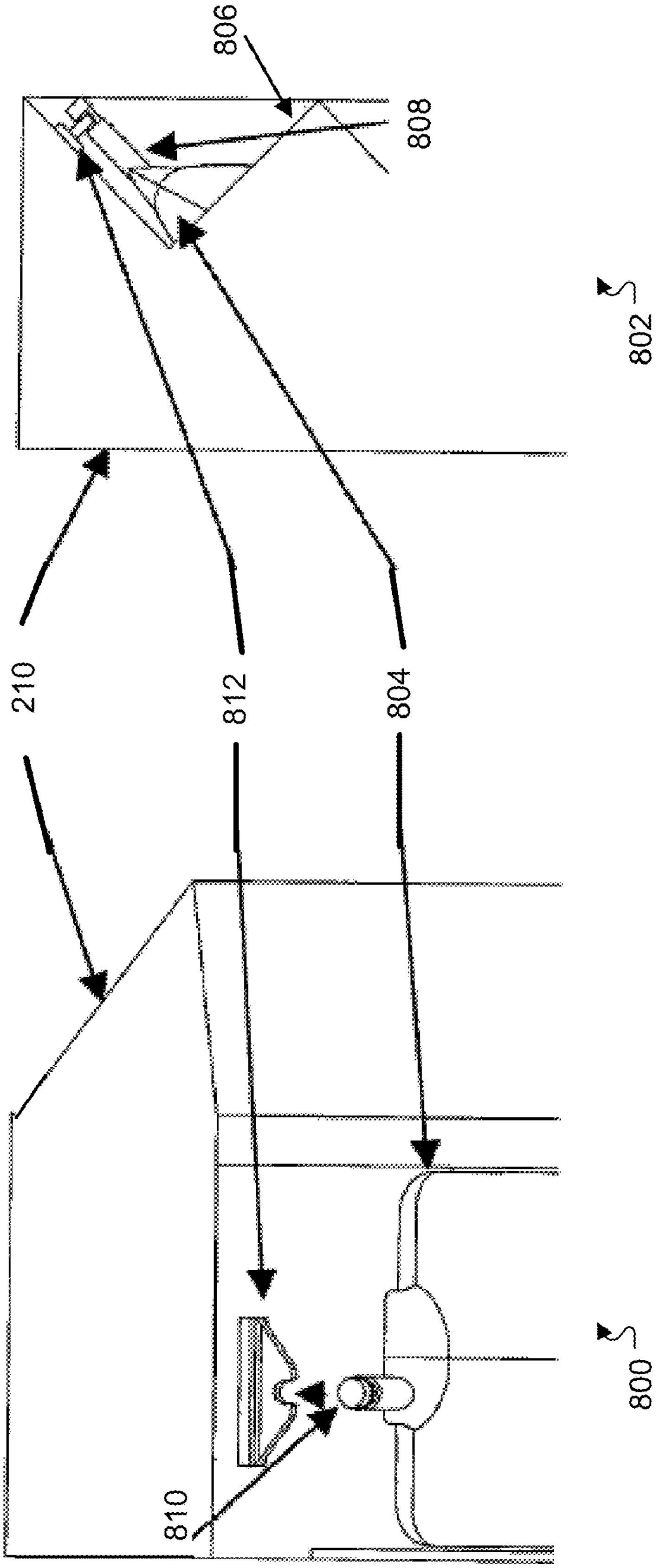
FIG. 8 shows an illustrative IV bag holder embodiment on the inventory rack of FIG. 5.

An example of the IV bag holder installed in the inventory racks 210 in FIG. 2, is shown in FIG. 8, which includes a front view 800 and a side view 802. The front view 800 and the side view 802 show how an IV bag 804, for example a Baxter bag 600, may slide into a pocket 806 in the inventory rack 210 and how fill port 810 may be fixed to the inventory rack 808 by inserting the fill port 810 into a fill port holder 812.

Figure 9:
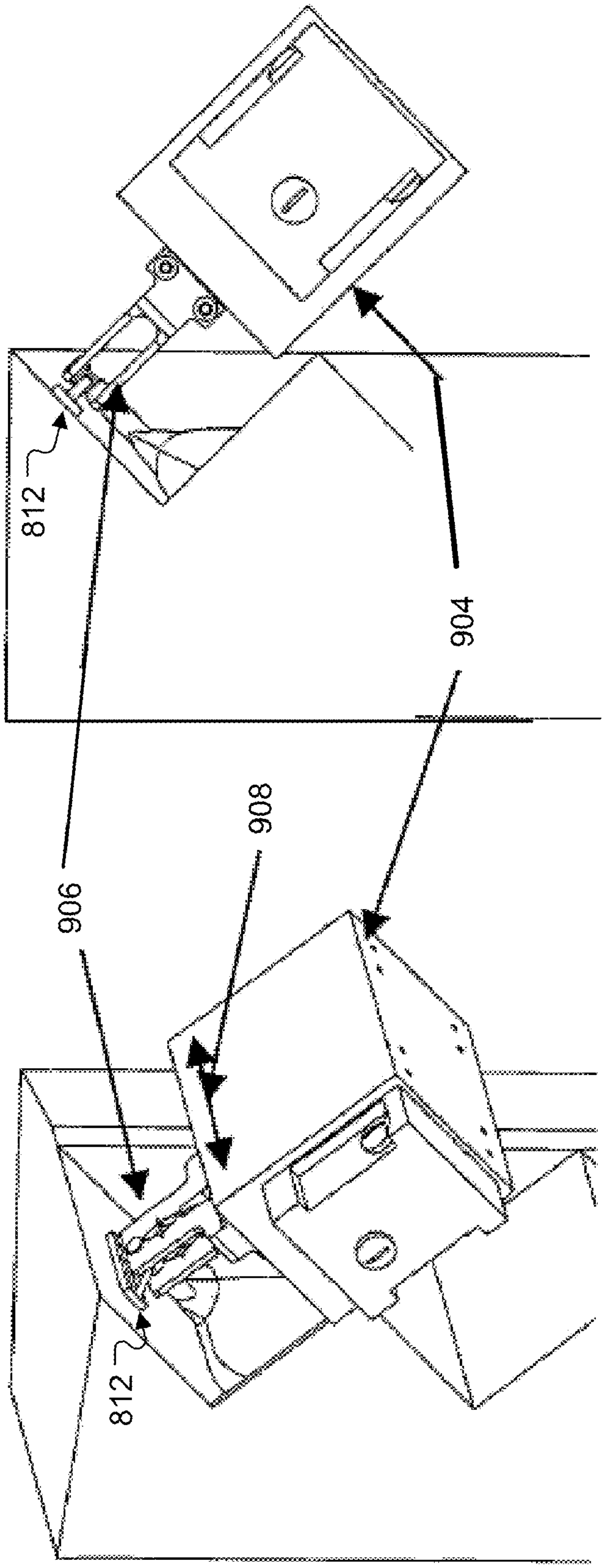
FIG. 9 illustrates a robotic arm gripper grasping an IV bag port from the holder of FIG. 8.

The robot may be programmed to pick the IV bag from the holder location by the fill port 810, as shown in a perspective view 900 and a side view 902 in FIG. 9.

In this example, the robot gripper 904 grasps the fill port 810 both above and below the bag holder 812 with two-jawed gripper fingers 906 to provide a reliable grip and provide alignment of the port with respect to the gripper axes. The robot gripper fingers move in a lateral direction 908 to grasp the fill port 810. Removal of the bag is accomplished by moving the gripper straight away from the holder (substantially parallel to the plane in which the body of the holder lies) to disengage the fill port from the holder 812. Upon disengaging the fill port from the holder 812, the robotic manipulator may then draw the bag out of the slot in a suitable motion.

Figure 10:
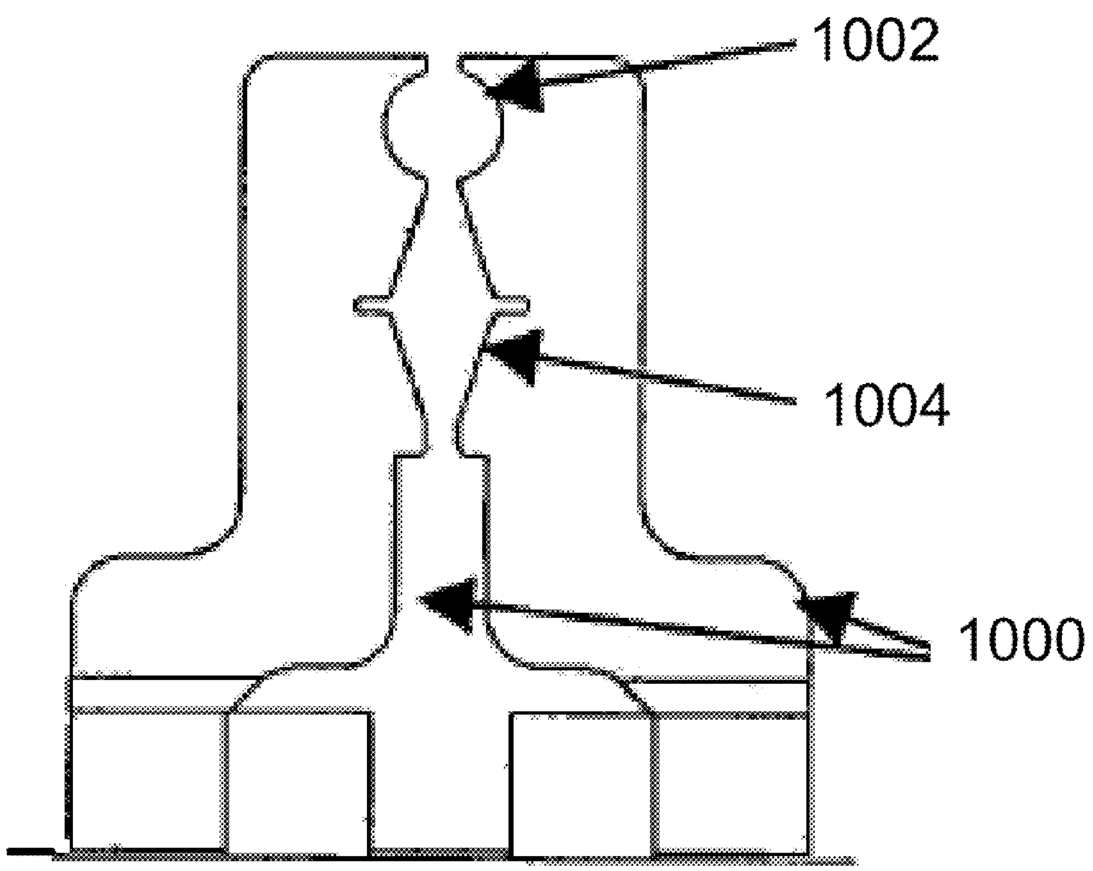
FIG. 10 illustrates an illustrative set of interchangeable gripper fingers for the robotic arm of FIG. 5.

The robotic manipulator may grasp the fill port of an IV bag using gripper fingers. FIG. 10 shows an illustrative set of gripper fingers 1000. The gripper fingers 1000 can perform multiple operations, including handling IV bags, but also handling other items, such as vials and syringes of various sizes and types.

The gripper fingers 1000 provide a multi-purpose design where the ends of the finger jaws have a substantially semi-circular cutout 1002 to retain or grasp the fill ports on the IV bags and/or syringes. The semi-circular jaw design may substantially conform to the general shape of IV bag fill ports. In various embodiments, the gripper fingers may be sized and shaped to grasp and handle various IV bag fill ports, and may be designed to support the weight of relatively heavy fluid-filled IV bags without damaging or deforming the port to an unacceptable level.

As can be seen with reference back to FIG. 9, the gripper fingers may include an upper and a lower set of opposing jaws. The spacing between the upper and lower set may be sufficient to grasp the fill port above and below the holder 812, respectively.

In some embodiments, one or more support members (not shown) may extend above and/or below the top and/or bottom surfaces of the inner diameter of the cutouts 1002. Such support members may provide additional surface area for engaging the fill port, which may distribute the force applied to the fill port across a larger area of the fill port when the gripper fingers are inserting or removing the fill port from the holder 812. Such support members may also provide additional friction, if needed, to support heavier IV bags.

To accommodate fill ports from various manufacturers, interchangeable gripper fingers may be provided. A gripper finger exchange station may be provided in the processing chamber 304 of the APAS cell 100, for example. To exchange one gripper finger 1000 for a different type of gripper finger based on the type of IV bag to be handled, the robotic arm may release one set of the gripper fingers 1000 in exchange for a second set having different sized cutouts 1002 to handle a different type of IV bags, for example. The releasable coupling between the gripper fingers and the robot arm may involve an electromagnet, one or more screws or bolts, and/or finger-operated spring mechanisms.

Alternatively, a universal interface to the robotic manipulator may be provided by using retention clips that have a uniform coupling interface to the robotic arm, but are adapted to adjust to, or are custom-sized for, IV bag fill ports of various types. Such clips may be attached to the fill ports outside of the APAS cell, and may be recycled for re-use after the IV bag has been processed by the APAS cell 100.

Figure 11:
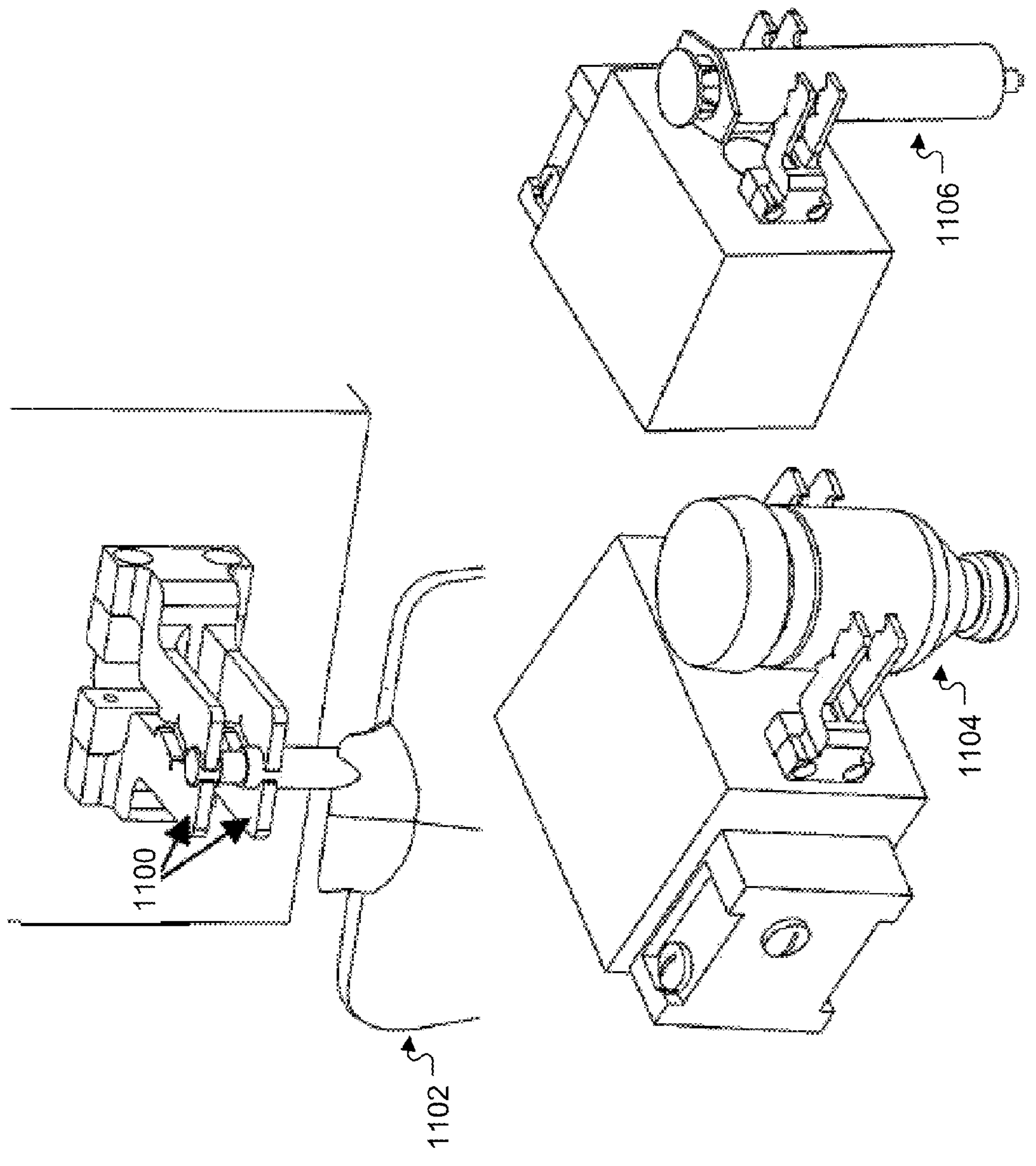
FIG. 11 illustrates examples of uses of the illustrative robotic gripper fingers of FIG. 10.

A second jaw area 1004 provides a general-purpose V-shaped portion of the jaw that may be used to grasp a wide range of sizes of rigid syringes and vials as shown in FIG. 11. The dual finger design 1100 may operate the opposing jaws in a coordinated (e.g., mirror image) movements to grasp the items, for example an IV bag 1102, a vial 1104 or a syringe 1106, so that the item may substantially self-align with the gripper axes.

In some embodiments, force feedback may be used in combination with position sensing (e.g., using potentiometers, encoders, etc. . . . ) to coordinate and control grasping of the gripper fingers with the robot arm movements so that the robot may grasp, retain, and release items in a coordinated fashion. Force feedback and gripper finger position sensing may be monitored to determine whether an item to be grasped is where it is expected to be, and whether it has the proper dimensions. For example, if force feedback indicates that that outer diameter of a syringe barrel is 10% larger than expected, then the APAS cell 100 may notify the operator of an error. As another example, if a syringe is too small for the pocket on the rack of the carousel, and is therefore tipped out an unexpected angle, then the force feedback and gripper finger position sensing may be able to detect such a condition and cause the APAS cell 100 to notify the operator.

The engaging surfaces of the cutout 1002 and/or the V-shaped portion 1004 may be arranged to be smooth or textured. The gripper fingers may be constructed of metal, plastic, or a combination thereof. Some embodiments may include, for example, a non-smooth textured surface, which may include rubber or other gripping material, on at least a portion of the engaging surfaces. For example, the jaw area 1004 may have a roughened surface to provide the gripper fingers 1000 with a more secure grip on the barrels of plastic syringes, for example.

In this example, the gripper fingers 1000 further include notches located at the apex of the V-shaped portion 1004. These may be used for various purposes, such as needle support and/or straightening.

FIG. 11 illustrates the flexibility of the gripper fingers 1100 for illustrative handling of various inventory items. One set of the gripper fingers 1100 can handle the IV bag 1102, a vial 1104, and a syringe 1106. As such, the gripper fingers 1100 may be used to perform a wide variety of operations in the APAS cell 100, for example. For example, the gripper fingers can accommodates vials and syringes having a wide range of sizes, shapes (e.g., need not be circular), weights, materials (e.g., plastic, glass, metal). The gripper fingers 1100 are also able to handle vials and syringes, for example, independent of the item's spatial orientation.

FIGS. 12A-12D show an illustrative carousel and rack system for lock loading of the rack within the carousel of the APAS cell 100. The inventory rack carousel, an example of which is the carousel 310 in FIG. 3, has features at its top and bottom to engage the inventory racks, and permit quick exchanges of racks on the carousel.

Figure 12A:
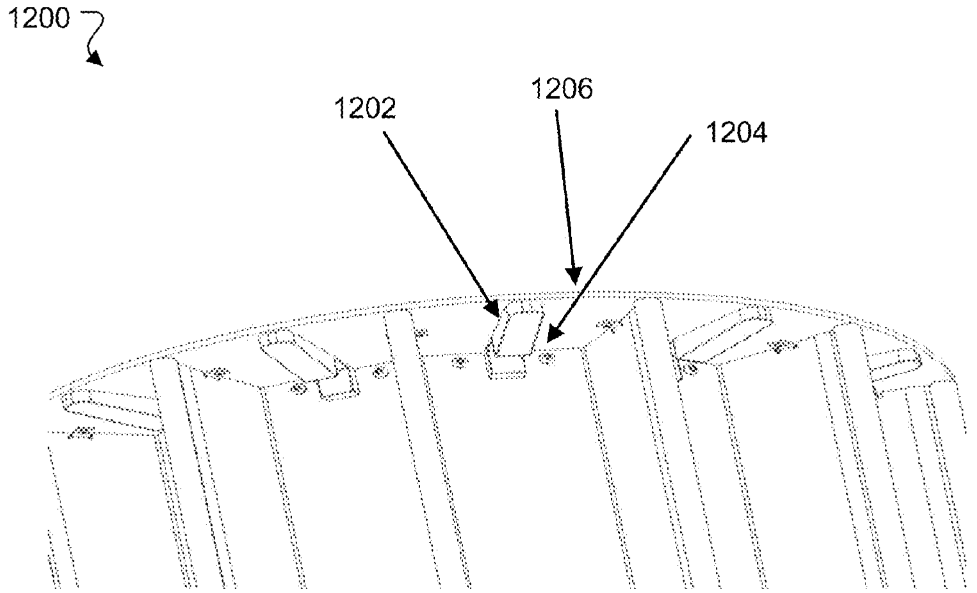
FIGS. 12A-12D shows an illustrative example of lock loading the rack into the carousel.
Figure 12B:
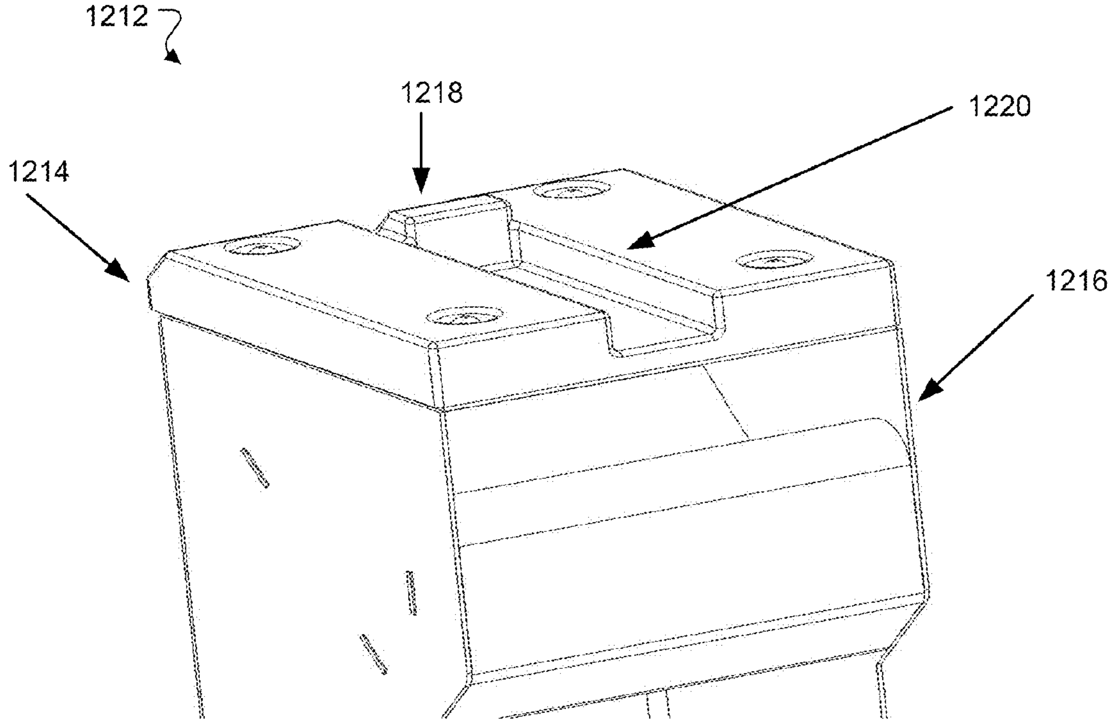

FIG. 12A shows the geometry for a carousel upper plate 1206 on a carousel 1200 to engage the racks. The carousel upper plate 1206 includes a rack alignment tongue 1202 and a rack retention slot 1204. FIG. 12B shows the geometry for an upper end of a rack 1212 that mates with and engages with the carousel 1200. The upper end of the rack 1212 has a rack upper end plate 1214 on a rack housing 1216 that provides features such as a retaining tongue 1218 and a lateral registration groove 1220 that help to engage the rack alignment tongue 1202 into the rack retention slot 1204 to provide both lateral registration and retention of the rack in the carousel 1200. This engagement is accomplished by having the lateral registration groove 1220 on the rack upper end plate 1214 engage the rack alignment tongue 1202 on the carousel upper plate 1206. The upper end of the rack 1212 is retained in the carousel by having the retaining tongue 1218 on the rack 1212 engage the rack retention slot 1204 in the rack alignment tongue 1202 on the carousel 1200.

Figure 12C:
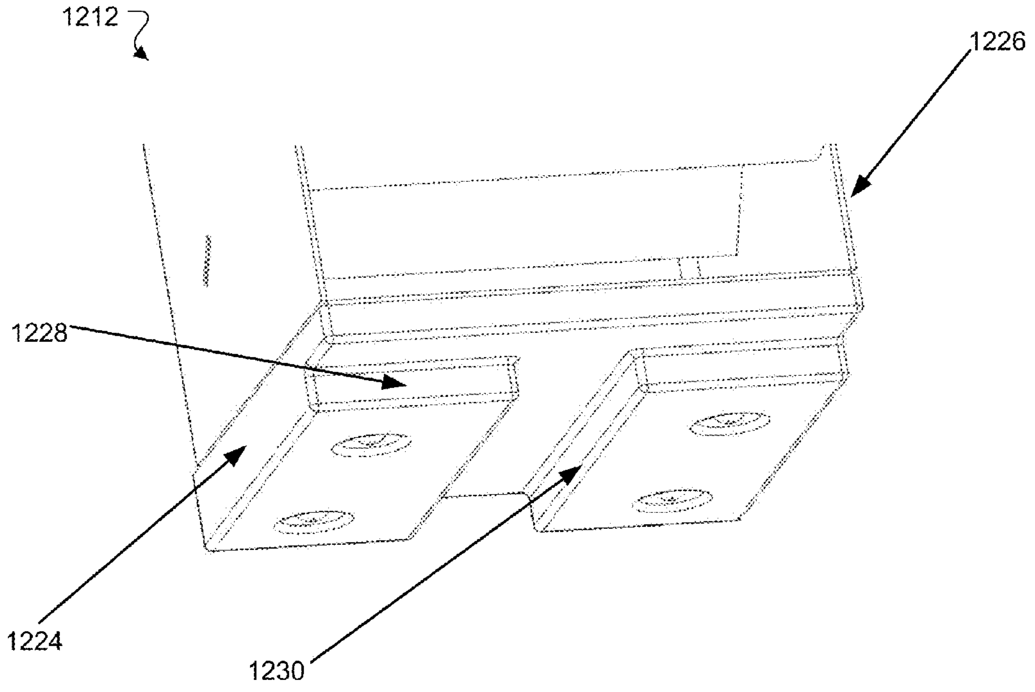
Figure 12D:
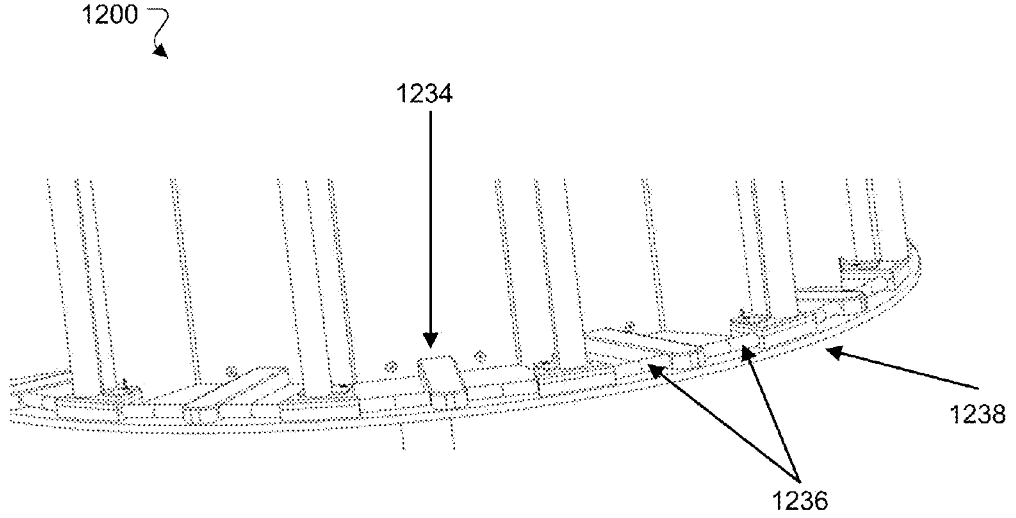

In this example, the lower end of the rack 1212 uses a similar tongue and groove alignment feature as the upper end of the rack 1212. FIG. 12D shows the geometry for a carousel lower plate 1238 on a carousel 1200 where the racks engage. The carousel lower plate 1238 includes a rack alignment tongue 1234 and rack retention rollers 1236. FIG. 12C shows the geometry for a lower end of the rack 1212 for engaging with the carousel 1200. The lower end of the rack 1212 has a rack lower end plate 1224 on a rack housing 1226 that provides features such as a retaining face 1228 and a lateral registration groove 1230 that help to engage the rack alignment tongue 1234. The rack retention rollers 1236 on the carousel lower plate 1238 are used to help guide the lower end of the rack 1212 into the carousel 1200. The lower end of the rack 1212 is engaged in the carousel 1200 by having the lateral registration groove 1230 on the rack lower end plate 1224 engage the rack alignment tongue 1234 on the carousel lower plate 1238. This provides the rack with lateral alignment and registration.

Figure 13A:
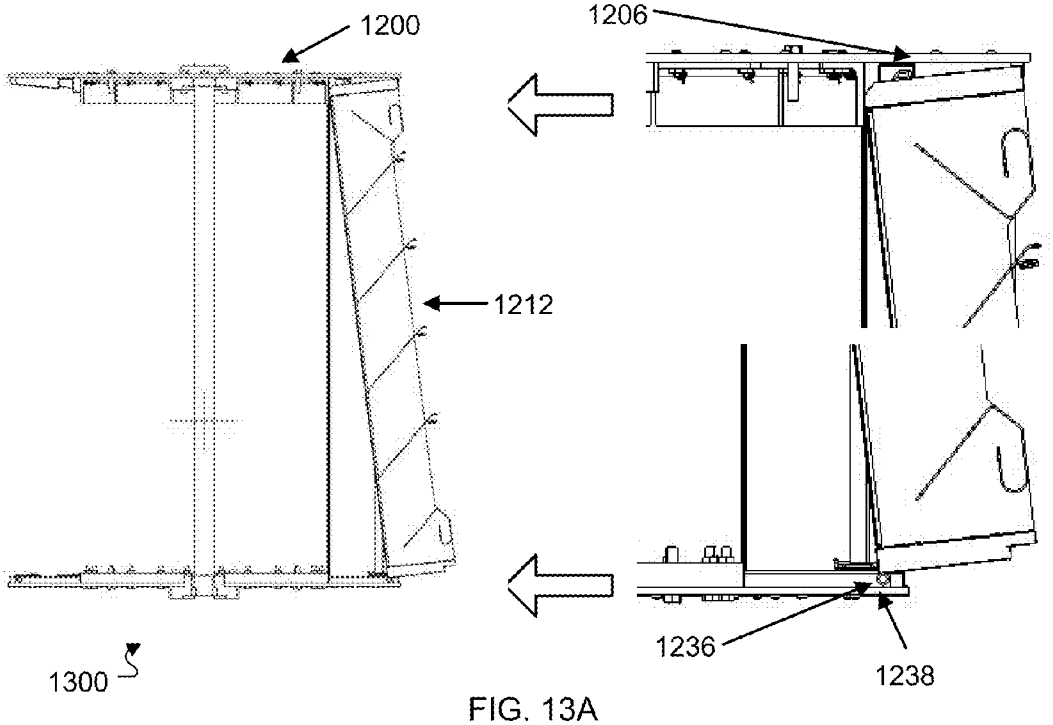
FIGS. 13A-13C shows the assembly sequence of the rack into the carousel.
Figure 13B:
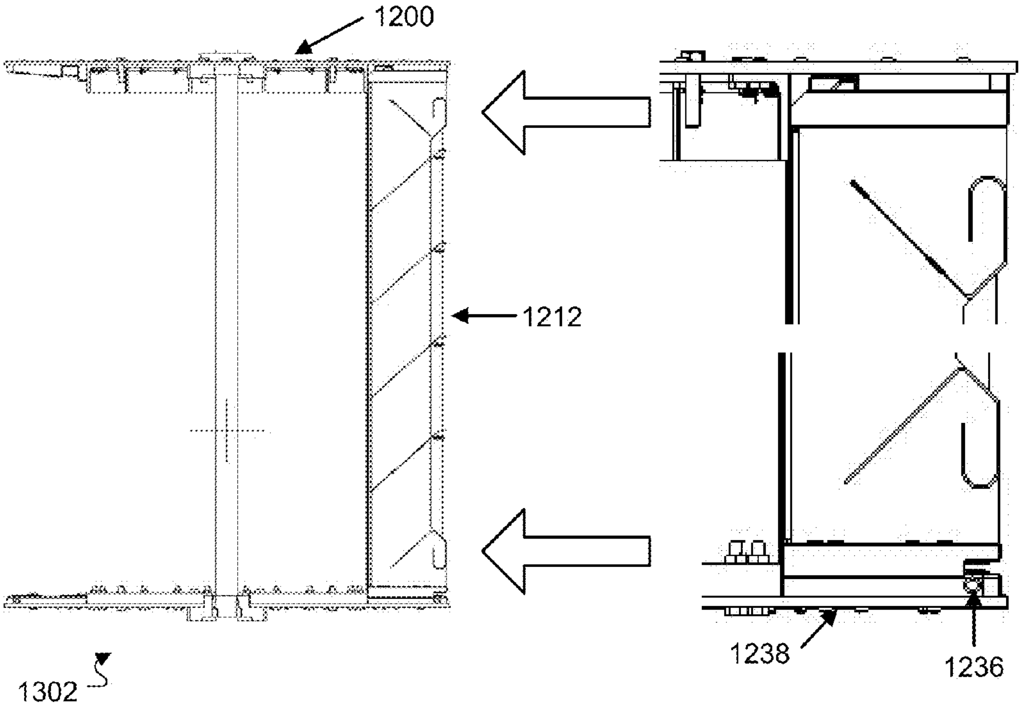
Figure 13C:
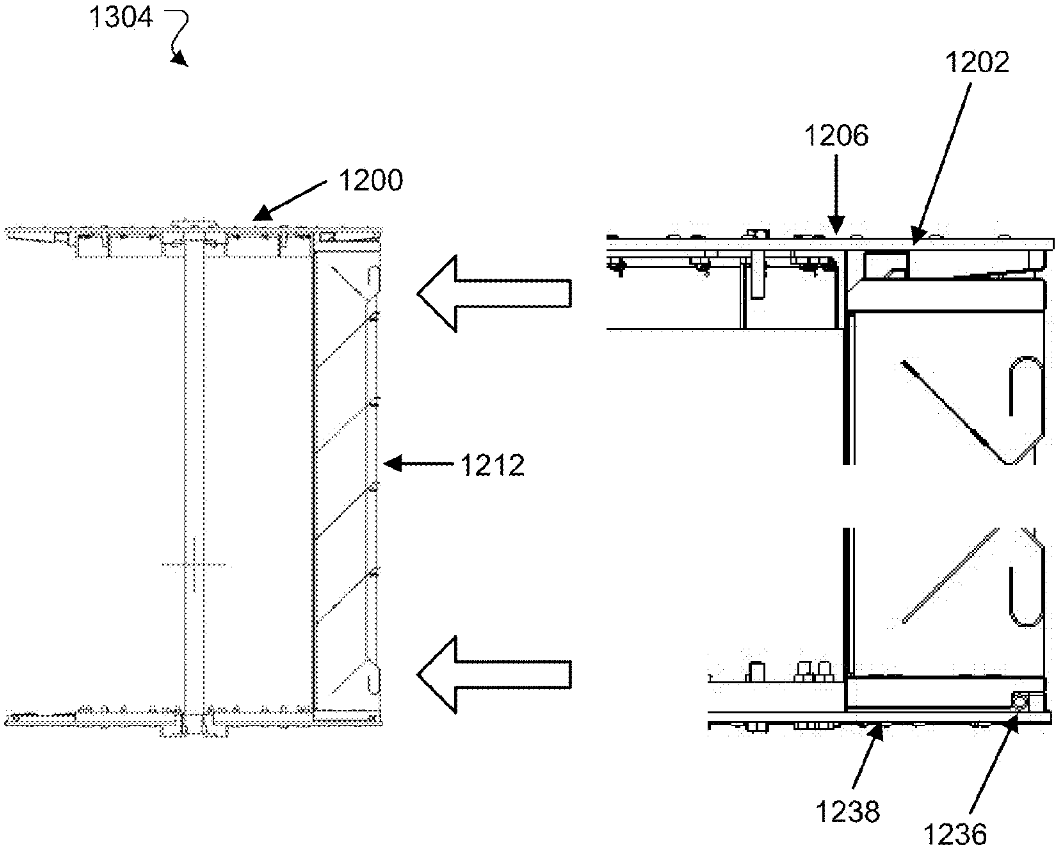

FIG. 13A-13C shows an assembly sequence of loading a rack 1212 into a carousel 1200. FIG. 13A shows a first step 1300 in the assembly sequence where the rack 1212 is first engaged at the top in the carousel upper plate 1206. Next the rack 1212 can slide into the carousel 1200 by traveling over the rack retention rollers 1236 on the carousel lower plate 1238. FIG. 13B shows a second step 1302 in the assembly sequence where the rack 1212 is fully inserted into the carousel 1200. The rack 1212 has traveled over the rack retention rollers 1236 on the carousel lower plate 1238 engaging the rack alignment tongue 1234 within the lateral registration groove 1230, shown in FIG. 12. Now that the rack is fully inserted, FIG. 13C shows the last step 1304 in the assembly sequence where the rack 1212 is slid down and engages behind the rack retention rollers 1236 on the carousel lower plate 1238 and the rack alignment tongue 1202 on the carousel upper plate 1206 is engaged at the top. The rack 1212 can be lowered into the carousel 1200 so that the retaining face 1228 on the rack lower end plate 1224, as shown in FIG. 12, drops behind the rack retention rollers 1236 on the carousel lower plate 1238 and forms a captive retention in the carousel.

Removal of the rack from the carousel is substantially the reverse operation of the insertion. The rack 1212 is first lifted toward the carousel upper plate 1206, and then the lower end of the rack 1212 is rotated outwards. This disengages the retaining tongue 1218 from the alignment tongue 1202 in the carousel upper plate 1206 allowing the rack to then be free of the carousel.

In some embodiments, the carousel upper plate 1206 and the carousel lower plate 1238 may be replicated one or more times in a rack channel to provide for multiple, partial length racks instead of a single, full-length rack. Partial length racks may be provided at one or more positions on the carousel. A single partial length rack may be exchanged independently from other racks, thus avoiding exchanges of an entire rack to replace only a small portion of the inventory stored on that rack. Partial length racks may be advantageous, for example, for racks containing inventory that is physically heavy for an operator to lift and load onto a carousel. Partial length racks may also be advantageous for certain inventory that is less frequently used, for example. In some installations, a mix of partial and full length racks may be advantageous to optimize inventory management.

In another embodiment, a rack 1212 may be modified as a shell arranged to support two or more insertable mini-racks. The mini-racks may be inserted and removed from the shell in a substantially similar manner as described above with reference to FIGS. 12A-12D and 13A-13C. The shell rack may be easily exchanged to permit the full-length racks to be used as needed to provide flexible inventory management.

Figure 14:
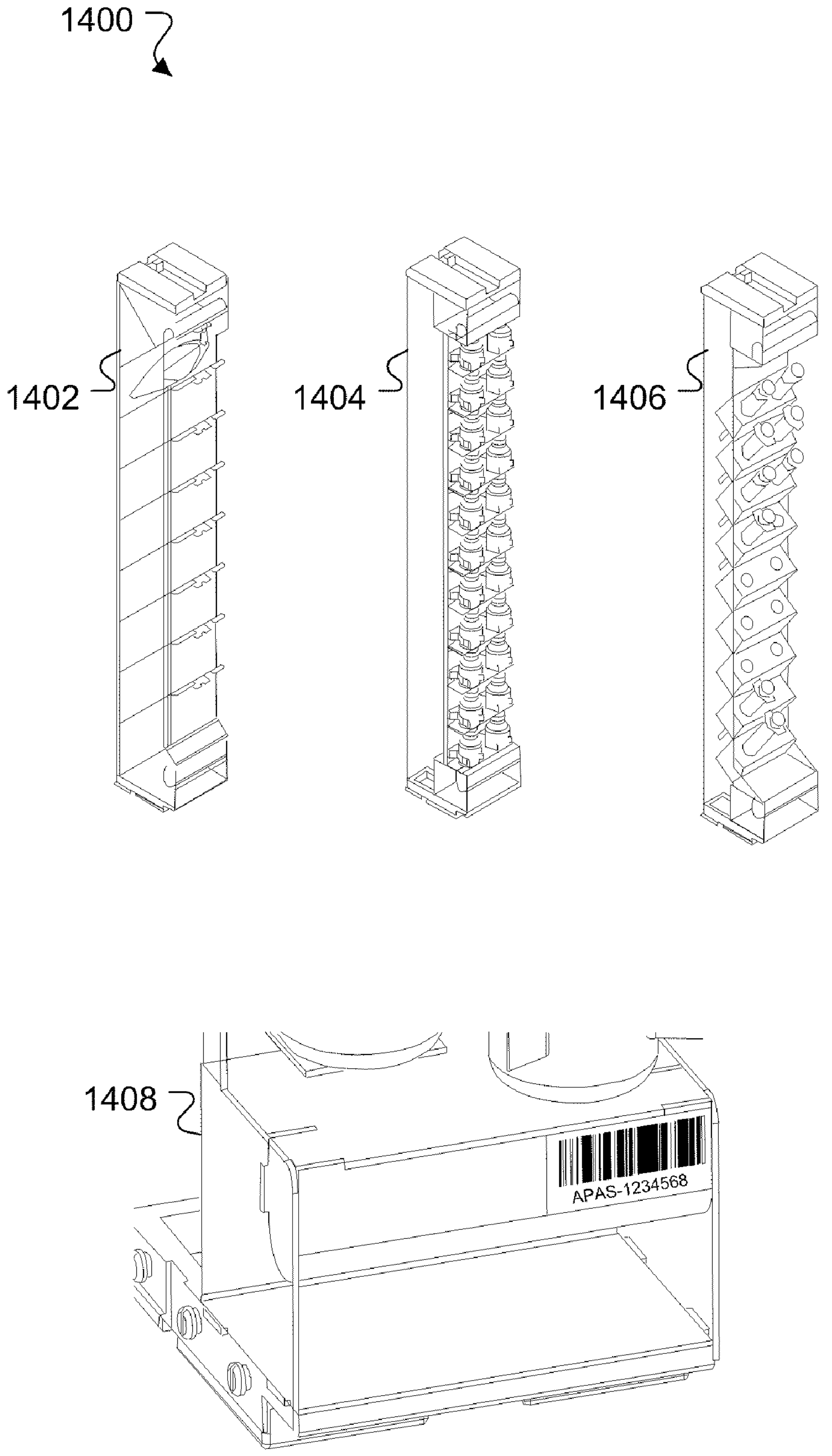
FIG. 14 shows illustrative inventory racks.

FIG. 14 shows an illustrative set of inventory rack designs 1400 that may be used to hold inventory (e.g., drug containers) 212, as shown in FIG. 2, to be used by the APAS cell 100 in its compounding process. The set of inventory rack designs 1400 includes, but is not limited to, three styles: a rack 1402 designed to be loaded with IV bags, a rack 1404 designed to be loaded with vials, or a rack designed to be loaded with syringes 1406. In this example, only one type of drug container is supported on each rack. However, in other examples, a single rack may contain a combination of various sizes and types of syringes, vials, and/or IV bags.

Each inventory rack style may contain multiple designs to accommodate the different sizes of each of the drug container types to be loaded on the racks. An inventory rack design may accommodate one size of a specific drug container or may accommodate a select number of sizes of a specific drug container. Examples of IV bag rack designs include, but are not limited to, a rack that can be loaded with up to four 1000 milliliter (ml) Baxter IV bags, a rack that can be loaded with up to eight 500 ml or 250 ml Baxter IV bags, in any combination, and a rack that can be loaded with up to twelve 100 ml and 50 ml Baxter IV bags, in any combination. Examples of vial rack designs include, but are not limited to, racks that can be loaded with up to eight 100 ml vials, up to eighteen 50 ml vials and up to twenty-two 20 ml vials. Another example rack design for vials can be loaded with fifty-eight 5 ml to 2 ml, in a combination of up to thirty 5 ml to 4 ml vials and up to twenty-eight 2 ml vials. Examples of syringe rack designs include, but are not limited to, racks that can be loaded with up to eight 140 cubic centimeters (cc) Monoject syringes, up to twelve 60 cc BD or Monoject syringes, up to fourteen 30 cc BD or 35 cc Monoject syringes, up to eighteen 20 cc BD or Monoject syringes, up to thirty-three 12 cc to 1 cc BD or Monoject syringes, or any of these in combination. Monoject syringes are commercially available from Tyco medical of Massachusetts. BD syringes are commercially available from Becton Dickson of New Jersey.

Each inventory rack has an electronically readable label 1408 attached to it for identification purposes. As an example, the electronically readable label 1408 may contain, for example, a bar code which can be scanned with a bar code scanner located adjacent to the carousel 310, 312 in the inventory chamber 302. The bar code may include, or be associated with information stored in an information repository, information about the contents of the rack that can be used by the APAS cell, for example, to update the inventory data and correlate racks and inventory with carousel position.

In another embodiment, the drug containers may have attached to them electronically readable labels, for example bar code labels, which contain information about the amount and type of drug in the container. The drug containers may be syringes, IV bags, or vials that contain a drug or a diluent needed for a reconstitution process by the APAS cell. Each inventory rack may also have, for example, a bar code label at each pocket within the rack as well as a label on the rack itself, as described above. An operator, using a hand-held bar code scanner, may scan each drug container prior to placing it in the rack pocket and then they may scan the pocket label. In conjunction with the loading of the rack, the operator may scan the bar code on the rack. The data from this scan may be transferred to the APAS cell 100 for use in its reconstitution process. The data may indicate the exact location of a drug or diluent within a rack on a carousel.

Figure 15A:
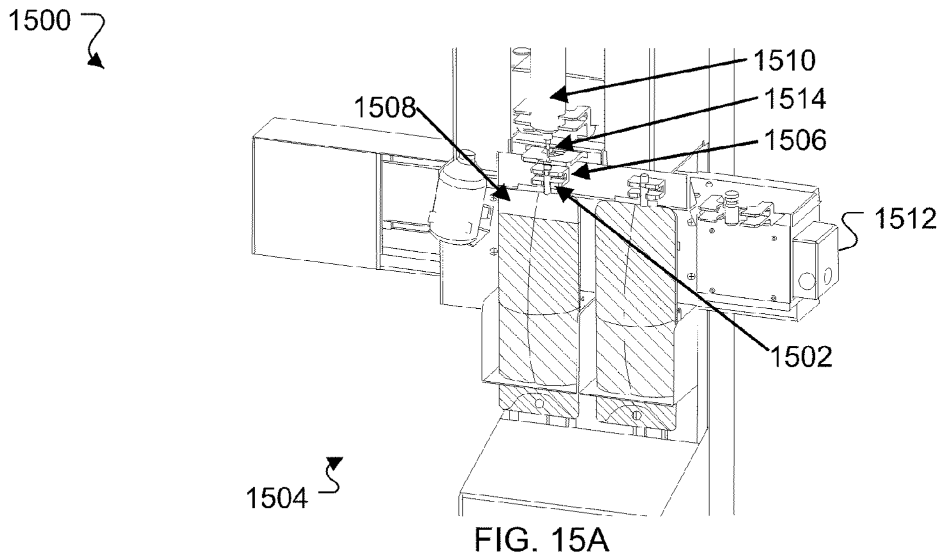
FIGS. 15A-15C shows an illustrative air extraction process from an IV bag.
Figure 15B:
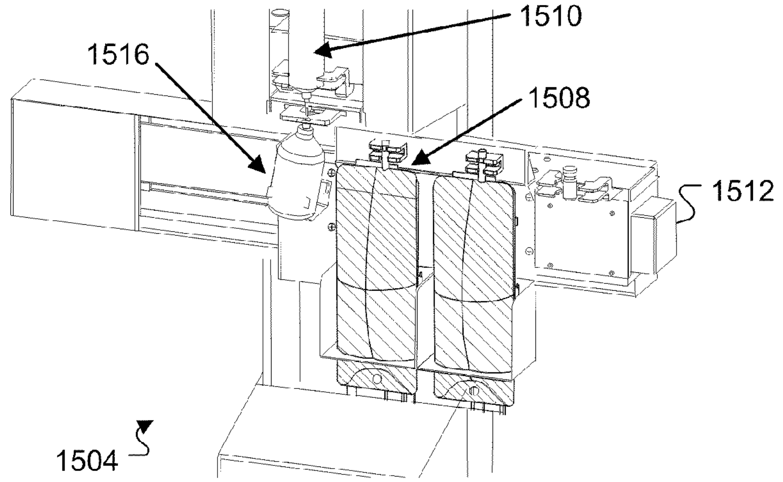
Figure 15C:
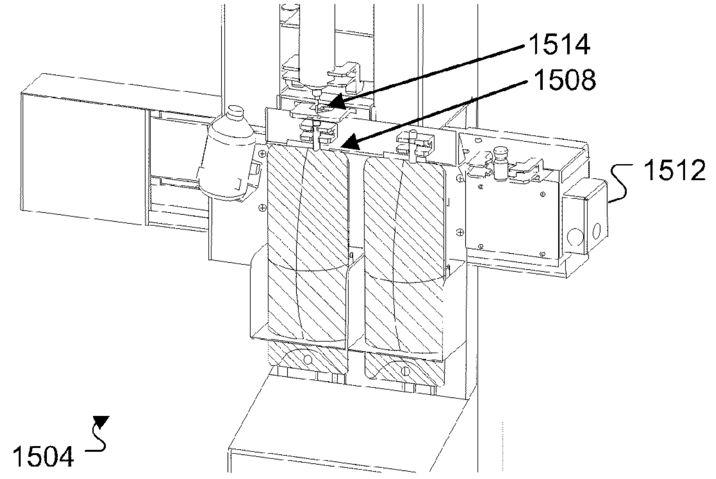

FIGS. 15A-15C illustrate apparatus and processes for extracting air and diluent from an IV bag. A process of extracting gasses from the IV bag permits the IV bag to be used for automated fluid transfer operations, and operations with a syringe in a needle down orientation in particular embodiments.

In this example, an IV bag is registered to have its fill port 1502 punctured by a needle down syringe manipulator 1504, an example of which is the manipulator 334 that was described with reference to FIG. 3. In each of FIGS. 15A-15C, two IV bags are shown as being retained by a corresponding retention clip that is holding an IV bag fill port. The retention clips may be similar to those described with reference to FIGS. 6-8.

The IV Bags as received into hospital inventory may be filled with a diluent, for example, 0.9% saline solution, sterile water or a dextrose mixture. To the extent that an IV bag to be processed in the APAS cell contains some gas, which may appear as a headspace in the IV bag, there is capacity to receive a drug that is injected into the IV bag. For example, a pharmacy technician using a drug filled syringe may inject its contents into the IV bag by penetrating the membrane on the IV bag port with the syringe needle. The IV bag then contains the dose needed. However, the APAS cell may also use an IV bag as a source of diluent in a drug reconstitution process where the drug is contained (e.g., in a liquid or dry form, such as a powder) in a vial. For example, the APAS cell 100 may reconstitute a drug in a vial by extracting a predetermined amount of diluent from the IV bag and injecting it into the vial.

FIG. 15A shows an illustrative stage of the reconstitution process that may occur at the needle down syringe manipulator station 1504. The needle down syringe manipulator station includes a retention clip 1506, an IV bag 1508 having the fill port 1502 that is registered by the clip 1506, a fluid transfer syringe 1510 oriented with a needle 1514 in a down position for puncturing the fill port 1502. The retention clip 1506 is mounted to an indexer 1512 that can laterally and/or vertically position the fill port 1502 relative to the needle 1514.

At the station 1504, the fill port 1502 is registered by a retention clip 1506 to permit a puncture motion relative to the needle 1514. In some embodiments, a quick puncture motion may be used to reduce the volume of air that may be entrained with the needle into the IV bag 1508. The weight of the IV bag 1508 may be supported by the retention clip 1506, although part or substantially most of the weight of the IV bag may also be supported by a horizontal shelf that the IV bag can rest on.

With the IV bag oriented so that the fill port 1502 is up, air (or other gasses) may rise toward the fill port 1502. To substantially avoid drawing gas from the IV bag 1508 into the syringe 1510 during a fluid transfer operation, a process for extracting substantially all of the air from the IV bag may be performed. The process may be terminated when all of the air has been drawn out of the IV bag 1508 and the syringe 1510 is drawing fluid. The syringe 1510 at the needle down syringe manipulator station 1504 can extract the air reliably by monitoring the syringe plunger manipulator (not shown here).

Based on the relative motion of the syringe plunger and/or the force required to move the plunger, a controller may be configured to determine when substantially all of the gas has been withdrawn from the IV bag 1508. The controller may receive input from sensors that may be interpreted to indicate a different force or speed, for example, that results when transferring air compared to transferring fluid. For example, if the plunger is being withdrawn at a constant speed, then the pull force on the syringe plunger (not shown) may increase measurably when substantially all of the air has been extracted and fluid starts to be withdrawn from the IV bag 1508 and into the syringe 1510. As another example, if the plunger is being withdrawn at a constant pull force or at a substantially constant excitation (e.g., terminal voltage for a DC motor), then the speed of the syringe plunger may decrease measurably when the last of the air has been extracted and fluid starts to be withdrawn from the IV bag 1508 and into the syringe 1510. Force on the syringe plunger may be monitored, for example, by strain sensors, torque sensors coupled to the motor shaft, and/or motor current. A sudden increase in current to the motor, for example, may indicate the transition from extracting air to extracting fluid. Speed may be measured or determined using various speed sensing techniques such as, for example, encoders, resolvers, multi-turn potentiometers, linear potentiometers, hall sensors, commentator noise, end-stop limit detection, limit switches, and the like, or a combination of such elements. Changes in speed may be determined from position measurements taken over time intervals.

In an alternative embodiment, a change in force may be detected when air is transferred into the IV bag 1508 from a syringe. For example, a selected volume of air and/or fluid may be transferred out of the IV bag 1508 and into the syringe. The volume transferred out of the IV bag 1508 may then be transferred back into the IV bag 1508. A change in force on the syringe plunger can be detected and recorded. The detected change in force may correspond to a transition between transferring air/fluid. The syringe plunger may then be pulled back to the point of the air and fluid transition point resulting in a primed IV bag.

In another embodiment, the withdrawal of fluid may be detected optically, for example, by an optical sensor monitoring light passing through the fill port 1502 and/or the syringe 1510. The light intensity passing through the syringe may change when the material being extracted into the syringe changes from gas to a liquid. Optical detection may be used alone, or in combination with syringe plunger force and/or speed monitoring.

In some embodiments, a known volume of air may be transferred out of the IV bag and into the syringe. This volume of air may be an amount that is greater than the expected volume of air. The syringe may then be weighed to confirm that there is some fluid in the barrel, indicating that the IV bag has been primed. The syringe may then be discarded.

According to one implementation, a reconstitution process may be performed in the APAS cell 100, for example, by the robotic arm 318 placing the IV bag 1508 in the clip 1506 at the station 1504. The IV bag 1508 may hang by its fill port 1502 on the indexer 1512 of the needle down syringe manipulator station 1504. The indexer 1512 may move the IV bag 1508 to a position under the syringe needle 1514. The IV bag port 1502 may then engage the syringe needle 1514. The syringe plunger may be withdrawn so that air is drawn out of the IV bag and into the syringe 1510. The syringe plunger may be withdrawn until the change in torque, for example, is detected and, in some embodiments, for some additional time to give margin on the draw resulting in a small amount of fluid draw and/or an IV bag that is negatively pressurized relative to ambient pressure. The indexer 1512 then lowers the IV bag 1508.

FIG. 15B shows another illustrative stage of the reconstitution process that may occur at the needle down syringe manipulator station 1504. The indexer 1512 moves the IV bag 1508 with the air removed to a position that puts a waste vial 1516 under the syringe needle 1514. The waste vial 1516 is then raised by the indexer 1512 to a position where the syringe needle tip is just inside the vial neck. The syringe plunger is then driven causing air and any fluid to be expelled from the syringe 1510 into the waste vial 1516.

In FIG. 15C, the indexer 1512 is lowered and repositioned so that the IV bag 1508 is under the syringe needle 1514 and is ready to draw diluent. During a needle-down diluent draw, some small amount of air may be drawn into the syringe (e.g., micro bubbles) along with the liquid or fluid.

Figure 16A:
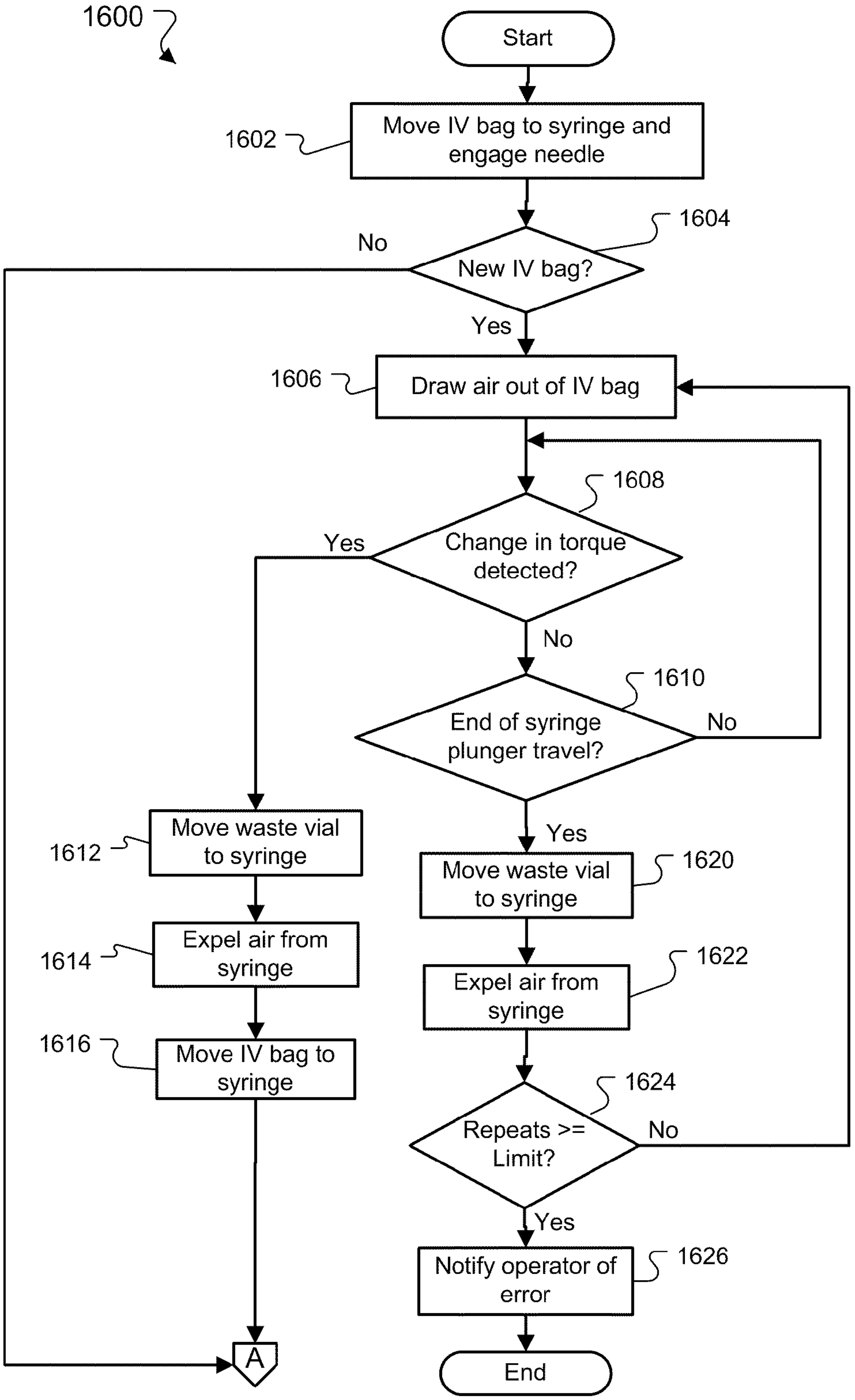
FIG. 16 is a flow chart of an illustrative method for air extraction from an IV bag.
Figure 16B:
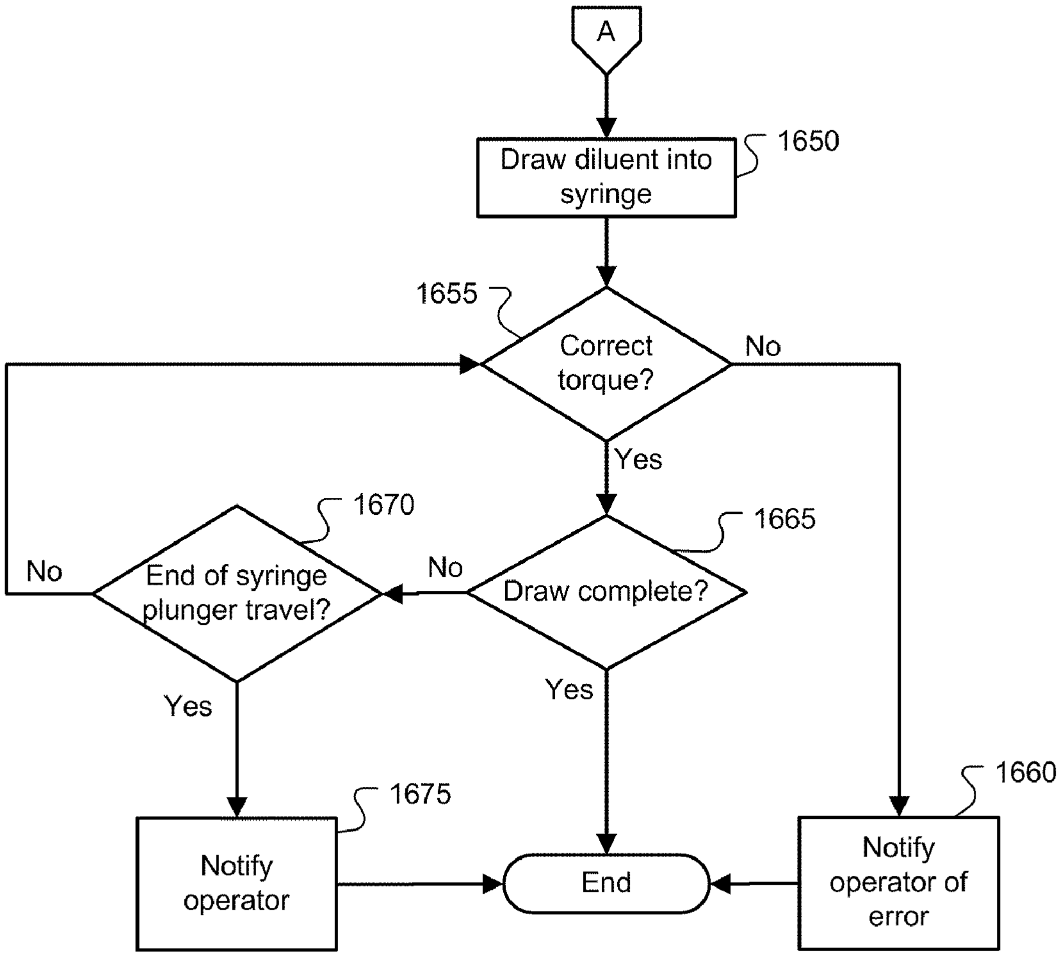

The needle down syringe manipulator station 1504 may be operated, for example by a programmed controller in the APAS cell 100, to perform an illustrative method 1600 for extracting gas from an IV bag according to the flow chart of FIGS. 16A-16B. This method 1600 may, for example, be applied in preparation for drawing diluent from the IV bag to reconstitute a drug.

When the method 1600 of this example is performed, the indexer 1512 moves the IV bag 1508 at step 1602 to a position under the syringe needle 1514, and the IV bag fill port 1502 is engaged on the syringe needle 1514 in preparation for a diluent draw. At step 1604, the APAS cell 100 controller determines whether or not the IV bag is considered new.

If the controller determines that the IV bag is new, then, at step 1606, the controller actuates the syringe plunger to draw air out of the IV bag 1508, as described with reference to FIGS. 15A-15C. The syringe plunger manipulator 1504 may pull the syringe plunger while monitoring, for example, the torque at step 1608 for, in some embodiments, a step change indicating that the all of the air has been pulled into the syringe and fluid is now being pulled. It may also monitor at step 1610 the syringe plunger making sure it does not reach its end of travel before all of the air has been pulled from the IV bag. If the plunger has not reached the end of its travel, then step 1608 is repeated.

If, at step 1610, the plunger has reached the end of its travel, then the waste vial is moved proximate the syringe at step 1620, the air is expelled from the syringe at step 1622. In this example, the controller next determines at step 1624 if the IV bag has repeated the gas extraction process, including steps 1620-1622, more than a limit. The limit may be based on information about the IV bag, such volume, historical usage (e.g., in the APAS cell 100), or weight measurement, for example. If the limit is exceeded, then the controller may generate a message to notify the operator at step 1626, and the process may be terminated.

If the change in torque detected at step 1608 occurs before the end of the syringe plunger travel is reached, this indicates that substantially all air has been removed from the IV bag. At step 1612, the indexer 1512 then moves the waste vial 1516 to a position under the syringe needle 1514 at step 1612 and raises it to a position where tip of the syringe needle 1514 is inside the neck of the vial 1516. The syringe plunger manipulator 1504 actuates the syringe plunger until it stops, expelling all of the air and any liquid from the syringe at step 1614 into the waste vial 1516. The indexer 1512 next moves the IV bag 1508, which has had all of the air removed from it, to a position under the syringe needle 1514 at step 1616 to engage the IV bag port 1502 on the syringe needle 1514.

If, at step 1604, the controller determined that the IV bag is not new, or after completing step 1616, then, at step 1650, the controller may actuate the syringe plunger to start drawing a predetermined amount of diluent from the IV bag. While diluent is being drawn, the controller may, in some embodiments, monitor for the correct torque on the motor at step 1655. If the torque is incorrect, or unexpected, that may indicate a problem, so the APAS cell 100 may notify the operator at step 1660. However, if the torque appears to be correct, then the controller may check whether the predetermined amount of diluent has been drawn at step 1665. This may involve the controller receiving signals from a sensor, such as a slide potentiometer, for example. If the draw is complete, then the method 1600 ends. Otherwise, the controller checks whether, at step 1670, the end of the syringe plunger travel has been reached. This may be detected based on motor current, speed, plunger position, or a combination of these or similar measurements. If the end of plunger travel has not been reached, then step 1655 is repeated. If the end of plunger has been reached, the controller may send a notification to the operator of the status at step 1675, and the method 1600 ends.

The APAS cell, by knowing the size of the syringe and the amount of diluent it needs to draw, determines how long the syringe plunger manipulator should pull on the syringe plunger to draw the amount of fluid needed. During the draw, the syringe plunger manipulator monitors the amount of torque needed to control the syringe plunger. A step change in the torque before the draw is complete may indicate a problem and should be reported to the operator 1626 and the process stopped. An error is also indicated if the end of the syringe plunger is reached before the draw is complete. This should also be reported to the operator 1626 and the process stopped. Once the draw has successfully completed, the process ends.

In some embodiments, the controller may measure, monitor, record, and/or store information indicative of a remaining volume in a particular IV bag. This information may be used, for example, for quality control purposes, and for determining when to stop drawing diluent from the bag (e.g., when the available volume falls below a practicable level).

Figure 17A:
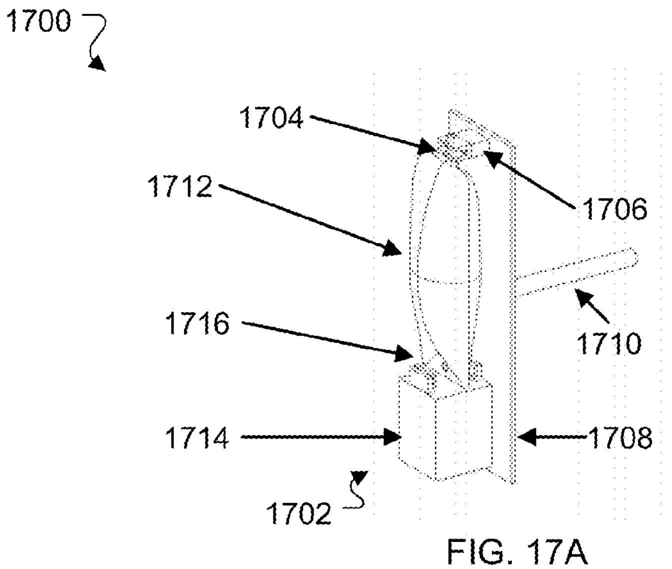
FIGS. 17A-17C shows an illustrative diluent bag manipulator.
Figure 17B:
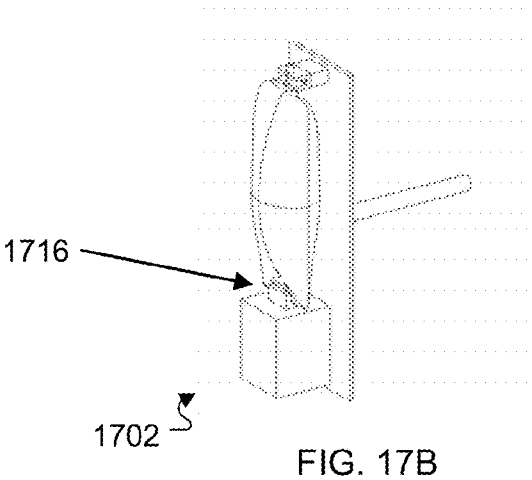
Figure 17C:
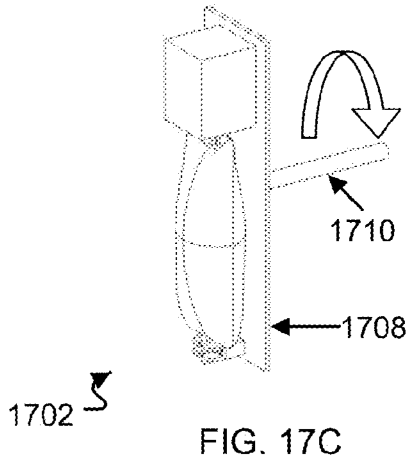

FIGS. 17A-17C show an illustrative apparatus 1700 for manipulating IV bags 1712 to be used to supply a diluent for a reconstitution process.

In FIG. 17A, an illustrative diluent bag manipulator station 1702 is provided in, for example, the APAS cell 100, for the purpose of manipulating IV bags containing diluent needed in a reconstitution process. The robotic arm 318, as described in FIG. 3, may convey or transport an IV bag to the station 1702. The arm may be actuated by a controller in the APAS cell 100 to register a fill port 1704 of the conveyed IV bag with a clip 1706, as described with reference to FIGS. 6-7, on a platen 1708. The bottom of the IV bag 1712 is placed into a gripper 1714 where gripper jaws 1716 are in the open position. Next, in FIG. 17B, the gripper jaws 1716 are closed to grasp the bottom of the bag. The IV bag 1712 is thus restrained by the closed gripper jaws on the bottom of the bag along with the top of the IV bag being secured in the IV bag clip 1706. FIG. 17C shows how the platen 1708 is rotated, for example, 180 degrees along the rotation axis 1710 to invert the IV bag to be oriented with IV bag fill port 1704 down, which may cause air in the IV bag 1712 to rise to the top. In this embodiment, diluent may be supplied, (e.g., by gravity feed or peristaltic pump) without a preparatory step of extracting the air from the IV bag 1712 before a syringe draw.

In this embodiment, the diluent bag manipulator station 1702 may orient IV bags for fluid transfer on a needle up syringe manipulator station 322, an example of which is described with reference to FIG. 3.

In some embodiments, the APAS cell 100 may have stored information (e.g., from visual inspection, weight measurement, historical information, user input, etc.) about the approximate fluid volume available in the IV bag. A controller in the APAS cell may determine when the available volume in the IV bag has been depleted to a level below which the IV bag may be discarded, or used for another purpose.

In some embodiments, the removal of the IV bag from the diluent bag manipulator station 1702 may involve rotating the platen again by 180 degrees to re-orient the IV bag as shown in FIG. 17B. The gripper jaws may then be opened, releasing the bottom of the IV bag. The robotic arm 318 may then grasp the IV bag by the port, as has been described, and withdraw it to remove it from the clip. The robotic arm 318 may then place the empty bag, for example, into a waste chute 333, as shown in FIG. 3.

In another embodiment, the gripper 1714 may move in a direction to increase or decrease the distance of separation between the jaws 1716 and the clip 1706 to allow for different size bags.

Figure 18:
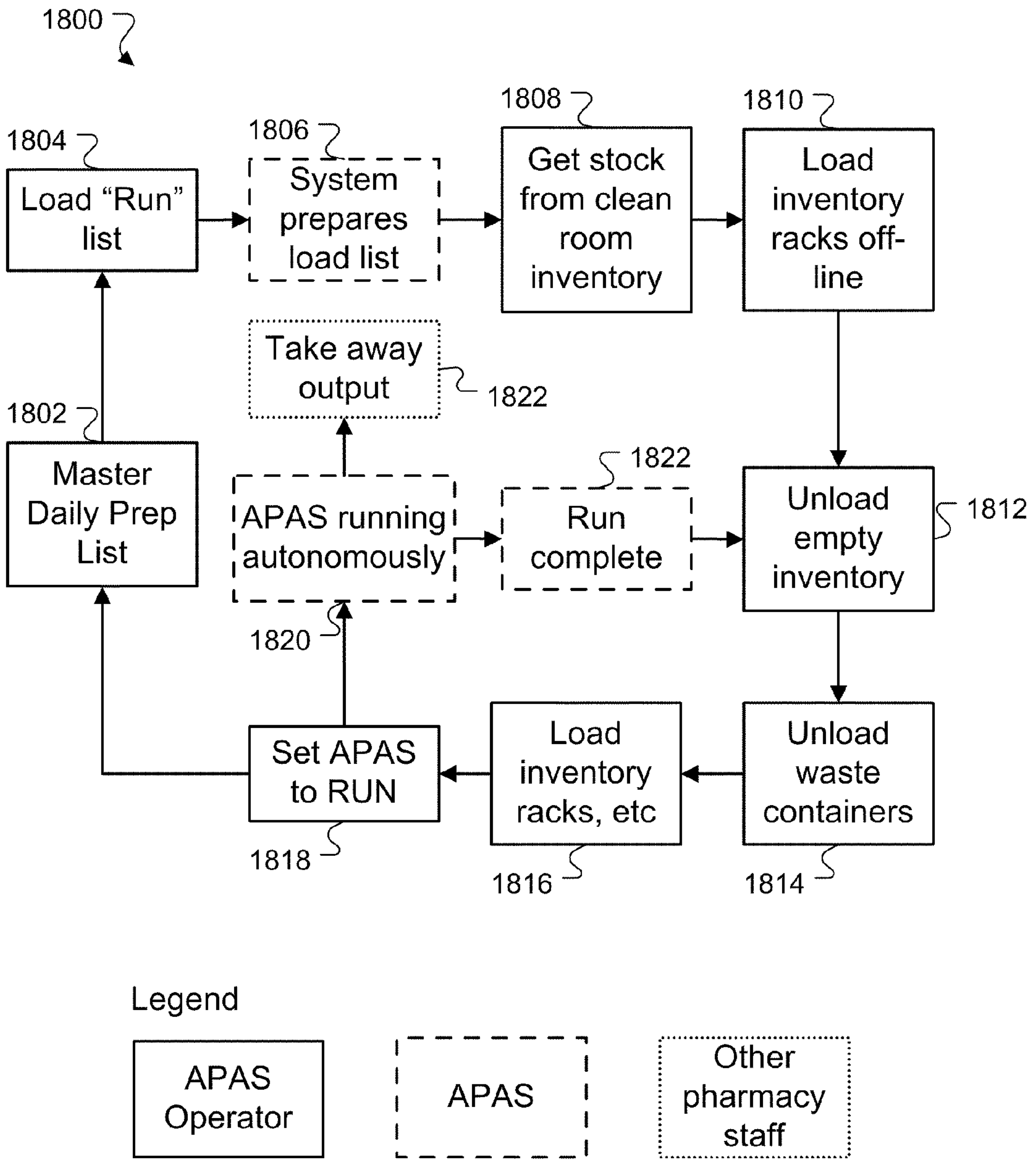
FIG. 18 is a flow chart of an illustrative batch mode method.

FIG. 18 is a flow chart of an illustrative batch mode of operation that may be used to fill orders provided to the APAS cell. Batch mode 1800 involves the loading of the APAS cell with a batch of input drugs and diluents and syringes and IV bags for the output doses to produce a pre-defined set of drug orders. An operator, for example, prepares a master daily prep list 1802, which is a list of all the drug orders that need to be filled by the APAS cell for that day. This may include, for example, many prescriptions of one type or a variety of different prescriptions. The list is next loaded, in whole or in part (e.g., depending on the size of the list), into the APAS cell as the "run" list 1804 to be used by the APAS cell to prepare the drug orders. Software in the APAS cell screens the drug orders to ensure that the APAS cell is trained to fill them. The APAS cell then identifies the inventory required to fill the drug orders and the rack configurations from those available. It prepares a load list 1806 to guide the loading of the inventory into the racks. The inventory needed includes the drugs and diluents needed to prepare the orders, which may be contained, for example, in vials, syringes, or IV bags. It also includes the syringes (with needles fitted) required for processing the orders and the output containers for the drug doses, which may include a syringe or an IV bag, for example. From this load list, an operator gets stock from clean room inventory 1808, for example, and loads the inventory racks offline 1810 with the stock in the positions on the racks as indicated by the load list.

Next the operator delivers the racks to the APAS cell. The operator then follows an inventory loading process as described in FIG. 4, first unloading empty inventory 1812 or unused inventory that may be contained on the carousels from the prior run. The operator then unloads waste containers 1814 and empties them in preparation for the run. The waste containers are below the waste chutes 333, described in FIG. 3, and may hold empty containers (e.g., used or empty syringes, bags, vials) that were used by the APAS cell. Next, in the inventory loading process as described in FIG. 4, the operator loads the inventory racks 1816 onto the carousels. The operator begins the batch process by setting the APAS cell to RUN 1818, for example, by selecting the RUN button on a touch screen flat panel monitor, an example of which is the monitor 202. The APAS cell then runs autonomously 1820, generating the output orders which, depending on the drug container, may be dropped into the syringe discharge chute 332 or the IV bag discharge chute 344, examples of which are described with reference to FIG. 3. A receptacle disposed beneath each chute may collect the containers. A pharmacy staff member can take the output away 1822 to be placed in inventory, for example, in a hospital ward.

The APAS cell continues to run and prepare the drug orders until its run is complete 1822. The system may generate a signal to inform an operator. For example, the system may inform the operator by displaying a message on a flat panel monitor serving as the input/output device 306, an example of which is described with reference to FIG. 3. Compounding operations may cease if all pending orders have been completed, or if inputs required to complete any pending orders are not available in the rack inventory. In some implementations, the APAS cell may operate autonomously in a "lights out" mode, substantially without operator intervention, to process orders using available inventory.

Figure 19:
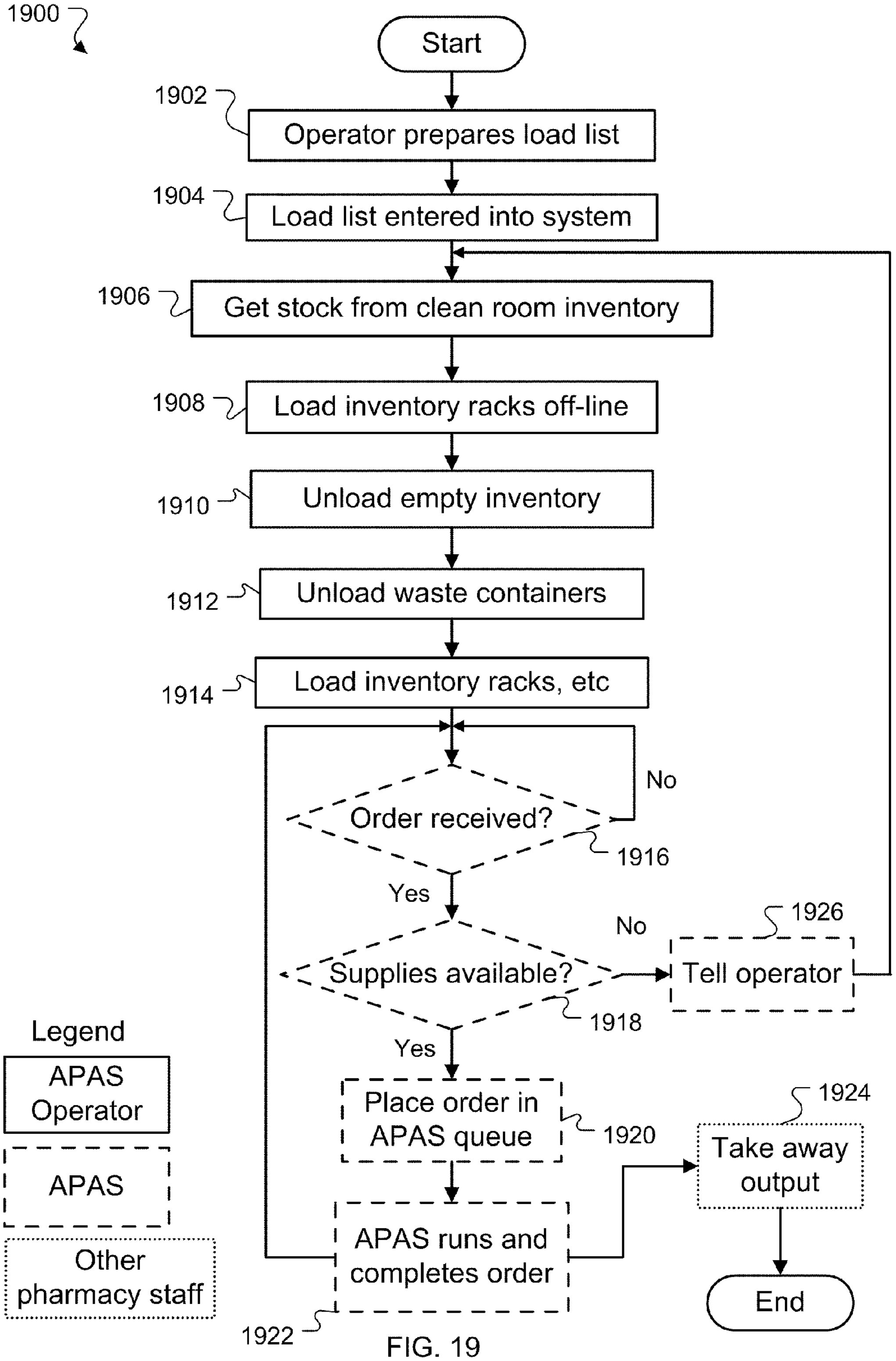
FIG. 19 is a flow chart of an example of an on-demand mode method that may be used by the device of FIG. 1.

FIG. 19 is a flow chart of an on-demand mode of operation that may be used to fill orders provided to the APAS cell.

On-demand mode 1900 involves the loading of the APAS cell with a complement of input drugs and diluents and syringes and IV bags for the output doses to produce drug orders that may constitute the most common drugs used on a given day. The APAS cell prepares a load list 1902 to guide the loading of the inventory into the racks. A total set of drug orders to be filled can be captured from an order entry system or manually entered by an operator. By analyzing the total set of drug orders to be filled, the APAS cell can determine an aggregate number of drugs, syringes, vials and IV bags required to fill the total set of drug orders. An aggregate list can then be provided to the operator. The operator can select the drugs, syringes, vials and IV bags required from current inventory to meet the APAS cell load requirements for the total set of drug orders. The inventory needed may include the complement of drugs and diluents needed, which may be contained, for example, in vials, syringes, or IV bags. It also includes the output container for the drug dose, which may be a syringe or an IV bag, for example. The operator enters the load list into the APAS cell 1904 using, for example, the flat panel monitor 202 as described in FIG. 2. From this load list, an operator gets stock from clean room inventory 1906, for example, and loads the inventory racks offline 1908 with the stock in the positions on the racks as indicated by the load list.

Next the operator delivers the racks to the APAS cell. The operator then follows an inventory loading process as described in FIG. 4, first unloading empty inventory 1910 or unused inventory that may be contained on the carousels from the prior day's operation. The operator then unloads waste containers 1912 and empties them in preparation for the day's orders. The waste containers are below the waste chutes 333, described in FIG. 3, and hold empty containers that were used by the APAS cell. Next, in the inventory loading process as described in FIG. 4, the operator loads the inventory racks 1914 onto the carousels.

The APAS cell then waits to receive drug orders 1916 from the hospital pharmacy by way of the hospital network, for example, as was described in FIG. 2. When an order is received by the hospital pharmacy, it is entered into the APAS cell. The APAS cell checks to make sure the supplies 1918 are in place to fill the order. If they are, the order is placed into the queue for the APAS cell 1920 where the APAS cell may then run and complete the orders 1922. The output order, depending on the drug container, may be dropped into the syringe discharge chute 332 or the IV bag discharge chute 344, as described in FIG. 3, where a receptacle placed beneath each chute may hold the container. A pharmacy staff member may take the output away 1924 to be used that day, for example, in a hospital ward.

If, when an order is received, the APAS cell determines that the supplies 1918 needed to fill the order are not in place, it notifies the operator 1926 who is responsible for reloading the inventory into the machine 1906.

The APAS cell may be able to run in either the batch mode or on-demand mode depending on user needs. For example, it can be used in the on-demand mode during the day shifts responding to demand from the hospital as it arises. During the evening and night shifts, it can be producing batches of drugs that are carried in bulk in the hospital pharmacy to maintain inventory.

An illustrative system 2000 capable of registering a fill port with stationary IV bags is shown in FIGS. 20A-20D. Embodiments may perform fluid transfer in needle-down or needle-up orientation. Registration may involve a portable fluid transfer port and/or a stationary bag, for example.

Figure 20A:
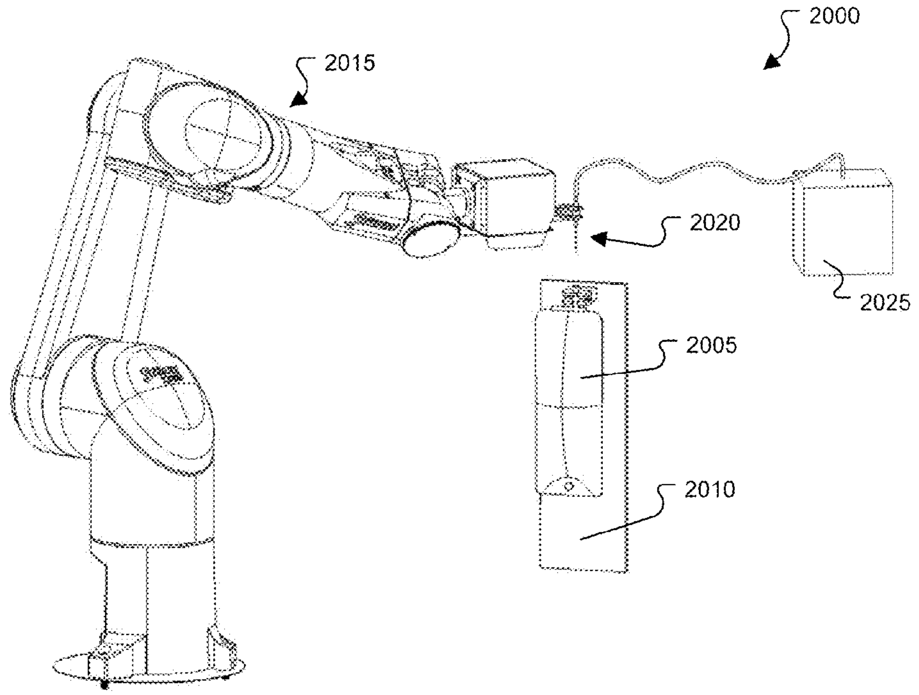
FIGS. 20A-20D show illustrative operations for a robotic manipulator to register a fill port with an IV bag in needle-up and needle-down orientations.

Embodiments may be operated by a controller to perform a process wherein an IV bag is conveyed from a carrier to a parking fixture 2010 in the cell and parked there by a robotic manipulator 2015. In the example of FIG. 20A, the system 2000 includes an illustrative parking fixture 2010, which may, in some embodiments, be the IV bag manipulator of FIG. 17A. In other embodiments, the parking fixture 2010 may also be a rack holding one or more IV bags that may be manually loaded by an operator.

The robot manipulator 2015, having released the IV bag 2005, may then grasp a fluid transfer port 2020 and register the port into the needle port on the IV bag. The fluid transfer port 2020 is connected to a fluid transfer device 2025, which can transfer fluid into and out of the IV bag (e.g., using gravity feed, pump, or other transfer mechanism). While the bag is oriented so that the port is at the top of the bag, air (e.g., in the headspace) in the top of the bag may first be extracted, as described elsewhere herein. The bag may be held on an IV bag manipulator and inverted to transfer fluid from the bag.

Figure 20B:
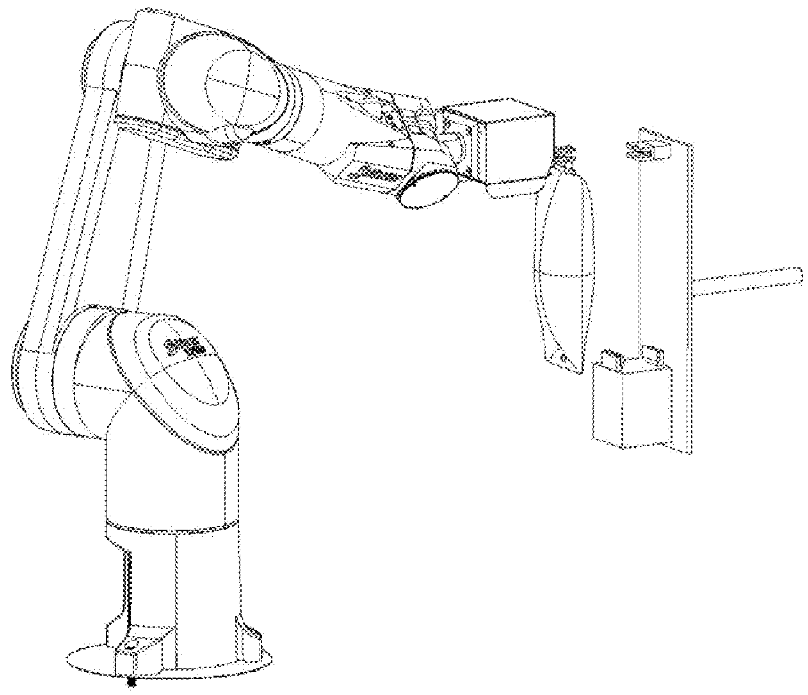
Figure 20C:
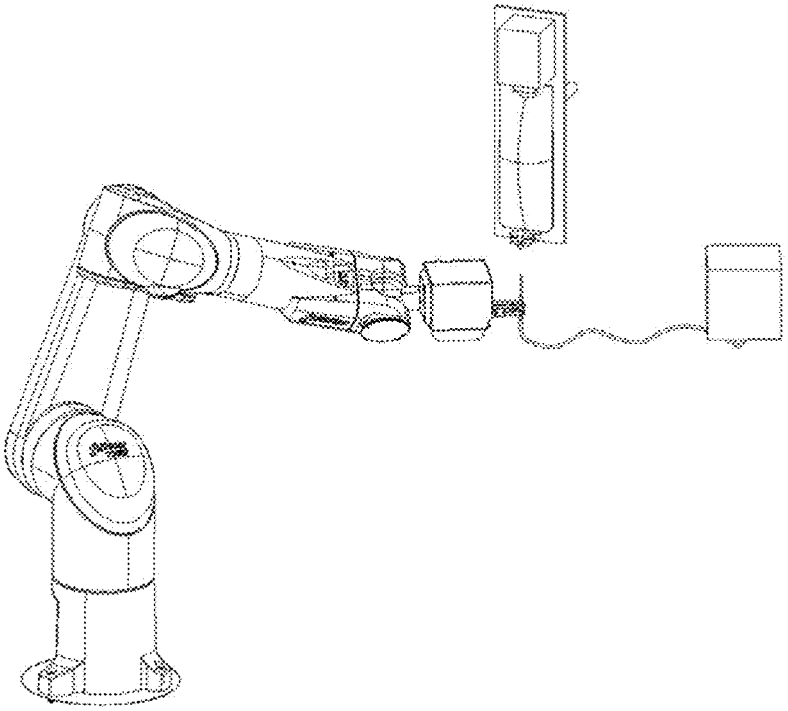
Figure 20D:
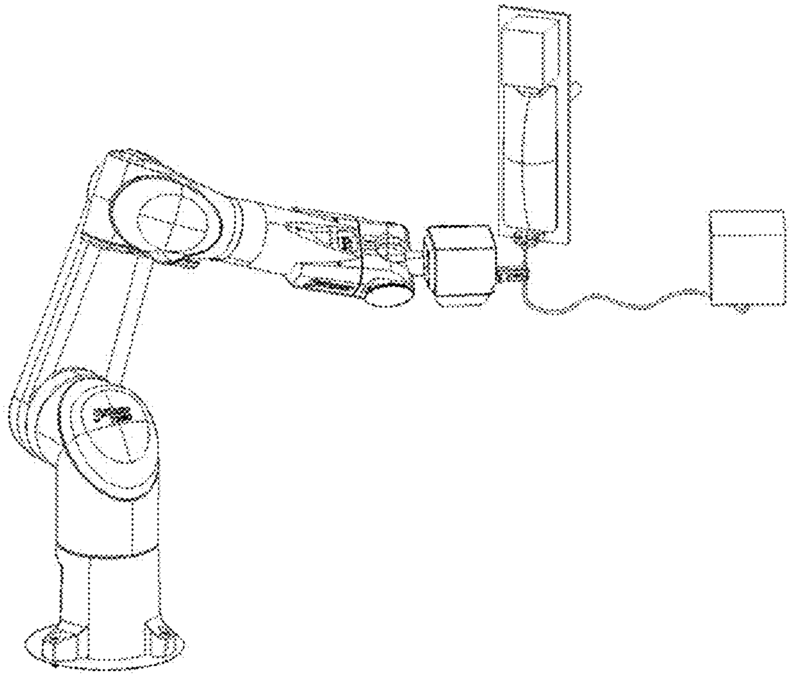

As illustrative embodiments, FIG. 20A shows the bag being parked and the robotic manipulator 2015 grasping and registering the fluid transfer port into the needle port on the bag. FIG. 20B shows the robotic manipulator 2015 placing the IV bag in IV Bag Manipulator. FIG. 20C shows the robotic manipulator 2015 grasping the fluid transfer port. FIG. 20D shows the robotic manipulator 2015 registering the fluid transfer port to the IV bag needle port.

In alternative embodiments, one or more IV bags may be mounted to retention clips, for example, such as may be mounted on a rotating storage carousel or a flat carrier. The robotic manipulator may register the fluid transfer port with any of the stationary bags. In a further alternative embodiment, the 2, 3, 4 or more IV bags may be retained by fill port retention clips coupled to an indexer, such as the indexer 1512 that was described with reference to FIG. 15.

In addition to the above-described examples, IV bags and syringes may be handled using systems, apparatus, methods, or computer program products other than the examples described above.

For example, the APAS cell 100 may include a main controller and one or more additional controllers in a distributed network architecture. The main controller may provide supervisory and management of cell operations, and coordinate the performance of sub-operations by the other controllers. Each controller may include one or more processors that perform operations according to software that may be developed, and compiled using one or more languages. The controllers may be in the form of embedded systems, having dedicated controllers, PLCs (programmable logic controllers), PC-based controllers with appropriate networking and I/O hardware and software, ASICs, or other implementation.

In some applications, one controller may be dedicated to controlling the robotic manipulator, including determining the position and motion paths for the manipulator within the processing chamber. Motion planning may involve solving static and/or dynamic kinematic equations to optimize conveyance time and reduce energy consumption, and such computation may be accomplished in real-time with a math coprocessor and/or digital signal processor that may be local to the APAS cell, or available on a remotely located workstation coupled to the APAS cell through a network connection, for example. In other embodiments, the expected motions (e.g., from carousel to scale) of the robot manipulator may be learned or taught.

Databases may be provided for purposes of handling various types and sizes of IV bags, syringes, and vials, as well as the expected locations and orientations for various inventory items on the storage carousels, racks, and the various stations throughout the processing chamber. Motion, position, force, diameter, and similar parameters may be compared against upper and lower thresholds in some cases, to determine if the manipulator has encountered a condition that should trigger and error signal, alarm, email notification, instant message, paging signal, or other signal to a responsible pharmacist, operator, or system maintainer, for example.

To accommodate various size, type, and manufacture of IV bags, appropriately sized holders may be disposed at locations in the cell at which the IV bag may be parked by the manipulator. Based upon information sufficient to associate an IV bag with a suitable holder, the information being determined either from user input or auto-detected (e.g., by bar code), the manipulator may selectively park the IV bag at the holder most compatible with the IV bag it is handling or conveying. With reference to FIG. 15A, for example, multiple styles and designs of the IV bag retention clips 1506 may be mounted to the indexer 1512 so that the manipulator may park an IV bag on a selected holder most appropriate for the IV bag. This approach may also be applied to storage racks and various stations disposed in the processing chamber.

In some embodiments, the indexer 1512 may move the waste vial 1516, the IV bag 1508, and the vial containing drug to be reconstituted (see FIGS. 15A-15C) laterally and/or vertically to register the appropriate item in alignment with the needle 1514 of the syringe 1510. In alternative embodiments, the needle down syringe manipulator may move the syringe and needle vertically and/or horizontally relative to the waste vial 1516, the IV bag 1508, and the vial containing drug to be reconstituted.

In some embodiments, the robotic manipulator may directly register an item it is grasping and holding, such as an IV bag fill port or a syringe, to implement a fluid transfer operation. The fluid transfer or gas extraction processing may be performed with the robotic arm grasping and supporting at least one of the containers involved in the fluid transfer operation.

In some embodiments, each APAS cell may be programmed with the information and be initialized with substantially identical information stored in non-volatile memory. In other embodiments, one or more APAS devices may be custom configured to perform specific functions. For example, one APAS cell may be configured to perform both custom and batch processing functions by responding to information about the compounding needed to fulfill various prescriptions and information about various alternative inventory solutions.

In various embodiments, the APAS cell 100 may work with inventory items, such as IV bags, vials, and syringes from various manufacturers. In some implementations, IV bag fill port retention clips placed at various proximate various stations in the processing chamber, and/or the gripper fingers on the robotic arm, may be exchanged or interchanged as needed to accommodate various designs and types of inventory items. Advantageously, some embodiments of the gripper fingers, for example, can accommodate a wide range of sizes and designs of commercially available inventory items, as described above.

In an embodiment, compounding operations may be performed using commercially available containers adapted for parenteral applications. APAS cell can also accommodate parenteral fluid containers, for example, those used for the preparation of total parenteral nutrition. In one example, such containers may be processed as inputs and/or outputs from the APAS cell 100. In further embodiments, compounding operations may be performed using commercially available flexible fluid containers for certain other medical or pharmaceutical applications. As an example, such containers may be processed as inputs and/or outputs from the APAS cell 100.

In some applications, compounding operations may be performed according to aspects of embodiments described herein in a clean environment. For example, an embodiment may be performed in a clean room environment, such as an ISO Class 5 environment, for example. In another embodiment, compounding operations may be implemented in a ventilated (e.g., flow hood) work area. In other embodiments, compounding operations may be performed in a chamber, an example of which is the compounding chamber 304. In various implementations, a series of compounding processes may be performed in part within a chamber, flow hood, and/or clean room. In various embodiments, the compounding operations, the inventory storage, and/or the actuation and conveyance of items may be performed in a substantially aseptic environment. In various embodiments, the compounding chamber 304 may be at a negative pressure relative to ambient atmospheric pressure, and the inventory chamber 302 may be at a positive pressure relative to ambient atmospheric pressure.

In some embodiments, the pressure in a chamber of the APAS cell may be different from ambient, such as up to at least about 10 inches of water, or between about 0.1 and 1.0 inches of water above or below ambient atmospheric pressure. Negative pressure may reduce the likelihood that certain chemicals may be released outside the chamber, for example.

In conjunction with the compounding area, inventory items may coordinate the handling of inventory items with a carrier that may present one or more items within proximity of a manipulator, for example. In an embodiment, one or more inventory items may be presented or delivered to a manipulator, an example of which is the robotic arm 318.

The manipulator system may include one or more coordinated axes of motion to grasp, convey, and/or orient inventory items. An inventory item may be, for example, registered on a retainer clip on a storage rack, or registered with a fluid transfer port, or otherwise manipulated in support of operations, such as operations involving fluid transfers at a fluid transfer station, that relate to compounding. In embodiments, the manipulator system may convey items in part by gravity feed system, or motion imparted by one or more motors (e.g., electric motors), operating alone or in combination.

In some embodiments, inventory delivered to the robotic arm 318 in the APAS cell 100, for example, may be a syringe that includes a syringe barrel in combination with a needle operably coupled to the barrel. In some embodiments, the needle is capped, and the needle cap is removed as a preparatory step for operating the syringe in various compound processing steps.

Next described are systems, methods, and computer program products suitable for using pulsed ultraviolet (PUV) light to substantially reduce active bioburden, disinfect, sterilize, and/or sanitize objects in an environment such as a pharmacy. In one embodiment, PUV light is applied within an APAS cell. The APAS cell includes a robotics cell that automates the compounding and dispensing of drug doses into IV bags and syringes, such as those that are routinely made in or for hospital pharmacies. The APAS cell utilizes a syringe-based fluid transfer process and employs a robot for moving drug vials, syringes, and IV bags through the cell as the medications are processed. Also described is another embodiment in which PUV light is applied to disinfect and/or sanitize objects outside of an APAS cell. In an illustrative embodiment, the PUV light may be implemented as a table-top system that allows pharmacy personnel to sanitize pharmaceutical packaging and/or other equipment.

Systems, methods, and associated apparatus include an automated cleaning/sanitizing of "critical areas" on drug vials, and IV bag ports during automated, semi-automated, or manual admixture compounding processes.

Figure 21:
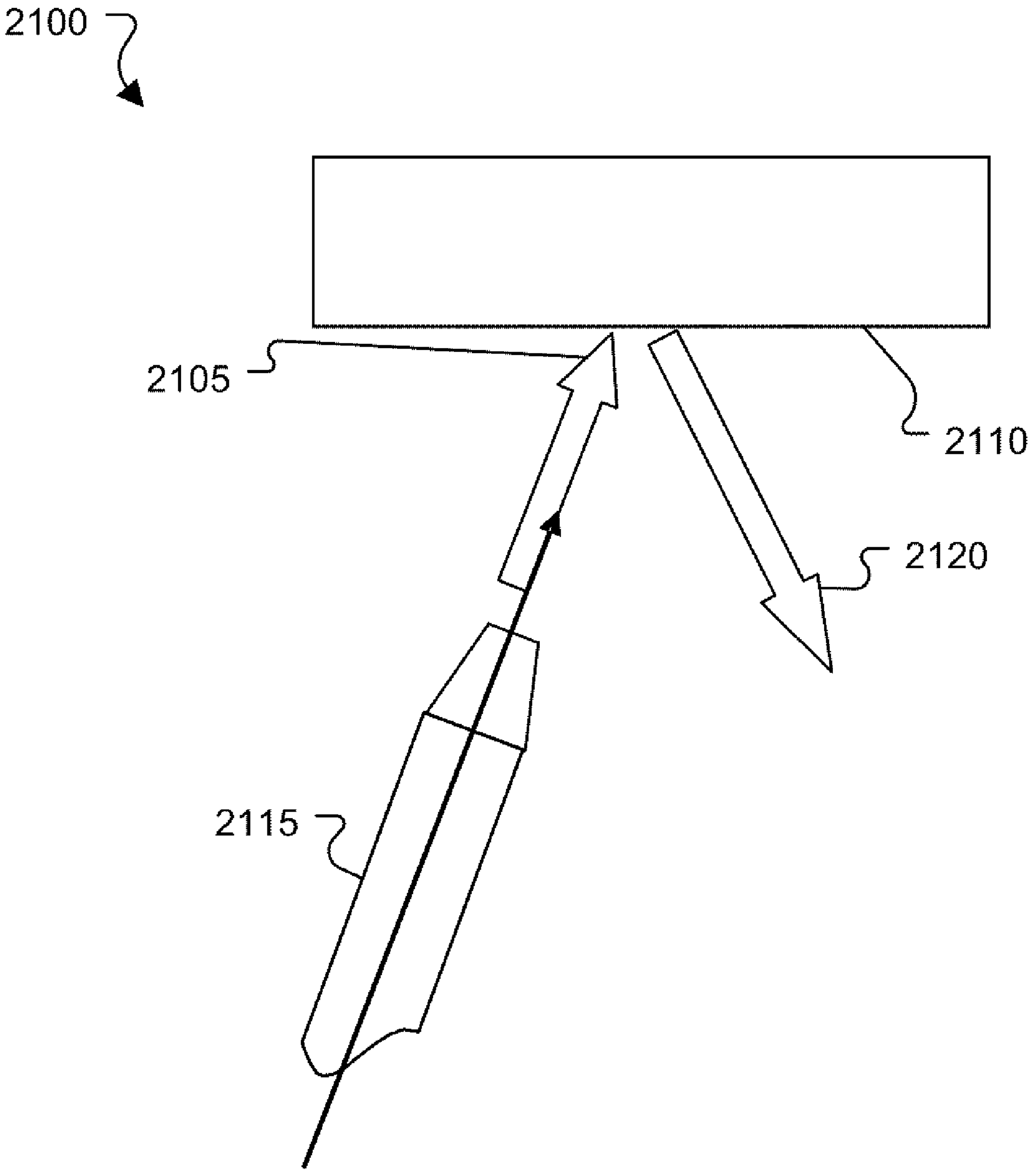
FIG. 21 illustrates an illustrative cleaning process in an APAS cell.

FIG. 21 illustrates an illustrative cleaning process 2100 in the APAS cell 100 of FIG. 1. In one embodiment, the process 2100 may be controlled, for example, by a controller that controls the operations of the APAS cell 100, to provide a controlled (e.g., timed and/or metered volume), pressurized, and directed spray 2105 of cleaning agent. The cleaning agent may be, for example, primarily but not limited to, about 70% isopropyl alcohol. The pressurized spray 2105 may serve to both dislodge particles, and to disinfect a surface 2110. The amount of cleaning fluid dispensed may be metered using a controllable (e.g., solenoid) valve. The cleaning fluid is pumped from a reservoir to a spray nozzle 2115 using a suitable method. Suitable methods may include, but are not limited to, direct pumping of the cleaning fluid, and/or feeding cleaning fluid into a pressurized air (or other gas) stream. In some embodiments, the cleaning fluid reservoir may provide sensors to detect fluid levels. There may also be a system to detect pressure, fluid flow, and confirm fluid spray. Waste fluid 2120 may be collected in a suitable container for subsequent evaporation, drainage, recovery, and/or disposal.

Figure 22:
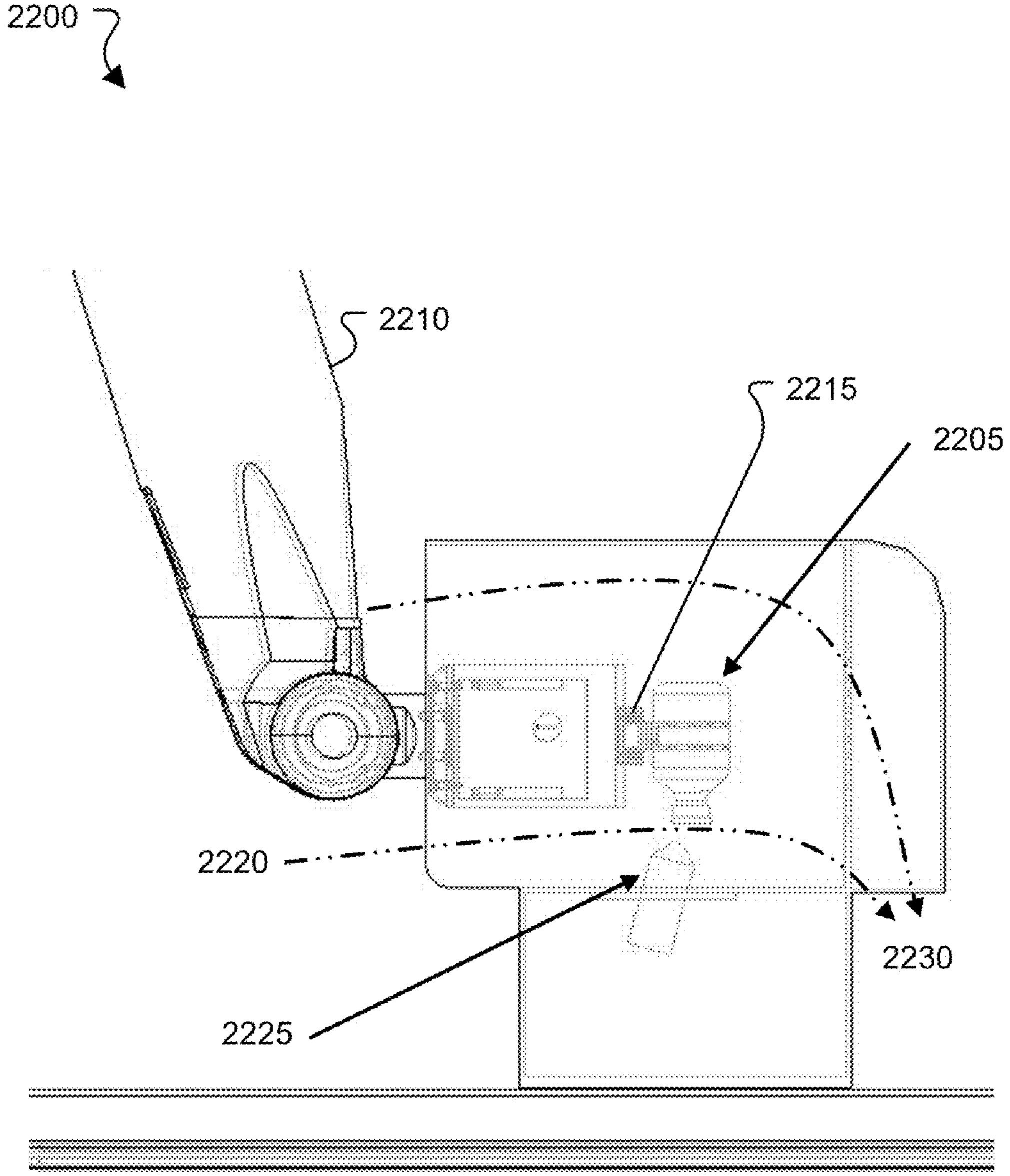
FIG. 22 shows an illustrative air flow system for the process of FIG. 21.

FIG. 22 illustrates an illustrative cleaning chamber 2200. When applied within the APAS cell 100, forced airflow 2220 may be used to substantially control mist and overspray from a spray nozzle 2225 from escaping the cleaning chamber 2200. The chamber 2200 may include one or more fans or sources of pressurized fluid to maintain the air flow. Exhaust air flow 2230 exiting the cleaning chamber 2200 can be filtered and/or exhausted from the APAS cell 100 to prevent fume build up. Sensors can be used to monitor airflow and shutdown drug processing in the APAS cell if inadequate airflow is detected. In this case, the operator may be alerted, for example, by an audible beep or a message on a display terminal connected to the APAS. The airflow can also be used to dry the cleaning fluid from the cleaned area. In some embodiments, the flow may include additives or substitutes for air, such as inert gases, for example.

Surfaces and/or objects to be cleaned 2205 may be presented into the chamber by a robotic arm 2210. The object to be cleaned 2205 may be moved during the cleaning process to allow larger areas to be cleaned. For example, a gripper 2215 on the robotic arm 2210 may impart motion with multiple degrees of freedom by rotating around and/or translating along one or more axes. The primary cleaning surfaces to be cleaned may include, but are not limited to, vial ports, diluent ports, and IV bag ports, for example.

The cleaning chamber 2200 can also be packaged into a self-contained unit to be used either manually, or automatically, as a stand-alone device to facilitate cleaning during manual drug compounding.

An apparatus may be used in the APAS cell 100, for example, for removing needle caps and needles from syringes, and removing caps from medicine containers/vials. The syringes and vials can be presented to the apparatus in one of several ways. In the APAS cell 100, a robotic manipulator, an example of which is described above, may present the syringes and vials to the apparatus.

An illustrative method of actuating the jaws of the apparatus includes using servo electric manipulators. In pharmaceutical environments, servo electric manipulators are an example of an actuator type that may be suitable for the clean environment needed for pharmaceuticals. Various other actuation mechanisms are possible.

One or more sensors (e.g., optical, force, current, etc. . . . ) may be used to monitor cap and/or needle removal. In one embodiment, the sensors may operate to detect caps and needles that are in a robotic gripper. In some embodiments, sensors can be located in the jaws, or be oriented to sense the items from just outside the apparatus. The sensors may be used to detect the presence of a part and the absence of the part when the apparatus is opened to discard the part by gravity and/or an ejector pin(s) to a chute below.

Figure 23:
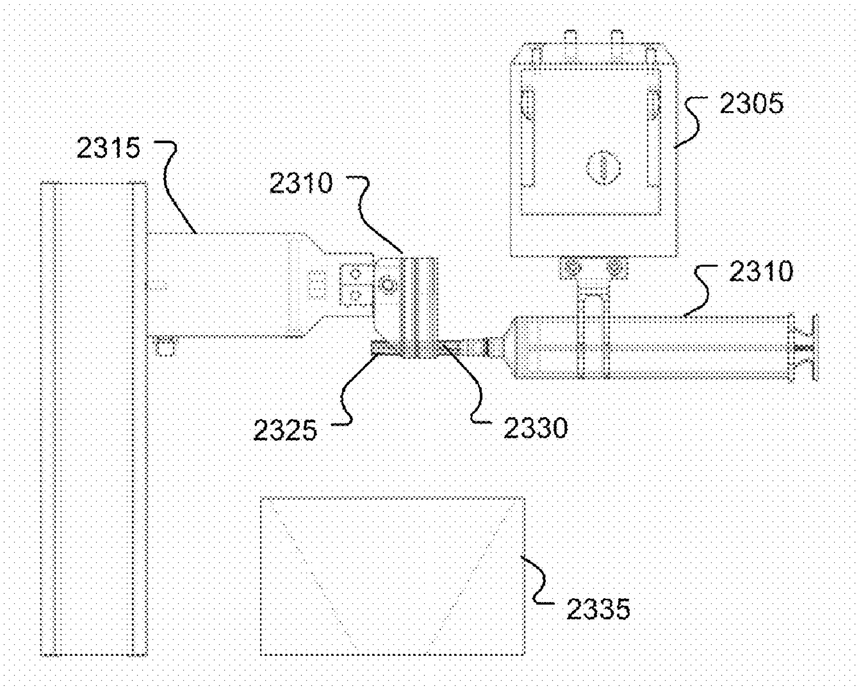
FIG. 23 shows an illustrative process for needle cap removal.

FIG. 23 shows an illustrative process 2300 for needle cap removal. In the APAS cell 100, a robotic gripper 2305 may present a needle/syringe combination 2310 to an apparatus for needle cap removal. The apparatus may include an actuator 2315 and jaws 2320.

A needle cap 2325 may be taken off a needle 2330 before using a needle/syringe combination 2310. Opening the jaws 2320 of the actuator 2315 and placing the needle cap 2325 in the V shaped feature in the jaws 2320 and closing on it to grip the cap 2325 can achieve needle cap removal. The needle/syringe combination 2310 can then be withdrawn from the cap 2325. The jaws 2320 can then be opened to discard the cap 2325 into a waste receptacle 2335 located below the jaws 2320.

Feedback from the jaws 2320 may be used to detect if a needle cap 2325 was present on the needle/syringe combination 2310. The feedback from the jaws 2320 may be in the form of diameter feedback information. If a needle cap 2325 was expected but not detected by the jaws 2320, the needle 2330 may be considered potentially contaminated. As such, the APAS cell can dispose of the needle/syringe combination 2310, or send the item to be sanitized as described elsewhere herein.

Figure 24:
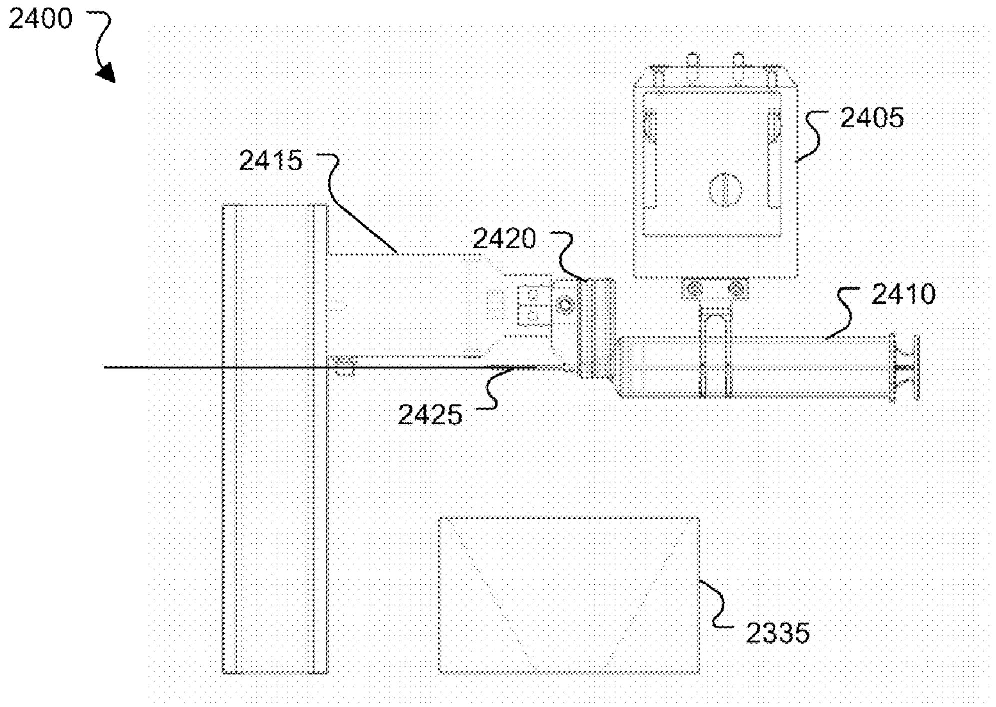
FIG. 24 shows an illustrative process for needle removal.

FIG. 24 shows an illustrative process 2400 for needle removal. In the APAS cell 100, a robotic gripper 2405 may present a luer-lock syringe 2410 to an apparatus for needle removal. The apparatus may include an actuator 2415 and jaws 2420. The apparatus may be the same apparatus used for needle cap removal, as described with reference to FIG. 23.

A needle 2425 from the luer-lock syringe 2410 may be removed by an unscrewing motion. The same V-shaped feature of the jaws 2420 that was used for needle cap removal may be used to grip the needle 2425 by the luer hub for removal. If a dexterous robot is used to hold the syringe 2410, the apparatus can be hard-mounted while the robot rotates the syringe 2410 about the needle axis to unscrew the needle 2425.

In other embodiments, the apparatus may be mounted on a device having a rotating base so that the rotating device can unscrew the needle from the syringe as a robotic manipulator withdraws the syringe slowly.

In various embodiments, syringes may be received in the compounding chamber with or without needles installed. In one example, a syringe with an installed needle may be conveyed to a station at which the tip cap on the needle is removed, an amount of medicament is dispensed from or drawn into the syringe, and the removed tip cap may be replaced onto the syringe by manipulation using the robotic arm. In some implementations, one or more syringes, tip caps, needles, capped needles, or syringe caps may be sanitized at the PUV station. In some systems, a needle dispenser may be provided to present needles for grasping by the robotic manipulator or otherwise for coupling to a syringe. In some cases, a needle dispenser provides needles (which may be sheathed) for packaging in a kit with at least a syringe.

FIGS. 25A-25E show an illustrative apparatus 2500 for vial cap removal. In the APAS cell 100, a robotic gripper (not shown) may present a vial 2505 to the apparatus 2500 for vial cap removal. The apparatus 2500 may include an actuator 2510 and jaws 2515. The jaws 2515 may include vial cap grasping jaw edges 2545. The jaws 2515 may also include a V jaw 2550 for needle and needle cap grasping. The jaws 2515 may also include cap retention features 2555. The apparatus may include features for needle cap removal, as described with reference to FIG. 23.

The vial 2505 can be inserted in the jaws 2515 of the apparatus by the vial cap 2520. The vial cap 2520 can be grasped by the jaw edges using a grasping jaw mechanism. The jaws 2515 are then closed on the vial cap 2520 so that the edges of the jaws 2515 engage the vial 2505 just below the vial cap 2520. The vial 2505 is then drawn out of the jaws 2515 and the jaw edges retain the vial cap 2520.

Figure 25A:
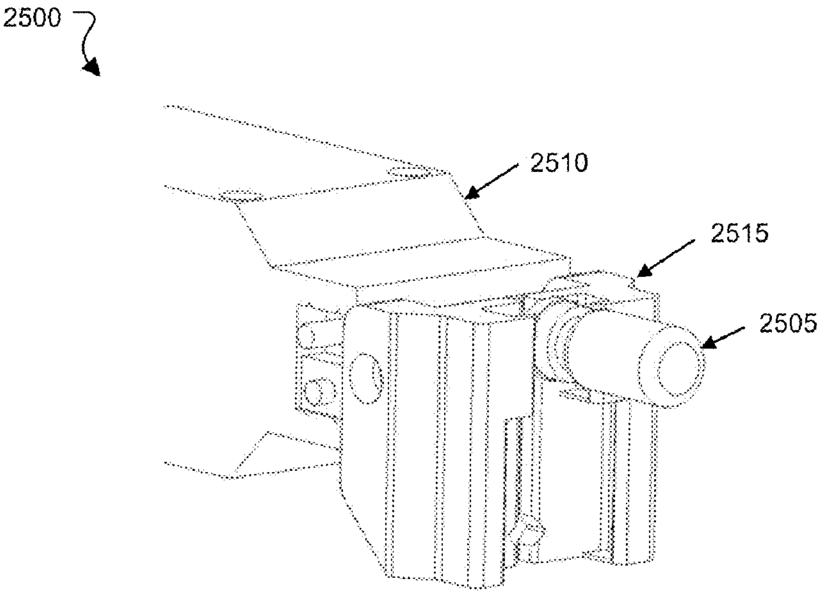
FIGS. 25A-25E show an illustrative process for vial cap removal.
Figure 25B:
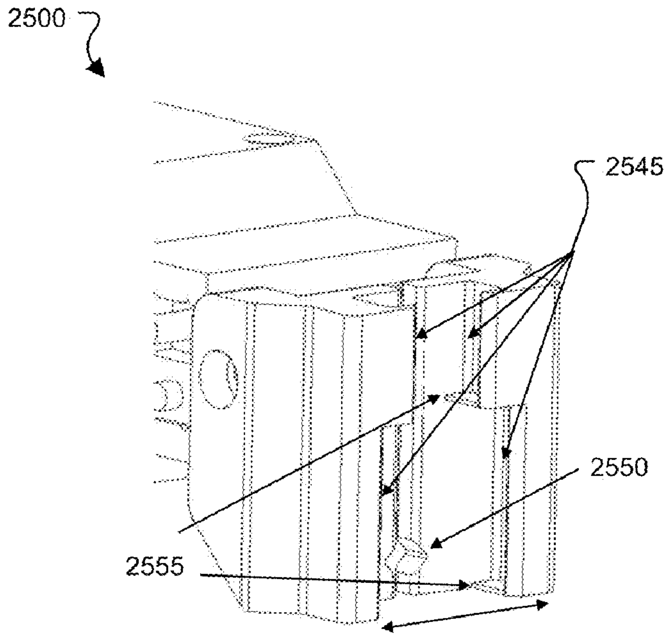
Figure 25C:
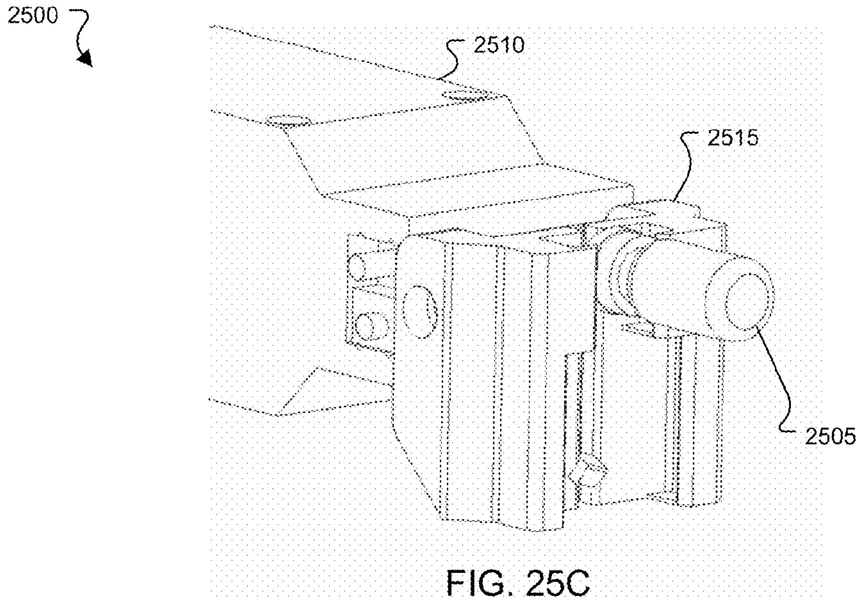
Figure 25D:
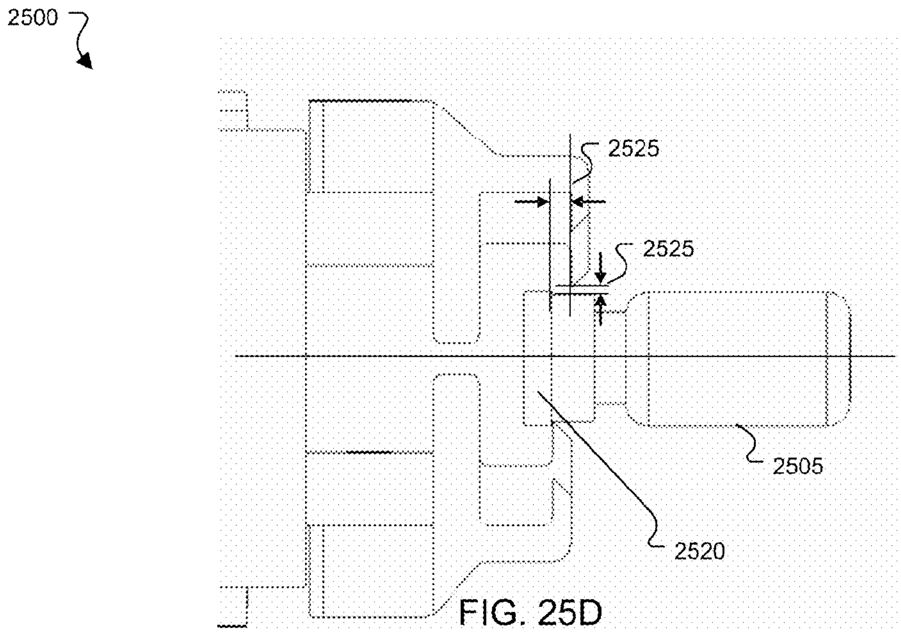
Figure 25E:
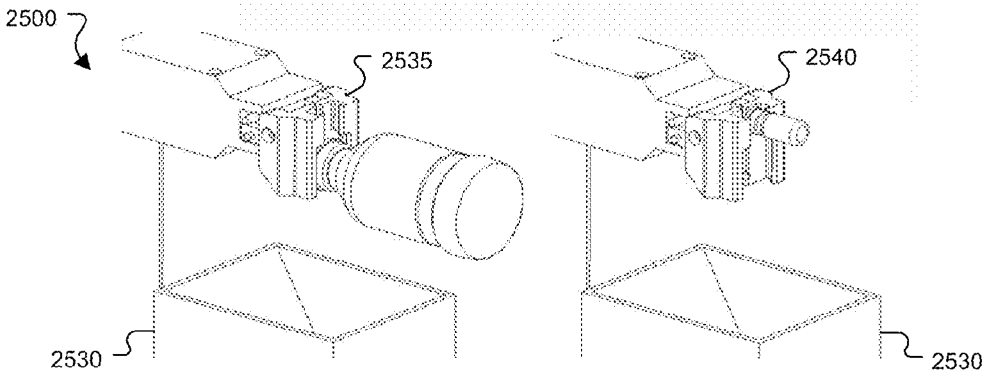

In some embodiments, the jaw edge pairs may have different lengths and offsets 2525 with respect to each other, as shown in FIG. 25D, for example. The offset and length differences may allow only one jaw edge to engage the vial cap at a time to facilitate vial cap removal with a prying motion, similar to manual removal. The offsets 2525 can allow the second jaw to engage the vial cap if the first one fails to remove it in the first attempt. This may occur when the first jaw slips past the vial cap and the actuator 2510 closes further to allow the second edge to make contact with the vial. The edge length differences can be designed to work with an actuator where the jaws move in unison with each other. In an embodiment, the vial may be presented on the center axis of a gripper, which coincides with the syringe presentation and facilitates robot setup. The design of the jaws may contain the removed item and prevent the vial caps from exiting the jaws in an uncontrolled manner until the jaws are opened to drop it in a waste chute, as shown in FIG. 25E.

Multiple sets of vial de-capping edges may be provided to accommodate the various sizes of vial caps that the apparatus can be used for, and to accommodate the stroke range of the actuator. Jaws 2535 and 2540 shown in FIG. 25E, for example, have two sets of de-capping edges.

Figure 26A:
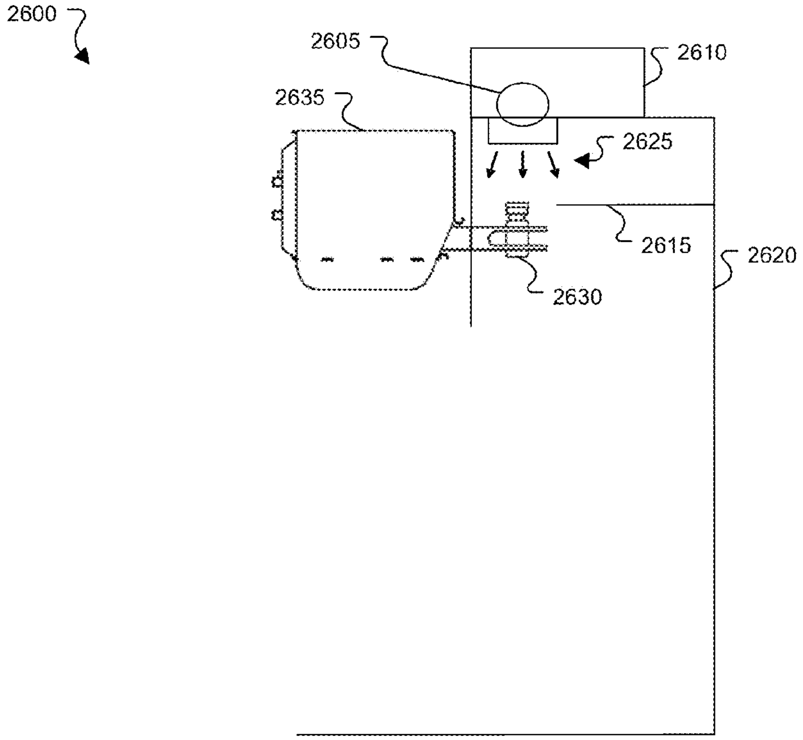
FIGS. 26A-26C show cross-sectional views of an illustrative pulsed ultraviolet (PUV) sanitizing system in the APAS cell.
Figure 26B:
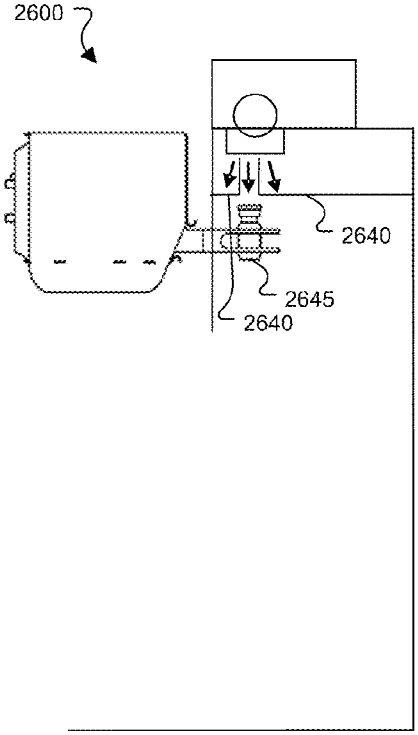
Figure 26C:
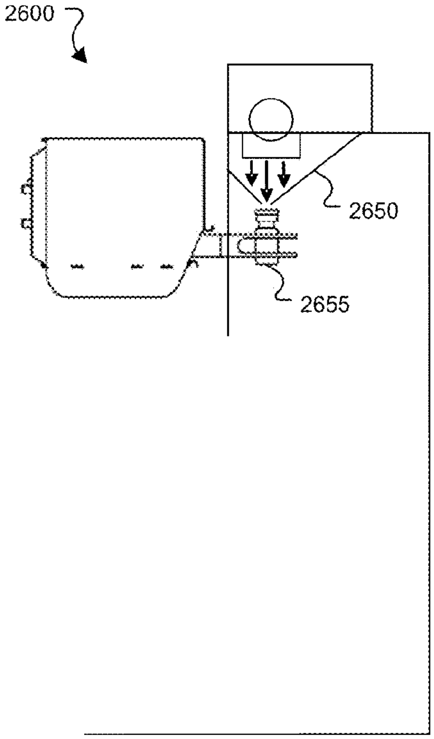

In various embodiments, vials or syringes may be capped, or caps removed, as needed to support operations, such as compounding or fluid transfer between containers, for example. Such operations may be performed in advance, such as during down time to build up reserves, or (e.g., just in time) as needed for a particular operation that has been scheduled or is already in progress. In some examples, operations may include providing features to indicate tampering with the capping and/or sealing of a pharmaceutical container. FIGS. 26A-26C show cross-sectional views of an illustrative pulsed ultraviolet (PUV) sanitizing system 2600. In an illustrative embodiment, a pulsed ultraviolet (PUV) system 2600 may be used to sanitize items within an automated pharmacy compounding device, such as an APAS cell 100, an example of which was described with reference to FIG. 1. In this example, the PUV system 2600 can be used to sanitize items that include, but are not limited to, drug vial ports, IV bag ports, and syringes. The sanitizing process performed by the PUV system 2600 may be used alone or in combination with one or more other cleaning processes described elsewhere herein.

The PUV system 2600 may be used to perform operations to sanitize objects placed within a PUV chamber. In this example, the system 2600 includes an ultraviolet (UV) lamp 2605, a lamp housing 2610, a baffle 2615, and a chamber wall 2620. The chamber wall 2620 may substantially reflect and/or absorb radiation so as to substantially contain UV radiation 2625 from the UV lamp 2605 within the PUV chamber. The UV radiation 2625 from the UV lamp 2605 may illuminate an object 2630 placed within the PUV chamber. In this example, the object 2630 is a drug vial that is positioned to be exposed to the UV radiation 2625 by a manipulator 2635. The manipulator 2635 may be a robotic gripper, for example, such as those described above.

FIGS. 26A-26C show a single chamber embodiment where the lamp housing 2610 and the UV lamp 2605 are mounted above the object 2630 with the UV radiation 2625 directed downward. In other embodiments, one or more UV radiation sources may be directed upward and/or from the sides, either alone or in combination with the downward directed UV lamp 2605. An illustrative UV radiation source for the lamp 2605 is a xenon lamp. The size of the light aperture in the baffles 2615 may be suitable for the objects being sanitized. The object 2630 may be presented to the UV radiation source by mechanical or robotic mechanisms.

Operations to sanitize an object may generally refer to operations to reduce the bioburden on the object to be sanitized. In some applications, a sanitizing operation may be intended to reduce active (e.g., living) bioburden to some degree. For example, a sanitizing operation may achieve a 6 log reduction of *bacillus subtillis* on an object. In another example, a sanitizing operation may kill all or substantially all spores and/or fungi on the treated surfaces.

The bioburden may include (but is not limited too) viruses, bacteria, spores, and/or fungi. In a range of examples, pulsed ultraviolet radiation may be used to kill one or more types of biocontaminants on, around, or within portions of a syringe or vial, such as the port of such a syringe or vial. In some cases, such bioburden may be found in environments such as medical clinics, hospitals, including hospital pharmacies, or research laboratories, for example, or other facilities in which pharmaceuticals may be packaged, prepared, stored, transported, or otherwise handled. Some embodiments may be beneficially applied to provide or enhance sanitization of vials, syringes, packaging (e.g., I.V. bags), tubing, access ports, and/or associated equipment (e.g., handling equipment, including robotic manipulators), fluids (e.g., water), or other materials that may come into proximity and/or contact with objects for which disinfection and/or sanitization may be a concern. Some applications may relate to the preparation of pharmaceutical and/or medical devices, such as delivery systems for providing parental nutrition or insulin to patients, for example. The method of sanitizing may be by a timed and/or metered pulse of UV radiation 2625, direct and/or reflected, primarily but not limited to UV-C wavelengths. In one example, the object 2630 to be sanitized may have a reduction of bioburden related to the intensity and duration of the flash, and the number of flashes presented to the object. Some systems may achieve, for example, at least about a 6 log reduction of *bacillus subtillis* within two seconds.

In various embodiments, ultraviolet radiation exposure may involve exposures over various wavelengths. In various implementations, the exposure may include UV-A, UV-B, and/or UV-C, at wavelengths including, but not limited to, between about 200 and 3000 nm, such as between about 160 and 380 nm, or between about 230 and 300 nm, or between about 250 and 270 nm, for example.

In some embodiments, exposure to pulsed ultraviolet radiation may occur for various lengths of time. For example, exposure may be completed in less than 10 msec, up to about 1, 5, 10, 20, 30, 40, or up to at least about 60 seconds, for example. If pulsed, pulses may be delivered at a fixed or variable frequency of between about 0.01 Hz and about 1 kHz, such as between about 0.1 Hz and 100 Hz, or between about 2 Hz and about 10 Hz. Individual pulse duration may be less than one second, such as between about 1 ns and 100 ms, or between about 10 ns and 10 ms, or between about 100 ns and 1 ms, or between about 1000 ns and about 0.1 ms, such as between about 300 and 400 microseconds. Multiple power supplies and/or flash lamps may be used in combination to interleave and/or increase peak intensity of radiation exposure from one or more locations around the target surfaces. Various stored profiles may be executed at various levels of pulse intensity, number, spacing, and timing. Control may be implemented by a processor, such as on a programmable logic controller (PLC) or an embedded controller, for example.

Ventilations and/or cooling may incorporate air handling apparatus alone or in combination with purging systems (e.g., Nitrogen). Energy delivered to the object to be sanitized may be a function of the number of pulses and the energy associated with each pulse. In some examples, a total energy delivered may be less than 1 Joule, between about 1 Joule and about 20 Joules, up to about 30, 40, 70, 100, 250, 500, 600, 750, or at least about 1000 Joules. Over longer time spans, any practicable amount of energy may be delivered to achieve an effective and/or desired reduction in active bioburden, such as spores, bacteria, and/or viruses, for example.

In some embodiments, the PUV system includes an interlock that disables the light source until a portion of the object is in the PUV chamber such that a substantially complete light seal is formed to prevent substantial light from escaping.

Other embodiments of the PUV system 2600 are possible. For example, the PUV system 2600 of FIG. 26B includes baffles 2640 arranged to provide a substantially cylindrical or tubular, vertically oriented lumen through which to illuminate an object 2645. The baffles 2640 may have reflective surfaces. In another example, shown in FIG. 26C, baffles 2650 are arranged to form a partial conical surface with an aperture to direct substantially all light to an object 2655 disposed near the aperture. Other similar arrangements of baffle configurations may be used to direct a substantial fraction of the light that enters the PUV chamber to an object placed near one or more apertures like those of FIGS. 26A-26C.

The PUV system 2600 may be adapted for integration into an APAS cell 100, or configured for stand-alone (e.g. table-top, free-standing) operation for use in a hospital pharmacy or similar environment. In the hospital pharmacy type of environment, pharmacy staff may prepare prescriptions by using an extension tool (e.g., tongs) to grasp the object to be disinfected and place it into the PUV chamber for disinfection. Location features (not shown) may be included to aid in the positioning of the object by the pharmacy staff in the correct location in the PUV chamber.

In embodiments, a rigid, semi-rigid, or flexible boot (e.g., rubber, foam, plastic, or flexible UV blocking or reflective material) may be formed around an aperture. When a fluid port of a vial or IV bag is to be sanitized, an operator in a pharmacy or a robot arm in an APAS cell may place the fluid port to be sanitized in proximity to the aperture such that the boot forms a substantial light seal interface with a body of the vial or IV bag. The aperture may provide a substantially UV-transparent window through which one or more surfaces on the fluid port may be exposed to ultraviolet radiation through the window. In response to a start signal, a dose of pulsed ultraviolet radiation may be delivered. The dose may be according to a pre-programmed set of pulses, at a specified intensity, duty cycle, repetition rate (e.g., fixed or variable), and number of pulses, or total energy. The start signal may be generated by a switch that is pressed when the body of the object is pressed into the boot, or a proximity sensor (e.g., optical sensor, hall effect sensor to detect robot arm, etc. . . . ) detects the fluid port in position, a signal generated by a controller or another switch (which may be manually pressed), or a combination of such these or other detection techniques.

For manual operation, some embodiments may include a feedback signal to indicate to an operator that the UV pulse profile has completed, or that the item has been exposed to the selected dose of pulse UV. In some embodiments, a display may indicate an exposure level, such as based on time, number of pulses delivered, or total energy delivered. In some modes, the operator may control the exposure level based on how long the item is pressed into the boot.

Instead of, or in combination with, a flexible boot, some embodiments may provide a receptacle to receive a fluid port in proximity of the UV exposure port. The receptacle may be sized to receive one or more sizes and styles of fluid ports for IV bags, and one or more sizes and styles of fluid ports for vials. A concave opening receptacle may be adapted to receive a range of sizes. One or more differently sized and/or shaped receptacles may be provided. In some embodiments, receptacles may be interchanged to accommodate a wide range of items to be sanitized. Different receptacles may have locating pins, rotating and/or sliding features to retain a receptacle being used.

Interlock features may be integrated into each receptacle. For example, proximity or pressure sensors may be used to determine when a receptacle is properly installed and a properly sized vial or IV bag fluid port is being inserted or pressed into the receptacle to be exposed to the ultraviolet radiation.

In some embodiments, a sensor may measure the approximate total energy delivered, and send feedback information to a controller. The controller may deliver pulses until a predetermined threshold of energy is delivered.

Figure 27:
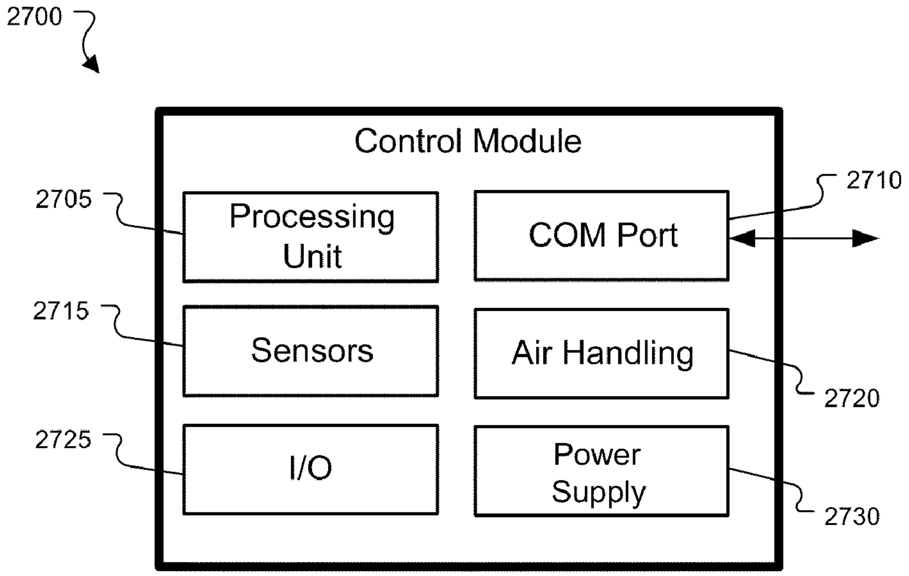
FIG. 27 is a block diagram of a control module for the PUV sanitizing system of FIGS. 26A-26C.

FIG. 27 is a block diagram of a control module 2700 for the illustrative PUV system 2600 of FIGS. 26A-26C. In an illustrative embodiment, the PUV system 2600 discussed herein may include a PUV chamber, a PUV lamp assembly, and the control module 2700. The control module 2700 may include a processing unit 2705, a COM port 2710, one or more sensors 2715, an apparatus for operating an air handling system 2720, an input/output (I/O) port 2725, and a power supply 2730. The processing unit 2705 can be used to supervise, monitor, and control operations according to programmed instructions and/or hardware configurations (e.g., analog, digital, PAL, and/or ASIC circuits). The sensors 2715 may include, but are not limited to, temperature, smoke, contaminant, vibration, position, and light intensity sensors. The I/O port 2725 can be used to receive and send signals to the sensors 2715 and/or actuators (e.g., motors, PUV lamp, etc.) in the PUV system 2600. In some embodiments, the control module 2700 may send and/or receive status and control information to or from a host computer or controller via the COM port 2710. The COM port 2710 may be serial or parallel, and may use packet or non-packet based communication protocols (e.g., RS-232, USB, Firewire) to receive and/or send signals to a master controller. An example of the apparatus for operating an air handling system 2720 was described with reference to FIG. 22. The elements in the control module 2700 can combine to operate the PUV system 2600 to sanitize objects in pharmaceutical applications.

With respect to the air handling system 2720 in the control module 2700, airflow may be used to cool the UV lamp 2605 and/or the PUV chamber. In some applications, the air handling system may also exhaust ozone that may be generated within the PUV chamber. The input air may be filtered to prevent particles from getting to the object 2630. The filtered air may also prevent particles from contacting the UV lamp 2605 itself thereby increasing bulb life and efficiency. Sensors may be used to monitor airflow and shutdown the system if inadequate airflow is detected. In some embodiments, the PUV system 2600 may be designed for application within the APAS cell 100 ISO class 5 clean air environment.

The system may further include an air handling system to ventilate the PUV chamber. The ventilation can be used to provide cooling air on the UV lamp 2605 to keep the bulb from overheating.

The power supply 2730 may provide voltage and/or current to drive the UV lamp 2605 during a pulse. For example, the power supply 2730 may store energy in a capacitor, inductor (including step-up and flyback transformers), or in a resonant (L-C) circuit, for example. In response to a trigger signal, the stored energy may be released to the flash lamp, such as a Xenon flash tube, for example. In some embodiments, the pulsed light output may include a spectrum of radiation, including energy at ultraviolet wavelengths. For example, the pulsed UV light may include energy content in the UV-A, UV-B, and UV-C ranges, and may include some energy content at wavelengths shorter and/or longer than UV wavelengths.

The pulsed UV light radiated during a particular pulse may be characterized by one or more waveforms that determine, at least in part, the amount of UV light exposure, or dose, an object may receive. Each waveform may have a range of intensities, durations, rise and fall times, and repetition interval between pulses. Accordingly, the control electronics that drive the flash element may determine the characteristic waveform based on drive (trigger) pulse characteristics, flash element conversion efficiency and dynamic impedance, applied voltage/current, and source impedance, and parasitic stray capacitance, resistance, and inductance. In some examples, the PUV waveform may be controllable by adjusting, for example, the amplitude of the applied voltage during a pulse. The amplitude (e.g., intensity) and or pulse repetition rate and number of repetitions may be programmed to a default, or user-configurable through a user interface (not shown) for the APAS.

In some implementations, a UV light sensor may be provided to measure the PUV light intensity to monitor the sufficiency of a light pulse. Sensors may be used to monitor the condition of the bulb and the intensity of the flash. The sensors may also be monitored to confirm that the appropriate light dose has been delivered. If, for example, the processing unit determines that a PUV waveform fails to meet an average minimum threshold over multiple pulses, then the processing unit may generate a fault signal over the COM port 2710.

A sensor (e.g., light beam, proximity, or contact) may be included in the PUV chamber to monitor the position or proximity of the object. The sensor may also be used to monitor the position or proximity of an item displaced by the presence of the object (e.g. switch) with respect to the bulb. This sensor may provide an interlock such that the bulb cannot be flashed if the object is not in the correct position.

Figure 28:
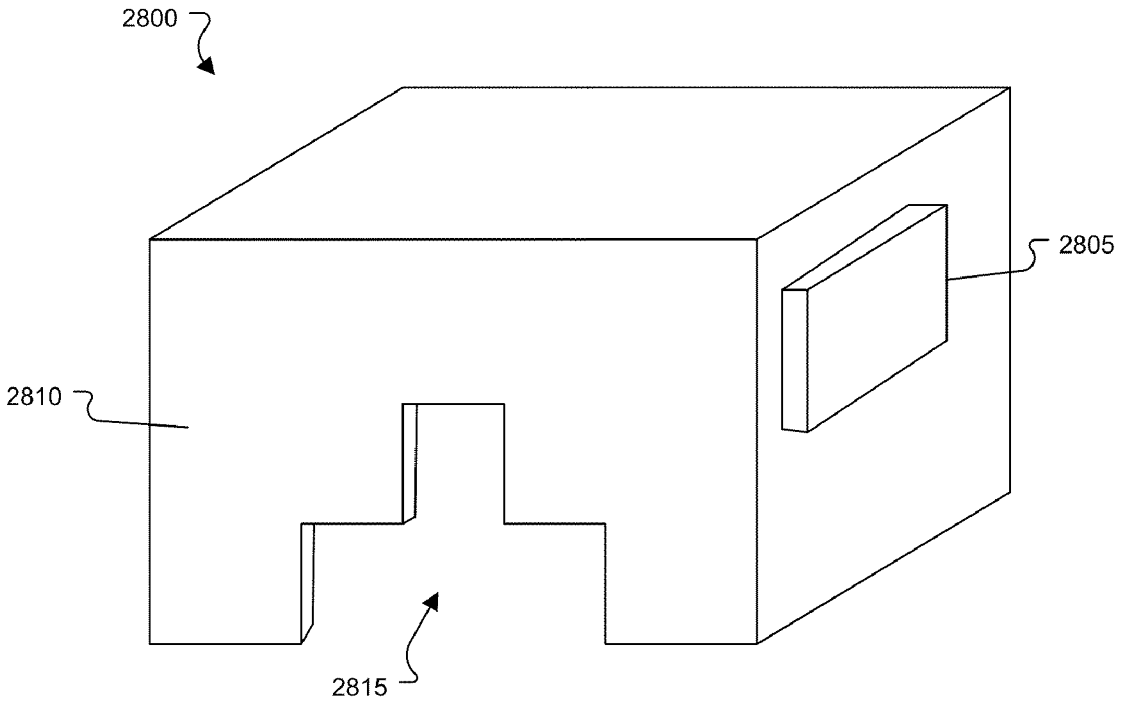
FIG. 28 shows a perspective view of an illustrative embodiment for a PUV housing.

FIG. 28 shows a perspective view of an illustrative embodiment for a PUV chamber housing 2800 for the systems of FIGS. 26A-26C and FIG. 27. A side 2805 of the housing 2800 includes an air handling assembly, which may contain filters and/or fans. A front 2810 of the housing 2800 has a tiered wide and narrow opening 2815. The wide opening can allow a robotic manipulator to insert wide objects, such as IV bags, near its base. The narrowed opening above the wide opening may accommodate the width of a manipulator that is used to position an object in a PUV chamber. For example, with reference to FIGS. 26A-26C, the manipulator 2635 may insert the object (e.g., vial, syringe, or IV bag) through the wide opening portion near the base of the housing 2800. The manipulator 2635 can then move vertically up toward the aperture in the baffles 2615 and/or the UV lamp 2505. When the object 2630 is positioned in the PUV chamber to receive a sanitizing exposure, some embodiments of the manipulator may further provide a partial or substantially complete light seal around at least a portion of the narrow and/or wide openings in the housing 2800.

In various embodiments, a manipulator may be adapted to provide a thin (e.g., pencil-like) extension apparatus (not shown) to extend the reach of the manipulator through a reduced width (e.g., narrower) slot in the narrow portion of the opening in the PUV chamber housing. Such extension apparatus, or the external portion of the manipulator itself, may be provided with baffling to provide either an internal or an external light seal around some or all of the openings in the PUV chamber housing. For example, a flexible rectangular baffling (e.g., plastic, rubber, or foam with reflective or absorptive coating) may be used to provide a substantial UV light seal over some or all of the narrow and/or wide openings in the PUV chamber housing when an object is positioned to receive pulsed UV radiation.

In some embodiments, the object to be disinfected may provide an effective light seal. The design of the baffles shown in FIGS. 26B-26C may be such that the object effectively seals the opening in the baffle when the object is brought into substantial contact with the baffle. Also, the baffle design may be compliant (e.g. flexible baffle material, spring mounted baffle assembly, or bellows) such that some tolerance in the positioning of the object against the baffle is afforded. The opening in the baffle may be sized to maximize the amount of PUV radiation on the targeted area to be disinfected.

Figure 29A:
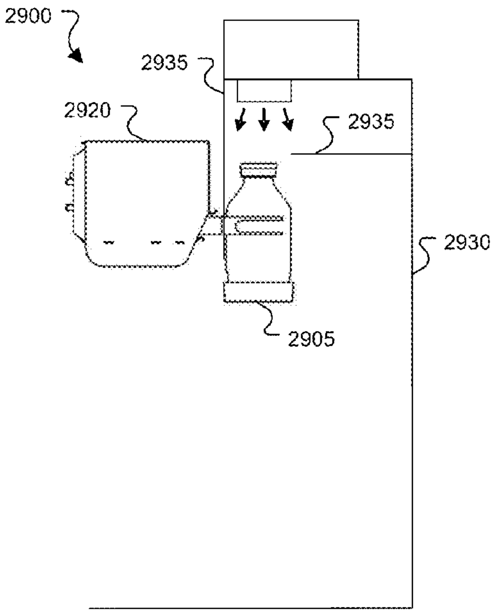
FIGS. 29A-29C show cross-sectional views of an illustrative PUV sanitizing system that accepts variously sized objects to be sanitized in an APAS cell.
Figure 29B:
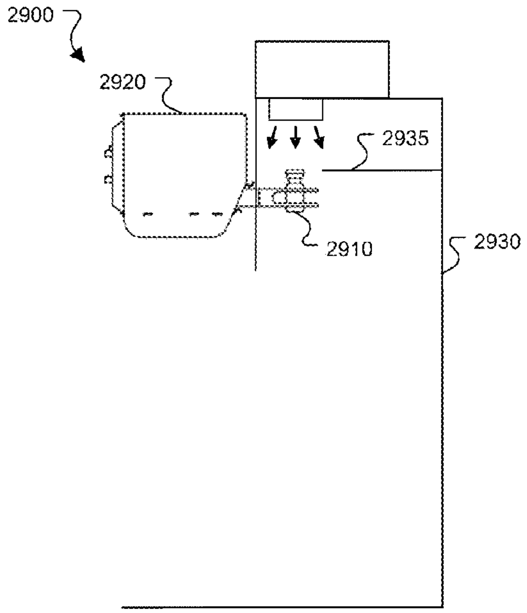
Figure 29C:
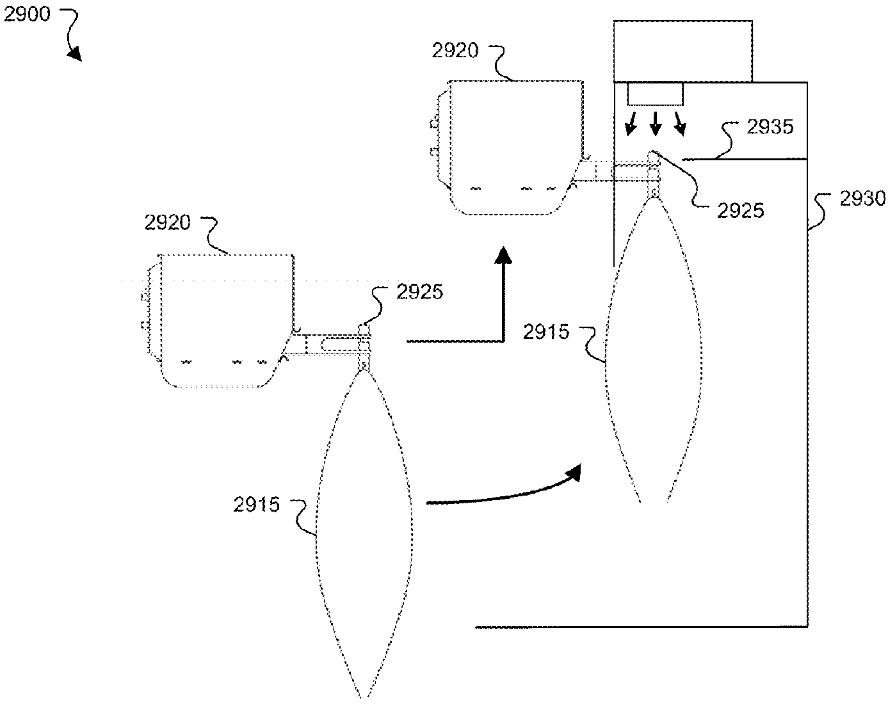

FIGS. 29A-29C show cross-sectional views of an illustrative PUV sanitizing system 2900 that accepts variously sized objects to be sanitized. In FIG. 29A, an object 2905 is a large vial, in FIG. 29B, an object 2910 is a small vial, and in FIG. 29C, an object 2915 is an IV bag. In each example, a manipulator 2920 may move along a trajectory suitable for positioning an object in a suitable location to be sanitized in the PUV chamber. In FIG. 29C, The IV bag 2915 in FIG. 29C, for example, may be flexed (e.g., if empty) to be positioned in the PUV chamber so that an IV bag port 2925 can be sanitized before making physical contact with a syringe.

Accordingly, the object to be sanitized need not provide a primary light seal. Chamber walls 2930, in combination with the manipulator 2920, may provide effective light containment. The chamber walls 2930 may include features such as baffles, reflective surfaces, and/or absorptive surfaces to further minimize escape of UV radiation from the PUV chamber.

Embodiments of the PUV chamber may be customized for the specific range of objects to be sanitized, taking into consideration object access requirements to the light source, object size, light containment, and distance of the object from the light source.

In some embodiments, the baffling may be automatically or manually reconfigurable to provide suitable illumination of the object. For example, the baffles may be on a rotatable carousel that can be repositioned (e.g., by a motor), to position the most effective baffle to illuminate the size, type, and/or shape of the object.

A PUV system may use system information available to an APAS controller, for example, to optimize the PUV sanitizing process. For example, the APAS cell 100 may contain the control module 2700, as shown in reference to FIG. 27, to control its operations that may transfer control information (e.g., indicative of the next object to be sanitized) to the PUV system 2600 via the COM port 2710. Such control information may include optimal waveform, amplitude, pulse repetition number and rate, object size, type, and/or shape-related information. The controller in the PUV system 2600 may respond by configuring the power supply 2730 and trigger controls to generate a sanitizing profile tailored to sanitize the next object. Such optimization promotes effective sanitizing without generating unnecessary heat, consuming unnecessary energy, prematurely aging the flash element, or introducing unnecessary delay in the PUV sanitizing process. In some embodiments, the robotic arm 318 may be unable to perform other tasks during the PUV sanitizing process. In other embodiments, the robotic arm 318 may release the object, perform one or more other actions, and return to grasp and convey the object after sanitization is complete.

Figure 30A:
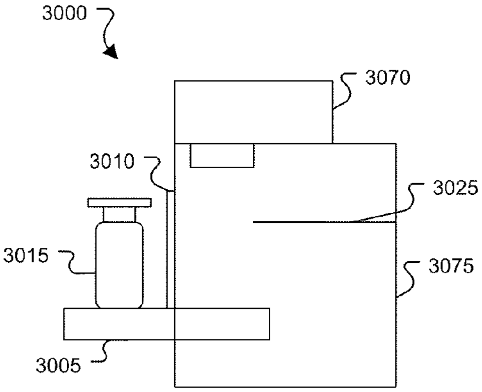
FIGS. 30A-30F show cross-sectional views of an illustrative PUV sanitizing system in an APAS cell.
Figure 30B:
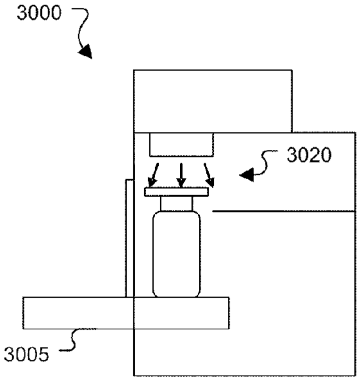
Figure 30C:
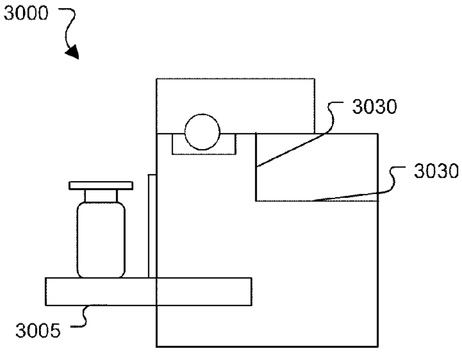
Figure 30D:
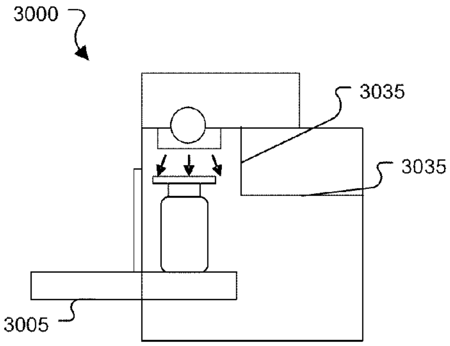
Figure 30E:
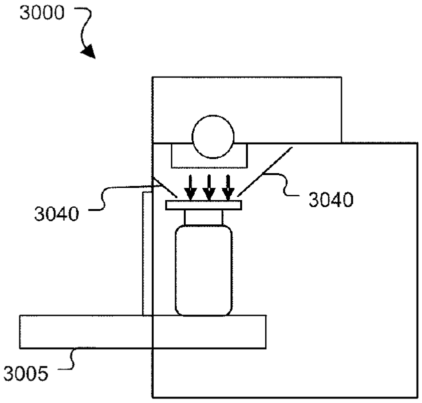

FIGS. 30A-30F show cross-sectional views of an illustrative PUV sanitizing system 3000 in the APAS cell 100 of FIG. 1. The system 3000 can use a rotating platen 3005 with a perpendicular vertical wall 3010, as shown in FIG. 30A, to position an object 3015 to be sanitized. Except for differences as noted or where not applicable, the discussion above regarding embodiments of the PUV system 2600 are generally applicable to embodiments of the PUV system 3000. For example, the PUV system 2600 may operate using a control module, an example of which is described above with reference to FIG. 27.

In FIG. 30A, the object 3015 to be sanitized is loaded on the platen 3005 external to the PUV chamber. The platen 3005 is rotated using an appropriate drive mechanism, (e.g., stepper motor, servo motor, mechanical linkage coupled to a solenoid) to position the object 3015 inside the PUV chamber where it can be exposed to the UV radiation 3020. The vertical wall 3010 serves as a baffle to substantially provide a light seal for the chamber that may keep most of the UV radiation 3020 from escaping. In some embodiments, sensors (e.g., encoder on platen shaft, index mark using hall effect sensor, opto-interrupter, etc.) may be used to detect when the platen 3005 is in position for loading or pulsing, or when the walls 3010 are in a sealing position. While positioned in the chamber, the object 3015 may receive a dose of PUV radiation, as has been described. The platen 3005 then rotates to position the object 3015 (portions of which may be substantially sanitized) outside of the PUV chamber, where it may be retrieved for further processing.

The PUV system 3000 may be adapted for integration into an APAS cell 100, or configured for stand-alone (e.g., tabletop) operation for use in a hospital pharmacy or similar environment. In the hospital pharmacy type of environment, pharmacy staff may prepare prescriptions by loading one or more objects to be sanitized on the platen 3005, perform the sanitizing, and retrieve the sanitized object for further processing after the platen 3005 rotates the object out of the chamber.

In some embodiments, the wall 3010 may further include multiple compartments (e.g., three, four, five, six, seven, eight or more) on the platen 3005. The walls may be uniformly distributed such that when any of the compartments is exposed to the UV radiation 3020, a portion of the wall 3010 is positioned to form a light seal.

In other embodiments, the platen 3005 may be a circular or non-circular track. It may advance substantially continuously, or in segments according to chambers. In some embodiments, the platen 3005 may advance in response to a user command, such as from a keypad or “start” button. In other embodiments, the platen 3005 may advance upon detecting the weight of one or more objects to be processed.

Similar to the discussion with reference to FIGS. 26A-26C, the PUV system 3000 may be configured to include other arrangements of a baffle 3025. Examples of this can be shown by baffle 3030 in FIG. 30C, baffle 3035 in FIG. 30D, and baffle 3040 in FIG. 30E.

Figure 30F:
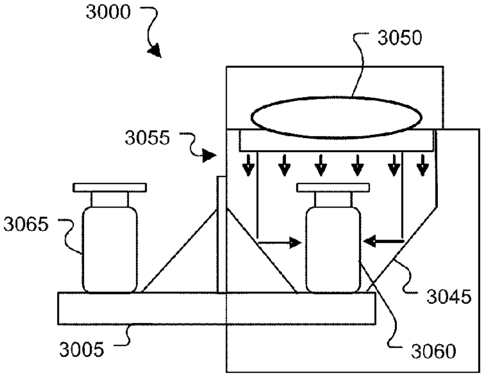

Other modifications may be made to the PUV system 3000. For example, an illustrative embodiment of the PUV system 3000 that includes a larger (or distributed) lamp system 3050 in combination with another illustrative embodiment of the baffle 3045 is shown in FIG. 30F. In this example, the UV radiation 3055 can be distributed over a broader area. The baffling 3045 and reflective surface on the platen 3005 can provide a broadly distributed UV radiation pattern over top and side surfaces of an object 3060. Moreover, the platen 3005 is carrying two objects 3060 and 3065. The object 3060 can be in the PUV chamber, and the object 3065 can be external to the PUV chamber. This multi-object carrying capability of the PUV system 3000 can promote efficient handling, for example, in a hospital pharmacy environment in which PUV sanitizing processing time may affect productivity and throughput.

In another embodiment, the platen 3005 may be adapted to receive a tray of objects that are to be sanitized. For example, a tray of two or more vials to be sanitized may be placed on portion of the platen 3005 that is external to the PUV chamber. The trays may include carrying handles for convenient placement and/or stacking of vials. Such trays may be prepared in advance, and can later be efficiently batch processed, thereby saving time and labor for processing pharmaceutical admixtures.

To aid in aseptic processing, the entire PUV system 3000 may be designed for use within an ISO class 5 clean air environment. Such an environment may be present, for example, within a containment cabinet in an APAS cell, or present in a hospital pharmacy laminar airflow hood. An air cooling system may be used, if needed, to dissipate the heat in the lamp housing 3070 or chamber 3075.

In addition to the above-described examples, sanitizing systems may be implemented using systems, methods, or computer program products other than the examples described above.

In various embodiments, a PUV system may communicate using suitable communication methods, equipment, and techniques. For example, the PUV control module may communicate with the APAS control unit and/or a hospital pharmacy network using point-to-point communication in which a message is transported directly from the source to the receiver over a dedicated physical link (e.g., fiber optic link, point-to-point wiring, daisy-chain). Other embodiments may transport messages by broadcasting to all or substantially all devices that are coupled together by a communication network, for example.

In some embodiments, each PUV system may be programmed with the same information and be initialized with substantially identical information stored in non-volatile memory. In other embodiments, one or more PUV systems may be custom configured to perform specific functions. For example, one PUV system may be configured to perform both custom and batch processing functions by responding to information about the objects to be sanitized.

In one aspect, an automated sanitizing system for a pharmacy environment for killing or incapacitating biocontaminants may present one or more objects to be sanitized. The system can include a chamber with a pulsed ultraviolet source. The system further can include an automated transport mechanism to place an object to be sanitized into the chamber for exposure to pulsed ultraviolet radiation from the pulsed ultraviolet source.

In various embodiments, the automated transport mechanism may further be to remove the object from the chamber after exposure to the pulsed ultraviolet radiation. The automated transport mechanism may include a robotic manipulator and/or a rotating platen. The automated transport mechanism may manipulate or move the object in response to a sequence of commands automatically generated by a processor executing a program of instructions.

Walls may substantially enclose the chamber, at least one wall having an opening for receiving the object and a portion of the transport mechanism. In some embodiments, the automated transport mechanism may provide at least a partial light seal around at least a portion of the opening.

The pulsed ultraviolet source may provide a pulse of ultraviolet radiation in response to a trigger signal. The controller may generate one or more pulses of a controlled waveform. The waveform may be controlled to provide a desired amplitude, shape, and/or intensity. The controller may generate a plurality of controlled pulses according to a selected sanitizing routine. The selected sanitizing routine may correspond to characteristics, such as type, size, or manufacturer, of the object to be sanitized. The controller may receive messages over a communication link, and the messages may contain information about the characteristics of the object to be sanitized.

The object to be sanitized may include a portion of a vial, an IV bag, or a syringe. The biocontaminants to be killed or incapacitated may include one or more viruses, bacteria, and/or fungi. The ultraviolet radiation may include UV-A, UV-B, and/or UV-C wavelengths.

Some systems may be stand-alone or table top systems; other systems may be adapted for integration into an APAS.

In another aspect, a method of sanitizing at least one object surface may include generating a motion trajectory command to cause a transport mechanism to place an object within a chamber. The method may also include exposing at least a portion of the object to a dose of pulsed ultraviolet radiation.

In some embodiments, the dose of pulsed ultraviolet radiation may include one or more pulses. The method may further include identifying a number of pulses of ultraviolet radiation that is sufficient to kill or incapacitate one or more types of biocontaminants to a selected degree. The selected degree may be substantially all biocontaminants, such as at least 99.99%, 99%, 95%, 90%, 80%, 75%, 70%, 60%, or at least about 50%. In some embodiments, between 1 and 100% of a particular biocontaminant may be killed or substantially incapacitated by the dose of pulsed ultraviolet radiation.

An air handling system for a pharmaceutical compounding area may provide an aseptic environment for drug processing. The air handling system for the pharmaceutical compounding area may also provide exposure protection for system operators. Air supplied to the pharmaceutical compounding area can be filtered with a high efficiency particle air (HEPA) filter or an ultra low penetration air (ULPA) filter to ensure that the particulate levels comply with federal and state regulations. Exhaust air drawn from the pharmaceutical compounding area may be filtered to reduce contaminant levels. The exhaust air drawn from the pharmaceutical compounding area may either be exhausted from the building, or may be partly or fully recirculated into the pharmaceutical compounding area. Drugs with benign exposure effects, such as antibiotics, can be processed in a positive pressure area in the APAS cell, where the positive pressure is with respect to the ambient pressure outside of the APAS cell. The positive pressure area can allow remixing of some or all of the air from the pharmaceutical compounding area back into the general pharmacy area within which the pharmaceutical compounding area is located. Cytotoxic drugs may be compounded in aseptic areas that operate in a negative pressure zone in the APAS cell, where the negative pressure is with respect to the ambient pressure outside of the APAS cell. The negative pressure zone can allow the external venting of all of the exhaust air.

Figure 31A:
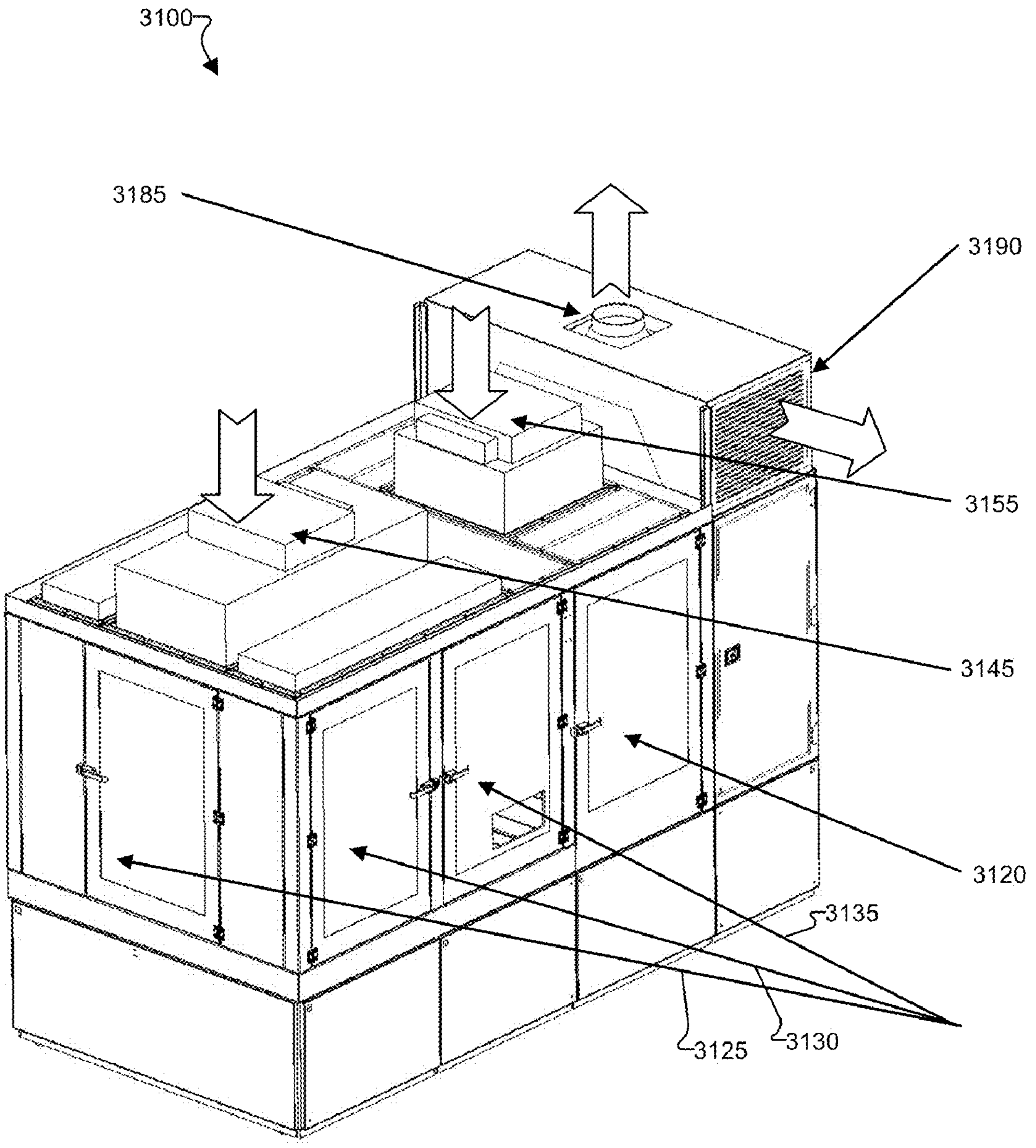
FIGS. 31A-31B are perspective cut-away views showing details of portions of an air handling system in an APAS cell.
Figure 31B:
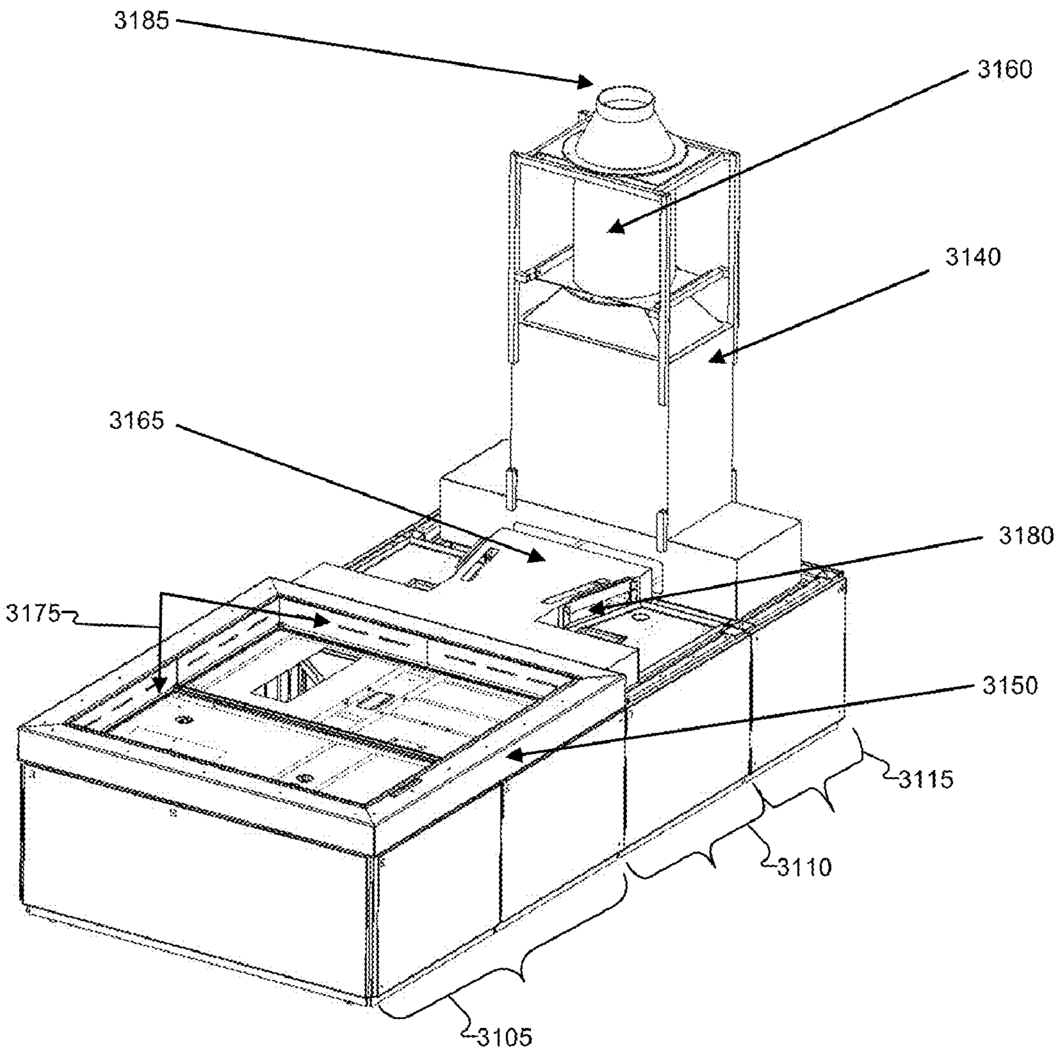

FIGS. 31A-31B are perspective cut-away views showing illustrative details of portions of an air handling system in an APAS cell. The APAS cell 3100 can be designed for compounding of both antibiotic (e.g., positive pressure) and cytotoxic (e.g., negative pressure) drugs with minimal changes to its setup or the operation. The APAS cell 3100 can be divided into compounding area sections that include the compounding area section 3105 and an inventory supply area 3110. The APAS cell 3100 can also include an exhaust area section 3115. The inventory supply area 3110 can include a carousel area with a carousel loading door 3120. A chamber in the inventory supply area 3110 may be maintained at a positive pressure with respect to the ambient environment. The chamber in the area 3110 may also be maintained at a negative pressure with respect to ambient, but at the same or a more positive pressure with respect to a pressure in a chamber in the compounding area.

In various modes, one or more controllers may regulate pressure in the compounding area chamber and/or the storage area chamber, either independently, relative to each other, and/or relative to ambient atmospheric pressure. Such regulation may be advantageous substantially prevent exposure of the ambient environment to compounding-area air during the loading of the inventory supply area 3110. The positive pressure of the inventory supply area 3110 can also help maintain cell cleanliness. Inventory carousels, described with reference to FIG. 3 and FIG. 4, in the inventory supply area 3110 can operate as a type of revolving door pass-through, preventing uncontrolled air transfer between the inventory supply area 3110 and the ambient environment. This can occur during the loading of the APAS cell 3100. The inventory carousels in the inventory supply area 3110 can also prevent uncontrolled air transfer between the inventory supply area 3110 area and the compounding area 3105 during inventory access.

In some embodiments, the air handling systems may monitor, record and/or regulate temperature, humidity, and/or composition. Temperature control may be performed in one or more zones within either or both compounding and storage chambers. For example, temperature control may be implemented by forced air heating or cooling, radiant heating (e.g., electric heat), fluid-filled heat exchangers, and the like. In some embodiments, composition of gas in the chamber may be controlled, for example, by selectively introducing one or more gasses (e.g., nitrogen) to catalyze reactions, neutralize toxic byproducts, and/or clean or otherwise sanitize the environment in a chamber. In some embodiments, visible (e.g., colored) gasses may be introduced to assess laminar flow, detect seal integrity, etc. . . . within the respective chambers. In some embodiments, desiccants and/or adsorbents may be used to control the environment in the chamber.

The compounding area 3105 can be a negative pressure area relative to the ambient environment. Hazardous aerosolized drugs or fumes may be contained within the compounding area 3105. They can be exhausted out of the compounding area 3105, as in examples described elsewhere herein. The compounding area 3105 may be sealed to the surrounding ambient environment during compounding. The APAS cell's cleanliness level can be continuously monitored during compounding. Completed product from the APAS cell can be output to the ambient environment by way of pass-through output doors. The pass-through output doors can be used to minimize air transfer to the ambient environment. The compounding area 3105 can be opened to the ambient environment by way of compounding area doors 3125, 3130, and 3135. This can be done as needed or based on a predetermined schedule, for restocking, maintenance, and routine cleaning. This may include a routine wipe down and cleaning of the interior of the compounding area 3105, removal and replacement of drip mats, syringe cap restocking, and needle sharps container removal and replacement.

The APAS cell 3100 can include a HEPA filter housed in a HEPA filter unit 3140 that filters exhaust air from the APAS cell 3100. The HEPA filter can hold contaminant particulates contained in the exhaust air preventing them from being released into the ambient environment. The APAS cell's exhaust system can include multiple operating modes. One operating mode can involve a complete external venting of the APAS cell's exhaust air. This operating mode may be used for some processes, such as certain cytotoxic drug processes, and can be optional for some other medicament processing. A second operating mode can involve a partial or complete recirculation of filtered exhaust air to the ambient environment. This operating mode can be used in medicament processing, for example antibiotic processing, that does not involve cytotoxic drugs.

The compounding area 3105 can include a sealed enclosure (e.g., chamber) that is supplied with clean ULPA-filtered air from a Fan Filter Unit (FFU) 3145 mounted to the top of the APAS cell 3100 in a location above the compounding area 3105. The air flow through the volume of the compounding area 3105 can be a substantially vertical laminar flow from the top of the compounding area 3105 in the APAS cell 3100 to the bottom of the compounding area 3105 in the APAS cell 3100. Exhaust air may be drawn into a duct 3150 that surrounds the lower periphery of the compounding area 3105. A second independent FFU 3155 can supply clean air for the inventory supply area 3110, which also has exhaust intake in the bottom. A single fan unit 3160 can draw exhaust air from both the compounding area 3105 and the inventory supply area 3110. The layout of the ducting and air flow into the fan unit 3160 is shown in FIG. 31A and FIG. 31B. The airflow into the ducts 3150 and 3165 can be controllably restricted (e.g., with adjustable vanes, flappers, slats, or other flow restriction elements) to force the ducts to be at a lower pressure than either the compounding area 3105 or the inventory supply area 3110. The restriction may be implemented by sizing the inlet slots 3175 in the peripheral duct 3150 of the compounding area 3105 small enough to restrict the total amount of air that can be pulled into the duct with the pressure differential developed by the exhaust fan 3160. Pressure management in the inventory supply area 3110 may be managed in a similar fashion by the use of inlet slots 3180.

One or more techniques may be used to deal with the exhaust air as it leaves the APAS cell 3100. In embodiments that are used for processing some drugs, such as certain cytotoxic drugs, and where desired by the user for antibiotic cells, substantially all of the air may be discharged from the building by connecting the exhaust fan discharge pipe 3185 to a duct leading to the building exterior (not shown), and air recirculation grills 3190 and associated plumbing may not be required.

In some embodiments, such as for some antibiotic processing, for example, substantially all of the air that is exhausted from the cell can be reintroduced to the ambient local area around the cell. The air may be exhausted from air recirculation grills 3190 on both sides of the APAS cell 3100 near the exhaust fan 3160 and the external discharge pipe 3185 connection may not be required.

For antibiotic processing cells, for example, some fraction of the exhaust air may be discharged to the building exterior and the remainder of the air may be recirculated in the ambient local area. In this instance, both the air recirculation grills 3190 and the external discharge pipe 3185 may be used. Some of the flow may be go into the recirculation duct to grills 3190 and the remainder may exhaust externally via the external discharge pipe 3185. An air flow control element (not shown) can be placed in the external discharge pipe 3185 to regulate flow balance as conditions in the downstream ducts fluctuate due to external factors.

Some embodiments may include a number of areas in or linked to the compounding area 3105 where additional air draw may be included to assist in managing the cell environment. As described elsewhere herein, such areas can include, but are not limited to, a waste bin area below the compounding area 3105 where waste consumables are deposited by the robot. Some embodiments may also provide air flow from a printer housing in which one or more printers can be housed. Some further embodiments include air flow local to one or more of the multiple syringe manipulators. Some further embodiments provide an air extraction system that serves to cool an ultraviolet (UV) lamp in a port sanitization system, an example of which is described with reference to FIGS. 26A-30F, within the compounding area 3105.

Air flow in each of the aforementioned areas may be provided through ducts that are in fluid communication with, for example, the peripheral duct 3150. As such, low pressure zones may be provided in one or more of the aforementioned areas in and around the compounding area 3105.

In some embodiments, the waste bin area may be connected to the low pressure peripheral duct 3150 in the compounding area 3105 to create a localized air flow into the waste bin area from the compounding area 3105. Any airborne drug residue from waste materials (e.g., emptied vials, used syringes, and/or emptied bags) can be then drawn out of the waste bin area directly and is substantially prevented from migrating back into the compounding area.

The printer housing and the syringe manipulator enclosures can be potential sources of particulate due to the concentration of mechanisms and the types of activities occurring in all these areas. Directly drawing air from these areas can pull particulate into the peripheral duct 3150 to be exhausted, rather than allowing migration into the compounding area 3105.

In some embodiments, the UV lamp in the port sanitization system may be cooled and/or cleaned by a flow of clean air. Such air flow may cool and/or substantially reduce particulate or organic solvents from depositing on the lamp surfaces. Connecting it to the low-pressure peripheral duct 3150 can force the air to be drawn into the UV lamp housing from just below the FFU outlet (where it is cleanest) and to flow over the UV lamp to provide cooling. In some embodiments, such cooling may be performed without additional air moving elements that may generate air currents that may disrupting laminar flows in the compounding area.

Figure 32:
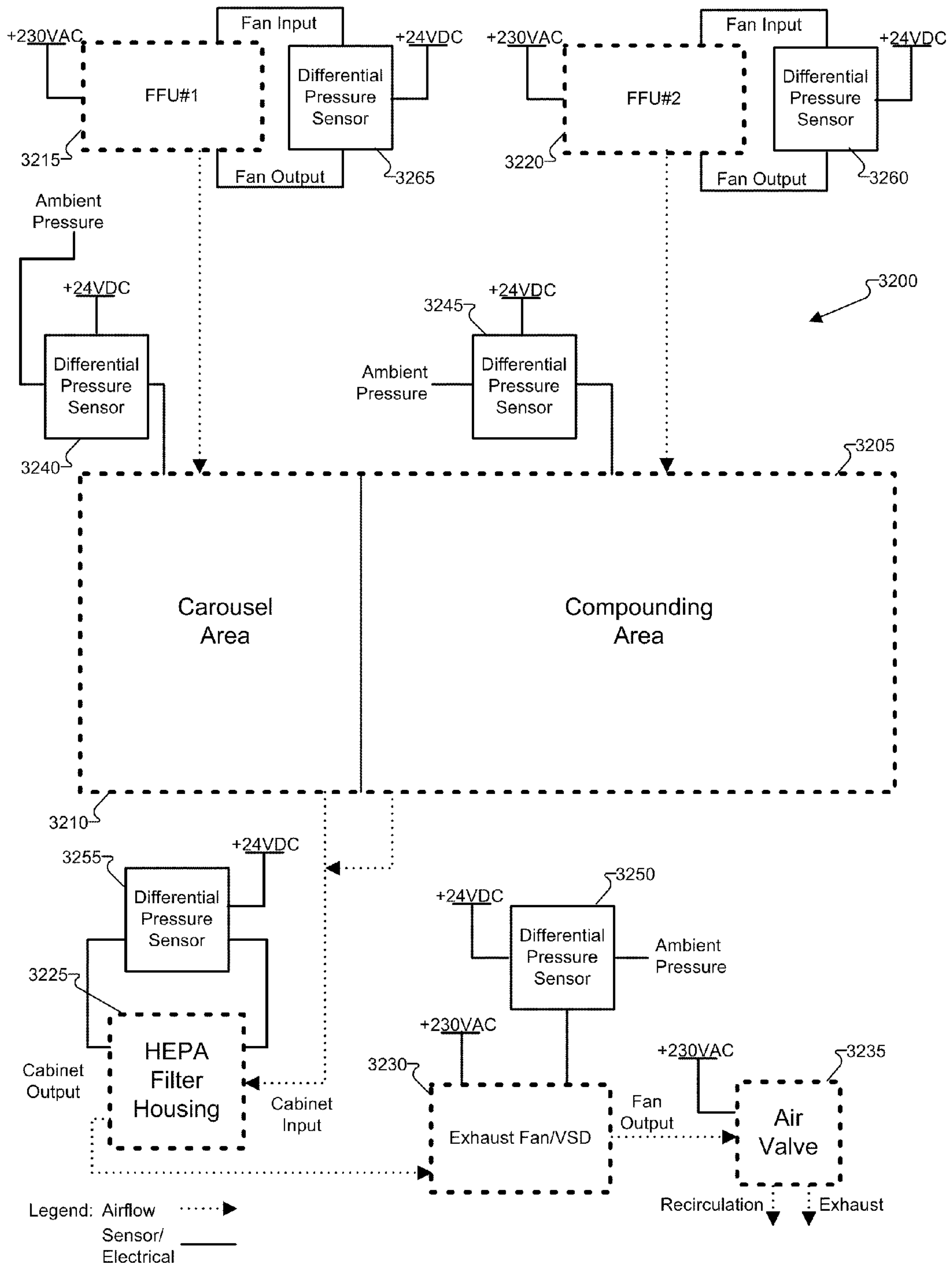
FIG. 32 is an illustrative block diagram of an APAS Cell Air Handling Control system in an APAS cell.

FIG. 32 is an illustrative block diagram of an APAS Cell Air Handling Control system 3200 in an APAS cell. The APAS Cell Air Handling Control system 3200 includes a compounding area 3205, carousel area 3210, a Fan Filter Unit (FFU) #1 3215, a FFU#2 3220, a HEPA filter housing 3225, a combined variable speed drive (VSD) exhaust fan 3230 and an air valve 3235. A cell controller (not shown) can manage the control of air pressure levels in the compounding area 3205 and the carousel area 3110, which was previously referred to as the inventory supply area, relative to the ambient pressure. Air pressure levels can be controlled by the APAS Cell Air Handling Control system 3200 in order to maintain preset pressure levels.

Air pressure levels in the compounding area 3205 can be controlled based upon input from a differential pressure sensor 3245. Air pressure in the compounding area 3205 may also be controlled by varying the speed of FFU#2 3220 based upon input from differential pressure sensor 3260.

Air pressure levels in the carousel area 3210 can be controlled based upon input from a differential pressure sensor 3240. Air pressure in the carousel area 3210 may also be controlled by varying the speed of FFU#1 3215 based upon input from differential pressure sensor 3265.

Air pressure levels in the compounding area 3205 and the carousel area 3210 can also be controlled by varying the speed of the exhaust fan/VSD 3230 based upon inputs from differential pressure 3250 and differential pressure sensor 3255, which monitors the air pressure level within the HEPA filter housing 3225.

Although pressure based control of the air pressure levels in the carousel area 3210 and compounding area 3205 are discussed, alternate methods may also be used. The methods may include but are not limited to air mass flow rate, velocity measurements, or air particle counter measurements. The methods may also be used to control pressure either singularly or in various combinations.

The differential pressure measurements may be used as a diagnostic to ensure that the fans, FFU#1 3215 and FFU#2 3220, are operating properly. Differential pressure can also be measured on the HEPA filter in the HEPA filter housing 3225 by differential pressure sensor 3255. The measurement of the differential pressure on the HEPA filters may be performed to monitor HEPA filter loading. In some embodiments, various filters, including one or more biofilters, may be included into the air handling systems for the compounding chamber, storage chamber, and/or a clean tent, an example of which is described with reference to FIG. 40.

Any time an operator opens the compounding area doors 3125, 3130 and 3135, some or all compounding operations may be suspended. In some cases, any items with exposed critical surfaces that are in process may be discarded or re-sanitized (e.g., with pulsed ultraviolet light). Processing in the compounding area 3105 may be resumed after the APAS cell measures an air cleanliness level at an ISO Class 5. For example, the operation may be resumed after determining that pressure levels are within control limits and/or particle counts are below predetermined thresholds. The compounding area doors 3125, 3130 and 3135 may generally be kept closed except for servicing/cleaning before and after each batch of processing. In some examples, APAS cell access doors may have magnetically controlled locks (or other interlock or access control devices) to prevent access in some modes to other than an authorized user.

In some embodiments, a particle counter may be used to monitor levels of contaminant particulates in the compounding cell. The particle counter may include a sensor (e.g., laser beam) that senses when a particle passes through it. When the particle passes through it, it can then increment a particle count. For example, a particle counter may be a Model CI-3000, commercially available from Climet Instruments Company of California. In some embodiments, particles may be counted if they meet or exceed a particulate size threshold. In one example, the particle counter may include two channels, one to measure particles up to about 0.5 micrometers (um), and another to measure particles sizes between about 0.5 um and about 5 um. To satisfy Class 100 cleanroom criteria, the particle count may be maintained at or below one hundred 0.5 um (or greater) particles in a cubic foot of air. Other channels, counters, or detectors may monitor for other types or sizes of contaminants (e.g., smoke). The particle count may be stored for each drug order, for example, in a database in the APAS.

Figure 33:
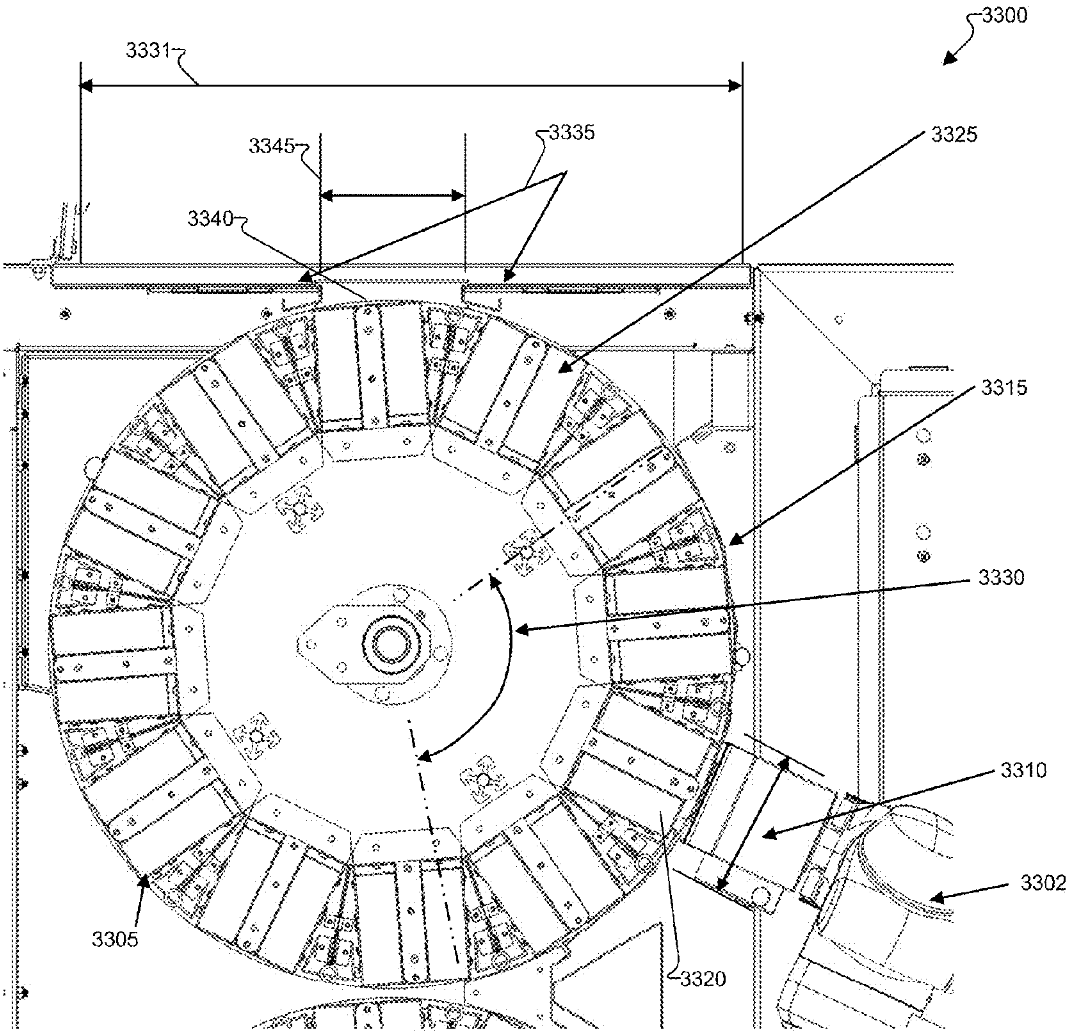
FIG. 33 is an illustrative cut-away view showing details of a carousel area in an APAS cell.

FIG. 33 is an illustrative cut-away view showing details of a carousel area in an APAS cell. A carousel 3300 is shown with a top plate 3305 removed. APAS cell inventory access can involve a pass-through door with a robot access port 3310 accessible with a robotic arm 3302 from the inventory supply area 3110 into the compounding area 3105. A carousel 3300 can be placed in a robot access position where the curved wall panel 3315 allows a portion of the carousel rack 3320 to be presented to the robot access port 3310. This can be managed with minimal air exchange as the door panels always substantially block the door aperture. This may be implemented in the APAS cell 100 by creating compartments around the carousel exterior. One compartment can be created for each of the twelve inventory racks, examples of which are carousel racks 3325 and 3320, per carousel. Other embodiments may include different numbers of racks, such as 2, 3, 4, 5, 6, 8, 10, 14, 16, or more, for example.

Figure 34:
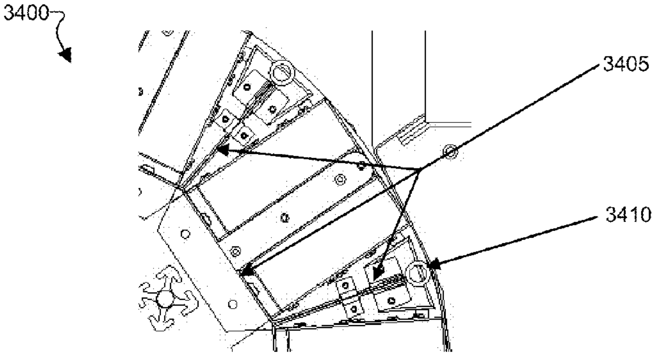
FIG. 34 is an illustrative view showing details of a carousel trim panel in an APAS cell.

FIG. 34 is an illustrative view showing details of a carousel trim panel in an APAS cell. A compartment may be formed from a three-faceted sheet metal trim panel 3405 that spans the distance from the lower to the upper circular disks that attach to the carousel shaft. The trim panel 3405 can isolate the volume occupied by each rack from the interior of the carousel and the adjacent racks. The two vertical edges of the trim panels can be fitted with an adjustable seal 3410 with a compliant edge lip. The compliant edge can substantially avoid hard pinch points between the trim panel 3405 and adjacent wall panel for operator safety, while the adjustment can allow for the adjustable seal 3410 to be positioned coincident with the outer diameter of the carousel disks.

The APAS cell inventory supply area 3110 may be maintained at a positive pressure relative to either or both the external environment as well as the compounding area 3105. It can be pressurized with ULPA or HEPA-filtered air that can be fed in from the FFU 3155 of the inventory supply area 3110 with exit vents at the floor level to allow laminar flow scrubbing of the incoming product by air passing down through the volume.

The curved wall panel 3315 that separates the carousel 3300 from the compounding area 3105 may include a curved segment for each carousel that closely conforms to the outer diameter of the carousel from the top plate to the bottom plate 3330. In a preferred embodiment, the curved wall panel 3315 may not interfere with the carousel outer features as a rubbing contact may generate undesired particulate with some materials. Therefore, a gap on the order of about one millimeter can be maintained between the curved wall panel 3315 and the swept volume of the carousel to substantially avoid a rubbing contact. The robot access port 3310 may be positioned in the curved wall panel 3315 such that as the carousel rotates, there can always be at least one of the vertical trim panel edge seals 3410 engaging the curved wall panel 3315 on either side of the door aperture. The top and bottom carousel plates may serve to restrict any air paths to the top or bottom of the door aperture. These measures can substantially prevent unrestricted air flow from the carousel volume into the compounding area 3105 during carousel rotations or while it is positioned for robot access. However, there can be a minimal amount of air bleeding past the carousel around the door openings from the inventory supply area 3110 to the compounding area 3105. Since the inventory supply area 3110 can be pressurized with clean, HEPA-filtered air, there may be substantially little opportunity to introduce contaminants into the compounding area 3105. With the compounding area 3105 at a lower pressure than the inventory supply area 3110 volume, potentially hazardous materials can be substantially restricted from migrating from the compounding area 3105 into the inventory supply area 3110 and/or the ambient external environment.

A carousel loading door access 3331, through which racks are installed and removed, may be shrouded with a wall panel 3335 that may expose the rack compartment 3340 that is being filled at any given time when the loading door is opened. This can be done by rack loading access 3345. The rack loading access 3345 may have the same minimal gaps between the wall panel 3335 and the outer diameter of the carousel upper and lower plates and trim panel edges. This configuration can allow for a limited flow of clean air from the pressurized inventory supply area 3110 volume to bleed out past the carousel while the loading door is opened, but the pressurization substantially prevents any external contaminants from entering the inventory supply area 3110 volume from the external environment. The controller for a servo-motor driven carousel, for example, can prevent rotation of the carousel while the exterior loading door is opened as an operator safety measure. The carousel and wall panel may be substantially sealed while the carousel is in the loading position.

Figure 35A:
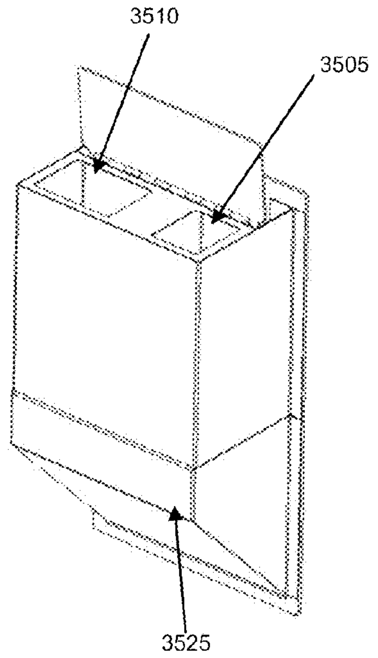
FIGS. 35A-35C show views of a product output chute in an APAS cell.
Figure 35B:
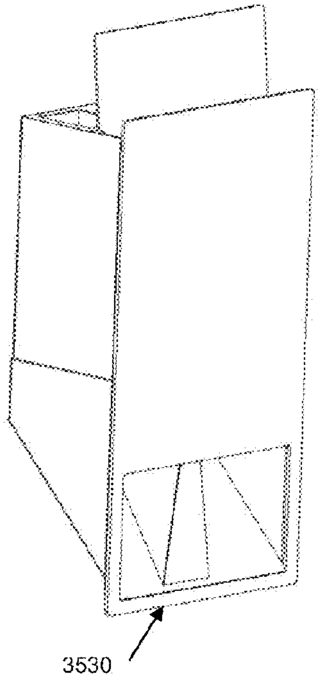
Figure 35C:
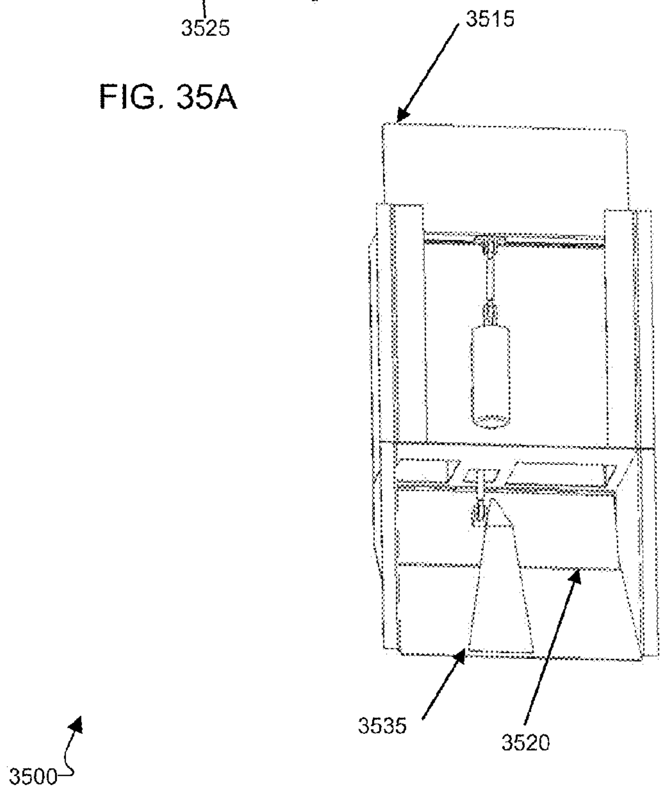

FIGS. 35A-35C show views of a product output chute 3500 in an APAS cell. Products leaving the APAS cell 100 can be placed in the product output chute 3500. The product output chute 3500 includes two product passages, which may also be referred to as chutes 3505 and 3510, an interior door 3515, an exterior door 3520, an interior face 3525, an exterior face 3530 and a product divider 3535. The product output chutes 3505 and 3510 and the product divider 3535 can allow for segregation of the products (e.g., syringes, IV bags) leaving the cell. The chutes 3505 and 3510 may include vertical product passages that are closed off at the ends with solenoid-actuated doors. There can be an interior door 3515 that covers both product passages and an exterior door 3520 that also closes off both product passages.

Figures 36A, 36B:
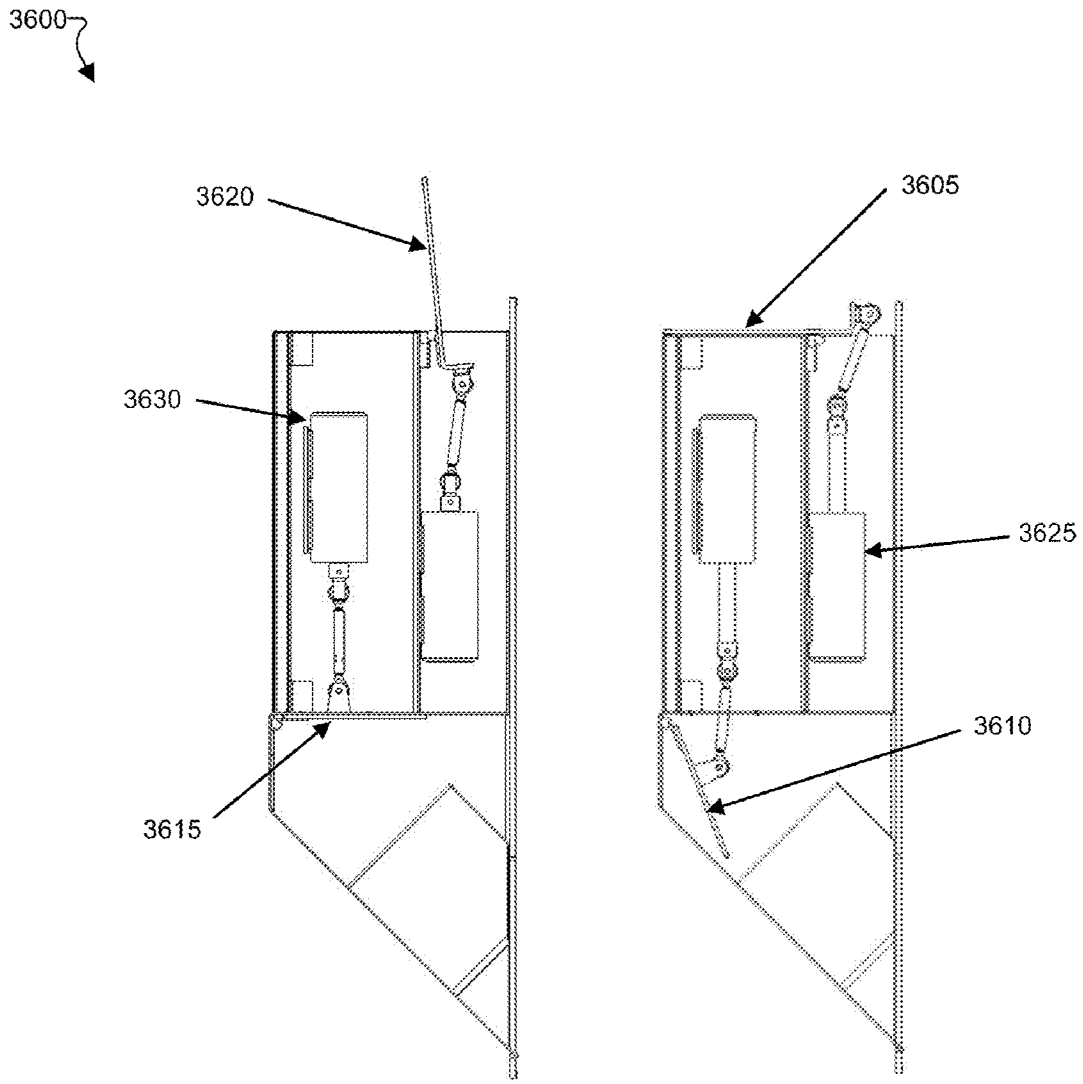
FIGS. 36A-36B show views of a product output chute AF00 in the course of releasing a product from an APAS cell.

FIGS. 36A-36B show views of a product output chute 3500 in the course of releasing a product from the APAS cell 100 of FIG. 1. The interior door 3515 on the product output chute can be normally closed 3605 while the exterior door 3520 can be normally open 3610. When product is ready to be sent out of the APAS cell, the exterior door can be closed 3615, the interior door can then be opened 3620 and the product can be placed through the interior door opening into one of the vertical product passages or chutes. The product can then be released by the robot. From there the product can be dropped. Once dropped, the product can come to rest on the closed exterior door 3615. The interior door can then be closed 3605 and a few seconds later, the exterior door can be opened 3610 and gravity can assist the product in exiting the pass-through. The exterior door can remain open 3610 until the next product is ready to be dispatched. The opening and closing of the interior door can be controlled by solenoid 3625. The opening and closing of the exterior door can be controlled by solenoid 3630. In another embodiment, each vertical product passage may have a separately controllable interior door, exterior door, or both.

Figure 37A:
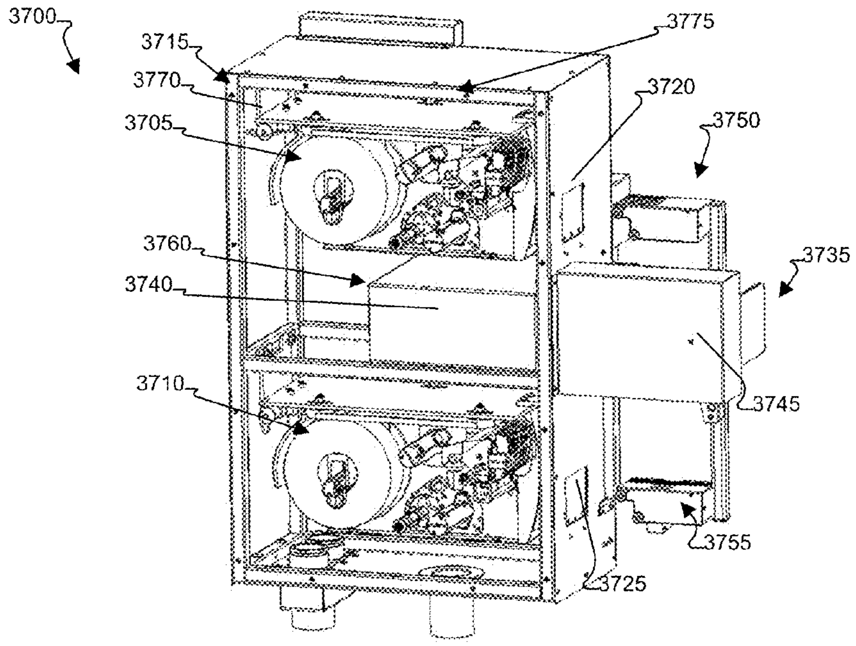
FIGS. 37A-37B show an illustrative printer system for an APAS cell.
Figure 37B:
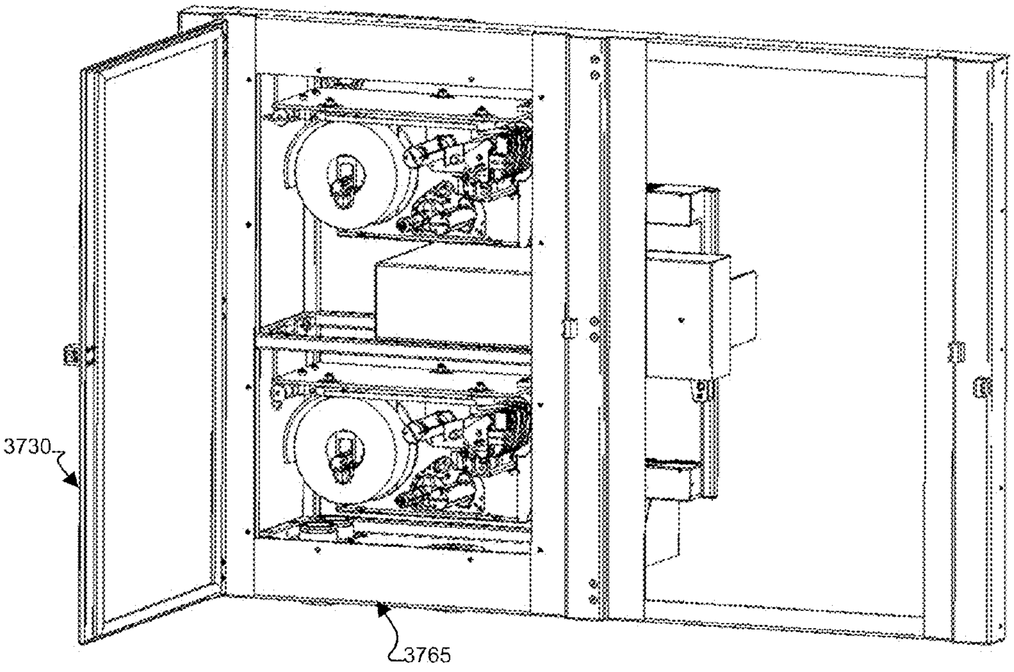

FIGS. 37A-37C show an illustrative printer system 3700 for an APAS cell. The printer system 3700 includes printers 3705 and 3710 that are mounted in an enclosure 3715 that includes an automated label shuttle 3735 that can provide a pass through into the compounding area 3105. The printer system 3700 includes a printer mounting plate 3775 that includes a quick release pin 3770 that can allow for the easy removal of the printer mounting plate 3775 assembly. The enclosure 3715 includes an external door 3730 for an operator to access the printers 3705 and 3710 for loading media and servicing, for example. The printer enclosure 3715 can be sealed against a panel 3765 that can be located inside of the external door 3730 and mounted to the doorframe. The panel 3765 can be used to seal the inside of the APAS cell from the ambient environment when the operator opens the external door 3730, for example, for printer maintenance. As noted previously, the printer enclosure 3715 may be operated at a more negative pressure than the compounding area 3105 through a duct providing fluid communication from the interior of the printer housing to a low pressure point in the air handling system described with reference to FIGS. 31A-31B, and/or active fans. This negative relative pressure may substantially reduce particulate generated by printer operations from migrating from the printer enclosure 3715 into the compounding area 3105.

The system 3700 includes a set of spring-loaded printer housing doors 3720 and 3725 that open into the enclosure 3715 to receive label trays on the automated label shuttle 3735 from the compounding area 3105. The shuttle 3735 includes a slide motor 3740, a slide cover 3745, a slide motor housing 3760, a bag label tray 3750 and a syringe label tray 3755. The shuttle 3735 can push the pass-through doors 3720 and 3725 open to enter and capture the printed labels for presentation to a syringe or an IV bag that the label is applied to.

Figure 38:
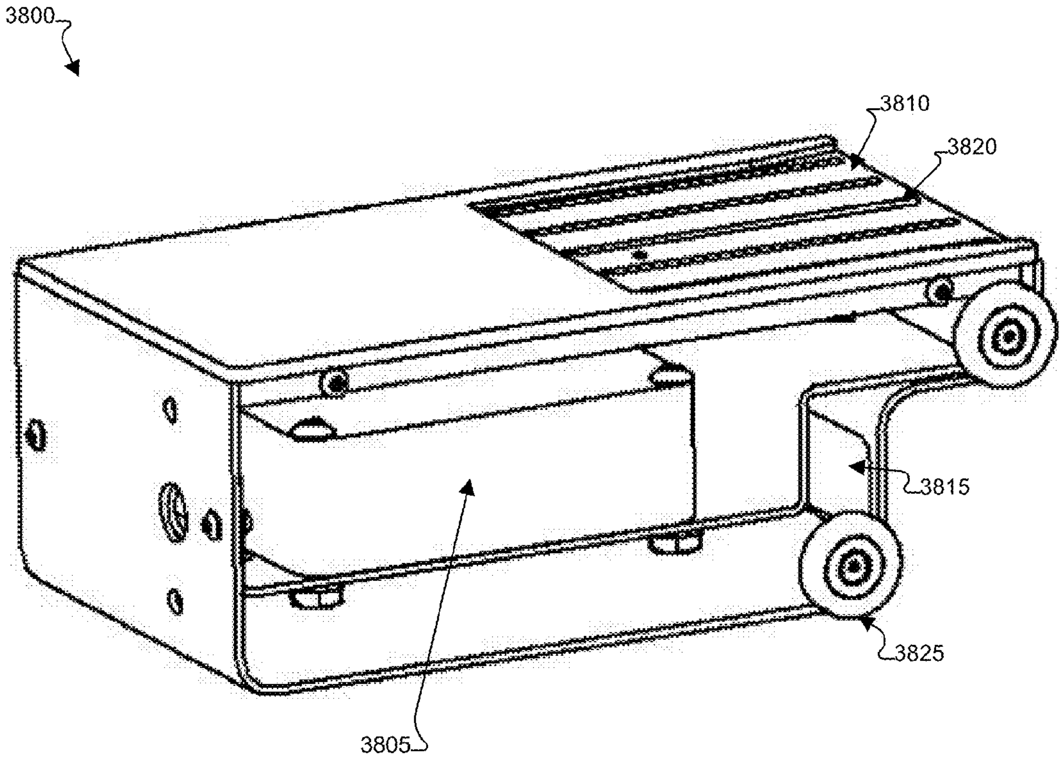
FIG. 38 shows an illustrative tray for the printer system of FIGS. 37A-37B.

FIG. 38 shows an illustrative tray 3800 for the printer system 3700 of FIGS. 37A-37B. The tray 3800 may be the bag label tray 3750 or the syringe label tray 3755. The tray 3800 includes a fan 3805 (e.g., with DC or stepper motor, for example) and wheels 3825 to contact the printer housing. The fan 3805 can be mounted inside of the tray 3800 to suck the label onto the tray 3800 as it comes off of the printer. A proximity sensor can be located in the top plate 3810 to detect the presence and proper location of the label. The sucking of the label onto the tray 3800 with the assistance of the incoming air 3820 can allow the label to overcome any natural label curl and electrostatic effects. It can also properly locate the label on the tray 3800 for removal and subsequent presentation to the bag or syringe. The fan 3805 blows air out of the tray 3815 towards the interior of the printer enclosure 3715. This can ensure that the particulate is blown into the printer enclosure 3715 and not into the compounding cell 3105 when the label is removed from its backing.

Some embodiments may include one or more printers and associated application apparatus to print labels and to apply those labels to vials, syringes, and/or IV bags. Some implementations may receive a label for a vial while rotating the vial as the label is dispensed. Various other embodiments may print a label in response to identifying a bar code match using a bar code reader device. Some labels may be printed in all or in part in one or more languages depending on the health care provider and patient needs. Some labels may include a description of attributes or image information of the proper contents of the medical container. Some embodiments may print information, such as 1 or 2 dimensional bar codes, text, or other indicia on an exposed surface of the IV bag. In some examples, the surface may be specially coated or include a previously applied label to substantially prevent the marking material from leaching into the interior of the IV bag. In some embodiments, machine readable indicia (e.g., bar code, pattern) may be imprinted on at least one surface of a pill, tablet, or other solid medicament. Some medical items may receive an RFID tag instead of or in addition to any other label.

Figure 39A:
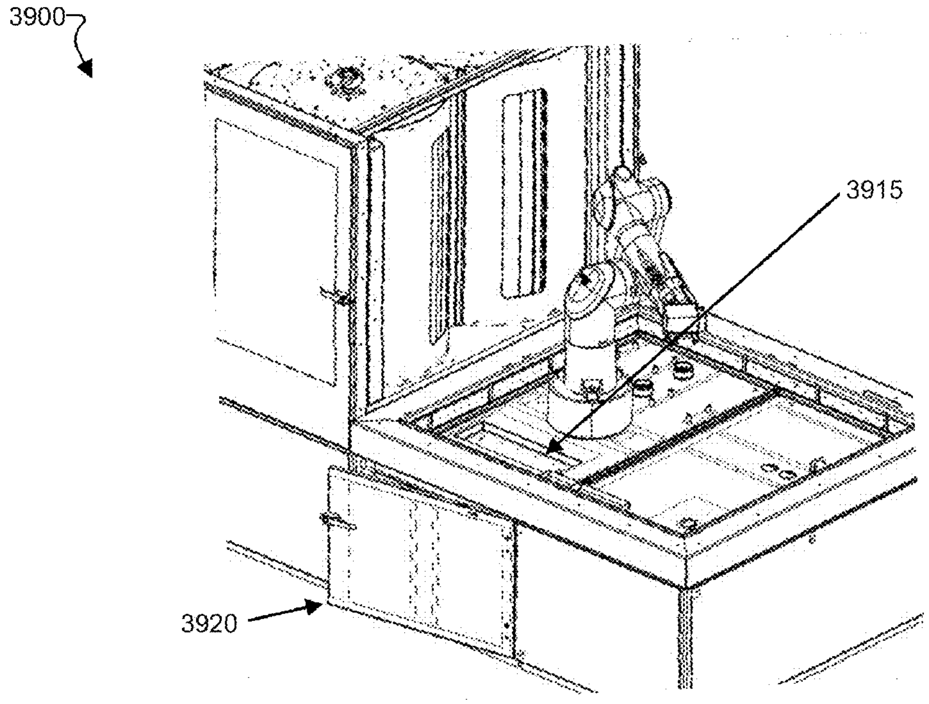
FIGS. 39A-39B show an illustrative waste bin area for an APAS cell.
Figure 39B:
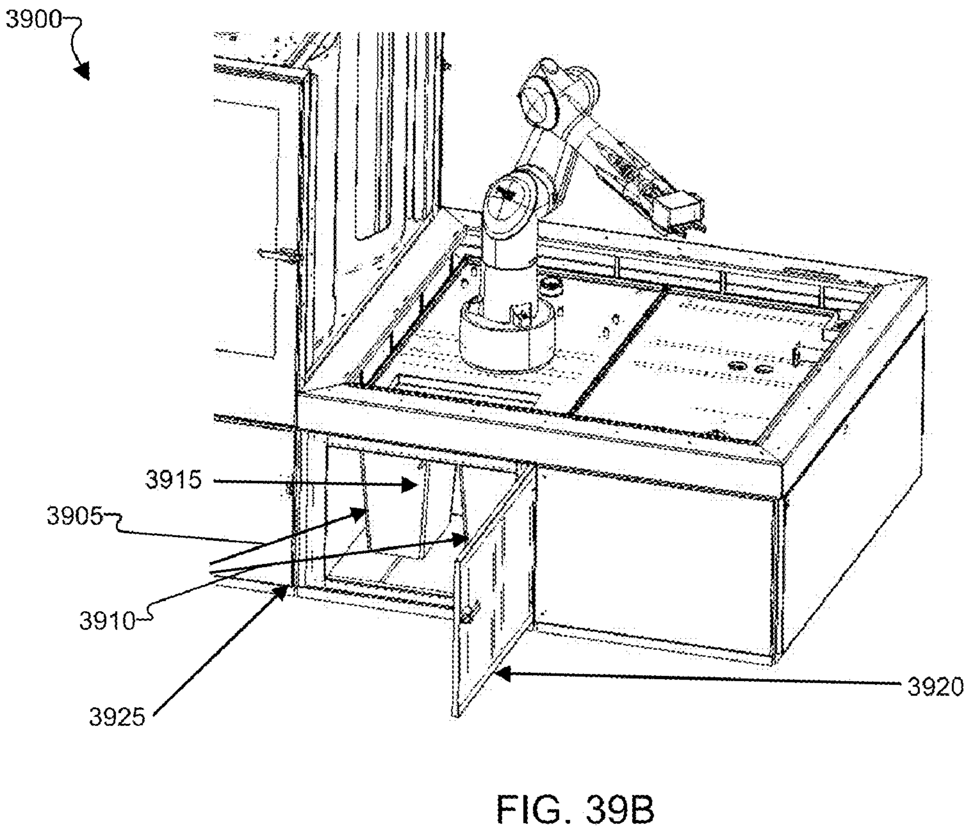

FIGS. 39A-39B show an illustrative waste bin area 3900 of an APAS cell. The waste bin area includes waste bins 3905 and 3910, an interior door 3915, an exterior door 3920 and a waste bin area enclosure liner 3925. The waste bin area 3900 can be coupled to the compounding area 3105 via a pass-through so that the waste bins 3905 and 3910 can be emptied without interrupting cell processing. The waste bin area 3900 can be a stainless enclosure, enclosure liner 3925, which can be sealed from the ambient environment. It can be fitted with the interior door 3915 that can isolate the waste bin area 3900 from the compounding area 3105 when it is closed. It can also fitted with the external door 3920 to access the waste bin area 3900 from the exterior for removal of the waste bins 3905 and 3910. The interior door 3915 and the exterior door 3920 can be interlocked so that as the exterior door 3920 is opened a couple of degrees, the interior door 3915 closes completely. As described with reference to FIGS. 31A and 31B, a connection to the peripheral duct 3150 around the base of the APAS cell can cause air to be pulled from the APAS cell, as long as the internal door 3915 is open, and draws air from the exterior when the external door 3920 is open. This may substantially prevent aerosolized drug from the waste bin area 3900 from returning to the APAS cell area or escaping from the APAS cell. The interlocking can be implemented with a mechanical linkage, but may also be implemented with an electro-mechanical actuator on the internal door 3915, with sensing or operator switches on the external door 3920 to initiate it.

In some cases, the interior of a syringe barrel behind a syringe plunger may be considered a critical surface. An example illustration of the interior of a syringe barrel behind a syringe plunger is described in more detail with reference to FIG. 46. The APAS cell 100 may be configured to avoid exposure of critical surfaces to non-sterile environment (e.g., less than ISO Class 5).

The operational procedure for getting the syringes from a Class 5 assembly area, through non-Class 5 environment, and back into the Class 5 cell, for example the APAS cell, can be handled in a number of ways to maintain, for example, that the sterility of the syringes. Two illustrative implementations are described below.

A first illustrative implementation may be to load the syringes into a clean rack in a Class 5 environment and once loaded, place a clean cover over the rack and syringes. The racks can then be transported from the assembly environment to the APAS cell 3100 with minimal risk of contamination. The cover can stay in place until the rack is installed into the carousel area 3110. The opportunity for contamination once the cover is removed can be minimized by a Class 5 airflow pattern in front of the exposed rack loaded in the carousel area 3110. As described in the discussion in air handling in the APAS cell, the carousel area 3110 can be maintained at a positive pressure relative to the external environment. There can be about a one to two millimeter gap between the exterior wall closure panels and the carousel top and bottom plates and vertical trim panel seals, allowing clean air to flow into the area in front of the rack once it is in the carousel area 3110. The clean air can blow over the face of the rack from the top, bottom, and both sides as long as the exterior door is open, minimizing the opportunity for external environmental contaminants to actually reach the syringes.

Figure 40:
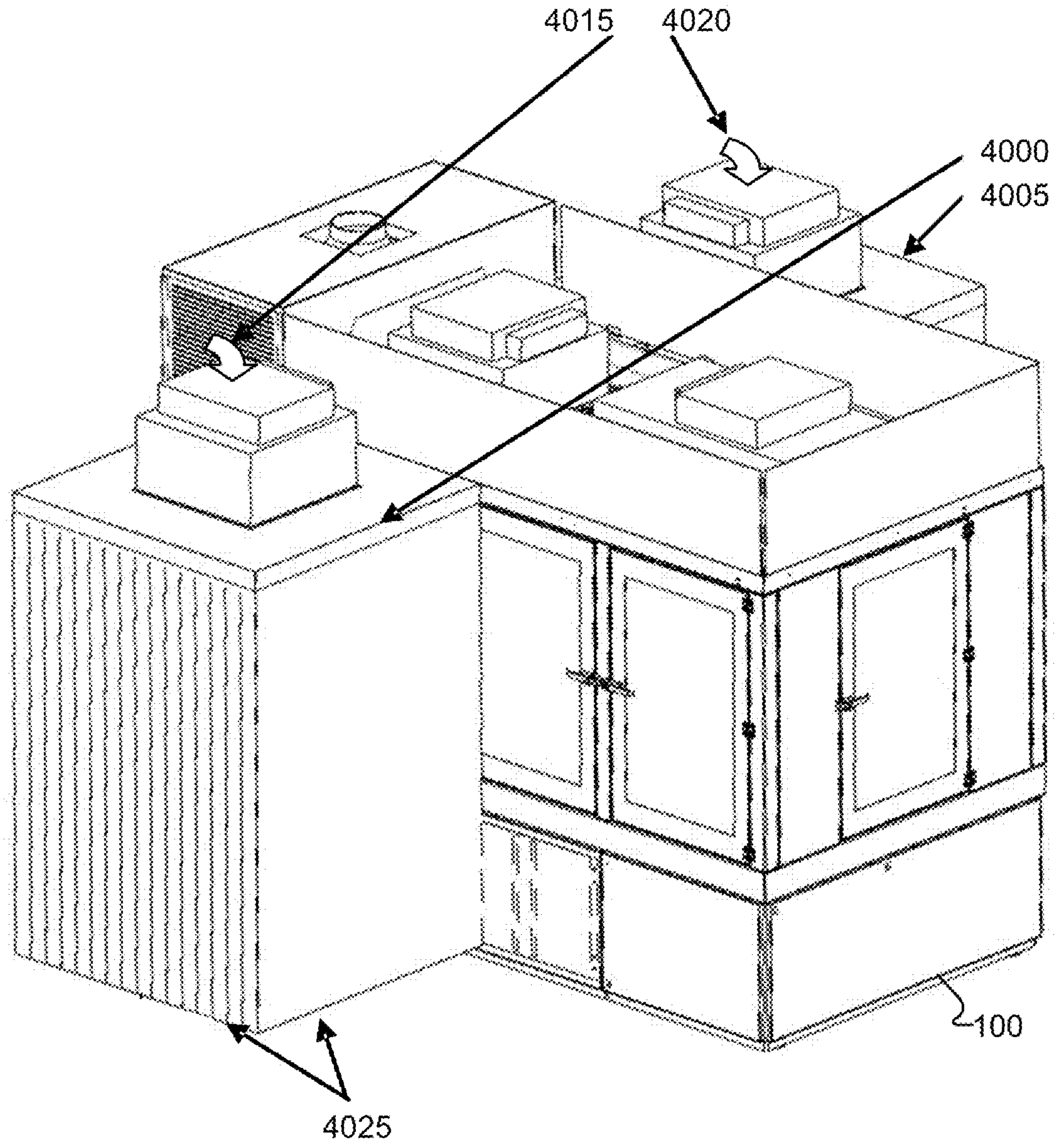
FIG. 40 shows a softwall downdraft clean room attached to the side of the APAS cell.

FIG. 40 shows softwall downdraft clean rooms 4000 and 4005 attached to the side of the APAS cell 100 of FIG. 1. A second illustrative implementation may be to create a local Class 5 clean environment outside each of the carousel loading doors by adding essentially a softwall downdraft clean room to the side of the cell structure that the operator can enter for APAS cell loading as shown in FIG. 40. This type of clean room can lend flexibility to the APAS cell loading paradigm. It can be large enough to allow the opening of the carousel door 3120. It can allow access to the operator interface panel inside the clean area, and may optionally include a small work surface to facilitate any routine operator tasks. The work surface may be mounted to the APAS cell, or free standing. The work surface can also be a suitably outfitted mobile cart which may also provide a mechanism to transport supplies to the APAS cell and/or convey packaging materials. Syringes, vials, and/or IV bags can be loaded into the racks in a Class 5 clean bench and then transported in covered racks to the clean area attached to the APAS cell, then loaded and uncovered inside the clean area resulting in an aseptic process. In some embodiments, the syringes and other supplies can be brought directly to the clean area outside the carousel door 3120 for loading directly into the racks that have been already installed in the carousel or for loading the racks in the attached clean area and then placing the racks into the carousel.

The clean rooms 4000, 4005 may form standalone clean tents, which may be formed into any suitable shape and use any suitable dimensions. The clean rooms 4000, 4005 each include a FFU 4015, 4020, respectively, blowing down from the ceiling of the APAS cell. In other embodiments, the clean room may include ductwork configurable to couple to one of the existing FFU's 3145, 3155 on the APAS cell. The walls 4025 may be, for example, a combination of overlapping plastic strips and/or flexible plastic sheet curtains. Such construction can be, for example, swung or slid back away from the side of the APAS cell to allow for the opening of the APAS cell doors for cleaning and maintenance as required. The air quality can be quickly reestablished after all doors are closed up again.

Figure 41:
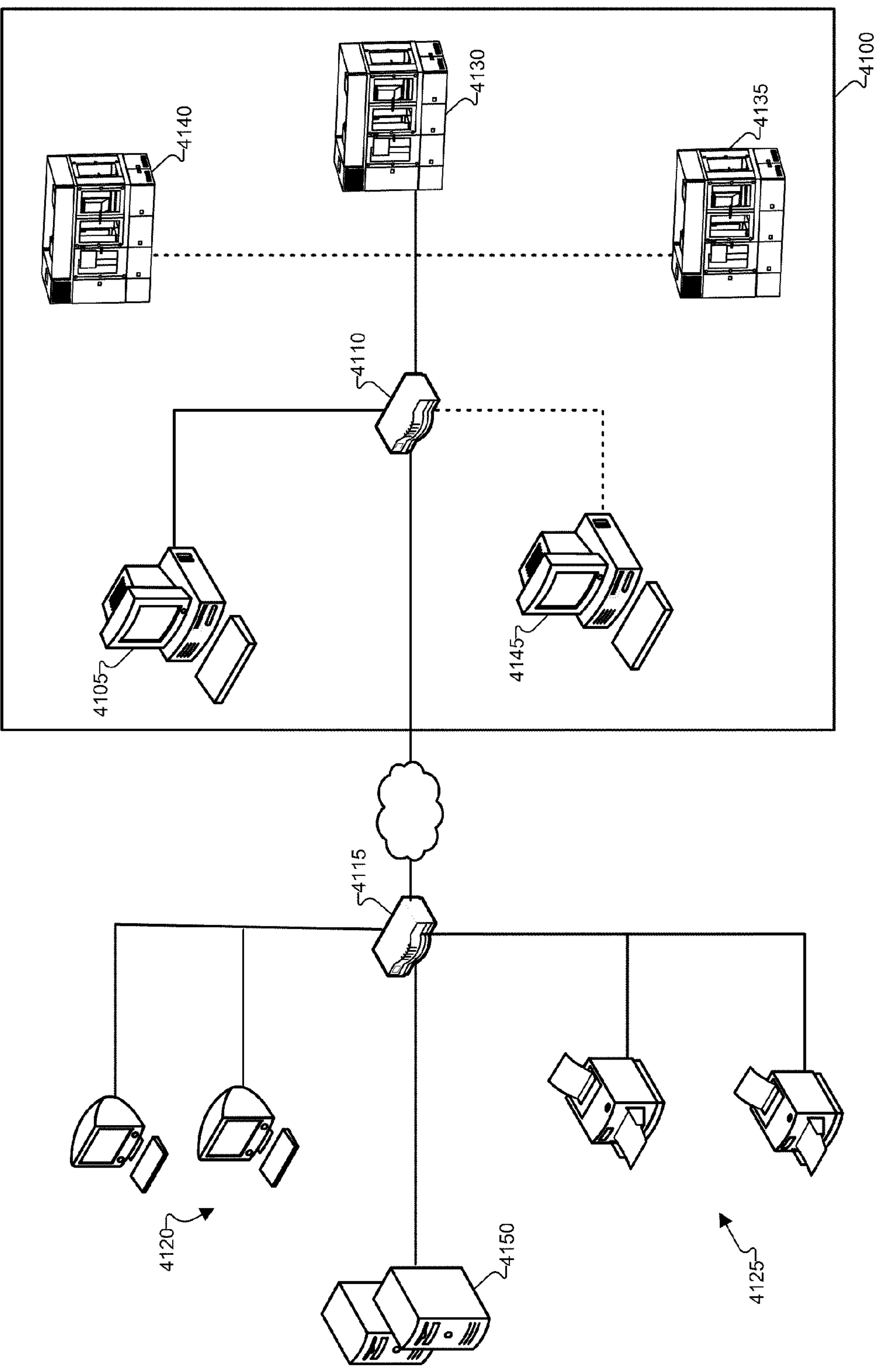
FIG. 41 shows an illustrative APAS within a hospital environment.

FIG. 41 shows an illustrative APAS 4100 for an illustrative hospital environment. The APAS 4100 includes one APAS cell 4130 and two optional APAS cells 4135 and 4140, connected to one or more remote user stations 4105 and 4145 by way of APAS local network 4110. In other embodiments, four or more APAS cells may be included in the APAS 4100. Using network communication (e.g., packet based communication), any practical number of cells of the APAS 4100 may operate in a coordinated manner from different geographical locations (e.g., different locations in a building, among multiple facilities, or in one or more geographically distant locations). Examples of communication networks can include, e.g., a LAN, a WAN, wireless and/or optical networks, and the computers and networks forming the Internet.

The APAS 4100 may receive drug processing requests by way of a hospital communication network 4115. The APAS 4100 may receive drug processing requests from existing hospital drug order/prescription order entry systems 4120.

In some implementations, the APAS 4100 may be integrated into an existing process flow model in which drug orders are prepared, validated, and passed to a pharmacy for manual processing. The process flow model may be managed by a hospital IT system 4150. Some existing order entry systems 4120 may generate printed labels by way of hospital printers 4125 that contain drug order information (e.g., drug name, dose levels, concentrations, patient data). Such labels can create a processing demand for operations performed manually in the pharmacy. The APAS 4100 can use the information on such labels as a source for drug orders for automated processing.

One illustrative way for an APAS process to begin can occur when drug orders are available on the hospital interface, as described with reference to FIG. 41. The drug orders can be a triggered event. The drug orders can be initiated on a time basis, initiated when files are present, initiated when capturing printer port data, or initiated when some other form of messaging from a hospital order entry system occurs.

Another illustrative way for an APAS process to begin involves an operator manually entering a non-patient specific request for drug processing. The APAS 4100 may be incorporated into an existing pharmacy process flow in which a request is made by medical staff for administration of medication to a patient. The request can then be vetted by pharmacy staff, typically in conjunction with order entry software. The pharmacist may vet the order entry by reviewing the dose levels, the other medications a patient is on, and other related factors. The APAS 4100 can receive already validated and/or vetted drug orders. Directly entering patient specific orders into the APAS 4100 may bypass these safety checks. In some embodiments, the APAS can only accept patient specific requests via the hospital interface. This mode of operation can support batch operations in a pharmacy. A batch operation can be an operation where a certain quantity of product is prepared in anticipation of demands. The batched products can then be either refrigerated or frozen. For example, a pharmacy operator may want to prepare a quantity of one hundred one gram Cefazolin syringes, or two hundred saline syringes for line flushes.

Since the data may already exist in some electronic format, site installations (e.g., hospitals) may transfer electronic files that contain the required information to the APAS 4100. Some implementations may use well known electronic data interchange techniques. Drug orders may be, for example, predefined outside of the APAS 4100. Any review of the appropriateness of the drug order, any contraindications, incompatibilities, or correctness of the prescribed doses can be performed by the existing hospital system outside of APAS 4100. The resulting drug orders can become inputs to the APAS cell for processing.

In some embodiments, the APAS may include an interface to a hospital system to capture certain key information about a drug request, which can then be processed by the APAS into a series of processing instructions to the APAS cell, that can control the preparation of the drug order in an automated fashion.

In addition to different interface methods, the actual contents of the drug orders can vary from hospital to hospital. The APAS 4100 may have a flexible drug order interface that can accommodate various apparatus for order input, while maintaining a fixed and validated backend automated system.

Figure 42:
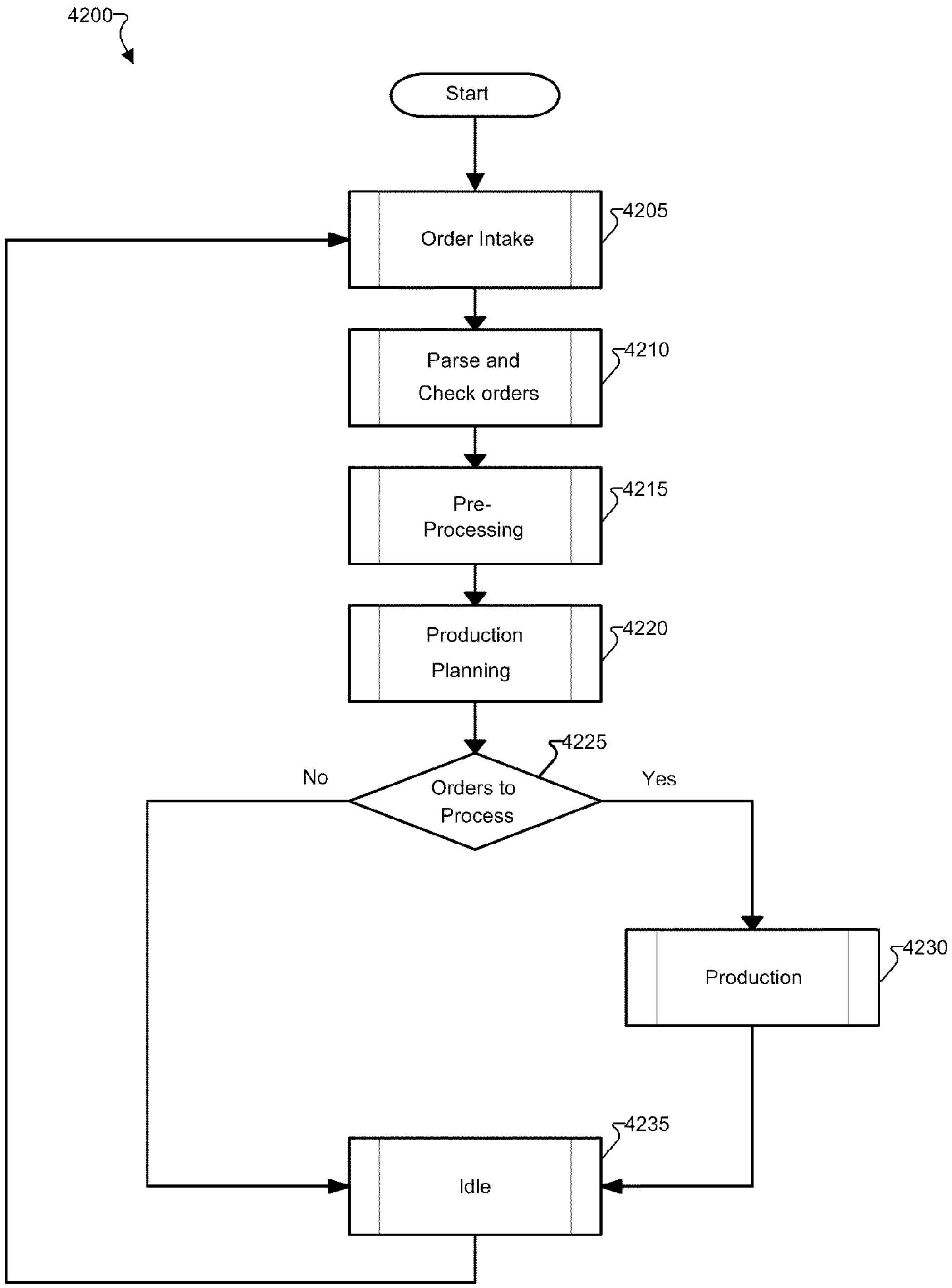
FIG. 42 is a flow chart of an illustrative method for an APAS process for the APAS of FIG. 41.

Drug orders can be received by the APAS 4100 in various ways. FIG. 42 is a flow chart of an illustrative method 4200 for an APAS process for the APAS 4100. The method 4200 shows an interface through which the hospital system may create an ASCII delimited file that is retrieved via FTP by the APAS 4100.

The method 4200 begins with a drug order intake at step 4205. Various methods for obtaining drug orders to the APAS 4100. These options may include, for example, capturing print stream data, connecting to an HL-7 Interface where the APAS creates a connection to the hospital's message server and registers for drug order request message packets, importing data from a data storage device (e.g., memory stick, disk, CD, or other removable storage devices), entering information directly (e.g., manual re-keying), reading optical character recognition, and/or scanning bar code information. Some implementations may include electronic data interchange methods, one example of which includes bar codes with tagged bar codes that have encoded XML, HTML, or otherwise encoded tagged information which may be, for example, associated with data fields as defined by a style sheet.

Figure 43A:
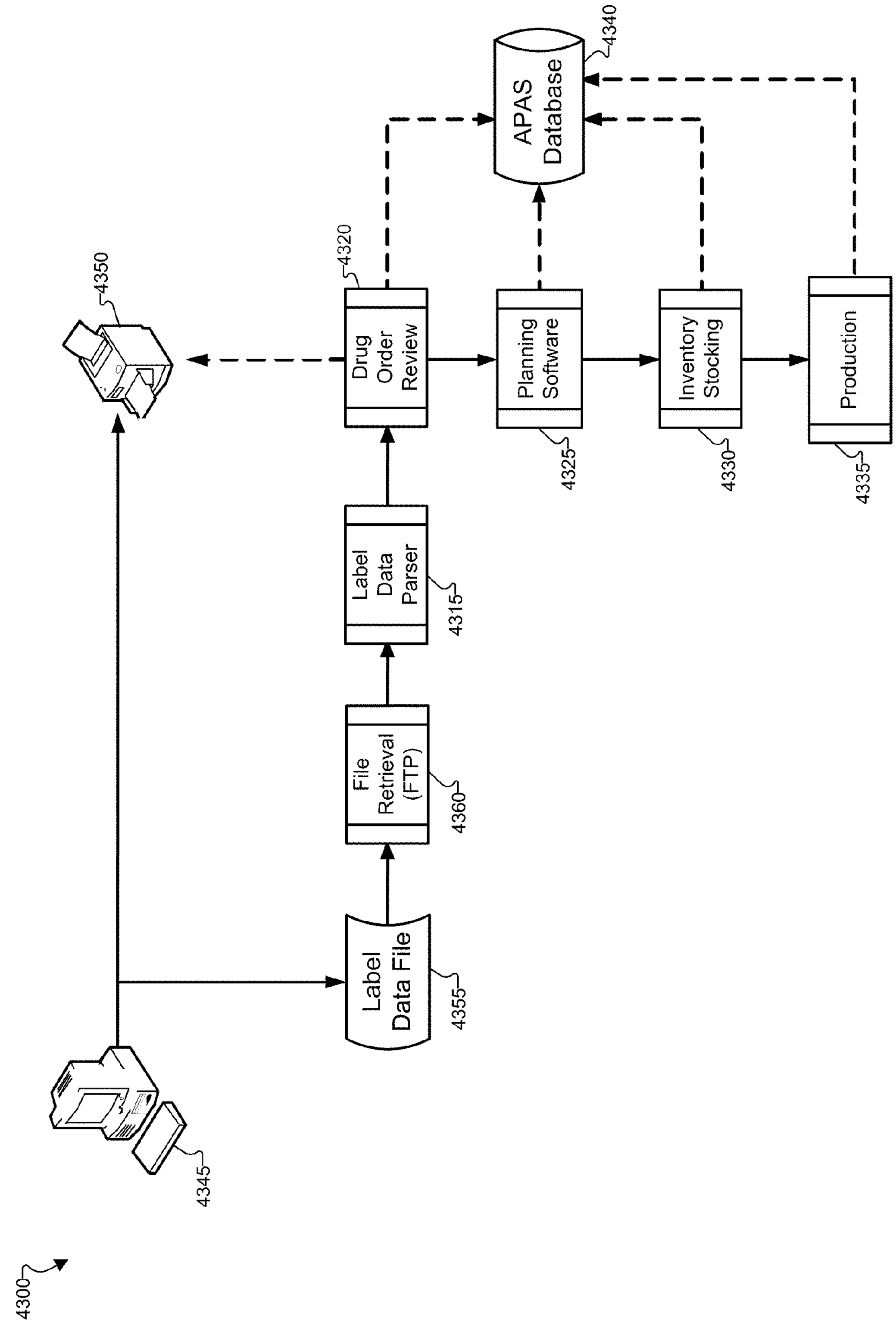
FIG. 43A is a flow chart of an illustrative order intake method that involves creating an ASCII delimited file.
Figure 43B:
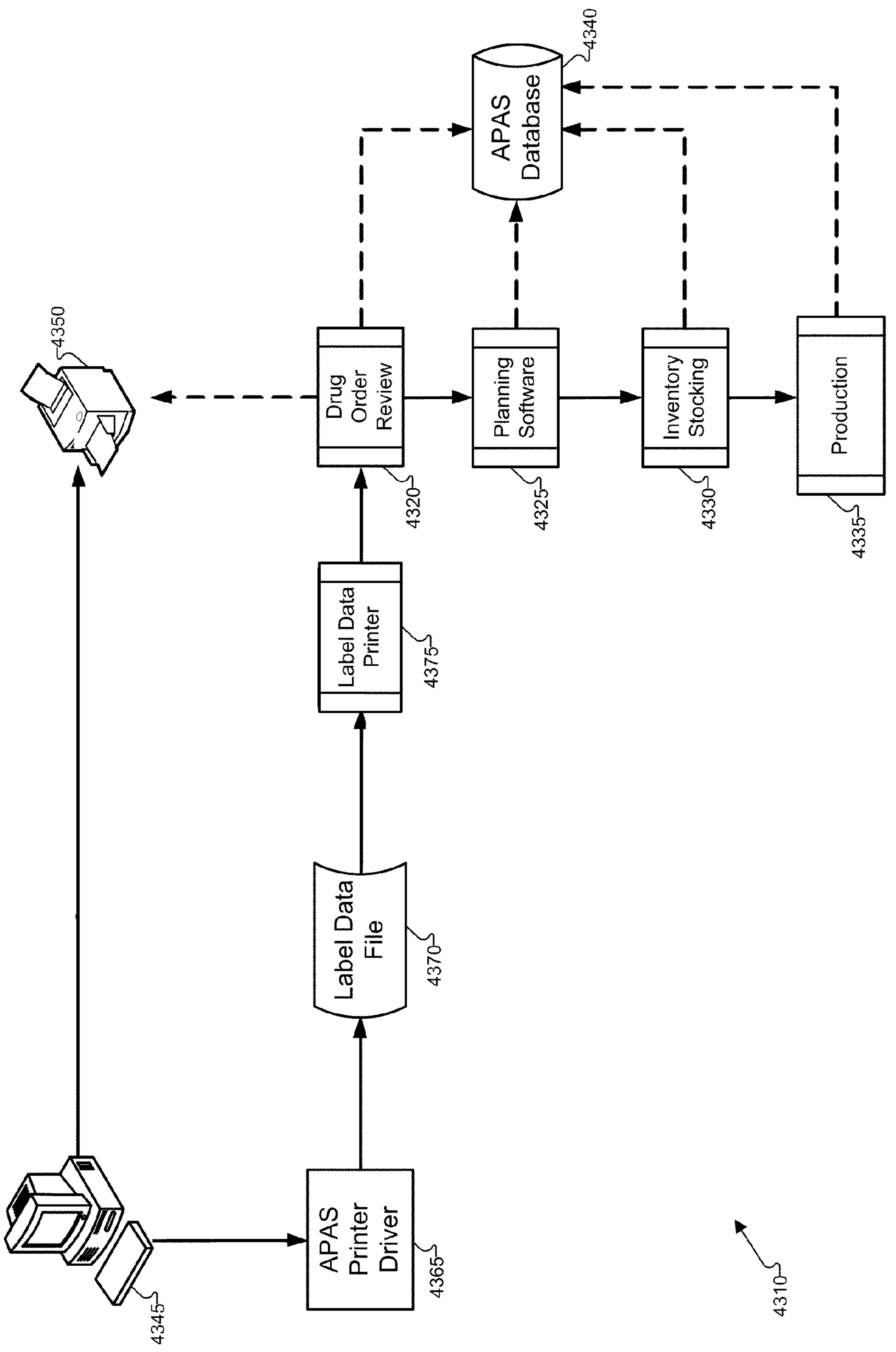
FIG. 43B is a flow chart of an illustrative order intake method that involves capturing print stream data.

Two illustrative approaches to perform the order intake step 4205 are shown in FIGS. 43A-43B. FIG. 43A is a flow chart of an illustrative order intake method 4300 that involves creating an ASCII delimited file. FIG. 43B is a flow chart of an illustrative order intake method 4310 that involves capturing print stream data. Another method to perform the order intake step 4205 involves an HL-7 Interface where the APAS 4100 creates a connection to the hospital's message server and registers for drug order request message packets.

A hospital IT system 4345 may execute drug order entry software in the method 4300. The hospital IT system 4345 can create a drug order label by generating an SQL query against a database in the hospital IT system 4345. The drug order label can then be printed by printer 4350.

The hospital IT system 4345 can also create an ASCII delimited drug order label data file 4355, which can be referred to as a label data file, that can be retrieved via File Transfer Protocol (FTP) 4360 by an APAS. The label data file 4355 can be placed in a folder contained on the hospital IT system that can be accessed by an APAS. Once accessed by the APAS, a label data parser 4315 can parse the label data file to determine if the APAS is capable of processing the drug order. The parsed label data file is then reviewed by a drug order review system 4320 in the APAS. If the drug order cannot be processed by the APAS, then the APAS can route the drug order label to the existing network printer 4350.

For drug orders that can be processed by the APAS, the drug order review system 4320 can create drug order records that can be stored in the APAS database 4340. The APAS can execute planning software 4325, which may generate production queue and inventory load data that also can be stored in the APAS database 4340. The database 4340 may again be updated with information determined in an inventory stocking step 4330, in which an inventory mapping can be generated for the APAS. Then, in a production step 4335, the APAS generates processing information that is also stored in the APAS database 4340.

A hospital IT system 4345 may execute drug order entry software in the method 4310. The hospital IT system 4345 can create drug order labels by selecting an existing printer driver in the hospital IT system 4345. The drug order label can then be printed by printer 4350. The method may involve, for example, an HL-7 Interface in which the APAS may connect to the hospital's message server and register for drug order request message packets.

The hospital IT system 4345 can also select to print to an APAS. An APAS printer driver 4365 can be provided for the hospital IT system 4345 to print to a port on an APAS cell. The port may be, in various embodiments, a network command, a USB, firewire, wLAN, or other serial or parallel implementation, for example. The APAS printer driver 4365 can create a print file on the APAS. The print file may be in the form of a label data file 4370. In some embodiments, the label data file 4370 may trigger label data parsing software. The label data parsing software can parse the label data file to determine if the APAS is capable of processing the drug order. A label data printer 4375 can take the parsed label data file information and create a drug order label. The parsed label data file is then reviewed by a drug order review system 4320 in the APAS. If the drug order cannot be processed by the APAS, then the APAS can route the drug order label to the existing network printer 4350.

For drug orders that can be processed by the APAS, the drug order review system 4320 can create drug order records that can be stored in the APAS database 4340. The APAS can execute planning software 4325, which may generate production queue and inventory load data that also can be stored in the APAS database 4340. The database 4340 may again be updated with information determined in an inventory stocking step 4330, in which an inventory mapping can be generated for the APAS. Then, in a production step 4335, the APAS generates processing information that is also stored in the APAS database 4340.

Different hospitals may have different label formats. To accommodate the wide variety of interfaces, FIG. 43A and FIG. 43B show that an input method 4300 and an input method 4310 in the order intake process can vary, but that regardless of the input method the processing steps 4320, 4325, 4330, and 4335 remain the same. This can allow for a flexible interface to a hospital system while maintaining a consistent automation method. When an APAS 4100 is first installed in a hospital location, configuration information can be preloaded into the APAS cell 100 that defines how to interpret the received drug order data. This can include defining which sections of the drug label data relate to the key fields for processing. A label can contain information that is not required to automate processing, such as the bed location of a patient, for example. Such information can be stored in free form fields that can appear on the label of prepared syringes and bags.

In an illustrative embodiment, a drug order record for each drug order processed by the APAS may be stored in the APAS database 4340. Each drug order record may be associated with parametric information relating to the state of the APAS cell during the processing of the drug order. This information may include, but is not limited to, a unique dose ID. In one or more data tables in the database 4340, parametric information may be associated with the unique dose ID. For example, operator, loader, responsible pharmacist, prescribing doctor or health care provider, inventory loader, and patient-related information may be associated with each unique dose ID. Date and time stamp information (e.g., start time, end time) may be associated with one or more data items associated with each unique dose ID. The information may also include information about the types (e.g., manufacture, model) and sizes of medical containers used to process the drug order, including intermediary and output medical containers used. Medical container information may include, for example, measurements of inner and/or outer diameters at certain locations, lengths, image information (e.g., prototype bitmap), and/or container weight. Each dose ID may be associated with process measurements, such as measurements of weights at different processing stages, captured images (e.g., bitmap, .gif, .jpeg, or .mpeg video clips), expected and actual image data, image comparison confidence level and threshold level, bar code data, number and intensity (e.g., or selected profile) of pulsed ultraviolet radiation exposure and identity of exposed item. Each dose ID may be associated with environmental parameter measurements, such as particle counter readings, mass flow rates in the air handling system, internal (e.g., in the compounding chamber, in the inventory chamber, in the clean tent) and external (ambient atmospheric) humidity, temperature, and pressure (e.g., gauge, differential between chambers and/or internal-external).

The drug order record in the APAS database 4340 may be associated with images of the drugs and/or diluent used to process the drug order as well as images of the final order in its delivered container. Information about the state of the APAS may also be stored in the drug order record in the APAS database 4340. For example, control settings for the air handling systems (fan speed, flow control elements) operation of various motors, robot parameters (e.g., motion profiles, keep-out areas), maintenance level, software and hardware versions, training profile, error or verification messages, aborted drug processes, related communications with hospital interfaces, user input information, and similar information may be associated with each dose ID. Other data that may be stored in the drug order record in the APAS database 4340 may include various other parameters for the drug order, such as expiration date, and various other APAS settings and/or variables contemporaneous or otherwise associated with the preparation of each drug dose.

Collecting and relating some or all such information in a relational database, may provide various benefits. For example, drug dose records may be recalled for individual doses, or recalled for classes of drug processes (e.g., all 10 mL syringe doses prepared in the last month). Recalled records may be reviewed for process control improvement, statistical analysis, auditing, repeating, profile editing, training, maintenance, and/or other purposes.

After completing the order intake step 4205, the APAS parses and checks received drug orders at step 4210. In various embodiments, the APAS 4100 may accommodate a wide range of input drug order formats. An input masking scheme may be implemented in which a configuration table stored in an APAS database 4340, for example, includes parsing information on the label. In one implementation, one or more SQL statements may be embedded within the label, and the configuration table can be used to extract data from the input file to create the appropriate fields within a drug order record in the APAS database 4340. The parsing information can include information regarding field delimiter and format information, as may be present in the case of captured print stream data. The parsing information may also include truncation or string subsets for required characters. Operations may be performed to strip off printer control characters, such as on captured print data. In various embodiments, packet headers, ECC, XML tags, and/or other types of metadata may be stripped, interpreted, or decoded from packet-based or other serial or parallel communications to interpret information to process a drug order.

The implementation of the input masking scheme can allow the APAS 4100 to accommodate a variety of formats and orders of data in a received drug label with little or no software changes. The mapping information can be contained in tables that can easily be modified. In a typical application of the method 4200, a hospital can predefine the contents of the input data and can preload the configuration data. In some cases, a benefit of this may be the ability to allow changes to fields without requiring modification of the software. This can also allow a variety of formats to reduce the accommodation work required by the existing hospital information systems to integrate with the APAS 4100. In some embodiments, the system may:

1. review drug orders received on the CPOE (care provider order entry) interface;
2. identify which of the received drug orders are to be handled by the APAS by tagging the orders (e.g., in a pick list); and,
3. perform verification that the drug quantity requested in a drug order falls within a trained and acceptable range unless manual acceptance/override of the limit is received.

In one example, a non-standard quantity of a drug may be requested for a large patient. The APAS may flag this case for review by an authorized user. The user can accept the occurrence without adjusting the predefined limit. The trained limits can be changed if it is determined that the occurrence is to be included in the range considered normal.

Drug orders can be received in a predefined format, for example a delimited ASCII file. In some embodiments, the APAS 4100 can verify that a drug order can be parsed and is in the correct format. A drug order is created in APAS database 4340 for each valid order received on the interface. The APAS cell 100 may identify orders that do not pass verification. For example, the drug order may be parsed by extracting the key fields from the drug order (e.g., drug name, drug quantity, units, concentration, concentration units). Verification may also involve verifying that the drug order is a producible order within the constraints of the IV bag and syringe trained inventories. The verification can be performed in step 4215.

When individual drug orders are verified, they may be added to a production queue at step 4220. The addition can be automatic or manual. The operators have control over which queue a drug request is allocated to, and can move orders between queues. The queue represents an aggregate of orders to be released to the cell for production. The queue may be pre-processed to determine the total aggregate of drugs and consumables required to fill the queue, which may later become the list of inventory items to be loaded.

Whether items are to be released to the production cell is determined at step 4225. If items are to be released, then the production step 4230 is performed. If no items are to be released, then system moves into an idle state 4235, after which step 4205 is repeated.

A purpose of pre-processing can be to analyze a set of drug orders that have been collected into a queue and released for production. Each order may be processed according to an algorithm to determine the processing steps necessary to complete the order. Database tables can be populated with the processing steps. The steps can define details, such as the amount of drug to be drawn, the syringe or bag size required, and/or any further dilution requirements, for example. The completed collection of these steps can be compiled to determine a total aggregate of drug, diluent, plus bag and syringe requirements for the dispensed doses. The APAS software can then process each aggregate, and through iteration with the operator, for example, providing inventory details such as what vial sizes to use, determines the mix of vial sizes and reconstitution processing inputs required (e.g., syringes, diluent) to provide the drugs to fill the production queue. This information may be used to generate an inventory stocking list that can be sent for display to the operators.

Automated compounding devices may have preloaded information for a specific drug order. For example, a simple automation device may have a preset table of data for handling a 1 gram cefazolin syringe fill, or a 2 gram cefazolin syringe. Handling an intermediate dose, such as a 1.5 gram dose, may involve retraining of the system. In embodiments of an APAS, drug orders and fills may be determined by an algorithmic method. In this approach, the software can calculate the processing steps for any valid range of doses that can be produced within the limitations of the available medical containers (e.g., syringes and bags loaded in inventory). As an example, the APAS can properly process 1 gram Cefazolin 100 mg/ml orders, or 2 gram, or 1.5 gram orders, without requiring any further training. The system may also incorporate range limit checking to flag abnormal doses for confirmation.

In an illustrative embodiment, software may be used to determine fluid volume requirements, syringe or bag size to dispense, and further dilution steps. The illustrative process may use a series of key tables, described below, in the APAS to define the drug, reconstitution profile, drug concentrations, and dispensing information.

Figure 44:
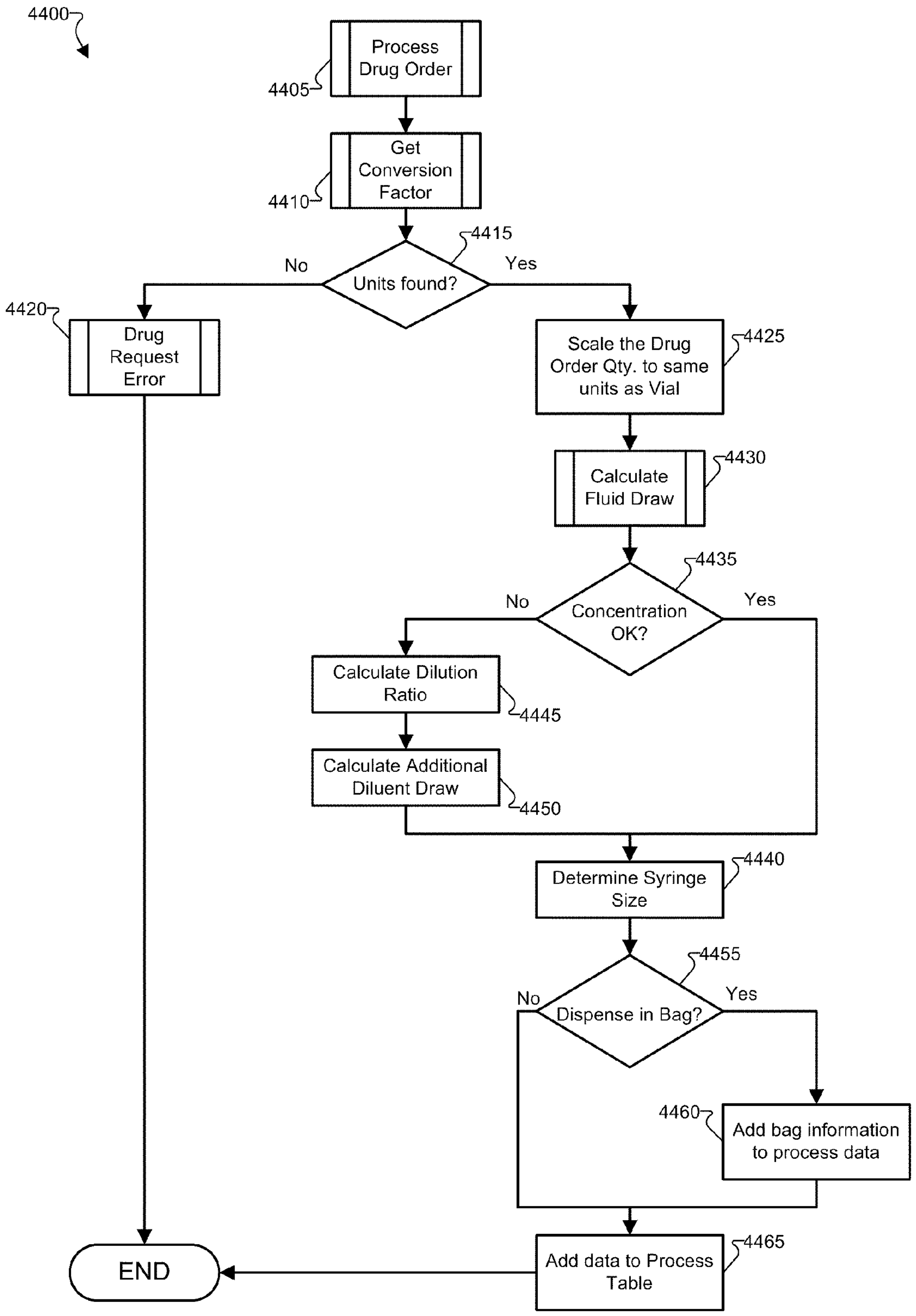
FIG. 44 shows an illustrative method by which APAS software analyses a drug order to determine the fluid transfer processing requirements.

FIG. 44 shows an illustrative method 4400 by which APAS software analyses a drug order to determine the fluid transfer processing requirements. In some embodiments, the APAS may first receive the requested drug name, and its concentration at step 4405. For example, the drug order may include the drug name, drug quantity, quantity units, concentration, and concentration units.

Next, at step 4410, the APAS obtains a conversion factor. To determine a conversion factor, the method 4400 can use the order's drug name to access the trained drug information to find out the base units, and then can use the order's units to find a conversion factor. In a first pass of the method 4400, the drug order quantity can be scaled to common units within the trained drug table. For example, if a drug in the trained drug table uses milligrams as a base unit, and a drug order is expressed in grams, the drug order can be converted to milligrams. The drug name on the order can be used to access the trained data, and determine what unit conversion can be used to convert the drug order to ordered units of a base. Trained drugs in the trained drug database can be associated with a field to indicate base units. Typical units can be milligrams or units. The drug order quantity can be parsed and then can be used as an index to determine the conversion. For example, Cefazolin 1 G 100 mg/m/vial concentrations may be expressed as units per milliliter.

The APAS determines dispensing information from a dispensing table. Dispensing information may include what media that drug dose and volume is to be dispensed from in the pharmacy. Syringe, bag and bag size, for example, may be determined based on threshold values in the dispensing table. In step 4415, the system determines if the media is available with the required amount in the APAS cell. If the required amount is not available, then a drug request error is indicated in step 4420 and the method 4400 ends. The error may indicate that the drug order has unknown units.

However, if the required amount is available, then the drug order is scaled to the same units as the medical container (e.g., vial) at step 4425. The APAS may compare the request to the drug concentration present in a vial of that drug. For example, the vial may be reconstituted by the APAS cell or already available with fluid. Then, at step 4430, a fluid draw is calculated. The system can determine the amount of fluid that can be transferred from the vial by dividing the quantity of the drug order by the concentration of the vial.

In step 4435, the APAS checks whether the concentration is acceptable. Whether further processing steps to adjust the dose concentration are needed depends on whether the vial concentration is equal to the dose concentration.

However, if the concentration is not acceptable, then, at step 4445, the system calculates a dilution ratio, for example, by dividing the vial concentration by the dose concentration. This may involve drawing an amount, further diluting the solution by drawing additional fluid, or decanting the drawn amount into a bag. In step 4450, additional diluent draw is calculated, for example, by multiplying the dilution ratio calculated in step 4445 by the fluid draw. The fluid draw is then subtracted from this product.

After step 4445, or if the concentration is acceptable at step 4435, then a syringe size is determined at step 4440. The determined syringe size is based on fluid draw and additional diluent. Then, at step 4455, the APAS determines whether the drug order is to be dispensed in an IV bag. If it is to be dispensed in an IV bag, then the APAS adds bag information to processing data, including information about the IV bag to use for dispensing.

After step 4460, or if it is not to be dispensed in an IV bag at step 4455, then the process data is added to the process data table, and the method 4400 ends.

In various embodiments, one or more drug tables can be used to determine the drug concentration. Such drug concentrations can be used to determine, for example, whether further dilution may be needed to complete the order.

An illustrative APAS can perform a method that includes an abstract series of defined steps with parameters. In some cases, the type of drug preparation that is to be performed by an automated compounding system like the APAS can be broken down into one or more of these discrete steps. With this approach, the APAS can accommodate a wide variety of processing requirements, and support multiple types of output products (e.g., syringes, bags).

In an illustrative method of FIG. 44, the steps of the method may include the operations of drawing, diluting, decanting, dispensing. Various combinations of such operations may be used to prepare drug orders using an algorithm such as that described herein. Drug preparations under this algorithmic method can fall into combinations of these four basic operations.

In some embodiments, the algorithmic method described above may be a default approach for implementing drug orders for the APAS. This method addresses some typical applications, and provides flexibility to handle fine resolution of quantity for a wide range of doses. Two additional illustrative processing methods that the APAS supports are described below. These methods can be invoked either through drug orders from the existing hospital order entry system, or by operator actions.

Three illustrative methods for drug order processing are as follows. A first illustrative method includes embodiments of the algorithmic method described with reference to FIG. 44. In preferred embodiments, this method may include a default method of operations of the device and generally covers standard preparations of drugs. A second illustrative method may be referred to as a lookup method. The lookup method may define commonly recurring alternative preparations instructions for a specific dose level and for which the APAS is trained. A third illustrative method may be referred to as a recipe method. The recipe method encapsulates the preparation instructions directly within the drug order or request. This method may typically be used where there is variability in how a drug order is to be prepared and dispensed, and/or where there are few commonly recurring instructions (e.g., pediatric, chemotherapeutic, or other applications for which drug processing may be tailored based on factors such as patient weight, surface area, or the like). The lookup and/or recipe methods may be advantageous, for example, in situations in which a pharmacist specifies drug order processing information (e.g., draws, dilutions, dispensing information) that falls outside of a normal processing range for an algorithmic method. These and/or other methods may be implemented alone or in combination.

In some applications, there may be a need to train the system to do something different for a specific drug at a specific dose level on a recurring basis. For example, the system may be trained to use predefined data instead of the algorithm method for a particular dose. The APAS may implement a method that uses one or more predefined preparation tables to define specific preparation requirements for a drug at a specific dose size. In this case, when the APAS receives a drug order, it can check the dose in the order against the predefined table. If it exists, then the predefined data can be used instead. There may be times when the hospital wants the algorithmic method to be used and other times when they want the predefined method used. For example, the hospital may have a protocol that calls for a 1 gram cefazolin dispensed in a syringe as the default in the algorithm, but sometimes the hospital may want the 1 gram cefazolin dispensed as a 50 ml IV bag. To support this, some embodiments of the APAS provide a method to specify a preference on the drug order, or allow the operator to specify, either for a batch or one or several orders in a batch, that this alternative preparation method applies. Whereas the default method needs information about the drug name, quantity and concentration, this method may receive information about other parameters to indicate whether alternative preparation methods (e.g., the lookup table) are to be used.

The recipe method may be particularly beneficial in cases with significant variability in the doses and the dispensing media (e.g., syringe, vial, IV bag, etc. . . . ) and concentrations. For applications such as pediatric and chemotherapy drug preparations, the dose sizes can vary depending on the patient (e.g., body mass, surface area, weight, etc.) There may be times where the drug order or the operators want to include specific ad hoc preparation information with the drug order. In this case, additional parameters in the label can define specific preparation requirements for that one drug order. The APAS can support a scripted recipe for the preparation. As an example, the order can specify details such as draw 10 ml of cefazolin 100 mg/ml, draw 20 ml of sterile water and dispense in a syringe. Another example may be to draw 10 ml of cefazolin and dispense it into a 50 ml bag of sterile water. As is described, the method can allow specific processing instructions to be included in the drug order itself. Therefore, the APAS may not need to use either the algorithmic or look up method. Specific encoded commands within the drug order can define that the recipe method is to be followed.

To control the drug process the APAS software, when executed by a processor, can cause pre-processing operations to be performed on the drug order as shown with reference to FIG. 44. Fluid transfer amounts can be calculated from the requested dose of a drug order, using the known concentrations of the drug vials listed in the tables of drug products the device has been trained to handle. This information can then be combined with the pharmacy's dispensing information which defines which doses can be provided in syringes and which doses can be provided in bags. This information may also be combined with the physical dimensional characteristics of the syringes to be used. In some embodiments, there may be a layer of interaction with the APAS operator where the drug inventory items to be used for a particular production run can be identified. They can be identified either using defaults or the operator may specifically input information about which items are to be used. In this interaction, the processing can identify inventory items, which can allow the APAS to calculate a total aggregate of drug product, vials, syringes, bags, and diluent to process the collection of orders. This total aggregate information can be communicated as a load instruction, or message, to the operator who can retrieve the list of items and place them into the device's inventory.

During the pre-processing step, the APAS can select processing sequences for each drug order. In an illustrative example, performing the method 4400 involves only a syringe draw. The example may be, for example, for a cefazolin order that is 1 G 100 mg/ml, where the vial units are in mg. The vial concentration is 100 mg/ml. This can be the result of steps 4405, 4410 and 4415. The method continues to step 4425 where the drug order quantity is scaled to the same units as the vial. This results in a drug request of 1000 mg. In step 4430, it is determined that the fluid draw is 10 ml. This is determined by dividing the drug request of 1000 mg by the vial concentration of 100 mg/ml. In step 4435 it is determined that the vial concentration is equal to the dose concentration. The APAS determines, in step 4440, that a 10 ml syringe is needed based on the fluid draw and the additional diluent. At step 4455, it is determined that an IV bag is not needed for dispensing. As such, the data includes the commands to get a 10 ml syringe and draw 10 ml from a vial. The data for the drug order is added to the process table at step 4465, and the method 4400 ends.

Another example of the method 4400 involves further dilution and dispensing into an IV bag. In this example, the drug order calls for a penicillin order that is 1 G sodium 6,000,000 mg, 500,000 mg/ml. The vial concentration is 500,000 mg/ml. This can be the result of steps 4405, 4410 and 4415. The method continues to step 4425 where the drug order quantity is scaled to the same units as the vial. This results in a drug request of 6,000,000 mg. In step 4435, it is determined that the fluid draw is 12 ml. This is determined by dividing the drug request of 6,000,000 mg by the vial concentration of 500,000 mg/ml. In step 4435 it is determined that the vial concentration is equal to the dose concentration. The method 4400 determines that a 20 ml syringe is needed, in step 4440, based on the fluid draw and the additional diluent which results in a total volume needed of 12 ml. The method 4400 proceeds to step 4455 where it is determined that an IV bag is required for dispensing. Step 4460 adds the bag information to the process data. In this example, a 50 ml bag of normal saline is needed. In step 4465 the data for the drug order is added to the process table. The data includes the commands to get a 20 ml syringe, draw 12 ml from a vial and add a 50 ml bag of saline. The method 4400 then ends.

Another example of the method 4400 involves further dilution. The example method 4400 can be, for example, for a clindamycin order that is 600 mg, 15 mg/ml with a 150 mg/ml concentration. This can be the result of steps 4405, 4410 and 4415. The method continues to step 4425 where the drug order quantity is scaled to the same units as the vial. This results in a drug request of 600 mg. In step 4435, it is determined that the fluid draw is 4 ml. This is determined by dividing the drug request of 600 mg by the concentration of 150 mg/ml. In step 4435 it is determined that the vial concentration is not equal to the dose concentration. The method 4400 then proceeds to step 4445 where a diluent ratio is calculated. In this example, the diluent ratio is determined to be 10:1. This is based on the ratio of the concentration of 150 mg/ml to the drug order of 15 mg/ml. In step 4450 it is determined that an additional 36 ml of diluent is needed for the drug order. This is determined by multiplying the fluid draw of 4 ml by the dilution ratio 10. The fluid draw of 4 ml is then subtracted from the result, 40 ml, and an amount of 36 ml of additional diluent draw is determined. In step 4440, it is determined that a 60 ml syringe may be used for the total volume of 40 ml. In step 4455 it is determined that an IV bag is not needed. In step 4465, the data for the drug order is added to the process table. The data includes the commands to get a 60 ml syringe, draw 4 ml from a vial and draw 36 ml of sterile water.

The system may independently calculate the amount of fluid, in milliliters, to be drawn, and the required size, in millimeters, of the target syringe, and what type and size of bag, if any, to dispense into. The end result of this processing can be a command sequence that represents steps to fill a drug order and the parameters of fluid transfer and syringe size. These processing commands may be stored, either temporarily and/or in the database, associated with a single drug order record for subsequent processing during production operations.

In the production planning stage, an example of which was described with reference to FIG. 42, the total aggregate of drugs and consumables for the drug order is determined so that inventory items can be selected. In various applications, the operator may provide inventory items selected through stored definition and/or user input, or through default definitions on what inventory items to use.

For example, the total aggregate of cefazolin for a production queue may be 100 grams across 90 doses. Therefore, a minimum of 100 grams of cefazolin may be provided in the inventory. As described above, there may be multiple sizes of vials. The operator can indicate which sizes and manufacturer contents can be used for the run. In some embodiments, this can be automated using default assumption on sizes, or optionally through an interface to a hospital inventory system. Pre-identification of the inventory can enable the system to perform appropriate validation checks during production operations. As an example, pre-identification may identify information that may later be used during a production verification check. A production verification check may include, for example, checking vial label information using machine vision pattern matching, optical character recognition (OCR), bar code scanning, or any combination of these or other techniques described herein.

In some embodiments, the process may involve identifying what drug inventory is to be used, and may include the sizes of drugs to use. This process may be at least partly automated. Automated identification may be overridden by operators in some embodiments. If there is more than one APAS cell, production queues can be assigned to a particular APAS cell. Required APAS carousel racks may also be identified.

After identifying inventory, the APAS cell can analyze the reconstitution processing requirements to create a series of commands stored in tables (e.g., in a database) for controlling the reconstitution process. Reconstitution control can involve high-level process commands with parameters that define a drug and a target concentration. The preloaded tables with trained drug and reconstitution data can be used to determine the required diluents and diluent volumes.

In some embodiments, this phase may generate a list of all the inventory items necessary for the production run, along with a complete set of processing commands for both reconstitution and drug processing. The APAS cell can also determine the racks and locations for each inventory item. This information may be sent for display, or may be printed, for review by the operators who can retrieve the items to load the APAS cell.

During this phase, the APAS cell may verify the inventory load requirements against the available rack compartments and can flag any issues where insufficient rack space is available to accommodate the inventory load. Further iterations may be performed on the inventory stock at this time. For example, the operator may have instructed the cell to use 100 small vials of cefazolin, which may exceed the capacity of the available inventory racks. In such a case, the production plan may be reduced to a level that can be accommodated by available rack space.

When a production queue has been pre-processed, the system may present to the operator a load map of items. The load map may indicate to the operator what drug, vial size, syringes, or bags, to place into inventory, and which racks may be required.

The operator may interact with the APAS software either at a remote user station 206, or directly at a terminal (e.g., a flat panel monitor 202) located near the APAS cell, for example, and may manually load the inventory items into the racks. In some embodiments, each rack may be bar coded, as shown in FIG. 14. A bar code reader may be used to confirm bar-coded items (e.g., medical items, medical containers) as they are loaded. The operator may indicate the contents of some or all locations to build a database of information on where in the cell each inventory item is located. This database may be used in subsequent phases, including in during production.

Verification of the drug vial via bar code may be performed, for example, as the vial is loaded into an inventory rack. This may be done, for example, by using a hand-held scanner at either the remote user station 206 or the in-situ loading 226 at the APAS cell 100. During the loading of racks outside of the APAS cell (e.g., at the inventory station), a bar code scanner may verify the rack type and unique identifier using a bar code label fixed to the rack.

In some embodiments, when the racks are loaded into the APAS cell, the doors can be closed, the carousel can be rotated, and each installed rack can be verified by type, serial number and location using the rack's bar code and a fixed bar-code reader located within the APAS cell. This process can be used to confirm what rack is loaded in each carousel location, and the process can allow the APAS cell to automatically determine the coordinates and motion profiles to reach each item.

Various embodiments may exchange data used to provide a demand forecast for medical items. Collected information from operations may be applied to inventory purchase decisions using appropriate software. Similarly, collected data may be used for invoice and billing functions.

In various embodiments, the APAS may perform drug order processing in which the software uses an algorithm and rules modified according to information regarding vials, trained products, and the intended output items (e.g., bags, syringes, vials, kits) to automatically determine fluid draw, syringe sizes, and product dispensing.

In an example, a drug order can be received on the hospital interface and is forwarded to the APAS for processing. The drug order can define the drug name, dose size, and/or required drug concentration fields that the software can use to determine processing requirements. The drug order may also contain other information, (e.g., patient names, bed locations, patient ID, notes) that may appear on a label on the prepared drug product. This information may appear on the drug order but is not used by the APAS. For example, a nurse may check a patient ID on a ward or for billing purposes, separate from the APAS. To automatically fill the orders, the APAS software can analyze the orders and translates the request into a series of processing steps that identify the required drugs, fluid transfers, and syringe and/or bag products. The APAS cell can accommodate off-the-shelf IV products and standard syringes to perform fluid transfers within the cell. Syringes, which have needles preinstalled, can be placed into inventory and then moved as needed to one of two syringe manipulators 322, 334. The syringe manipulators 322, 334 include grippers and motor-controlled sliders that, under software control, can hold a syringe and articulate the syringe plunger to perform the required fluid transfers. The syringe manipulators 322, 334 can hold the barrel of a syringe, plunge a vial or bag onto the syringe's needle, grip and hold the plunger stem of the syringe and move the plunger stem up and down to cause fluid transfer via the needle.

During the production run, the APAS cell may retrieve this collection of processing steps for a given drug order. In some embodiments, the system can read from the data that indicates a drug is required, what fluid amount (e.g., in ml) is required, and what type or size of syringe is required (e.g., in ml). The software can check the device's available inventory to find an appropriate syringe size, and can retrieve the syringe physical characteristics from the appropriate table. The physical data can be used to determine dimensions for a syringe gripper (e.g., plunger button diameter, barrel exterior diameter, overall length, extension of the needle, maximum fill, and interior diameter). The APAS software now has information about the top level fluid transfer demands and the dimensions of the syringe to be used. An algorithm can then be used to translate the required milliliters of fluid draw into a number of millimeters of plunger stem travel for the particular type of syringe selected. In some embodiments, this calculation may be accomplished using the interior diameter of the syringe to determine the length of the interior column of fluid, which equates to the required plunger stem pull. The software may, for example use manufacturer average interior diameter information to minimize the effect of manufacturing tolerances on the interior diameters. In some embodiments, the software may add a default offset equal to one half of the interior diameter tolerance to compensate for syringes that might fall on the low side of the average. In some embodiments, a dynamically adjustable offset may be used to fine tune the compensation used for syringes. The dynamically adjustable offset may be based upon statistical analysis of recorded syringe measurements. For example, a syringe may be weighed before and after fluid fill. Use of this data over time can allow for the adjustment of the amount of compensation based on the history of the prepared doses. The APAS software may control the movement of the syringe manipulator slider to achieve the desired linear pull which is equal to the desired fluid volume. The filled syringe can then be weighed to confirm that the actual weight is consistent with the expected weight. This can be done with a tolerance reflective of the range of interior diameter variations. If the weight is within an expected range, then the system may cap and label the syringe before depositing it into an output bin for retrieval and dispensing by the operators. In various embodiments, the steps described above may be performed in a different sequence, include additional steps, or be altered to achieve similar objections.

In an illustrative example, prescriptions may be assigned in various orders, such as first-in, first-out, or prioritized according to a delivery schedule. The system may determine at various points, including before processing, a required size for one or more vials, syringes, and/or IV bags to process a prescription. Some prescriptions may be designated to be processed in separate filling, fluid transfer, and/or compounding processes, and/or assigned a collection receptacle when completed, for example. Outputs may be provided in vials (which may be recapped, for example), IV bags, or syringes containing drug orders in pill, tablet, capsule, or other solid, semi-solid, or liquid form. In some embodiments, the APAS may include a pill counter and/or dispenser. The outputs may be dispensed in combination with other items as a kit of medical items. For example, a syringe may be packaged with another syringe that is to be administered to the same patient at the same time. As another example, one or more IV bag preparations may be packaged as a kit with a syringe for a particular surgical procedure that may be performed in the future. In yet a further example, a syringe may be provided with a needle in a protective sheath in a kit. In still a further example, auxiliary materials (e.g., swabbing materials, disinfectant, etc. . . . ) may be included in a kit as appropriate for a particular patient or procedure, for example. Kits may be packaged, for example, in sterile plastic bags, shrink-wrapped, sanitized with pulsed ultraviolet light, or otherwise prepared for storage or future use. Appropriate packaging and labeling equipment may be provided in the compounding chamber, in the storage chamber, in a clean tent, or external to an APAS. Computers associated with the APAS may receive and process requests for kits in combination with preparing pharmaceutical compounds.

Some systems may include one or more web server and support web browser interfaces that include information input, control, and reporting functions for the APAS. Web servers may provide, for example, a gateway to the Internet or other wide area network. In one embodiment, a web server may be used to remotely authorize compounding operation. Using various protocols (e.g., HTTP, FTP), a remote node may transmit an authorization signal to an APAS. In response, the APAS cell may perform the requested compounding operation upon validation of the authorization signal. Some web browser embodiments may include, for example, modules developed using HTML, XML, JAVA, applets, servlets, or in combination. Applications, such as web portals, may be used in combination with various programming languages to support functionality as described herein.

Features of the APAS may include the flexibility to handle a variety of drugs in a variety of sizes, the ability to prepare doses in a range of IV bag and syringe sizes, and the ability to prepare these items in any order or to intermix dose preparations.

Achieving this flexibility may involve a robust and open system and incorporate features and methods that make the system open. Various embodiments may provide one or more benefits, such as the abilities to:

handle a drug in different sizes of vials;

perform drug reconstitution with different fluids and different levels;

support various mixing profiles for reconstitution;

support various mixing durations;

use a drug from multiple vendors, for example, cefazolin from two or three vendors;

handle a range of sizes for IV bags; or handle a range of sizes of syringes and support multiple vendors.

To support drug order processing, an illustrative embodiment of the APAS implements several data tables in a relational database. Illustrative data tables are described below. The data model represents a unique feature of the APAS design that can allow the APAS software to be highly flexible thus allowing the APAS to handle vials from multiple manufacturers, varying in sizes, each size having possible multiple concentrations and reconstitution profiles. It also can allow for site specific customization of the final form of the product dispensed. For example, the output container for a drug order may vary as to whether the patient is a child or an adult. Therefore, a pediatric hospital may configure the default container for a specific drug order to be an IV bag where a non-pediatric hospital may configure the default container for the same drug order to be a syringe.

To illustrate the overall flow of syringe processing, an overview of the data tables is described below. In an illustrative database of the system, each drug may have a 1 . . . N relationship with a drug manufacturer. For example, Cefazolin may be associated with two manufacturers (e.g., Pharmaceutical Partners of Canada Inc., and Novopharm Ltd.). Each manufacturer has a one to many relationship to vials. For example, Pharmaceutical Partners of Canada Inc. may be associated with vial information such as: DIN 2237140 and 10 G Vial; and, DIN 2236926 and 50 mg Vial. Novopharm Ltd. may be associated with vial information such as: DIN 2108135 and 10 G Vial; and, DIN 2108127 and 1 G Vial. Each vial record may store information about, for example, physical characteristics, such as dimensions, tolerances, and weight medical containers. In further examples, each vial record may be associated with information about a one to many relationship to a reconstitution profile. For example, DIN 2237140 and 10 G Vial may be associated with reconstitution profile information such as: 100 MG/ML, add sterile water 96 ml; and, 200 MG/ML, add sterile water 45 ml.

A drug used in the APAS may be trained in the APAS cell. Physical characteristics and dimensions can be used by the APAS in vial handling, for example. The physical characteristics and dimensions may be used by the robotic arm to calculate offset. The physical characteristics and dimensions may also be used by the gripper on the robotic manipulator and the syringe manipulator to determine expected diameters for various vials and syringes trained in the APAS. Also expected weights, in milligrams, may be used for vials, syringes and IV bags prior to filling. Tolerance levels may be included along with each physical characteristic and dimension, and expected weight. In some embodiments, the dimensions may be obtained from gripper feedback in the APAS cell for vials and syringes.

An operator may be free to choose any of the trained items in the APAS to load into the APAS cell inventory. The stored information for the trained inventory items may be used to determine the selection. For example, the APAS is trained for 1 g and 10 g cefazolin. Therefore, the operator can choose between a 1 g and 10 g vial of cefazolin.

In some cases, the system may perform compounding operations by drawing from multiple sizes of a drug in stock. For example, the storage racks may simultaneously store Cefazolin 10 gram bulk vial (Novopharm DIN 02108135) and Cefazolin 1 G (Novopharm DIN 02108127). In some embodiments, the selection may be determined or confirmed by an operator during preparation and/or loading. In an illustrative example, if fifty 1 Gram vials are nearing their expiration date, pharmacy staff might elevate the priority level based on expiration date, and the system might respond, for example, by incorporating the fifty 1 gram vials into load maps, for example, sent to the operator.

In some cases, the system may perform compounding operations with a single drug that may be sourced by any one of multiple vendors. For example, inventory may include Cefazolin 10 gram bulk vial supplied by Novopharm (DIN 02108135) or by Pharmaceutical Partners of Canada Inc. (DIN 02237140). In a system database, compounding profiles may be adapted to identify the proper drug for each source, and complete compounding operations using either source. In some cases, drugs from both vendors may be stocked in inventory at the same time.

In some examples, one drug may be associated with multiple reconstitution profiles. A particular profile may be selected from the multiple profiles based on the requested drug order dosage. For example, Cefazolin 10 Gram bulk vial (e.g., Pharmaceutical Partners of Canada Inc., DIN 02237140) may be associated with two drug profiles for injection. A first profile to produce 200 MG/ML doses may include diluting with 45 ml of sterile water. A second profile to produce 100 MG/ML doses may include diluting with 96 ml of sterile water.

An illustrative trained drug table lists drugs trained in the APAS. The drug table lists the generic drug names, and can have a one-to-many relationship to the drug manufacturer's tables. For example, the drug Cefazolin can have multiple vendors. This table tells the APAS software what drugs are trained for handling by the device. This table can be consulted to confirm that APAS has been trained to handle a drug.

The drug table may include a list of all of the drugs for which the APAS is trained to handle. The table can list a generic drug name, which can be available in multiple sizes and/or sourced from multiple manufacturers.

An illustrative drug manufacturer's table can store the information related to a particular drug manufacturer. It can include the drug name, and the drug identification number. The drug identification number indicates sizes. In some embodiments, this table can store multiple drugs and/or multiple sizes of drug vials from multiple vendors. For example, a vendor (e.g., Novopharm Inc.) can provide 10 gram and 1 gram vials of Cefazolin.

Figure 45:
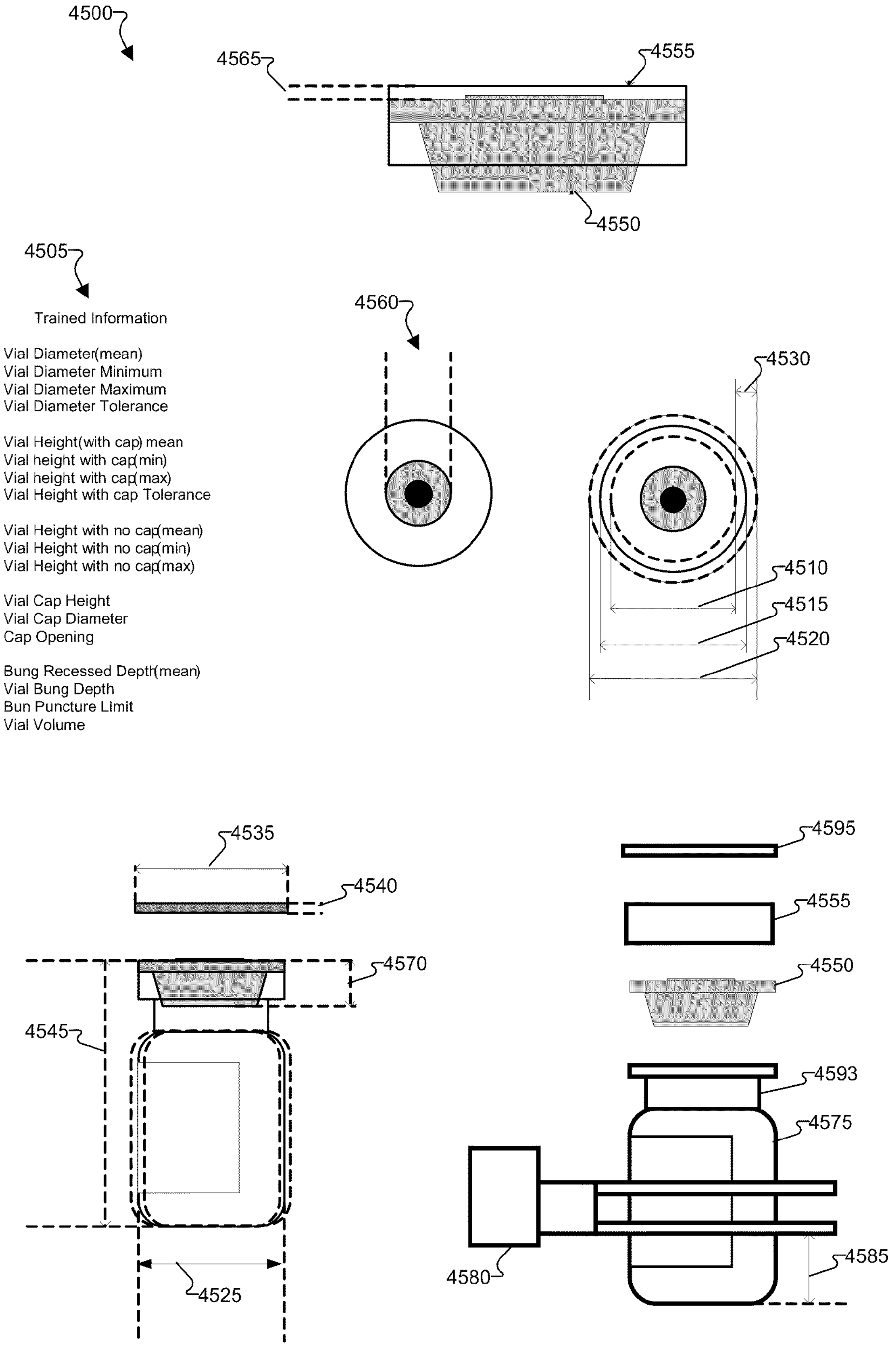
FIG. 45 shows illustrative vial characteristics for vials.

FIG. 45 shows illustrative vial characteristics 4500 for vials that are used in an APAS cell. A drug reconstitution table stores information about how to reconstitute a particular vial. For example, the reconstitution fluid volume for Novopharm 10 Gram Cefazolin can differ from Sabex Inc. 10 Gram Cefazolin. A specific drug vial that requires reconstitution may have at least one reconstitution table entry, with multiple reconstitution entries possible for each vial based on concentration. For example Novopharm 10 gram Cefazolin vial can be reconstituted with 45 ml of sterile water to achieve 50 mg/ml concentration, or that same vial can be reconstituted with 96 ml or sterile water to achieve 100 mg/ml concentration.

An illustrative drug vial table 4505 stores the dimensional information for a specific vial. Dimensional information for a specific vial may include vial diameters 4510, 4515, 4520, and 4525 as well as a vial diameter tolerance 4530. It may also include a vial cap diameter 4535. Dimensional information for a vial may also include heights such as a vial cap height 4540, and a vial height 4545. A vial can include a vial bung 4550 which can include a bung crimp cap 4555. The vial bung 4550 can include a cap opening 4560 which is located on the top of the vial bung. A bung recessed depth 4565 can be defined as the distance from the bung crimp cap 4555 to the top of the bung 4550. A bung depth 4570 can be defined as the distance from the top to the bottom of the vial bung 4550. A vial 4575 can be held in a gripper 4580 where the gripper finger height 4585 can be defined as the distance from the bottom of the vial to the bottom of the gripper fingers 4580. The vial 4575 can include a vial label 4590, a vial neck 4593, and a vial cap 4595.

The drug vial table 4505 can capture the diameters, heights, dry weight, reconstituted weight, bung puncture limits, pointers to trained vial label images and label areas of interest for pattern matching and parsing masks for bar codes. This may be implemented as a one-to-one table with a drug manufacturer table entry, for example.

Vial labels may be trained by using a software interface and camera to take images of the vial label, and unique (e.g., information rich) attributes of the vial label are identified. These unique attributes may form search regions for pattern matching. The search regions can include any feature (e.g., a drug name, symbols, numbers, or a bar code). These search regions can also include a pattern to be stored and to which subsequent vials may be compared. When assessing a vial against the trained patterns, algorithms may assign a score to each region to indicate how well a given vial matches the predefined trained patterns. Thresholds may be used to define what an acceptable match is. To be validated, the vial can have a very high match to the predefined pattern. The thresholds can allow some amount of tolerance to be built into the system for things like small scratches on the vial label as are likely to happen in day to day pharmacy operations.

Using multiple search regions per vial label may increase the robustness of the method and can reduce the probability of a false positive. For example, two drugs from the same manufacturer may have labels that have a similar look (e.g., fonts, layout, sizes), vial sizes, and drug names with some common characters. For example, the drugs cefazolin and cefoxitin both come in 10 gram vials with similar physical dimensions, and since they come from the same manufacturer, may have similar labels. In this example, if the pattern matching software was expecting a cefazolin vial but was presented a cefoxitin vial the pattern matching may report an approximate 40% match between the two different vials. This may be rejected by the method as not meeting the threshold score value. By combining additional regions, such as the drug code, and some other key words unique to the vial, and not relying on any single region, confidence in the pattern match may be improved.

During the process of training the cell to handle a drug, when vial label regions are defined, the cell software can step through all the other trained vial patterns to ensure that no vials are ambiguous. If there is ambiguity, additional regions can be added to the trained pattern set for that vial until any ambiguities are removed.

A drug dispending table can determine the processing requirements. This implementation can allow the software to be customized to how each hospital wants to dispense medications. For example, some hospitals may select syringes for certain medical items, whereas others may select IV bags for similar uses. Selection criteria for the type and format of some products can vary according to installation protocols that may be site specific. The difference in the protocols may be related to the patient receiving the drug product. For example, children in a pediatric hospital may receive a drug product in an IV bag while adult patients in a non-pediatric hospital may receive the same drug product in a syringe.

In another example, one hospital may have a protocol that calls for 200 milligrams of Gentamicin to be dispensed in a syringe, while 250 milligrams or greater is dispensed in a 100 milliliter bag.

An illustrative dispensing table identifies a drug, its dispensing information (e.g., syringe, bag, vial), and any appropriate dose threshold or other criteria for selecting between containers, and what container type or size. Such selection criteria may apply to inputs, outputs, and/or intermediary products. Some embodiments may specify the format type of cap (e.g., syringe cap) to apply to the output. Certain caps may be color coded, tagged (e.g., RFID), and/or provide certain use features (e.g., tamper evidence, hook, easy removal) that may be specified by an operator or by a system default parameter.

Figure 46:
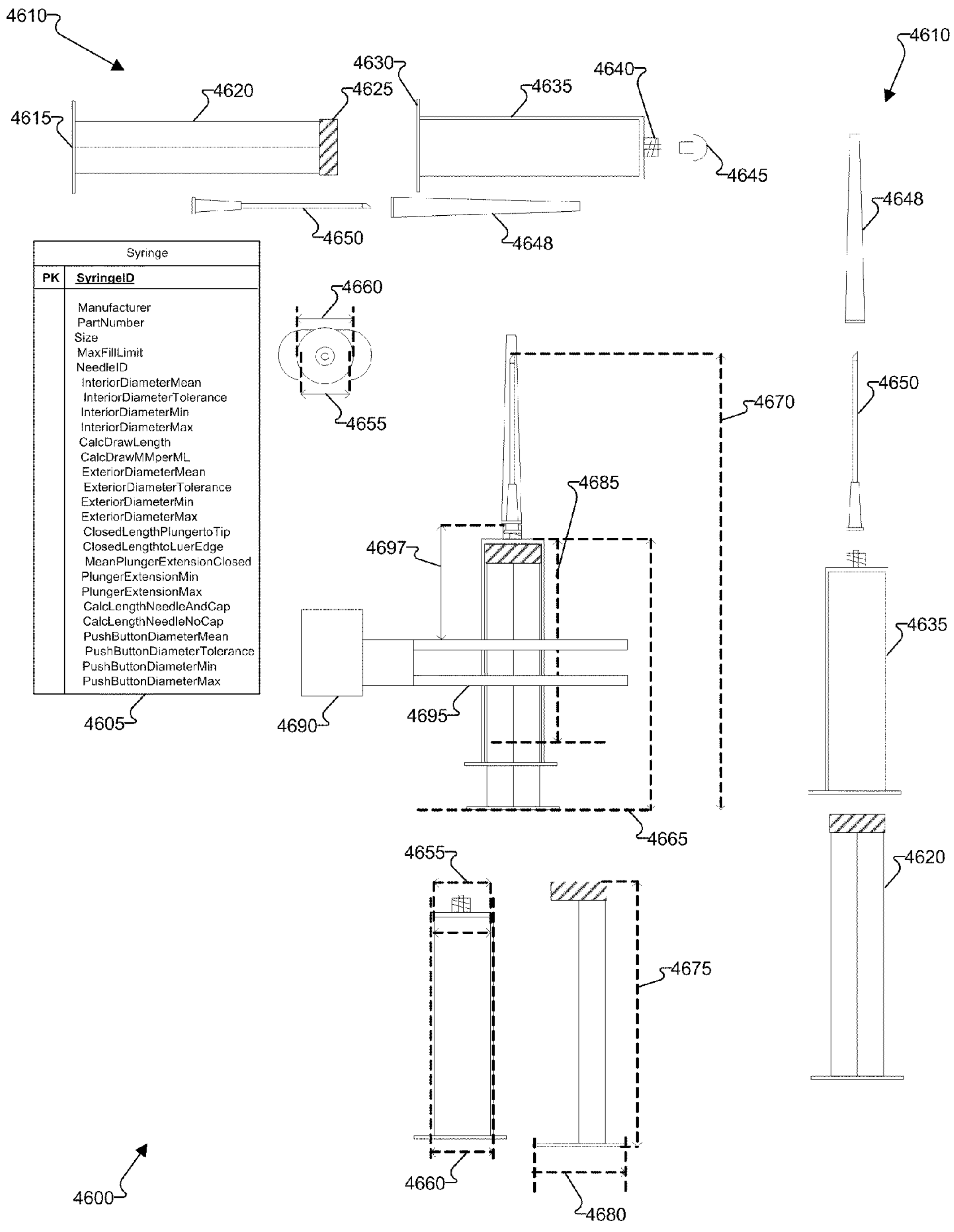
FIG. 46 shows illustrative syringe characteristics for syringes.

FIG. 46 shows illustrative syringe characteristics 4600 for syringes that may be used in the APAS cell 100. A syringe 4610 includes a plunger flange 4615, which may also be referred to as a plunger stem button. The plunger flange includes a plunger flange diameter 4680. The syringe 4610 also includes a plunger stem 4620, and a plunger 4625. The syringe also includes a barrel flange 4630, a barrel 4635, a luer lock 4640 and a syringe cap 4645. The syringe also includes a needle 4650 and a needle cap 4648. The syringe 4610 can be assembled as shown with the needle cap 4648, the needle 4650, the barrel 4635 and the plunger 4620.

In general, an APAS may use off the shelf consumables or inputs. The APAS cell may accommodate syringes of different sizes from different manufacturers. The APAS cell may include predefined information related to the characteristics of the syringes to be handled. Correctly performing fluid transfers for reconstitution, syringe filling, and decanting can involve information about the syringe's physical properties. The physical properties can include dimensions such an interior diameter 4655 and an outer diameter 4660. The interior diameter 4655 can be used for the calculation of travel to complete the fluid transfer. Other properties can include the maximum fill allowed which limits the maximum extension 4685 on a syringe plunger 4625. Syringe information can also be used for syringe manipulation within the APAS cell. This may include various syringe lengths, and exterior diameters for handling with the various grippers in the APAS cell. Syringe lengths can include a syringe closed length 4665, an overall syringe length 4670, and a plunger length 4675.

FIG. 46 shows a gripper 4690 with fingers 4695 that can be used to grip the syringe. A grip distance 4697 can be considered to be a distance from the top of the gripper fingers 4695 to the top of the luer lock 4640.

Manufacturing tolerances can impose ranges of uncertainty on some syringe dimensions. This may be taken into account by the APAS cell. The interior diameter used for fluid transfer can use a manufacturer's data minimum and maximum values to determine a mean (i.e., average) value.

An illustrative syringe table 4605 can store syringe information, including dimensional data, for each syringe that the APAS cell is trained to handle. Manufacturer, part number, and syringe size can distinguish the syringes. The characteristics of each syringe that the APAS cell is trained to handle can be defined in the syringe table 4605. The dimensional characteristics may be acquired by measurement or from external input so that the APAS cell can properly calculate the fluid draws, and the resulting millimeters of travel to achieve a required fluid transfer. The amount of travel of the plunger stem to achieve a given fluid transfer can be a function of the syringe's interior barrel diameter.

The syringe table 4605 may include pre-loaded manufacturer data on the syringes. A configuration file can identify which syringes are in use in a hospital. If the hospital changes suppliers of syringes, then maintenance staff may change the configuration file. In some embodiments, the APAS can be hard coded or otherwise incapable of receiving user input syringe information. For example, syringes may be identified uniquely by measurement of an outer diameter of the syringe barrel and a syringe plunger using feedback from the gripper on the robotic manipulator. In some embodiments, operators of the APAS may not provide syringe information to the system, as the syringe size to use is determined algorithmically by the software. In some embodiments, a selected syringe may be verified by one or more automated measurements, such as barrel diameter, plunger diameter, machine vision with pattern match, bar code, weighing, OCR, or any combination of these and/or other techniques described herein.

To support various labeling requirements from different hospitals, some embodiments may provide a flexible method that supports easily changing the contents of labels. The APAS may implement a method for output label definition that allows any site to fully customize the labels, and to easily change the label content and layout. Data content in the label can include contents from any field in any table in the APAS database to be included in the output labels. This may include defining output labels as a series of accessible lines. Each accessible line can have a definition of the X and Y offset from the bottom left of the label. This can allow for customization of the location of the line on the printable space of the label, and can also allow for a variable number of lines, up to the maximum allowed by the physical footprint of the label. Each report line can point to or reference a report text field to define the format and contents of the line. The report text field can define a variable number of parameters, which may include: a variable number of parameters to appear on the line; the database table field names of these parameters; SQL Select Statement (includes table name); and, format information (e.g., font, font size, height).

Embedding a SQL statement and building a query string from the parameters can allow for the accessing any field in any table if it is of interest to include on the output product label. This can allow for quick modification of the output label to meet the requirements of a facility, and may also be used for testing and/or troubleshooting.

As can be seen from the sections on trained items, each dimension of trained inventory can involve a dimensional tolerance. Additionally, there can be tolerances on the APAS cell for off the shelf and manufactured items. These tolerances can contribute to a cumulative uncertainty in information about, for example, position of containers relative to the robotic manipulator and/or locations in the system. Because of the variability in dimensions, one or more independent checks may be incorporated into loading, retrieving, dose verification, and/or other operations involving inputs, outputs, and/or intermediate products to perform confirmations.

Tolerances in medical containers may be reflected in various measurements of dimension, weight, and volume. In one example, tolerances for measurements of 10 vials of a drug from one manufacturer with vials from 5 different lot numbers, may show about 2.5% variation in measured diameters and about 1 mm variation in the diameter of the vial. In another example, weights of 10 vials may show about 1 gram of variation. In yet another example, weights of 6 empty 60 ml syringes from the same lot number may show 1.2 grams of variation. In still another example, weights of 6 syringes after filling to the 10 ml gradient line may show about 0.24 grams of variation, which is about 2.4% variation in the content.

Figure 47:
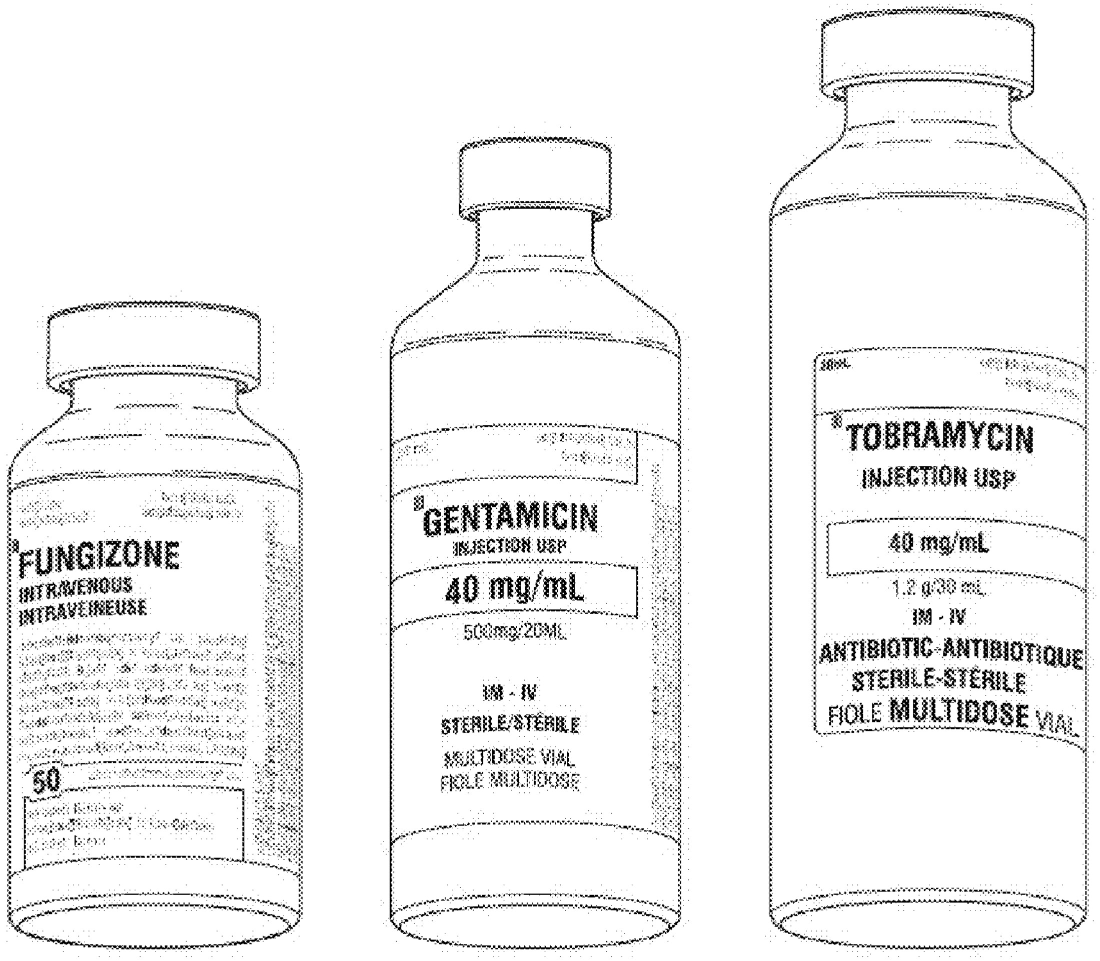
FIG. 47 shows three different-sized drug vials.

FIG. 47 shows three different vials of drugs of various sizes. Ambiguity in vial sizes may exist where many different vials have similar diameters. Therefore, some form of confirmation of vial height (e.g., a vision system or edge detection) may be included in case there are manufacturer changes in vials.

In one implementation, a set of drug orders or requests may be passed to the APAS cell for analysis and a list of required drugs is prepared. An operator can take the list and retrieve the correct inventory. The operator's check can be the first verification that vials are stored in positions on a serial numbered rack. The rack can then be placed onto a carousel at a known location for the APAS cell to pick up via a robotic arm 506, shown with reference to FIG. 5. In another embodiment, the inventory retrieval, rack loading, and or checking may be partially or entirely automated, such as in an automated storage facility.

Figure 48:
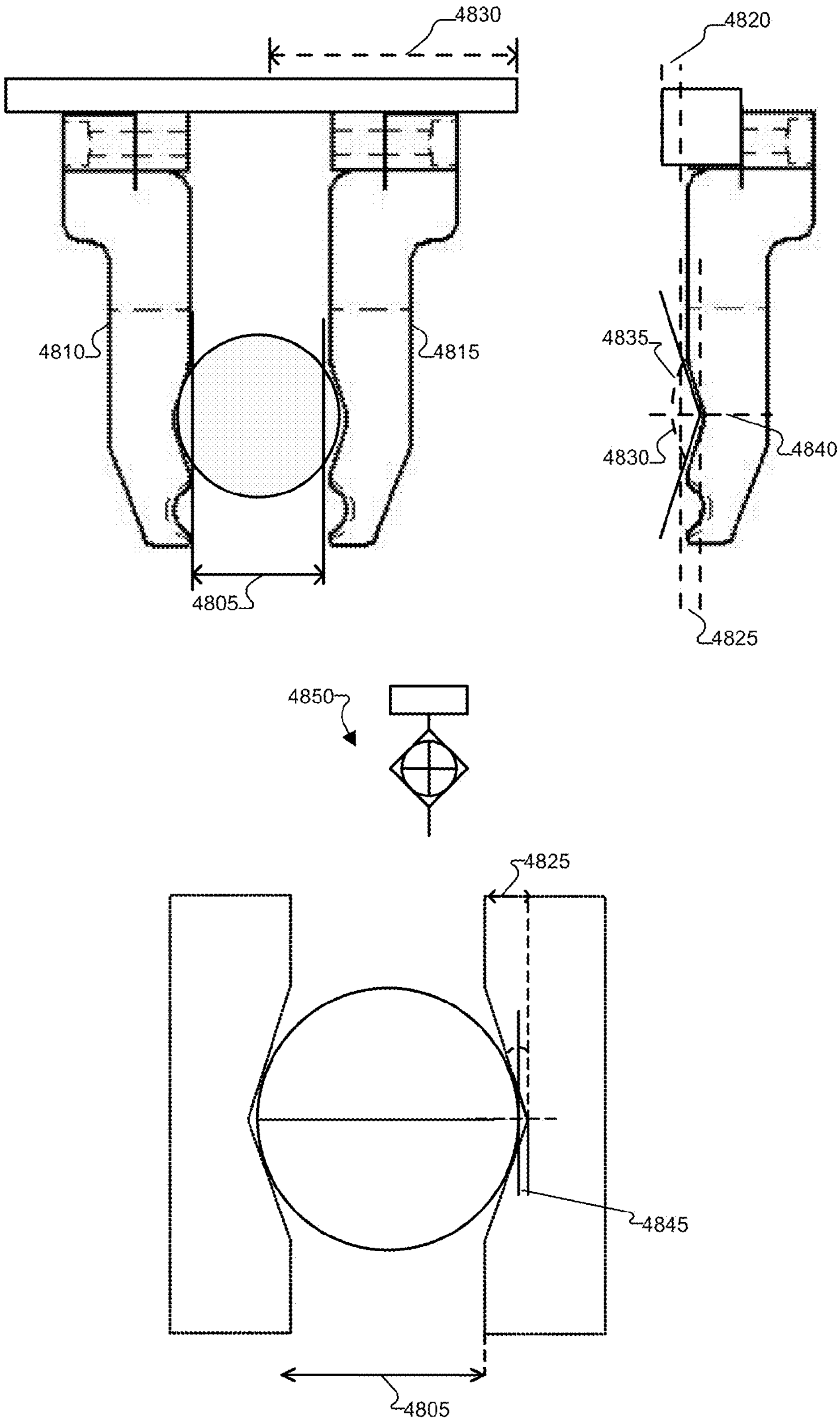
FIG. 48 illustrates a use of gripper information to verify a vial.

FIG. 48 shows how gripper information can be used in vial confirmation in an APAS cell. The robotic arm 506 is equipped with a gripper 1000 with movable fingers 4810 and 4815, as shown with reference to FIG. 10. The APAS cell control software can access the predefined and stored dimensions of the vials (e.g., exterior diameter and tolerance), coordinate information for the carousel, and the numbered rack. Through one or more motion controllers, the APAS cell can command a series of robot and gripper movements to extract a vial from the inventory system. The predefined vial data can include a mean exterior diameter of the vial, along with a tolerance based on minimum and maximum diameters derived, for example, from measurements of a sample set of vials. The gripper, having fingers 4810, 4815, can be opened to a gripper distance 4805, which is greater than the maximum diameter of the vial to accommodate the required vial size. A maximum travel 4830 can be defined for each of the gripper fingers 4810, 4815. The gripper can then be commanded to close the fingers 4810, 4815 together in a controlled (e.g., constant) torque using, for example, a current mode motor control to cause the gripper fingers to close with a set amount of torque against the vial body. The gripper may have, in some embodiments, a sensor (e.g., encoder, resolver, linear potentiometer, linear encoder, pulse counter, etc. . . . )

coupled to communicate position information over the serial interface, which can provide gripper position information back to a controller (not shown). The software in the controller may monitor the griper to determine when the fingers both stop moving. This can be determined when the gripper has stopped or exceeded a current limit, or when the position information stops advancing. The software can then read the positional information provided to it by the serial interface.

Attributes of the gripper finger 4815 include a gripper finger offset 4820, the depth of the gripper finger V notch 4825, and an angle of the V notch. The angle of the V notch can be characterized as an angle of the V notch 4830 from one side of the notch to the other as well as an angle of the V notch 4845 relative to a center line 4840. In an illustrative example, dimensions for the gripper finger 4815 can include the depth of the gripper finger V notch equal to 2.93 mm. The V notch angles can be 72 degrees for the V notch angle 4845 relative to a center line 4840 and 144 degrees for the V notch angle 4830 from one side of the notch to the other. Another attribute of the gripper finger 4815 can include the vial edge to vertex 4845. For example, this dimension can be 18 degrees.

A fully closed gripper is shown in 4850. For example, minimum travel for the gripper can be −½ mm (e.g., by offset) and maximum travel for the gripper can be 68 mm.

Figure 49:
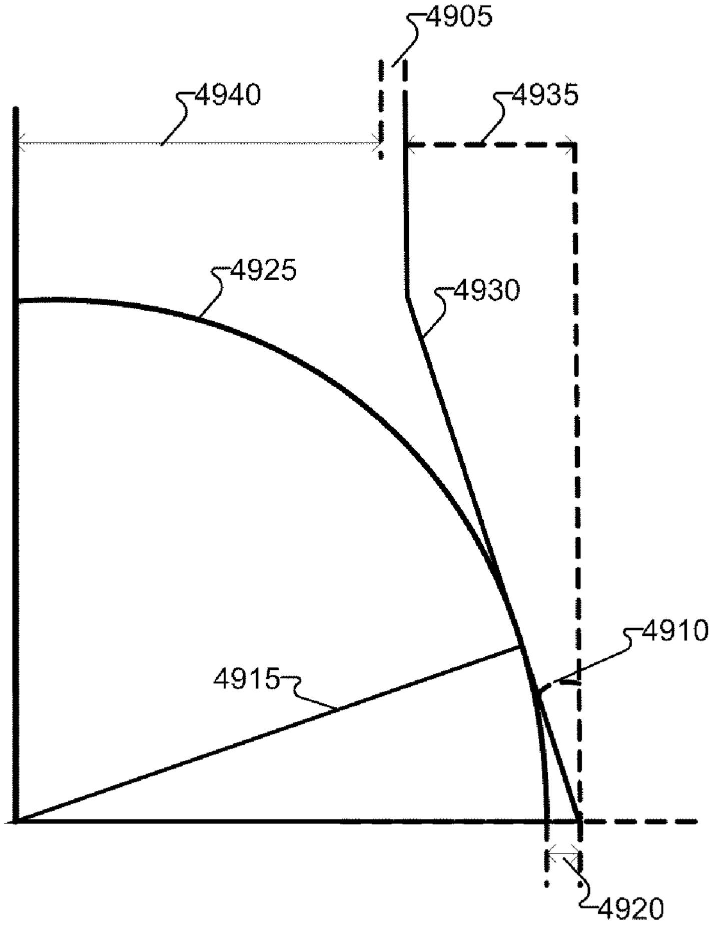
FIG. 49 illustrates vial diameter confirmation using gripper finger positional feedback.

FIG. 49 illustrates illustrative diameter confirmation of a vial using gripper finger positional feedback. In an illustrative system, an algorithm in the software can relate the gripper finger distance to the vial diameter. Each finger can have a v-notch to engage the vial, where smaller vials sit deeper into the notch and therefore the gripper finger positional feedback has to be translated to vial diameter. The position information from the gripper 1000 and the calculated diameter of the vial in the gripper can then be compared to the expected diameter with predefined tolerances. This combination may provide confirmation as to whether or not the vial diameter is consistent with the expected diameter within tolerances.

In the event the gripper fingers close more than expected or do not close enough, the wrong vial may be in the inventory location, or a vial may not be present at all. This step can be used to confirm that the vial is consistent in size with the expected contents, and therefore the cell can proceed to the next steps in the process. If the vial diameter is not consistent with the expected diameter, the system may identify an error condition.

In an illustrative embodiment, a vial fits symmetrically in the fingers of a gripper. The fingers can engage the vial at four tangent points that can limit the depth of travel. The vial can sit in the V notch and form a gap from the edge of the vial to the vertex of the V notch 4920. The length of the gap is relative to the radius of the vial. The angles forming the V notch are preset based on finger geometry. There may be different finger types with different angles. The fingers can be mounted with an offset relative to gripper travel. FIG. 48 shows a vial outline 4925, a gripper finger outline 4930 and a depth of a V notch 4935.

In illustrative embodiments, gripper travel may be characterized approximately by the following equation and related aspects are shown in FIG. 48 as gripper travel distance 4940.

$$\text{Gripper travel}=2r-(2(dV-x)-Fo)$$

Where:

Fo=a predefined finger geometry (4905)

Ø=angle of V notch (4910)

r=radius of the vial (4915)

c=r/cos(Ø)

x=r−c (4920)

dV=depth of V notch (4935)

In some cases, the gripper fingers can make contact on the circumference of the vial or syringe barrel. The gripper feedback distance can relate through an algorithm to the actual diameter of the vial or syringe so that the APAS cell can confirm that the diameter of the held object falls with the expected ranges. FIGS. 49 and 48, as described above, illustrate the use of the fingers in the verification of the diameters.

The diameters of vials and syringes can vary with manufacturing variations. The gripper fingers can have manufacturing tolerances as well as gripper mounting and alignment tolerances, all of which may affect the measured gripper distance of diameter. An acceptable variance threshold setting may be defined in the syringe data to accommodate such tolerances.

All of the dimensions of the gripper fingers that affect the translation (e.g., angle of the V-notch, the depth to the vertex as shown with reference to FIG. 48) can be parameters that are stored in data tables. When the fingers are changed in the APAS cell, these parameters may need to be updated, and a calibrated cylinder can be used to adjust the parameters to accommodate manufacturing variations.

Figure 50:
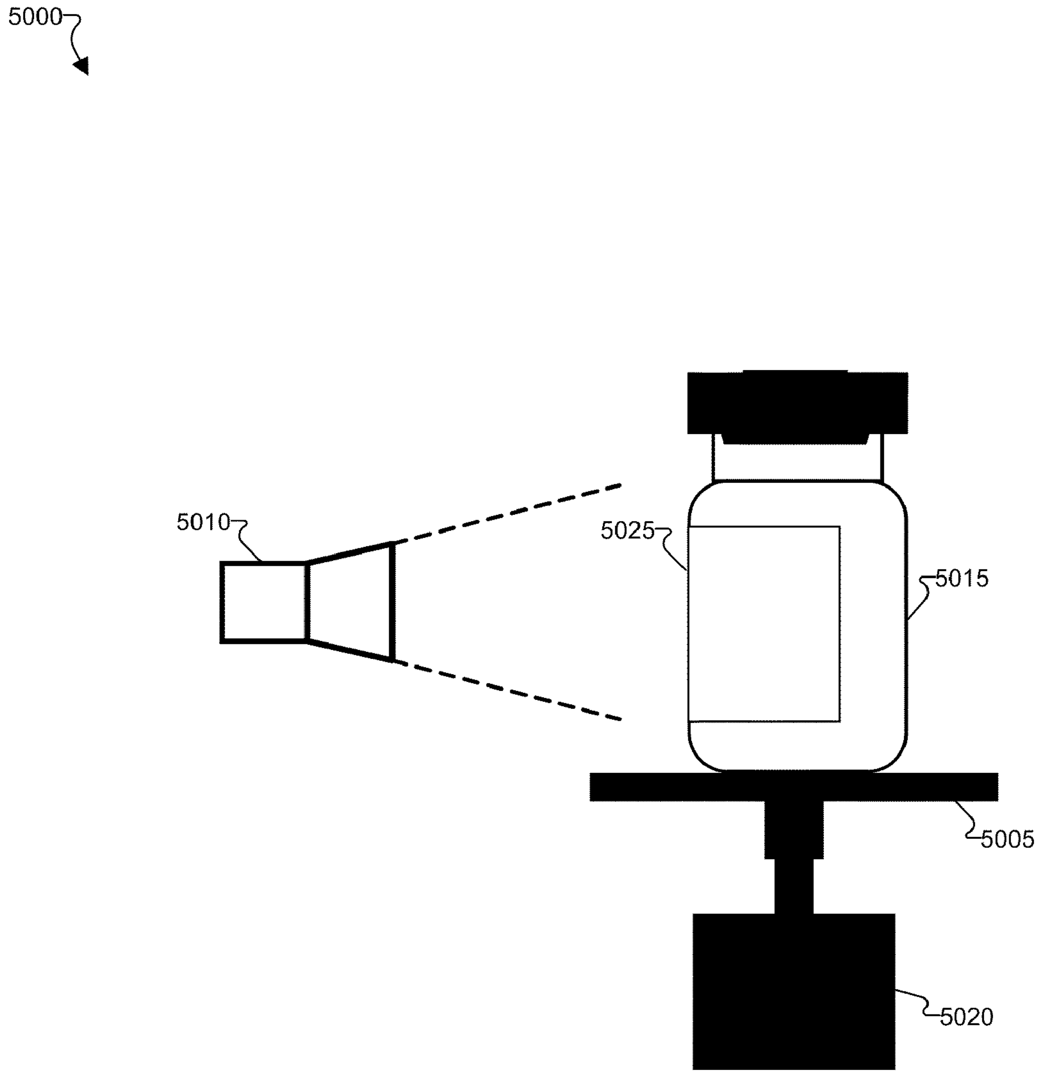
FIG. 50 shows an illustrative vial identification station.

If the system confirms that the vial diameter, based on measurement by the gripper fingers, is consistent with the expected diameter for the vial, the APAS cell control software may command the robot to convey the vial to an illustrative vial ID station 5000 as shown in FIG. 50.

The vial ID station 5000 includes a rotating platform 5005, a camera system 5010, lights (not shown), and a processor (not shown) to execute pattern matching software. In an illustrative method, a robot can place a vial 5015 on the center of the platform 5005, and the APAS cell software can command the motion control hardware 5020 to begin rotating the platform 5005. As the vial 5015 rotates, the camera 5010 can take images of the vial label 5025. The images can be passed to pattern matching software that compares the areas of the vial's label to a set of predefined and trained images for that drug. The areas can include any unique feature of that vial label, but may usually include the drug name, the drug manufacturer, and/or the drug code (e.g., NDC or DIN). The vial 5015 may be rotated through one or more revolutions as the pattern matching software checks each image for matches of the key label fields. One or more threshold settings in the software can allow for rating the match between the vial images and one or more trained pre-defined images. The ratings can correspond to a pass or fail score based on the thresholds. To pass the pattern recognition, there can be a sufficiently good match to one or more of the defined fields. In preferred embodiments, at least two unique patterns per label may be used to identify a medical container (e.g., vial, syringe, IV bag). The APAS cell may store the images of the vial ensuring that the key fields are captured, as well as the vial's lot number and expiration date. The software can then create logical links to associate the images and the drug orders that use the vial. This can allow for the ability to preserve information for auditing a record of vials used to process any drug orders.

An additional feature of pattern matching software may be to allow recognition of bar codes in an image. An illustrative method may include performing a pattern match on one or more features of one or more images of a vial. The pattern match may be combined with reading a bar code from one or more of the vial images, if one is available. The combination can provide an additional measure of robustness for vial verification.

If the vial 5015 does not pass its pattern matching, the vial 5015 can be rejected and the operator may be notified. The APAS cell may then attempt to retrieve another vial from the inventory system. The system can limit the number of retries. If there are multiple consecutive failed validations, it may indicate a rack load error, for example.

Once the vial's label 5025 has been verified, the robot can transport the vial to a scale where it can be weighed and the vial's weight can be compared to the expected weight for that vial based on the pre-defined vial information, including quantity and contents of the vial.

If the vial passes the weight verification, it can be picked up by the syringe manipulator gripper. The syringe manipulators can be equipped with similar grippers as the robot, and so the syringe manipulator gripper can be used to check the vial's exterior diameter.

The syringe manipulator includes a vial bung height sensor that can determine the height of the bung relative the syringe manipulator. Example embodiments of the vial bung height sensor may include, but are not limited to, a laser, an acoustic measurement system, and/or a vision system with associated image processing capabilities. The distance can be used to confirm the depth of travel for the syringe needle to enter the septum of the vial.

When picking up a vial of unknown height, which may be due to an improperly seated vial in the storage rack, the grippers 1000 may be slowly opened so as to let the vial slide within the fingers at the vial ID station 5000. Confirmation of the vial can then be done using the pickup height of the vial, which corrects for height.

To account for variations in the vial height due to manufacturing tolerances or potential changes in the vials, a vial bung height sensor can be incorporated. The vial bung height sensor can be integrated into the syringe manipulator and used to determine the height of the bung. This can also address the variability in the recessed depth of the bung relative to the crimp cap of the vial.

Typical vials may be asymmetrical. Manufacturing variations in the glass surfaces of the vials can result in a variation on the vial diameter. In one example, a sample of 10 vials from the same manufacturer, same size, and same drug may show a 2% variation in the diameter of a single vial when measuring with a caliper at various positions around the vial, and 2.5% variation in diameters between vials, and 2.7% variation in weights of the empty vials. In some embodiments, each vial may be weighed before reconstitution and use.

In some embodiments, automated compounding may involve the ability to reconstitute drugs by adding appropriate amounts of fluid to powdered form of a drug and then agitating until thoroughly mixed. In manual practice, pharmacy staff may add fluid and shake the vial, let it settle, shake more until there is no more particulate visible in the vial. A concern with this approach can be that there is no quantifiable mixing time defined either in the pharmacy practice or within the drug monographs. The instructions may state, for example, to mix until clear. It can be difficult to detect small particulate in all vial sizes and make a safe conclusion that particulate is not present. Sizes and types of vials can vary widely. Some vials may have labels that wrap around the entire cylinder of the vial. Some vials may have textured finishes on the lower portion of the vial. Some vials may have a plastic hanger loop that covers the bottom of the vial. In some embodiments, an APAS implements an illustrative method performed during the drug training. In the method, the time it takes for manual mixing can be captured and a multiplier (e.g., 1.01, 1.05, 1.10, 1.15, 1.25, 1.50, 1.75, 2.0, 3.0, 4.0, up to at least about 10.0) can be applied to extend the minimum amount of mixing time. For a drug that determined to require two minutes of mixing by a pharmacist may be assigned, for example, a 2.0 multiplier that would bring the automated mixing time to four minutes.

The mixers in the APAS cell may include a servo motor-driven assembly under software control. The assembly can implement a variety of mixing motions with a variety of speeds and profiles. In some examples, each mixer can be fitted with multiple faces, and each face can be configured with clips and shelves to hold one or more vials and/or syringes. The mix of faces and clips on faces can be customized for each installation. For example, a pharmacy may have a custom configuration of mixer faces. In another example, a maintenance staff can change the faces of the mixer to give the mixer a different clip capacity for mixing. Database tables can define the configuration of each mixer in the cell. Multiple mixers can be installed. A typical installation may have two independently controllable mixing stations. Mixing profiles that agitate harder in the direction towards the bottom of the vials can be implemented to ensure that vials do not 'walk' within the clip, for example, by performing a hard shake down every two or three cycles to force the vial toward the bottom of the shelf to prevent walking or rising in the clip.

It can be expected that two or three mixing profiles can meet the needs for all the drugs the device is to handle. These may consist of an aggressive profile, a normal profile, and a gentle shake profile. The gentle shake profile may be for those drugs prone to frothing and for which the monographs recommend gentle mixing. In a manual process, the mixing can be achieved through the combination of a wait time, during which the soaking of the powder occurs, and an agitation time. In the APAS cell, the mixers may momentarily stop as drug vials are added and removed from the stations.

Figure 51A:
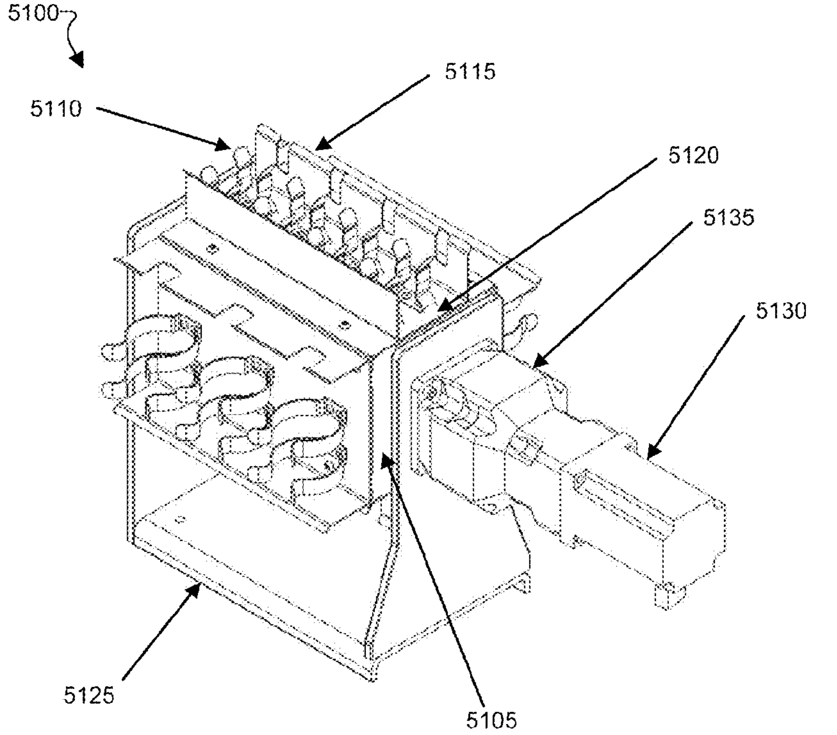
FIGS. 51A-51B show an illustrative vial mixer.
Figure 51B:
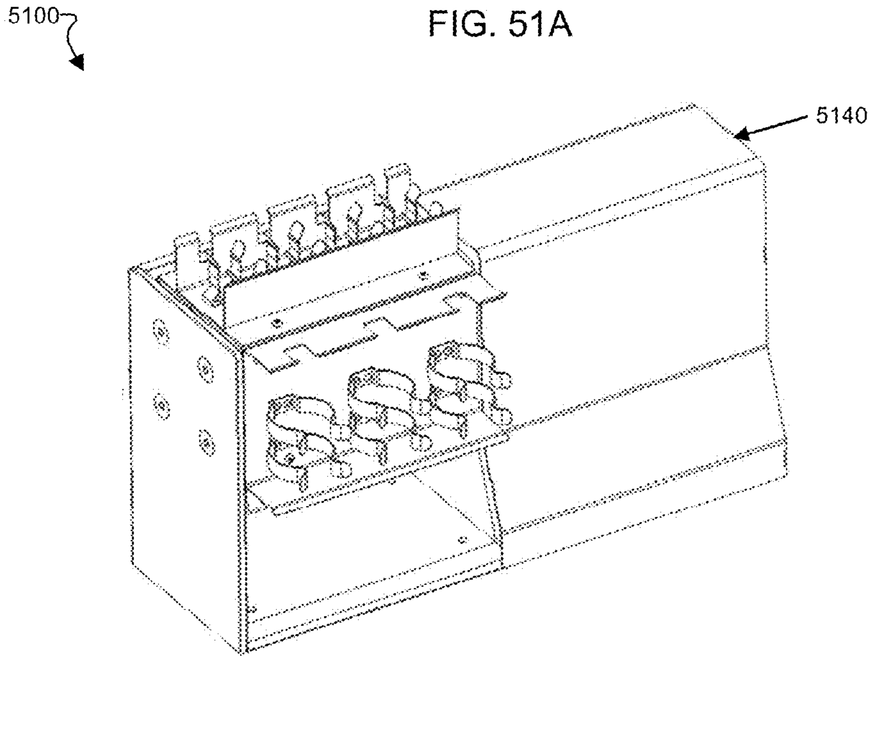

FIGS. 51A-51B show an illustrative vial mixer 5100 for an APAS cell. FIG. 51A shows the vial mixer with its cover removed. FIG. 51B shows the vial mixer with its cover installed. The vial mixer 5100 includes a rotating drum 5105, vial clips 5110, vial retainers 5115, vial mounting panels 5120, a frame assembly 5125, a servo motor drive 5130 and a gear reduction unit 5135.

The vial mixer 5100 may simulate the mixing profiles that pharmacy technicians use in manually mixing drugs during the reconstitution process. The vial mixer 5100 can impart a rotary motion to the vials at a speed and intensity similar to a person holding a vial and shaking it.

The vial mixer 5100 includes the rotating drum 5105 with four faces to which vial clips 5110 and vial retainers 5115 are mounted to facilitate insertion of the vials by the robot. The retainers 5115 can ensure that the vials cannot shift in the clips 5110 under vigorous shake and be ejected out of the mixer. The vial mounting panels 5120 on the faces of the drum 5105 can each be configured to a narrow range of vial sizes, but in the combination of all four faces, the vial mixer 5100 can take commonly used vials sizes. The panels 5120 on the mixer drum 5105 can be interchanged so that if a particular APAS cell uses either more limited or greater ranges of vial sizes, the complement of vials can be tailored with minimal reconfiguration effort.

In one embodiment, the drum 5105 can be mounted in a frame assembly 5125 on bearings and can be driven by a servo motor drive 5130 with an inline gear reduction unit 5135. In an alternative embodiment, a motor (e.g., stepper, brushless DC, induction, synchronous, reluctance, etc. . . . ) driven by a torque and position control system (e.g., with current and position estimation and/or feedback) may have a direct coupling from the motor shaft to the drum 5105, or optionally through a shaft coupler. Position controlled motors may provide, for example, repeatable stopping positions of the drum 5105 at each of the four faces to facilitate pick and place of the vials on the drum 5105 by the robot. Position feedback may include an index (e.g., home), a resolver, encoder, hall effect sensors, pulse counters, or other well-known position feedback techniques. Flexibility in the mixing motion profile can provide for a gentle mixing action on the same unit as well as drugs that require a vigorous shake to minimize the time for drug reconstitution. The servo motor technology can allow any type of profile from a slow continuous rolling motion to an aggressive back and forth motion with a frequency up to at least about four Hz, and amplitude up to at least thirty degrees.

Since there may be many vials on the mixer at one time, the drugs that need the gentlest profile can dictate the shaking profile at any given time, and the exposure time for any drugs requiring more aggressive agitation can be compensated for with more time to assure complete reconstitution. Also, since there can be two mixers in some embodiments of the APAS cell, one mixer can be set to a gentle agitation profile while the other mixer can be set for more aggressive agitation, and the drugs can be targeted accordingly. The motion profile can be a parameter that is specific to each drug type and the profile can be reset automatically by the cell controller as required to suit the drugs being mixed.

The motor and gear head 5135 can be normally covered 5140 to afford them protection and facilitate easy cleaning and wipe down. A local venting structure coupled to the air handling system may provide a local low pressure to remove any outgases or contaminants that may arise local to the mixing system.

Figure 52A:
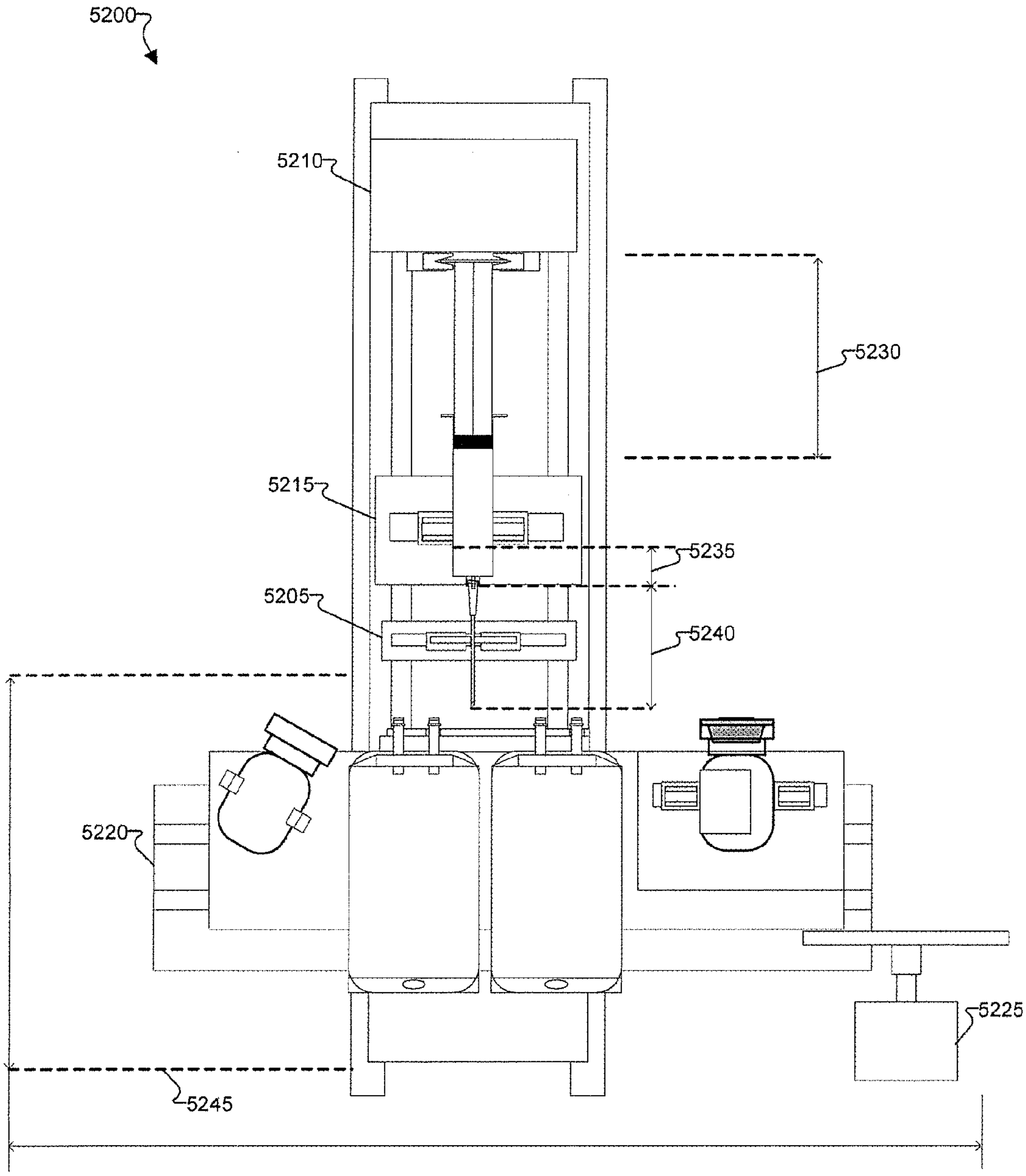
FIGS. 52A-52B show illustrative syringe manipulation at a syringe decapping station.
Figure 52B:
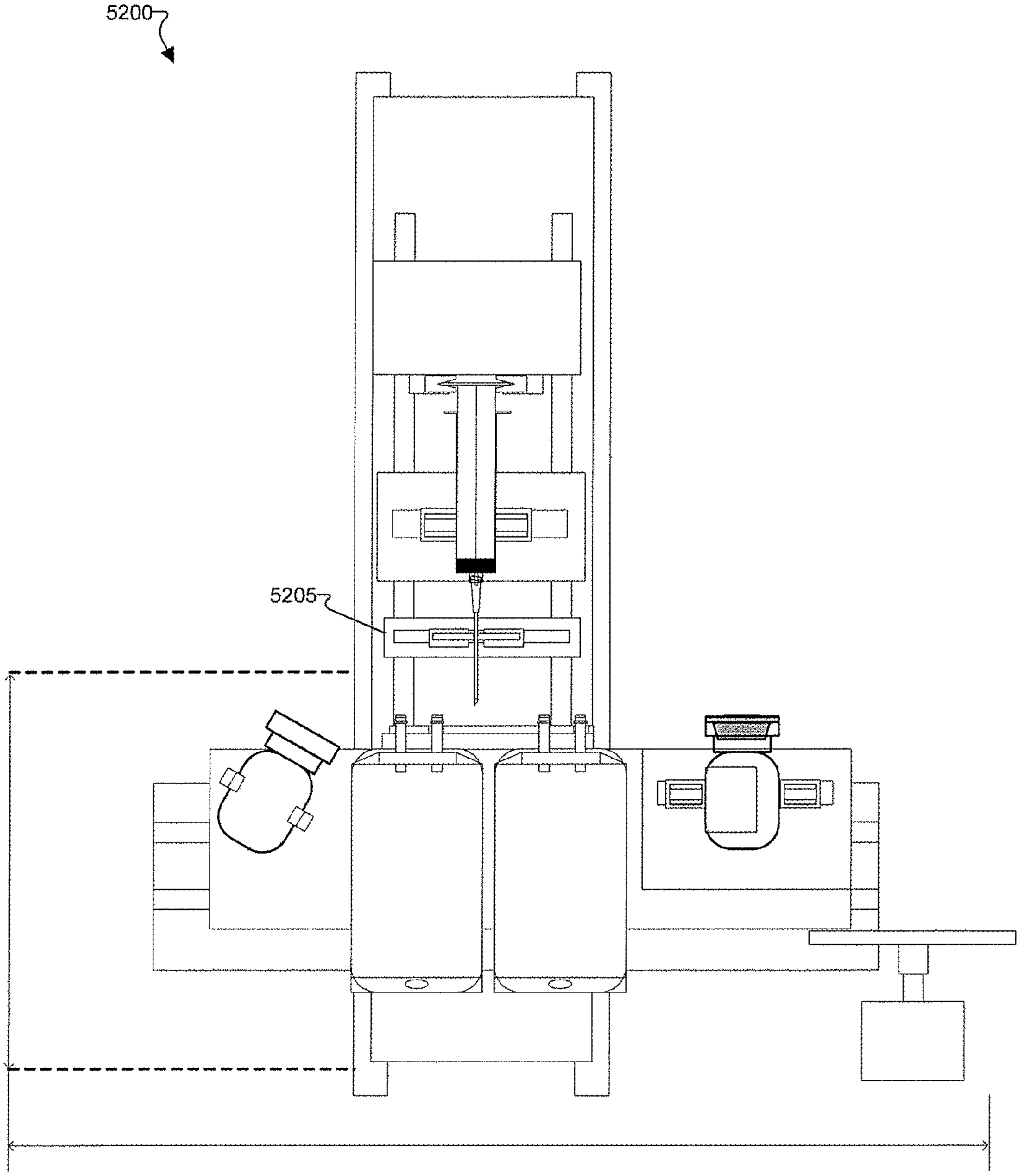

FIGS. 52A-52B show an example of syringe decapping at an illustrative syringe manipulator station 5200. The syringe manipulator station 5200 includes a syringe plunger gripper 5210, a syringe barrel gripper 5210, a vial and bag indexer 5220, and motor and associated motion control hardware 5225. The syringe plunger gripper can slide in a vertical range 5230 to enable the pushing and pulling of the syringe plunger in the syringe barrel. The syringe barrel gripper 5215 can remain stationary. A grip distance 5235 can be the distance from the bottom of the syringe barrel gripper 5215 to the top of the syringe luer lock 4640, as described with reference to FIG. 46. The vial and bag indexer 5220 may move vertically and horizontally in a sliding motion 5245.

Syringes in the APAS cell may be loaded into inventory with needles and needle caps installed. During normal operations, the device can perform operations to remove the needle cap before the syringe can be used in the manipulators. To do this, the syringe may be presented at a manipulator station 5200 that contains a needle gripper 5205 that holds the needle cap and the robot performs a pulling away motion that removes the needle cap. The needle gripper 5205 can open to release the cap and a sensor can detect the dropping object. This can provide confirmation that the cap has been removed. To ensure that the needle was not removed in the process, or that a syringe did not have a needle installed, the APAS cell can detect the presence or absence of the needle by gripper feedback on the needle gripper 5205. The fingers on the needle gripper 5205 can engage the needle within a notch that tightly holds the needle and helps to straighten and/or align the needle for engagement into the port of an IV bag or vial. The needle gripper 5205 can also provide positional feedback that relates to the distance between the gripper fingers. This positional information can allow for detection of whether or not an object (e.g., a needle) is present between the gripper fingers. The positional information can also be used, depending on finger geometries, to allow for determination of the gauge of the needle present. The positional information can also be used to determine whether a syringe cap is present.

A syringe verification procedure may be used to determine syringe type based on one or more measured diameters. In some cases, a single measurement may uniquely identify a syringe type from among all possible types of syringes that may be loaded. In some other cases, two or more measurements may be required to uniquely identify syringe characteristics.

It is possible within any given hospital that there can be present syringe types from multiple vendors. There may be overlap between syringe sizes, where a given size may exist from more than one vendor. For example, a hospital may use 20 ml syringes from two or even more vendors. It is also possible that as supply contracts are negotiated and renegotiated within a hospital that the common or default syringe manufacturer can change. The APAS may be trained to work with one or more syringes from one or more vendors.

In various embodiments, the APAS may use preloaded, predefined syringe data taken from published manufacturer information which is preinstalled in each delivered APAS. During processing, the APAS can determine what syringe sizes are required to fill the queue or orders and those required to reconstitute the vials to fill the drug orders. In this case, operators can receive information about what type and size of syringe may be required to fill a particular order, based on the drug order requirements and the predefined syringe data.

The APAS cell can use the syringe to perform fluid transfers. Data about a particular syringe's physical characteristics can be used to control the plunger manipulation for fluid transfers. To safely and accurately fill drug requests, the syringe data can be a validated, calibrated and predefined data set that is part of a delivered APAS. In some embodiments, the APAS can disallow changing syringe data by users. Changing syringe data in the APAS can therefore be a maintenance operation performed by trained maintenance technicians following proper change control procedures, and not something performed by the device's users.

Figures 53A, 53B, 53C, 53D:
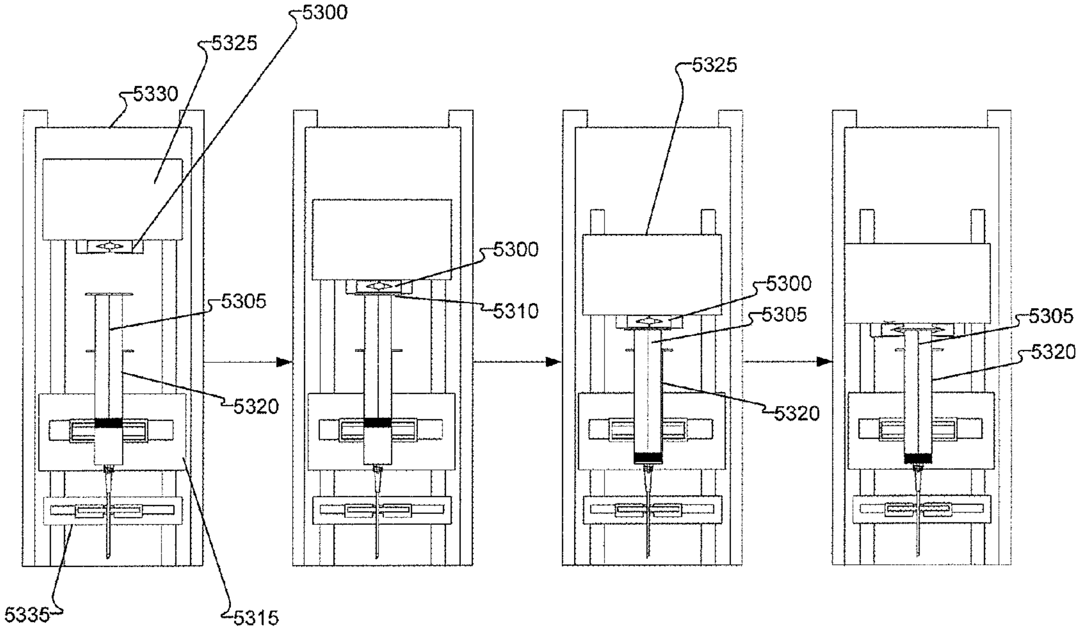
FIGS. 53A-53D show illustrative stages of a syringe plunger maneuver.

FIGS. 53A-53D show various stages through which a syringe plunger is maneuvered. FIG. 53A shows a syringe manipulator 5330 which includes an adjustable syringe plunger gripper 5300, an adjustable syringe barrel gripper 5315, a needle gripper 5335 and a moveable carrier 5325. A syringe includes a plunger stem 5305, a plunger stem button 5310 and a barrel 5320.

In various embodiments, an APAS cell includes the syringe plunger gripper 5300 with an adjustable width to engage the plunger stem 5305. The syringe plunger gripper 5300 can include fingers to engage the syringe plunger. An actuation system (e.g., one or motors, and associated linkages, gearing) may be operated to control the separation of the fingers on the syringe plunger gripper 5300 to accommodate a variety of sizes of plunger sizes and plunger flange 5310 diameters. The adjustable syringe barrel gripper 5315 can accommodate a variety of different syringe barrel 5320 diameters. The syringe plunger flange 5310 (or stem button) can be engaged for pushing or pulling directly via this adjustable syringe plunger gripper 5300. The gripper 5300 is linked or mounted to the moveable carrier 5325. The carrier 5325 is linked to a vertical slide positioning system, which may be electrically, pneumatically, or hydraulically operated. Movement of the carrier 5325 translates into controllable pushing or pulling of the plunger by operation of the gripper 5300.

Information about the plunger stem 5305 position and the position of the syringe within the syringe barrel grippers 5315 of the syringe manipulator 5330 can be used for accurate fluid transfer operations. The syringe 5320, the needle, and the plunger 5305 can be accurately controlled, for example, to perform operations with the needle down syringe manipulator, in which the syringe can be used to draw diluent from an IV bag, and/or to add fluid to vials for reconstitution.

FIG. 53B shows the syringe plunger gripper 5300 closed engaging the syringe plunger flange 5310. The resistance force of the plunger can be detected as a step increase in force, for example, and the position of the plunger flange may be monitored based on the position of the gripper 5300.

FIG. 53C shows the moveable carrier 5325 moving in a downward direction and pushing the syringe plunger stem 5305 into the syringe barrel 5320, with the plunger fully seated in the barrel. FIG. 53D shows the syringe plunger flange 5310 captured by the gripper 5300 after the gripper 5300 was opened, advanced downward, and closed to engage the syringe flange 5310. From this position, the syringe plunger may be withdrawn controllably from the barrel by upward motion of the carrier 5325.

The APAS cell may handle unknown grip height due to, for example, potential variability in how the syringe is seated in inventory. This uncertainty may affect the position of the needle relative to the bag or vial septum (bung), and may result in piercing too deep (not able to draw the expected fluid volume from a vial), or not piercing deep enough (not penetrating the bung or partial penetration that creates an air path and results in, e.g., leaking, aerosolizing, or incorrect fluid transfer). In one embodiment, the syringe manipulator can be used to properly position the syringe for height as follows. The plunger gripper can be closed, and brought down toward the syringe. As the gripper is moved vertically down, the closed fingers can push the plunger stem within the barrel. The system can monitor torque feedback from the slider and when it detects the step change in torque, the plunger has been fully seated within the barrel. The system can then open the plunger stem grippers and engage the plunger stem button. At this point, the system can loosen the grip on the syringe barrel and needle. By sliding the plunger gripper, the system can adjust the height of the syringe to a suitable vertical height.

In another embodiment, the syringe barrel gripper can be opened slightly allowing some slippage of the barrel within the grip. With the plunger gripper in the closed position, the plunger slider can be brought down to the expected height for that size syringe. This maneuver may substantially seat the plunger such that, if the plunger stem is not fully seated, the plunger moves within the barrel of the syringe. With a fully seated plunger, then the barrel moves within the gripper.

Figure 54A:
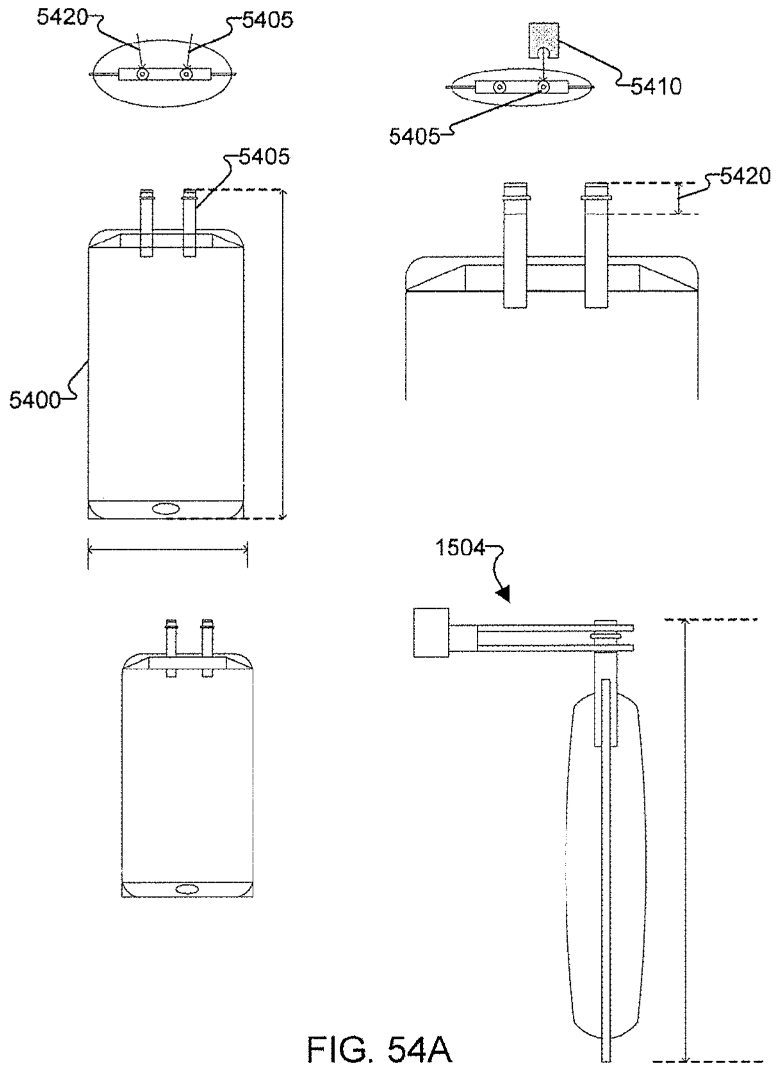
FIG. 54A shows an example of an IV bag on a syringe manipulator.
Figure 54B:
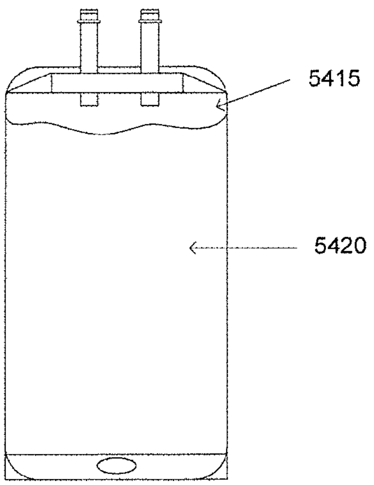
FIG. 54B shows an example of an IV bag with air space.

FIG. 54A shows an IV bag on a syringe manipulator. FIG. 54B shows an IV bag with air space. In an illustrative method, fluid may be drawn from an IV bag with the ports 5405 and 5420 upwards. The robot can take an IV bag 5400 from an inventory rack and place a fill port 5405 into a clip 5410 on a needle down syringe manipulator station 1504, an example of which is described with reference to FIG. 15A. With the IV bag 5400 in this orientation, air space 5415 can be drawn out of the IV bag 5400. A needle can be placed in fill port 5405 by piercing the port an amount equivalent to a bung pierce depth 5420. The method can employ the characteristic that the IV bags can be a sealed container with soft sides such that the bag collapses as air and fluid is drawn from the IV bag. The syringe manipulator 1504 can draw the air from the IV bag 5400, and the motion control system can monitor the torque/force feedback on the syringe plunger stem, as described elsewhere herein. There can be a substantial (e.g., a step) change in the force and/or torque when the fluid transfer transitions between transferring air and transferring fluid. In an illustrative example, a blunt fill needle may minimize the air flow back into the bag when the needle is disengaged and subsequently re-engaged into the fill port bung.

In some embodiments, the torque step change on a syringe plunger pull can also be detected by transferring fluid into the IV bag. Moving the syringe plunger stem with the syringe plunger gripper installed and pulling a vacuum within a syringe barrel may involve a detectible change of torque when pulling fluid compared to air. In another embodiment, the syringe plunger stem can be pulled to a known level that is greater than the expected mean air space within the IV bag. The syringe plunger stem can be held in the pulled position and paused while the fluid reaches equilibrium within the syringe barrel. The torque value may drop off as the fluid fills the vacuum that has been formed in the syringe barrel. The next step can be to push the syringe plunger stem so that fluid transfers back into the IV bag, while monitoring the torque value. A step change in torque can be detected when all of the fluid has been transferred back into the IV bag, such that substantially only air is being transferred back into the bag. By monitoring syringe plunger stem position data, it can be determined at what syringe plunger position the step change in torque occurred. The plunger can then be pulled back to that position resulting in an IV bag with the air volume removed.

Identifying syringes that need to be loaded into the APAS cell may involve identifying several pieces of information. A first piece of information can be a drug order that may include a drug name, a drug quantity/volume, and drug concentration that is independent of any syringe data. A second piece of information can be a site specific drug dispensing table, which defines what size and type of container to use for that drug and size.

For example, at one pharmacy a 2 gram dose of a drug 'X' may be sent to the patients in a syringe. At a different pharmacy, that same drug and dose may be sent in an IV bag. The dispensing table can define site specific preferences for sending orders to patients. The site specific preferences can be independent of any syringe data. A third piece of information can be drug vial reconstitution data, which defines a fluid transfer volume requirement and is part of the determination of the syringe sizes required.

The APAS cell can use these items and an algorithm to calculate a fluid volume transfer requirement that is independent of a particular medical container (e.g., syringe). The APAS cell can then search the preloaded syringe data to find a predefined syringe of an appropriate size to handle that fluid transfer. When a match is found, the APAS cell can then select the syringe's physical dimensions from the preloaded data. If loading is required, the APAS cell can output the syringe data to the operator to identify the selected syringe type and size to load.

The APAS controller can use the pre-loaded syringe data in two illustrative processes: reconstitution and drug order filling.

For reconstitution processes, the APAS cell can use published data from drug manufacturers that defines the required diluent type and volume required to reconstitute the powdered drug within a vial. The APAS can use this information to determine a fluid transfer volume for a vial and then automatically can select a reconstitution syringe by using the required volume, and searching the database to find the smallest syringe whose defined volume exceeds the required transfer volume. The APAS can then calculate syringe plunger travel by using the volume required and information about the interior diameter of the syringe.

For drug order filling processes, fluid can be drawn from vials into the barrel of a syringe and the entire syringe can be dispensed for use by a patient. In this case, the APAS can use inputted drug order data containing drug name, quantity, concentration and/or optionally patient information. The APAS cell can determine, using the drug volume and the dispensing table data, what type of container that drug and volume is to be dispensed in. For example, in one pharmacy, a 2 gram drug order may be dispensed in a bag, while in another it may be dispensed in a syringe, and this can differ from one pharmacy to another. The APAS cell can then automatically select the smallest size of syringe that exceeds the fluid transfer requirement. The APAS cell can then use that syringe's parameters (e.g., interior diameter) to calculate the total plunger displacement, and then to determine the appropriate motion cycling (e.g., plunger push and pull) to maintain appropriate pressure in the draw container (e.g., a vial) which prevents prevent aerosolizing of the content.

In some embodiments, the APAS cell may not accept user inputted syringe information, and by design disallows any user input of syringe data for concerns of safety and accuracy of the fluid transfers. For the APAS cell, syringe data may be pre-defined and pre-loaded from published manufacturer data.

Some embodiments restrict the type of inventory that can be loaded into the APAS cell. For example, some APAS cells may allow the operator to select between different, pre-defined syringe types, and verify that the operator loads only the selected type of syringe. In some embodiments, the APAS cell may detect what syringe is present in inventory at the time that it is used.

The APAS cell may implement methods for ensuring which syringe type has been loaded into the cell. Even if the preferred implementation strategy is to limit the device operations to type A syringes, for example, it may be possible during routine operations that an operator makes a mistake and loads the wrong syringe type. If, for example, the system expects type A syringe but is loaded with a type B syringe having a different interior diameter and/or length. Use of the type B syringe, if undetected, may lead to inaccurate fluid transfer and potentially a drug order error. Apparatus for cross-checking may be implemented to mitigate risks associated with such syringe loading errors by the operator.

The APAS cell may use combinations of diameter feedback from the grippers in the system, along with scale information (e.g., syringe weight when empty), and other techniques in combination to reduce ambiguity as to which syringe is presented to the system. Combinations of independent detection methods may be used to verify a medical container, such as a syringe, vial, or IV bag. For example, combinations of one or more gripper feedbacks and length feedback (e.g., using an optical photo-interrupter detection system), and/or torque feedback (e.g., as a function of position) from the syringe manipulator may be used for container verification. Combinations of these and other methods, such as comparison of stored (trained) image information with captured images from a vision system to identify the container, may be used.

In some embodiments, a separate drug order processing step may take the drug order data and the pre-loaded syringe data and compute the linear travel that the plunger needs to be moved. A command can be placed in a buffer for a controller in the APAS cell, for example. In one implementation, this may be a database table.

In one embodiment, a user (e.g., pharmacy staff) cannot override pre-loaded syringe data in the APAS cell by manually inputting syringe data. In this embodiment, the controller may not receive any inputted syringe information, and the controller may not calculate the plunger movement distance using inputted syringe data. The controller that moves the plunger may not receive any inputted syringe data; rather, it may receive preprocessed data that defines the travel distance for the plunger. The motion control hardware translates this into, for example, motor pulse counts for a stepper type motor. The controller may also implement an algorithm to manage (e.g., by maintaining below a stored threshold value) the pressure in a fluid receptacle (e.g., vial or bag) that results in alternating between extending and retracting (e.g., pushing and pulling) the syringe plunger.

The APAS cell may use information about the interior diameter of a syringe barrel, for example, to calculate the travel distance for the syringe plunger.

Within an illustrative cell, the APAS cell can incorporate a series of linear grippers to hold syringes, vials and/or needles. Examples of grippers are described with reference to FIG. 10, and FIG. 53. The grippers can be fitted with a variety of fingers that incorporate unique features for improving the hold of the gripper on the cylinders of the syringes and vials. Notably, the fingers can incorporate a V-Notch that increases the area of contact on the syringe barrel and the vial body. The gripper fingers can provide feedback via a serial interface to a controller in the APAS cell. The feedback can include positional information of the space between the gripper fingers. The APAS cell can use this gripper feedback as part of multi-step confirmations of vials and syringes.

IV bags may be used in the APAS cell as a source for diluent to reconstitute drugs, as a source for diluting drugs within a syringe, and as a receptacle into which drugs can be injected. Some embodiments may provide mechanisms to verify contents of inputs and outputs related to automated processing of IV bags.

Figure 55A:
FIGS. 55A-55B show illustrative images of IV bags.
Figure 55B:

FIGS. 55A-55B show illustrative images of IV bags that may be used in an APAS cell. Pattern matching using a vision subsystem can be used to identify the bags in some embodiments.

Each IV bag may have a varying pattern of folds and warps that may be resolved in order to identify the bag. The APAS cell can incorporate a method of de-warping the bag image. A drained, flat bag can be used to capture a baseline image, and then the APAS can determine whether or not the sampled bag image can be mapped to the trained image. The software can attempt to determine a deformation grid that, when applied to the captured image, can result in a good match with the trained image. The APAS cell can return a score of how well the de-warped image matches the trained pattern. Alternative methods may include the use of a filled bag as the source for a trained image. In many cases, the areas of interest can curve around the edge of the bag, and use of a flat image may return a lower match score.

In an illustrative embodiment, an APAS may incorporate multiple independent methods to verify the contents of a medical item, such as an IV bag, vial, and/or syringe. Bar codes may be incorporated in the labeling of IV bags. The APAS can use bar codes, if they are present on an IV bag, to provide another independent check on the contents of the bag. Vision software may be used to process and decode captured images of the bar code. Optical character recognition software may process images with text to identify contents. Some embodiments may use a separate external bar code reader so that bag ID validation is not dependent on only a single optical system (e.g., vision system and vision software).

In some embodiments, the bar codes can contain a drug identification number, but can also include multiple bar codes or additional information (such as lot number and expiry date) encoded within the bar code. The APAS can include a processor (e.g., digital circuit, ASIC, and/or microprocessor) to parse a bar code and/or to identify the unique sub-elements of the bar code that identify the drug contents. Bar codes may be one or two dimensional.

In some cases the bar code may be on the same face as the bag label information, or it may be on the reverse side of the bag. The APAS cell may include a method to capture location and position information on the bar code so that the robot can correctly present the bar code to an bar code reader outside of the compounding chamber. For example, if the bar code is present on the face of the bag, a rotational maneuver with the robot may be executed to present the bar code to an external reader.

In some embodiments, an APAS may incorporate multiple methods to check a vial's contents. Bar codes may be incorporated in the labeling of the vial. The APAS can use bar codes, if they are present on the vial, to provide another independent check on the contents of the vial. Vision software may be used to process and decode captured images of the bar code. Some embodiments may use a separate external bar code reader so that the vial identification and/or verification is not dependent on only one vision system for validation.

Bag fluid contents can vary between bags and batches due, for example, to manufacturing tolerances. An illustrative APAS cell can incorporate a method of verifying bags by weight and differential weights. A bag that is used for dispensing can be weighed before and after a drug is injected. The differential weight may be used to verify that an appropriate fluid volume was added or removed. A bag that is used for fluid draws can also be weighed before use and this weight can be used to confirm the bag size and the expected fluid contents. For example, a mean empty weight of the bag and the weight of 1 ml of fluid can be preloaded in database tables. Weighing the bag before use, subtracting the weight of the bag material, and dividing the weight by the weight of 1 ml of the fluid can yield an approximate volume of fluid in the bag. This number can be used in the number of draws that can be pulled from the bag. The data tables can contain an expected weight with tolerances for that size bag, but this method can confirm the fluid contents of the bag before use.

Figure 56A:
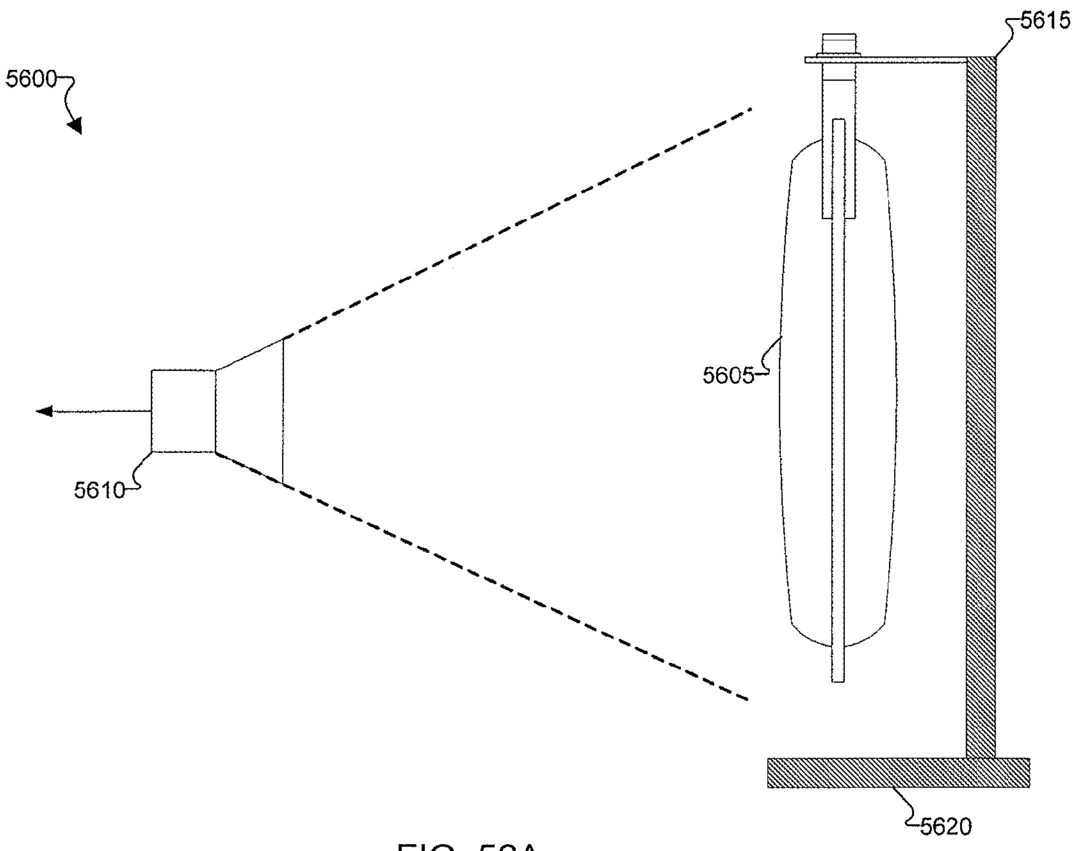
FIGS. 56A-56B show an illustrative system for IV bag identification and confirmation in an APAS cell.
Figure 56B:
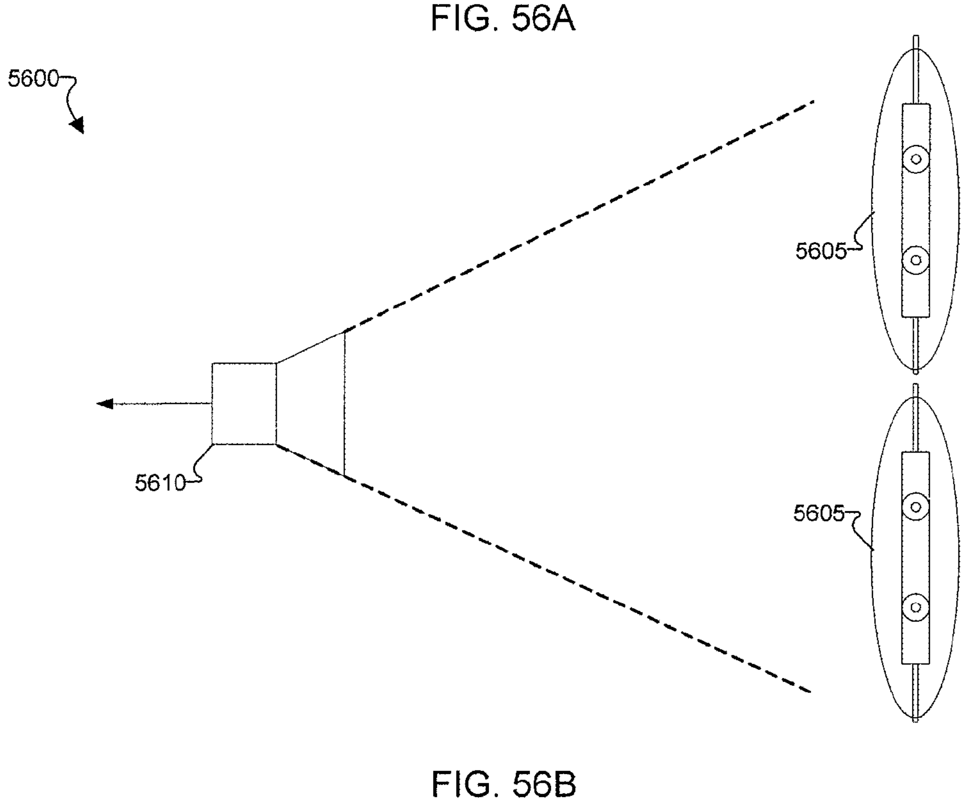

FIGS. 56A-56B show an illustrative system for IV bag identification and confirmation in an APAS cell. The system 5600 is shown with a side view, FIG. 56A, and a top view, FIG. 56B. The system can be used to identify an IV bag 5605 using vision software for recognition, as described above. A camera 5610 can be used to capture an image of the IV bag 5605 in a holder 5615. The captured image of the IV bag can then be used by the image recognition software for identification. Dose verification can be done by weighing the IV bag on a scale 5620 before, during and/or after the reconstitution process as has been previously described. The weight can be used by the APAS software for dose verification purposes.

In some embodiments, the APAS cell can implement a method of using multiple areas of interest to improve the accuracy of the machine vision pattern matching. The areas of interest may include fluid name, and fluid concentrations. In some applications, bags may contain saline, dextrose, or sterile water.

In the case of saline and dextrose, the concentrations can be fields that may be discriminated, for example, in standard concentrations of 0.9%, 0.45% and 0.225% concentrations. In various embodiments, the vision system may resolve the drug name and/or the concentration.

In some embodiments, various procedures may be used to verify quality and/or performance of the system. For example, patient and/or package information may be sent for display on a display device when the robot arm retrieves medical items from the storage system. In some examples, more than one code may be read, such as a bar code on a medical item and an associated label that may be printed. The multiple codes may be compared to verify that the codes match. Some hospital systems, for example, may include data entry terminals at which patient data may be entered and transmitted to the APAS. In some embodiments, a total processing time may be calculated in advance, and may then be compared to an actual processing time. Such information may be used to monitor the performance of the system, and may be used for scheduling and planning purposes by estimating about when certain operations (e.g., batch operations) may be completed and/or additional inventory to be loaded. Such forecast information may be transmitted to the inventory controllers that may prioritize and prepare racks to load onto the storage system to minimize downtime.

Prepared syringes may have syringe caps installed on the luer lock tip substantially to prevent leakage or spilling of the fluid contents, and to protect the contents from contamination. The syringe caps may be stored in sterile packaging trays within a controlled environment.

Figure 57:
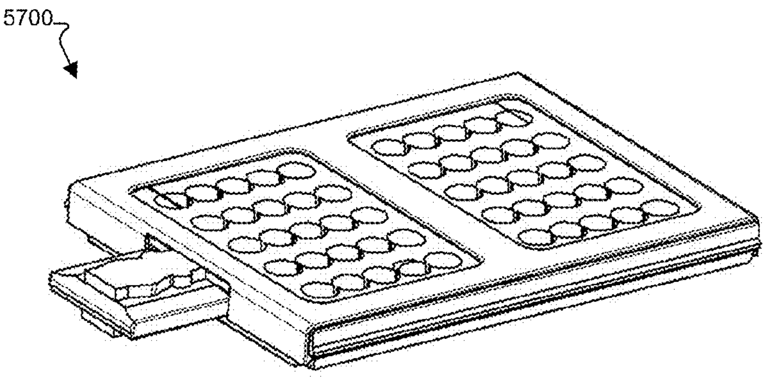
FIG. 57 shows an illustrative syringe cap tray.
Figure 58:
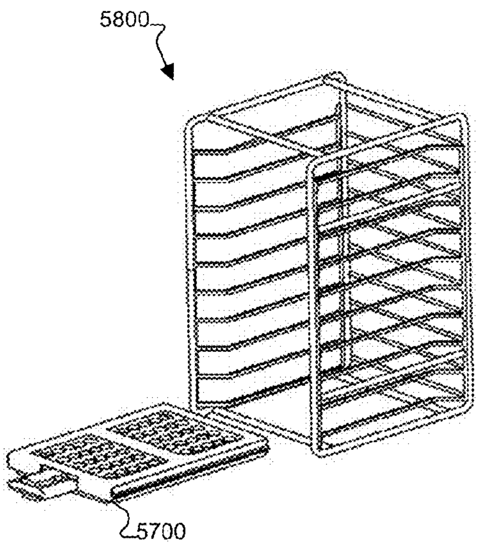
FIG. 58 shows an illustrative syringe cap tray storage enclosure.
Figure 59:
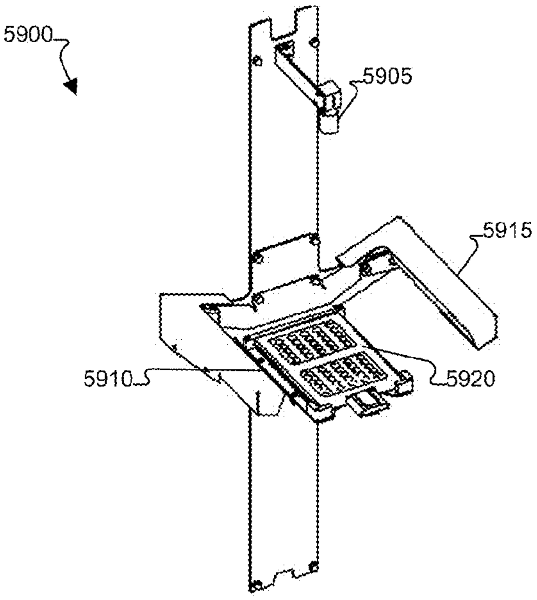
FIG. 59 shows an illustrative syringe capper station.

FIG. 57 shows an illustrative syringe cap tray 5700 that is used in an APAS cell. FIG. 58 shows a syringe cap tray storage enclosure 5800 that may be used in the APAS cell. FIG. 59 shows an illustrative syringe capper station 5900 that may be used in an APAS. The syringe capper station can include a camera 5905, lights 5910 and 5915, and reference marks 5920.

The APAS cell may incorporate a robot manipulator to retrieve the syringe cap tray 5700 from the syringe cap tray storage enclosure 5800 within the APAS cell and position the tray 5700 within the syringe capper station 5900.

Figure 60A:
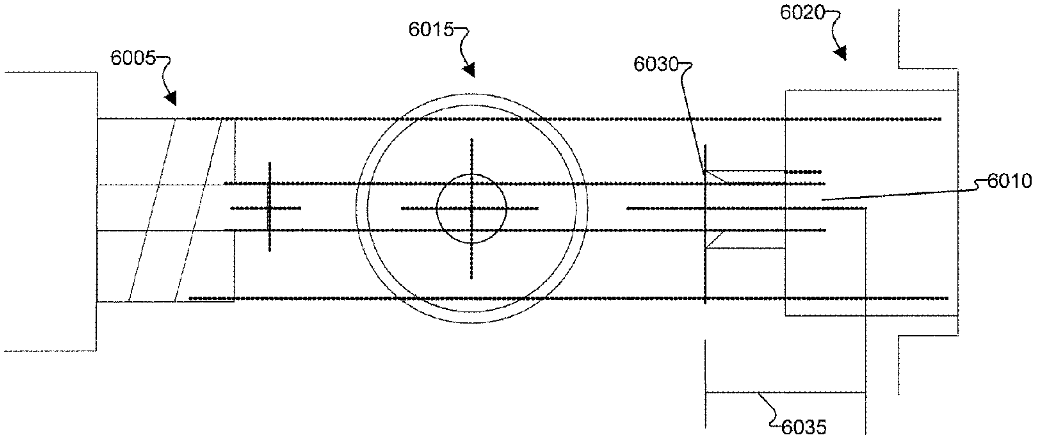
FIGS. 60A-60B illustrate aspects of syringe capping in an APAS cell.
Figure 60B:
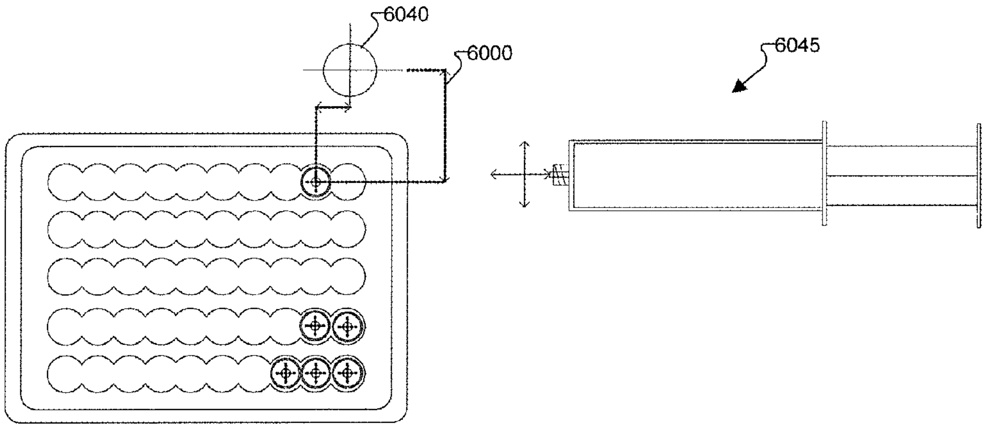

FIGS. 60A-60B illustrate illustrative aspects of syringe capping in an APAS cell. Included in FIG. 60A are a top view of a syringe cap 6015 in a syringe storage tray 6025 and a side view of a syringe cap 6020 in a syringe storage tray 6025. In some embodiments, capping syringes may involve engaging a cap on a syringe luer lock hub 6005. In some other embodiments, caps may be applied using other mechanisms, such as a snap fit, for example. A plunge depth 6035 is shown as the depth a syringe cap needs to cover to securely attach to the syringe. The positional tolerance may be, for example, approximately +/−0.5 mm 6010. The caps can include a bevel 6030 that is about 1 mm larger than the luer lock hub 6005 and narrows to about the same width as the luer lock hub 6005. While this design can allow for a tight fit on the end of a syringe, it can impose an accuracy requirement on determining the center of the caps and relaying that determined information to the robot for correct placement. A robot can use offsets to position a syringe 6045 over a syringe cap in a syringe cap tray. A robot trained position can be defined with one or more markers, such as an ID station fiduciary marker 6040.

Figure 61A:
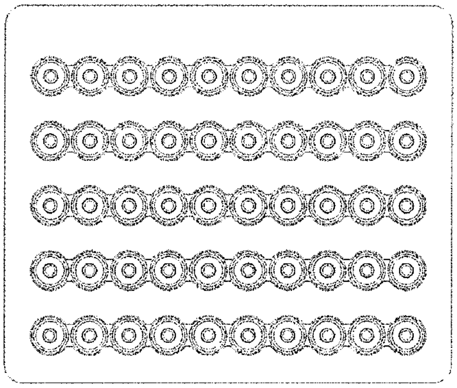

FIGS. 61A-61B show illustrative configurations of syringe caps in the syringe cap tray 5700. In some embodiments, the APAS may incorporate a method that uses shallow lighting on each side of the cap tray to provide good illumination of the edges of the syringe caps. The camera 5905 can take a high resolution image of the cap tray, and pattern matching software may process the image to locate the center of each hole in the cap. FIGS. 61A-61B show the results of the pattern matching and detecting the centers of the vials. As can be seen in FIG. 61B, it may be possible that caps can be out of position (e.g., due to a bump of the cap tray). The image processing software can verify the distances between the cap centers and detect any overlap conditions. For example, reference point 1 6100 in FIG. 61B shows an example in which the centers of caps have been found, but one cap is out of the expected distance relative to other cap positions. In this case, the system may identify at least the two caps as being in error (e.g., out of position), but the software also looks at nearby caps to see if they are at the expected stand-off distance from each other. The system may also identify an error if the stand-off distance is less than expected.

Figure 62A:
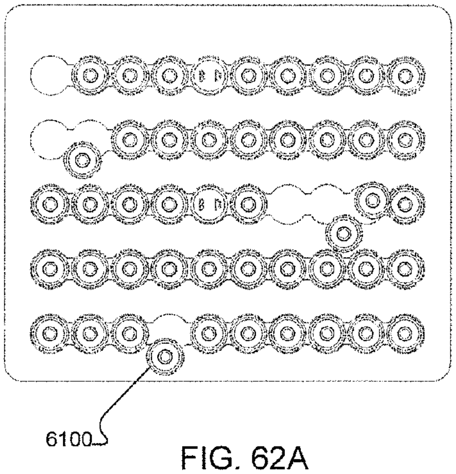
FIG. 62 shows an illustrative configuration of syringe caps in the syringe cap tray of FIG. 57, where one cap is misplaced.
Figure 62:
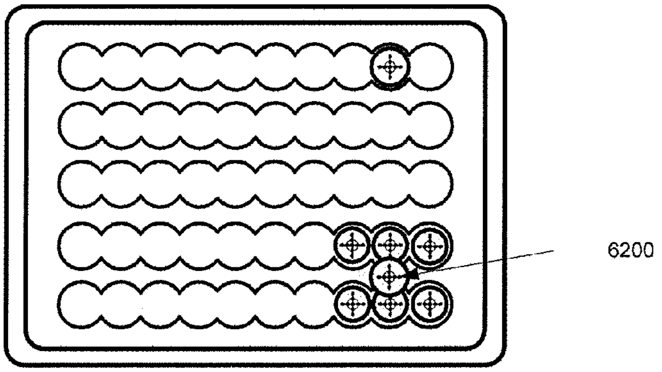

FIG. 62 shows an illustrative configuration of syringe caps in the syringe cap tray of FIG. 57, where one cap 6200 is misplaced. In this example, one out of position cap 6200 causes six surrounding caps to be considered invalid as a syringe may not have a clear line of access to any of the seven caps. This test may be used to indicate that a syringe has a clear path to a cap in one or more axes (e.g., x, y, and z directions). At the end of the processing, the software may have identified a collection of correctly positioned caps, and also may have identified any caps that are not available to be used (e.g., missing, overlapping other caps, less than the expected standoff distance).

In some embodiments, a fixed fiduciary mark can be incorporated in the capping station that is at a fixed position reference point for the robot. The image processing software can provide an X and Y offset 6000, as shown with reference to FIG. 60B, to this fixed fiduciary mark. The fixed fiduciary mark may be a trained robot position whereby, for example, the center of the mark is known in x, y, z, rotation, and joint angles of the robot. The height of the caps within the tray can be stored in a database table, and is consistent for all caps in a tray. Only the x, y offsets may be given to the robot in some embodiments.

Because syringes may contain fluid, there can be the possibility of small drips on the end of the luer lock hub due to the squeeze of the gripper on the barrel of the syringe. The system may be programmed to identify and/or follow motion trajectory when carrying the capped syringe to minimize the opportunity for cross-contamination. The robot path to the capping station from the de-needler may be arranged so as not to pass over or any other equipment to substantially minimize the chance that any drops might fall on other surfaces (e.g., unused caps, other medical containers, surfaces that contact medical containers). Such a protocol may provide that any drips from the syringe be dropped onto a drip pan that can be cleaned. For example, when the uncapped syringe is brought to the capping station, the APAS software may verify that the uncapped syringe does not pass over any caps to prevent any chance of cross contamination. In some embodiments, then, the APAS cell may select available syringe caps from the outer edges of the tray, or via some path that substantially avoids an approach to a syringe cap that passes over any over other cap on the way.

Once the capping maneuvers for a syringe have been completed, the APAS cell may confirm that the syringe cap has been correctly affixed to the syringe. The APAS cell can incorporate a method of using a camera and pattern matching software to confirm the syringe cap is on the end of the syringe. The robot can be commanded to perform a maneuver to position the syringe so that the edge of the side view of the cap and syringe is within the field of view of the camera. An image can be taken and pattern matching software can be used to detect the presence of the cap pattern on the syringe.

Some embodiments may include a station at which one or more syringe caps may be stored. In various embodiments, a supply of syringe caps may be provided for one or more types of syringes.

In some embodiments, the APAS cell may expect vial caps to be removed prior to being placed into the inventory racks. Some embodiments may further include a device to verify a vial cap is not present prior to attempting to use the vial (e.g., by attempting to puncture the vial's septum with a needle). In an illustrative embodiment, a method to confirm vial decapping may include a camera and pattern matching software. A robot can be commanded to deliver a profile or top view of a vial into the filed of view of the camera. The camera may then photograph the vial and store the image. The image can be compared to a trained image. The trained image may consist of a circular area of the septum on the top of the vial or the hard edges of the profile of a vial cap. The trained image may be compared to the vial image to confirm that the vial cap is not present. The confirmation may be through verifying that the camera sees a circular septum to confirm that it is safe to puncture the vial.

In addition to the above-described embodiments, some APAS implementations may include decapping apparatus for removing caps from medical containers, such as bottles and/or vials, for example. In one embodiment, the robot gripper, securely grasps and conveys a vial to a decapping station. The decapping station includes one or more features for rotating and/or levering a cap to remove the cap from the container. Software in the controller may selectively determine which feature(s) to use to remove the cap, the selection being based on the design or characteristics of the medical container. The system may be trained with motion and operation profiles to decap specific containers. In some cases, such decapping operations may be performed in a just in time manner prior to the medical container being used in an admixture operation, for example. In other cases, the decapping may be performed as needed, for example, on capped medical containers after they have been loaded into the storage system. System loaders may be instructed to remove caps prior to loading, and the decapping station may be used upon identifying containers that were not decapped prior to loading.

Various mechanisms may be used to remove caps, including safety caps. In one embodiment, a rotatable member includes multiple gripping sections, each section having decapping elements that can be opened and closed to grip a cap in response to a controller. As the cap is rotated to loosen the cap, the robot may advance the container along the axis of rotation to effect removal. In another embodiment, the fingers biased relative to each other may engage the cap while the container is pulled to effect a removal of the cap. In yet another embodiment, a pivotable member may be biased to engage a cap delivered by a robot, which moves the container to effect a removal of the cap.

Confirmations of doses can be performed by confirming the drug and fluids are correct by using a combination of one or more techniques, including, for example, machine vision, barcodes, plunger travel monitoring, and/or weighing. In one example, which involves a draw and further dilution, each step change can be weighed. For example, drawing 1 ml of drug and diluting it by drawing 4 ml of sterile water to achieve a target concentration can result in a first weight after the 1 ml transfer and a second weight after the 4 ml transfer. In another example involving dispensing a drug into an IV bag, the bag can be weighed before and after fluid transfer, and the weights can be recorded for differential comparison, for example.

Software in some embodiments may operate to verify compatibility of medicaments before or after identifying medicaments to use to process a drug order.

For vials, there can be a range of sizes of clips to hold the inventory in the inventory racks. The vials can have a wide range of diameters. The APAS cell can relate the diameter of the vial to the clip to determine the standoff distance from the back for the inventory rack and translate this into robot positioning information for pick up. When vials are placed in inventory clips, the fingers of the clip can spread to accommodate the vial with the amount of spread related to the diameter of the vial. This can result in the center of the vial being positioned in a different location relative to the plane of the inventory rack. For example, the center of one vial may sit farther away from the rear of the rack than the center of another vial. This may indicate that the vial that sits farther away from the rear of the rack is larger than the other vial. The robotic manipulator may need to adjust the distance it travels to pick up the vial in order to center the gripper on the vial. Therefore, there can be at least one approach position for each location on a rack. The APAS can use the vial's diameter to fine tune the distance at which the robotic manipulator engages the vial. The robot can align the gripper fingers (e.g., the V-notch) with the center of the vial to grip. In another embodiment, some storage rack locations may be pockets.

For fluid transfers using a syringe, the speed of the plunger stem can relate to a bore of a needle. The interior diameter of the needle and the fluid viscosity may limit how fast the fluid flows, which can determine the speed of syringe plunger articulation. Pulling too fast on the syringe plunger may result in having to wait for the fluid to catch up as pressures balance. Pushing too fast may compress the column of air in the syringe barrel and may also result in a delay as the fluid continues to flow after plunger articulation is stopped. The APAS can limit the plunger speed, or calculate the wait time. In each case, when transferring fluid to and from a vial, the APAS may generate and maintain a slight negative pressure in the vial to prevent aerosolizing upon needle withdrawal. This can be accomplished by cycling the plunger to alternate between transfer of air out of the vial and transfer of fluid into the vial in a needle down configuration. It can also be accomplished by cycling the plunger to alternate between the transferring of fluid out of the vial and of the transferring of air into the vial in the needle up configuration. An algorithm can translate the total fluid to be transferred into a series of push and pull cycles so that a negative pressure is maintained in the vial. The headspace within a vial and the internal pressures may not be known. For example, in reconstitution the headspace may equal the amount of fluid to be transferred, and the pressure in the vial can be assumed to be ambient. The algorithm can ensure that the pressure is initially pulled to a negative number and then maintained around that number. For example the transferring of 30 ml of water into a vial for reconstitution can initially result in a first step of a pull of a predefined percent of the total volume of fluid. For example, 10% of the volume, or 3 ml, can create a −3 ml vacuum in the vial. The fluid transfer can then be broken into a series of iterations of pushing and pulling volume, the percent step value, until the fluid is fully transferred. In this example, the syringe plunger can cycle between pushing 3 ml and pulling 3 ml, resulting in an increasing column of air in the syringe and a corresponding decrease in fluid volume in the syringe. Within the vial there may be an increasing volume of fluid while the pressure alternates between ambient and −3 ml. As a final step, the plunger can be pulled one step value to ensure a negative pressure is left in the vial.

In an illustrative example, a draw from a vial may be performed as follows. First, the syringe plunger may be positioned to draw in a pre-determined amount of air into the syringe barrel. This amount may be determined based on the required fluid volume of the prescription (first pull). The predetermined amount of air can replace the volume of fluid that is drawn with an approximately equal volume of air. So if 10 ml of fluid is being drawn, 10 ml of air can be pushed in to replace it. During this process, the system may estimate or monitor the 'headspace' in the vial. In a preferred embodiment, the method may maintain a slight negative pressure in the vial.

Second, the syringe plunger can be actuated to draw a predetermined amount of fluid from the vial. In this case it can generate a negative pressure. This can be limited so that pull does not exceed a force limit (e.g., by limiting motor current to a threshold level.) Third, the syringe plunger can be actuated to push a volume of air into the vial to replace the volume of fluid removed. Fourth, the syringe plunger can be retracted again to an amount approximately equal to the amount of air pumped into the vial. Fifth, the cycle can continue until the required amount of fluid is drawn into the syringe from the vial. Sixth, at the end of the cycling, the volume in the syringe can substantially match the required draw amount, and there can be a slight negative pressure in the vial.

In an illustrative embodiment, passed parameters may include:

Vial.MaxPressure—(Pmax) max pressure allowed in a vial in Atmospheres

Vial.MinPressure—(Pmin) minimum pressure (e.g. vacuum) allowed in a vial in atmospheres Vial.HeadVolume—(Vh) volume of air in vial (headspace) in milliliters Vial.FluidVolume—(Vfv) total volume of fluid (e.g., drug) in the vial in milliliters Drug.VolumeToDraw—(Vdrug) Volume of drug required to be drawn Syringe.MaxVolume—(SLmax) Maximum volume allowed in the syringe Syringe.MillilitrePerMM—VQsyr Local and Globals Process.CycleControl—(cycle) used for process and logic control Process.Completion Control—(complete) used for logic control Volume.Total—(Vtot) total volume of air across syringe and vial Syringe.VolumeOfAir (Vas)

Drug.VolumeToDisplace (Vdl)

Syringe.CurrentLevel—(SL) current syringe level of plunger

Initialize

SyringeLimitMax=30 (milliliters)//SLMax

VolumeDisplacedPerMM=calculated value using syringe characteristics//VQsyr

CompletionControl=0//complete

CycleControl=0//cycle

VolumeAirinSyringe=0.0//assume initial volume

TotalVolume=Volume

The APAS cell syringe manipulator 322 or 334 can operate to extend and/or retract the plunger. The syringe can be used to transfer fluids so each syringe has an attached needle, where the needle is engaged in the septum of a bag or a vial such that the plunger articulation achieves a fluid transfer. The method may alternate between plunger extension and retraction using an algorithm to calculate varying lengths and directions of plunger travel to transfer fluid into the syringe while maintaining appropriate pressure in the target receptacle to prevent aerosolizing of contents. In some embodiments of the APAS, the syringe manipulator may perform extraction and retraction operations using the syringe as the fluid transfer mechanism. In some embodiments, such operations may be performed advantageously without additional fluid transfer stations.

In various embodiments, adaptations may include other features and capabilities. For example, some systems may be implemented as a computer system that can be used with implementations of the invention. For example, various implementations may be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating output. The software can incorporate multi-threading or parallel operations to improve the throughput of the APAS cell. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The computer system may be implemented as a distributed computing system, and can include clients and servers. A client and server are generally remote from each other and typically interact through a network. The relationship of client and server arises by virtue of computer programs running on the respective computers and having a client-server relationship to each other.

Some embodiments can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of analog or digital data communication, including packet-based messages, on a communication network. Examples of communication networks include, e.g., a LAN, a WAN, wireless and/or optical networks, and the computers and networks forming the Internet.

In various embodiments, systems such as those described herein for handling IV bags and/or syringes, among other items, may communicate information using suitable communication methods, equipment, and techniques. For example, the APAS controller may communicate with the hospital LAN and/or a hospital pharmacy network using point-to-point communication in which a message is transported directly from the source to the receiver over a dedicated physical link (e.g., fiber optic link, point-to-point wiring, daisy-chain). Other embodiments may transport messages by broadcasting to all or substantially all devices that are coupled together by a communication network, for example, by using omni-directional radio frequency (RF) signals, while still other embodiments may transport messages characterized by high directivity, such as RF signals transmitted using directional (e.g., narrow beam) antennas or infrared signals that may optionally be used with focusing optics. Still other embodiments are possible using appropriate interfaces and protocols such as, by way of example and not intended to be limiting, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope that may be claimed.

What is claimed is:

1. A robotic automated pharmaceutical processing system comprising:

- a processor-based interface configured to receive requests to prepare one or more pharmaceutical prescriptions; and
- a controller coupled to the interface and configured to operate an automated prescription preparation device in response to the received requests, the automated prescription preparation device comprising:
  - an inventory chamber comprising a housing to store within the inventory chamber a plurality of inventory items to be used in preparation of one or more pharmaceutical prescriptions,
  - a compounding chamber access portal in a first side of the inventory chamber,
  - a compounding chamber adjacent to the inventory chamber and communicating with the inventory chamber through the compounding chamber access portal in the first side, a multi-axis multi-linkage robot disposed within the compounding chamber and configured to grasp a first inventory item being presented from the inventory chamber through the compounding chamber access portal, convey the first inventory item to a first process location, release the first inventory item for processing at the first process location, and subsequently convey the first inventory item to a second process location in the compounding chamber, a syringe manipulator station within the compounding chamber configured to hold a syringe, and an IV bag holding station adapted to receive an IV bag from the multi-axis multi-linkage robot and operable to rotate between a first position configured to support the received IV bag with a port of the IV bag directed substantially upwards, and a second position configured to support the received IV bag with the port of the IV bag directed substantially downwards, wherein the IV bag holding station is further adapted to register the port of the IV bag with a first needle of the syringe held by the syringe manipulator station while the IV bag holding station is in either the first position or the second position.

2. The system of claim 1, further comprising an exterior access portal formed in a second side wall of the housing of the inventory chamber, wherein the exterior access portal is operable between a closed position and an open position to provide an operator access for loading and unloading inventory items in the inventory chamber.

3. The system of claim 1, wherein the first side is disposed between the compounding chamber and the inventory chamber, the compounding chamber access portal being formed in a first side wall that comprises a divider between the compounding chamber and the inventory chamber.

4. The system of claim 1, further comprising an air handling system arranged to provide air flow through the compounding chamber, the air handling system being arranged to produce a substantially uniform airflow from a ceiling of the compounding chamber toward a floor of the compounding chamber, wherein the air handling system is further arranged to reduce air pressure inside the compounding chamber to a level substantially below an ambient air pressure proximate and exterior to the compounding chamber.

5. The system of claim 4, further comprising a waste container area disposed in proximity to the compounding chamber to receive inventory items that have been processed in the compounding chamber; and an aperture that couples the compounding chamber to the waste container area, wherein the air handling system is arranged to cause at least a portion of the provided air flow to flow from an interior region of the compounding chamber through the aperture generally toward a waste container disposed in the waste container area.

6. The system of claim 5, further comprising a door proximate the aperture, wherein the door permits, when in an open position, and substantially prevents, when in a closed position, the provided air flow to flow from the interior region of the compounding chamber through the aperture generally toward the waste container disposed in the waste container area.

7. The system of claim 1, further comprising a prescription database operationally coupled to the controller to provide recipe information for controlling the automated pharmaceutical processing system to prepare any of a plurality of prescriptions, wherein the automated prescription preparation device is configured to prepare the prescription for output in one of an IV bag or a syringe.

8. The system of claim 1, further comprising a rotatable inventory carousel disposed in the inventory chamber to receive the plurality of inventory items, wherein the carousel is rotatable about a vertical axis and comprises a first plurality of locations each adapted to receive an IV bag, a second plurality of locations each adapted to receive a vial that contains a drug, and a third plurality of locations each adapted to receive a syringe configured with a plunger slidably disposed within a first end of a barrel and a needle coupled to a second opposite end of the barrel, and wherein the carousel is configured to bring a selected one of the locations in proximity to the compounding chamber access portal to present a selected inventory item being stored at the selected location to the compounding chamber access portal.

9. The system of claim 1, further comprising a shaking station configured to impart a motion to a vial to mix the contents of the vial before drawing fluid from the vial.

10. The system of claim 1, wherein the syringe manipulator station is further configured to hold the same or another syringe with a needle of the held syringe directed in a downward orientation for injecting fluid from the syringe into a vial.

11. The system of claim 1, wherein, upon completion of a fluid transfer operation, the system is further configured to withdraw a volume of fluid from a vial to produce a negative pressure in the vial relative to ambient pressure outside of the vial.

12. A robotic automated pharmaceutical processing system comprising:

a processor-based interface configured to receive requests to prepare one or more pharmaceutical prescriptions; and a controller coupled to the interface and configured to operate an automated prescription preparation device in response to the received requests, the automated prescription preparation device comprising:

an inventory chamber comprising a housing to store within the inventory chamber a plurality of inventory items to be used in preparation of one or more pharmaceutical prescriptions, a compounding chamber access portal in a second side of the inventory chamber, a compounding chamber adjacent to the inventory chamber and communicating with the inventory chamber through the compounding chamber access portal in the second side, the second side being disposed between the compounding chamber and the inventory chamber, the compounding chamber access portal being formed in a second side wall that comprises a divider between the compounding chamber and the inventory chamber, a multi-axis multi-linkage robot disposed within the compounding chamber and configured to grasp a first inventory item being presented from the inventory chamber through the compounding chamber access portal, convey the first inventory item to a first process location, release the first item for processing at the first process location, and subsequently convey the first inventory item to a second process location in the compounding chamber, and an air handling system arranged to provide air flow through the compounding chamber, the air handling system being arranged to produce a substantially uniform airflow from a ceiling of the compounding chamber toward a floor of the compounding chamber, wherein the automated prescription preparation device is configured to prepare a first pharmaceutical prescription for output in one of an IV bag or a syringe, and upon completion of a fluid transfer operation, the system is further configured to leave the vial at a negative pressure relative to the ambient pressure outside the vial.

13. The system of claim 12, wherein the air handling system is further arranged to reduce air pressure inside the compounding chamber to a level substantially below an ambient air pressure proximate and exterior to the compounding chamber.

14. The system of claim 12, further comprising a waste container area disposed in proximity to the compounding chamber to receive inventory items that have been processed in the compounding chamber.

15. The system of claim 14, further comprising an aperture that couples the compounding chamber to the waste container area, wherein the air handling system is arranged to cause at least a portion of the provided air flow to flow from an interior region of the compounding chamber through the aperture generally toward a waste container disposed in the waste container area.

16. The system of claim 15, further comprising a door proximate the aperture, wherein the door permits, when in an open position, and substantially prevents, when in a closed position, the provided air flow to flow from the interior region of the compounding chamber through the aperture generally toward the waste container disposed in the waste container area.

17. The system of claim 12, further comprising a rotatable inventory carousel disposed in the inventory chamber to receive the plurality of inventory items, wherein the carousel is rotatable about a vertical axis and comprises a first plurality of locations each adapted to receive an IV bag, a second plurality of locations each adapted to receive a vial that contains a drug, and a third plurality of locations each adapted to receive a syringe configured with a plunger slidably disposed within a first end of a barrel and a needle coupled to a second opposite end of the barrel, and wherein the carousel is configured to bring a selected one of the locations in proximity to the compounding chamber access portal to present a selected inventory item being stored at the selected location to the compounding chamber access portal.

18. The system of claim 12, further comprising a syringe manipulator station configured to hold a syringe with a needle directed in a generally upward orientation for drawing fluid through the needle from a vial into the held syringe, and hold the same or another syringe with the needle directed in a downward orientation for injecting fluid from the syringe into the vial.

19. The system of claim 18, wherein the syringe manipulator station is further configured to hold the same or another syringe with the needle directed in a downward orientation for injecting fluid from the syringe into an IV bag.

20. The system of claim 18, further comprising an IV bag holding station adapted to receive an IV bag from the multi-axis multi-linkage robot and operable to rotate between a first position configured to support the received IV bag with a port of the IV bag directed substantially upwards, and a second position configured to support the received IV bag with the port of the IV bag directed substantially downwards, wherein the IV bag holding station is further adapted to register the port of the IV bag with the needle of the syringe held by the syringe manipulator station while the IV bag holding station is in either the first position or the second position.

* * * * *